US011808031B2

(12) United States Patent  
Wright

(10) Patent No.: US 11,808,031 B2  
(45) Date of Patent: *Nov. 7, 2023

(54) INSULATABLE, INSULATIVE FRAMEWORK APPARATUS AND METHODS OF MAKING AND USING SAME

(71) Applicant: J. David Wright LLC, New Haven, CT (US)

(72) Inventor: John David Wright, Woodbridge, CT (US)

(73) Assignee: J. David Wright LLC, New Haven, CT (US)

(*) Notice: Subject to any disclaimer, the term of this patent is extended or adjusted under 35 U.S.C. 154(b) by 7 days.

This patent is subject to a terminal disclaimer.

(21) Appl. No.: 17/218,560

(22) Filed: Mar. 31, 2021

(65) Prior Publication Data

US 2021/0285206 A1 Sep. 16, 2021

Related U.S. Application Data

(63) Continuation of application No. 16/547,326, filed on Aug. 21, 2019, now Pat. No. 11,066,826.

(Continued)

(51) Int. Cl.  
*E04B 1/00* (2006.01)  
*E04B 1/78* (2006.01)  
(Continued)

(52) U.S. Cl.  
CPC .................. *E04B 1/78* (2013.01); *E04B 1/14* (2013.01); *E04B 1/2604* (2013.01);  
(Continued)

(58) Field of Classification Search  
CPC .......... E04C 3/16; E04C 3/122; E04B 1/7654; E04B 1/78; E04B 1/14; E04B 1/2604;  
(Continued)

(56) References Cited

U.S. PATENT DOCUMENTS 560,900 A ‡ 5/1896 Fredricks ............... A44C 21/00  
40/27.5  
917,433 A 4/1909 Hoffheimer  
(Continued)

FOREIGN PATENT DOCUMENTS

CA 1182266 A 2/1985  
CA 2112924 7/1995  
(Continued)

OTHER PUBLICATIONS

"Measure Guideline: Wood Window Repair, Rehabilitation, and Replacement" by Peter Baker, Building America Report—120, Building Science Press, 2012; retrieved from https://www.buildingscience.com/documents/bareportslba-1 203-wood-window-repair-rehabilitation-replacement/ view, 96 pages "Heat and Mass Transfer: a practical approach—3rd edition" by Y.A. Qengel, McGraw-Hill, New York, N.Y. (2003), pp. 147-149 "Acoustic Absorption in Porous Materials," by Kuczmarski et. aAl, NASA/TM—2011-216995, 27 pages.‡

(Continued)

*Primary Examiner* — Chi Q Nguyen  
(74) *Attorney, Agent, or Firm* — UConn IP Law Clinic

(57) ABSTRACT

A building framework is disclosed herein comprising a first structural member, a second structural member, and a third structural member disposed between the first and second structural members, a first web member connecting the first and third structural members in a spaced apart relationship, and a second web member connecting the second and third structural members in a spaced apart relationship. The first web member is positioned relative to the second web member such that the shortest distance between the first web member and second web member is greater than or equal to 5 times the thickness of the third structural member. Additional products, systems, and methods also are disclosed.

20 Claims, 55 Drawing Sheets

Related U.S. Application Data

(60) Provisional application No. 62/720,808, filed on Aug. 21, 2018.

(51) Int. Cl.
  E04B 1/14 (2006.01)
  E04B 1/26 (2006.01)
  E04B 1/76 (2006.01)
  E04B 1/24 (2006.01)
  E04B 1/94 (2006.01)

(52) U.S. Cl.
  CPC .......... *E04B 1/7654* (2013.01); *E04B 1/2403* (2013.01); *E04B 1/26* (2013.01); *E04B 1/94* (2013.01)

(58) Field of Classification Search
  CPC ...... E04B 1/94; E04B 1/10; E04B 2001/7679; E04B 2001/2672; E04B 1/2403; E04B 1/26
  USPC ...................... 52/235, 481.1, 656.1, 243, 270
  See application file for complete search history.

(56) References Cited

U.S. PATENT DOCUMENTS

| | | | | |
|---|---|---|---|---|
| 1,356,764 A | ‡ | 10/1920 | Henderson | E04C 2/12 428/406 |
| 1,676,258 A | ‡ | 2/1924 | Fork | E04C 3/086 29/897.31 |
| 1,656,810 A | ‡ | 1/1928 | Arnstein | B64C 1/065 52/634 |
| 1,762,786 A | ‡ | 6/1930 | McKeown | E04C 3/292 52/642 |
| 1,974,227 A | ‡ | 9/1934 | Witty | C04B 28/32 106/687 |
| 2,150,898 A | ‡ | 3/1939 | Ackley | E04B 2/58 52/293.3 |
| 2,169,253 A | ‡ | 8/1939 | Kotrbaty | E04C 3/09 52/693 |
| 2,302,194 A | ‡ | 11/1942 | Dayton | E04B 1/2608 403/217 |
| 2,335,220 A | | 11/1943 | Edwards | |
| 2,398,603 A | | 4/1946 | Soderberg | |
| 2,470,641 A | | 5/1949 | Portz | |
| 2,578,599 A | | 12/1951 | Rose | |
| 2,827,676 A | | 3/1958 | Sanford | |
| 2,831,793 A | | 4/1958 | Elmendorf | |
| 2,917,408 A | | 12/1959 | Goldstein et al. | |
| 2,922,201 A | ‡ | 1/1960 | Baker | E04B 2/707 52/481.1 |
| 2,988,854 A | ‡ | 6/1961 | McKinley | E04B 1/2608 52/639 |
| 2,998,140 A | | 8/1961 | Hoffman et al. | |
| 3,076,738 A | ‡ | 2/1963 | Uschmann | B27D 1/00 156/306.9 |
| 3,090,164 A | ‡ | 5/1963 | Nelsson | E04F 13/0803 52/346 |
| 3,131,034 A | ‡ | 4/1964 | Marsh | F26B 21/02 34/496 |
| 3,159,235 A | ‡ | 12/1964 | Young | E04B 2/7412 52/404.5 |
| 3,199,213 A | ‡ | 8/1965 | Milligan | F26B 21/004 34/396 |
| 3,262,723 A | ‡ | 7/1966 | Strickler | B27F 1/16 403/265 |
| 3,283,464 A | ‡ | 11/1966 | Litzka | E04C 3/086 52/636 |
| 3,314,209 A | ‡ | 4/1967 | Troutner | E04C 3/292 52/639 |
| 3,452,502 A | ‡ | 7/1969 | Price | E04C 3/16 52/693 |
| 3,490,188 A | ‡ | 1/1970 | Troutner | E04C 3/12 52/644 |
| 3,507,524 A | ‡ | 4/1970 | Steidle-Sailer | F16B 12/04 403/219 |
| 3,611,653 A | | 10/1971 | Zinn | |
| 3,651,612 A | ‡ | 3/1972 | Schmitt | E04C 3/16 52/693 |
| 3,947,309 A | | 3/1976 | Troutner | |
| 3,956,555 A | ‡ | 5/1976 | McKean | B27N 3/143 428/106 |
| 3,992,838 A | ‡ | 11/1976 | Vizziello | E04B 2/702 52/233 |
| 3,992,839 A | * | 11/1976 | La Borde | E04B 2/721 52/592.1 |
| 3,999,343 A | * | 12/1976 | Roberts | E04B 2/7412 52/241 |
| 4,001,999 A | | 1/1977 | Chandler | |
| 4,078,352 A | ‡ | 3/1978 | Knowles | B27F 7/155 52/693 |
| 4,157,002 A | | 6/1979 | Adolph | |
| 4,207,719 A | | 6/1980 | Knowles | |
| 4,224,774 A | ‡ | 9/1980 | Petersen | E04B 2/707 52/404.1 |
| 4,228,631 A | | 10/1980 | Geffe | |
| 4,235,057 A | | 11/1980 | Teeters | |
| 4,336,678 A | | 6/1982 | Peters | |
| 4,344,263 A | | 8/1982 | Farmont | |
| 4,372,093 A | ‡ | 2/1983 | Ericsson | E04C 3/292 52/642 |
| 4,478,018 A | ‡ | 10/1984 | Holand | E04B 1/762 52/220.1 |
| 4,559,748 A | ‡ | 12/1985 | Ressel | E04B 7/022 52/262 |
| 4,568,577 A | ‡ | 2/1986 | Fischetti | B27M 3/006 428/33 |
| 4,578,909 A | | 4/1986 | Henley et al. | |
| 4,617,776 A | ‡ | 10/1986 | Bergstrom | E04C 2/34 52/1 |
| 4,630,424 A | | 12/1986 | Eberle et al. | |
| 4,639,176 A | | 1/1987 | Smith et al. | |
| 4,644,014 A | ‡ | 2/1987 | Thomson | C04B 7/7438 521/68 |
| 4,731,389 A | ‡ | 3/1988 | Christopher | E04B 1/7604 521/103 |
| 4,852,314 A | | 8/1989 | Moore, Jr. | |
| 4,982,545 A | ‡ | 1/1991 | Stromback | E04C 3/07 52/639 |
| 5,144,785 A | ‡ | 9/1992 | Berglund | E04B 1/26 52/690 |
| 5,299,400 A | ‡ | 4/1994 | Sing | B27M 3/0053 144/340 |
| 5,505,031 A | * | 4/1996 | Heydon | E04B 1/7654 52/800.1 |
| 5,560,177 A | ‡ | 10/1996 | Brightwell | E04C 3/16 52/690 |
| 5,609,006 A | | 3/1997 | Boyer | |
| 5,617,693 A | | 4/1997 | Hefner | |
| 5,625,996 A | | 5/1997 | Bechtel | |
| 5,657,606 A | ‡ | 8/1997 | Ressel | E04B 1/08 52/293.1 |
| 5,664,388 A | ‡ | 9/1997 | Chapman | E04C 3/065 52/262 |
| 5,678,381 A | ‡ | 10/1997 | DenAdel | E04C 3/29 52/836 |
| 5,706,620 A | * | 1/1998 | De Zen | E04B 7/20 52/270 |
| 5,755,067 A | | 5/1998 | Mercurio | |
| 5,761,872 A | | 6/1998 | Sanford | |
| 5,761,873 A | | 6/1998 | Slater | |
| 5,904,025 A | ‡ | 5/1999 | Bass | E04G 23/0218 52/167.3 |
| 5,953,883 A | | 9/1999 | Ojala | |
| 5,985,415 A | ‡ | 11/1999 | Giltner | B27F 1/16 403/364 |
| 6,073,413 A | | 6/2000 | Tongiatama | |
| 6,088,989 A | | 7/2000 | Matsu et al. | |

(56) References Cited

U.S. PATENT DOCUMENTS

| | | | |
|---|---|---|---|
| 6,205,729 B1 ‡ | 3/2001 | Porter | B32B 29/00 52/309.7 |
| 6,209,284 B1 ‡ | 4/2001 | Porter | E04B 1/26 52/268 |
| 6,231,950 B1 ‡ | 5/2001 | Giltner | B27F 1/16 403/364 |
| 6,240,695 B1 ‡ | 6/2001 | Karalic | E04C 3/02 52/656.1 |
| 6,276,110 B1 ‡ | 8/2001 | Karlsson | B27F 5/00 52/836 |
| 6,291,049 B1 ‡ | 9/2001 | Kunkel | B32B 3/06 428/119 |
| 6,308,469 B1 * | 10/2001 | Leung | E04B 1/10 52/693 |
| 6,378,579 B1 ‡ | 4/2002 | Giltner | B27F 1/16 144/345 |
| 6,389,767 B1 ‡ | 5/2002 | Lucey | E04B 1/24 52/223.1 |
| 6,415,580 B2 | 7/2002 | Ojala | |
| 6,460,297 B1 ‡ | 10/2002 | Bonds | E04C 2/384 52/234 |
| 6,460,310 B1 ‡ | 10/2002 | Ford | E04C 3/14 52/837 |
| 6,494,012 B2 | 12/2002 | Seng | |
| 6,526,723 B2 ‡ | 3/2003 | Hovenier | E04C 3/16 248/200.1 |
| 6,534,143 B1 ‡ | 3/2003 | Thoma | B32B 7/08 428/44 |
| 6,571,523 B2 ‡ | 6/2003 | Chambers | E04B 1/14 52/270 |
| 6,701,690 B2 ‡ | 3/2004 | Deschenes | E04C 3/16 52/837 |
| 6,772,572 B2 | 8/2004 | Henthorn | |
| 6,910,311 B2 | 6/2005 | Lindberg et al. | |
| 6,960,277 B2 | 11/2005 | Brunet | |
| 7,225,593 B2 | 6/2007 | Wilhour | |
| 7,225,594 B2 | 6/2007 | Karlström et al. | |
| 7,356,974 B2 ‡ | 4/2008 | Tadich | E04C 3/292 52/693 |
| 7,418,874 B2 | 9/2008 | Leitinger et al. | |
| 7,543,419 B2 | 6/2009 | Rue | |
| 7,571,578 B2 | 8/2009 | Moody et al. | |
| 7,617,648 B2 | 11/2009 | Moody | |
| 7,743,578 B2 ‡ | 6/2010 | Edmondson | E04C 3/07 52/653.1 |
| 7,866,112 B2 | 1/2011 | Edmondson | |
| 7,975,736 B2 ‡ | 7/2011 | Poutanen | B27F 1/16 144/347 |
| 8,091,297 B2 | 1/2012 | Tiberi et al. | |
| 8,109,058 B2 | 2/2012 | Miller | |
| 8,109,302 B2 | 2/2012 | Borne | |
| 8,166,724 B2 * | 5/2012 | Lemyre | E04C 3/18 52/696 |
| 8,176,699 B1 ‡ | 5/2012 | Birchfield | E04H 9/14 52/407.3 |
| 8,307,610 B2 | 11/2012 | Landers | |
| 8,347,573 B2 | 1/2013 | Stanhope | |
| 8,397,454 B2 ‡ | 3/2013 | Commins | E04B 1/26 52/293.3 |
| 8,424,266 B2 ‡ | 4/2013 | Edmondson | E04C 3/09 52/653.1 |
| 8,434,232 B2 ‡ | 5/2013 | Jones, III | E04C 3/08 29/897.31 |
| 8,516,778 B1 | 8/2013 | Wilkens | |
| 8,528,294 B2 ‡ | 9/2013 | Vanker | E04B 1/1903 52/690 |
| 8,640,429 B1 ‡ | 2/2014 | Watts | E04C 3/28 52/838 |
| 8,671,636 B2 ‡ | 3/2014 | Bruner | E04B 2/706 52/274 |
| 8,695,295 B2 ‡ | 4/2014 | Thornton | E04C 3/42 52/233 |
| 8,756,889 B2 ‡ | 6/2014 | LeBlang | E04B 2/763 52/309.12 |
| 8,820,034 B1 ‡ | 9/2014 | Watts | E04C 3/16 52/838 |
| 8,904,737 B2 ‡ | 12/2014 | Schiffmann | E04B 1/0007 52/793.1 |
| 8,919,071 B2 ‡ | 12/2014 | Vanker | E04C 3/08 52/693 |
| 8,997,424 B1 ‡ | 4/2015 | Miller | E04B 1/08 52/481.1 |
| 9,010,054 B2 | 4/2015 | Herdt et al. | |
| 9,221,189 B2 ‡ | 12/2015 | Lachance | B27C 9/02 |
| 9,315,000 B2 ‡ | 4/2016 | Anderson | B29C 44/58 |
| 9,493,940 B2 ‡ | 11/2016 | Collins | E04B 1/24 |
| 9,540,281 B2 ‡ | 1/2017 | Warner | B01F 5/0696 |
| 9,587,399 B2 ‡ | 3/2017 | Jakobsen | E04B 1/18 |
| 9,593,486 B2 ‡ | 3/2017 | Thompson | E04B 1/88 |
| 9,624,666 B2 ‡ | 4/2017 | Singleton | E04B 2/58 |
| 9,677,264 B2 ‡ | 6/2017 | Iverson | E04B 2/70 |
| 9,708,781 B2 ‡ | 7/2017 | Sanders | E04B 1/80 |
| 9,740,799 B2 ‡ | 8/2017 | Herdt | B29C 53/063 |
| 9,783,985 B2 | 10/2017 | Iverson | |
| 9,890,530 B2 ‡ | 2/2018 | Tierney | B32B 27/12 |
| 9,896,844 B2 ‡ | 2/2018 | Cossette | E04C 3/16 |
| 9,957,715 B1 ‡ | 5/2018 | Carlson | E04C 2/296 |
| 10,131,119 B2 ‡ | 11/2018 | Freres | B32B 21/042 |
| 10,184,241 B2 * | 1/2019 | Johnson | E04B 1/10 |
| 10,267,030 B1 ‡ | 4/2019 | Lepage | E04B 1/34838 |
| 10,487,506 B2 ‡ | 11/2019 | Thornton | E04C 3/292 |
| 11,066,826 B2 * | 7/2021 | Wright | E04C 3/16 |
| 11,255,084 B2 | 2/2022 | Roosevelt | |
| 2004/0010996 A1 ‡ | 1/2004 | Karlstrom | E04B 2/7453 52/838 |
| 2006/0168904 A1 | 8/2006 | Muszynski | |
| 2007/0130865 A1 ‡ | 6/2007 | Nusz | E04C 3/18 52/481.1 |
| 2007/0204560 A1 | 9/2007 | Konshuk | |
| 2007/0227095 A1 | 10/2007 | Hubbe | |
| 2008/0134619 A1 ‡ | 6/2008 | Nichols | E04B 5/48 52/690 |
| 2008/0141618 A1 ‡ | 6/2008 | Ritchie | E04C 2/34 52/796 |
| 2010/0269439 A1 ‡ | 10/2010 | Morrisette | E04B 1/80 52/309.4 |
| 2010/0293889 A1 | 11/2010 | Deboef, Jr. et al. | |
| 2012/0011793 A1 ‡ | 1/2012 | Clark | E04C 3/29 52/309.4 |
| 2014/0093678 A1 * | 4/2014 | Walker | E04C 2/34 428/161 |
| 2015/0267407 A1 ‡ | 9/2015 | Sirowatka | E04C 3/16 52/690 |
| 2017/0030072 A1 ‡ | 2/2017 | Corson | E04B 7/04 |
| 2018/0127979 A1 ‡ | 5/2018 | Thrall | E04C 3/11 |
| 2019/0017269 A1 ‡ | 1/2019 | Holt | E04C 3/29 |
| 2019/0071864 A1 ‡ | 3/2019 | Anderson | E04C 2/08 |
| 2019/0085557 A1 | 3/2019 | Carlson | |
| 2019/0100918 A1 ‡ | 4/2019 | Thornton | E04C 3/06 |
| 2019/0171999 A1 * | 6/2019 | Conboy | G06K 19/0723 |

FOREIGN PATENT DOCUMENTS

| | | |
|---|---|---|
| CA | 2008043 C | 12/1999 |
| CA | 2328338 | 12/2000 |
| CN | 106958290 A | 7/2017 |
| CN | 106968369 A | 7/2017 |
| EP | 2108758 A1 | 10/2009 |
| EP | 2108758 B1 | 12/2017 |
| FR | 2996572 A1 | 4/2014 |
| WO | WO1995/030807 A1 | 11/1995 |
| WO | WO1998022670 | 5/1998 |
| WO | WO1999049146 | 9/1999 |
| WO | WO2009/134137 A2 | 11/2009 |

(56) References Cited

FOREIGN PATENT DOCUMENTS

WO    WO2011/090418 A1    7/2011
WO    WO2012120310        9/2012

OTHER PUBLICATIONS

International Search Report and Written Opinion for PCT/US2019/047489 dated Nov. 7, 2019, 16 pages.‡

"Measure Guideline: Wood Window Repair, Rehabilitation, and Replacement" by Peter Baker, Building America Report—120, Building Science Press, 2012; retrieved from https://www.buildingscience.com/documents/bareports/ba-1203-wood-window-repair-rehabilitation-replacement/view, 96 pages.

"Heat and Mass Transfer: a practical approach—3rd edition" by Y.A. Çengel, McGraw-Hill, New York, N.Y. (2003), pp. 147-149.

"Acoustic Absorption in Porous Materials," by Kuczmarski et. aAl, NASA/TM—2011-216995, 27 pages.

ASTM Designation C168-97 "Standard Terminology Relating to Insulating Materials" reprinted by the American Society for Testing and Materials, Sep. 2012, 6 pages.

2018 International Energy Conservation Code; 1 page https://codes.iccsafe.org/content/iecc2018/chapter-4-re-residential-energy-efficiency?site_type=public.

"The Why of Psi" by Rolf Jacobson and Chris Petit, CertiPHIers Cooperative, Passive House Northwest Conference, 2017, 56 pages; retrieved from https://www.phnw.org/assets/Conference2017/presentations/why%20of%20psi%20-%20jacobson%20petit.pdf.

Extended European search report for application EP19852354.0-1005, dated Apr. 8, 2022, 7 pages.

\* cited by examiner
‡ imported from a related application

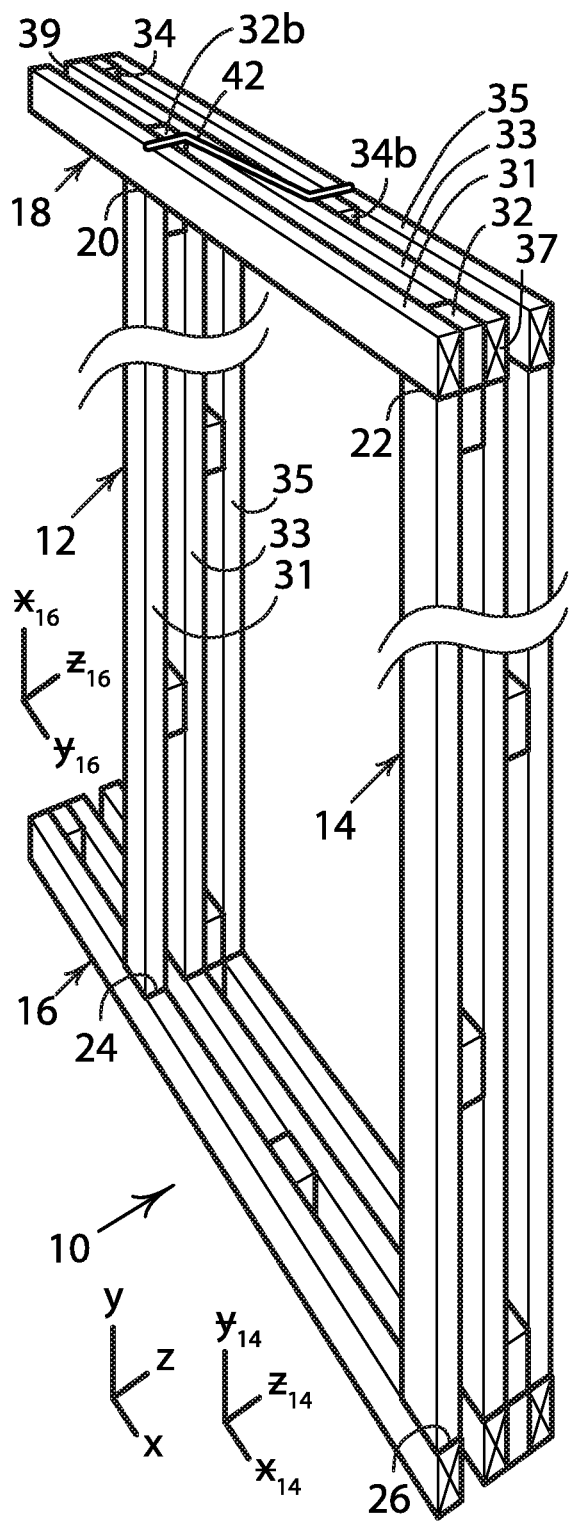
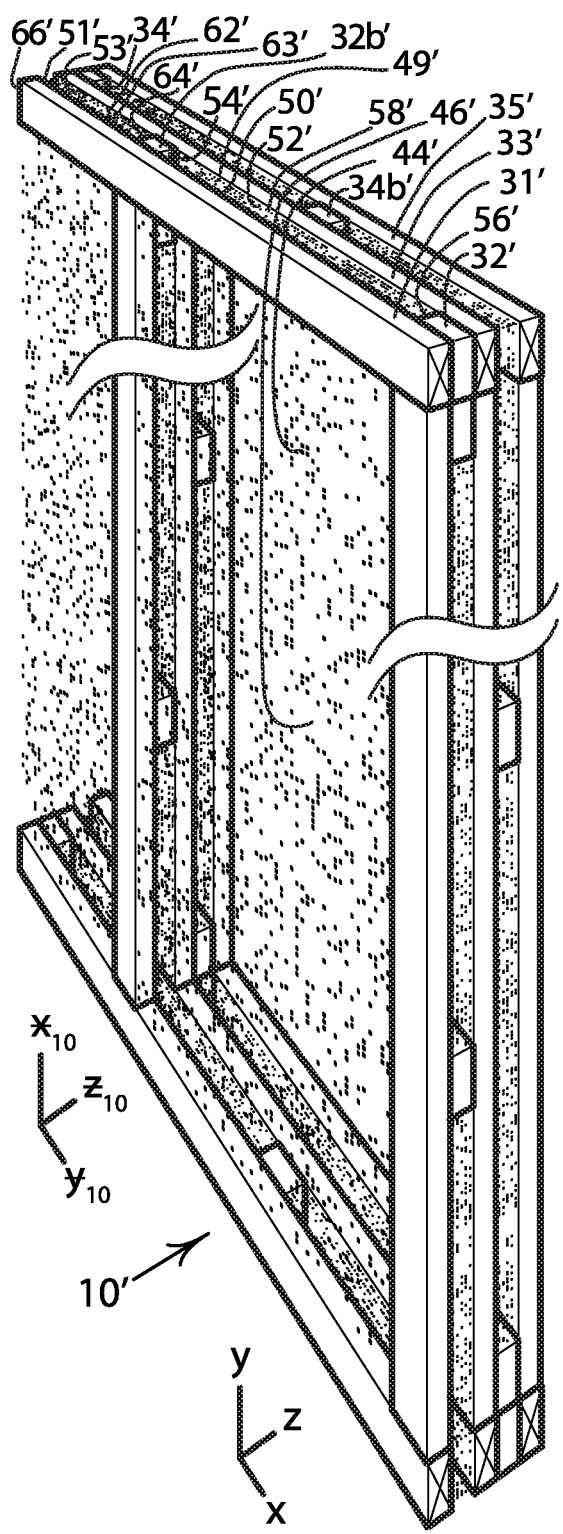
Fig. 1A
Fig. 1B

 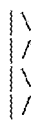     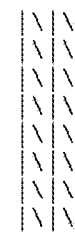 
Fig. 2B    Fig. 2C    Fig. 2D    Fig. 2E    Fig. 2F    Fig. 2G    Fig. 2H    Fig. 2I
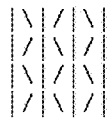 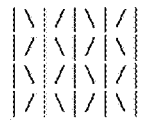
Fig. 2J    Fig. 2K
   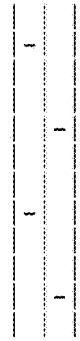 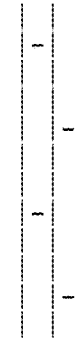  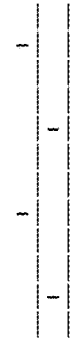 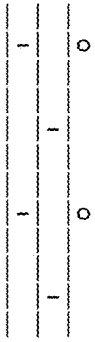
Fig. 2M    Fig. 2N    Fig. 2O    Fig. 2P    Fig. 2Q    Fig. 2R    Fig. 2S    Fig. 2T

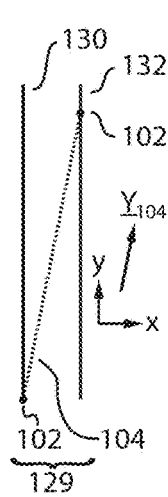 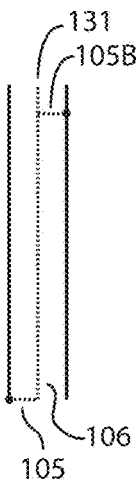 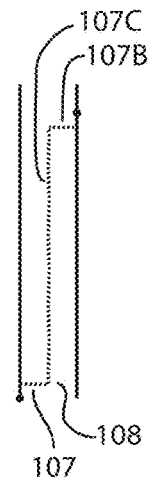 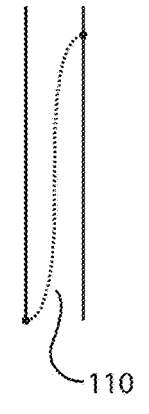  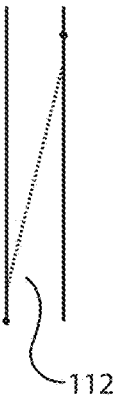
Fig. 3A   Fig. 3B   Fig. 3C   Fig. 3D   Fig. 3E   Fig. 3F
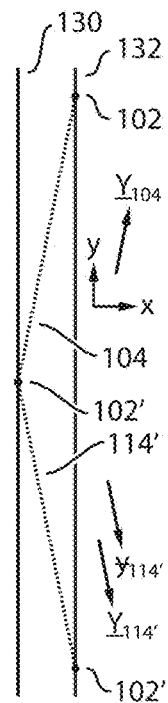 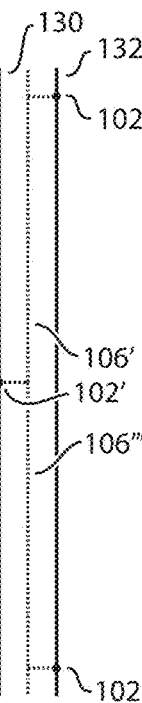 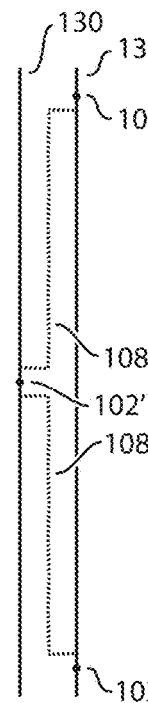 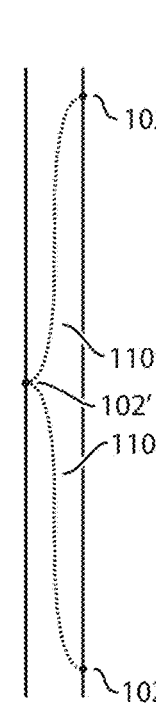 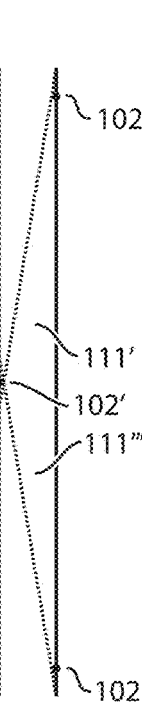 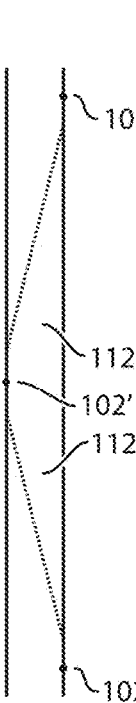
Fig. 3G   Fig. 3H   Fig. 3I   Fig. 3J   Fig. 3K   Fig. 3L

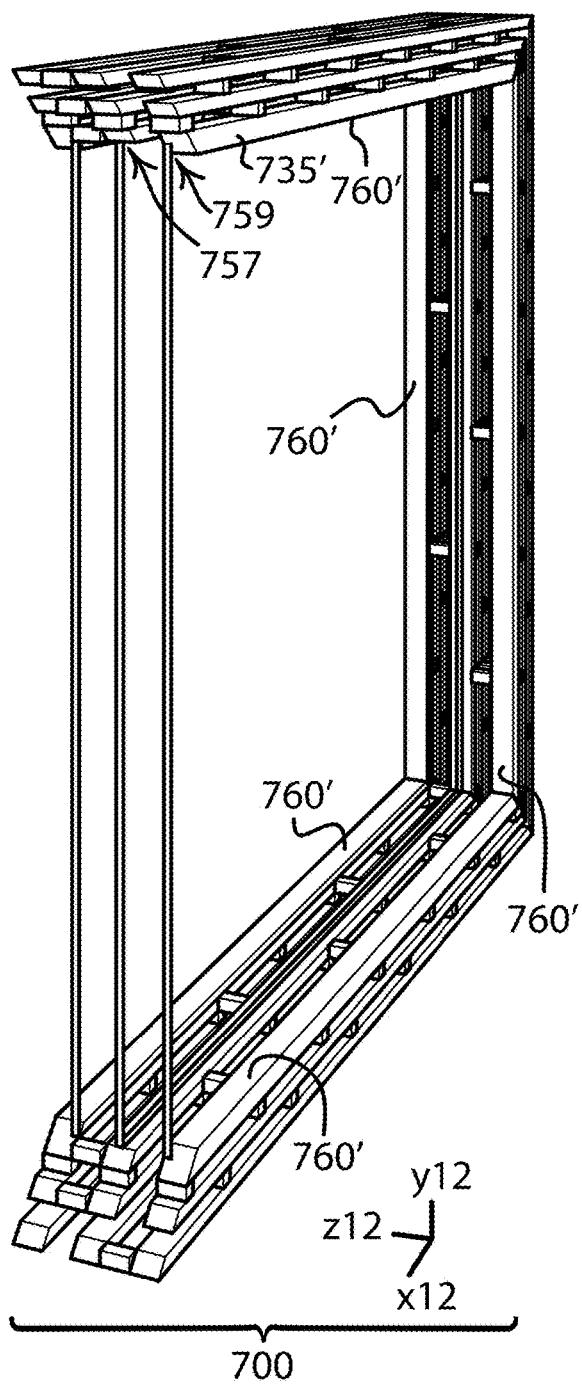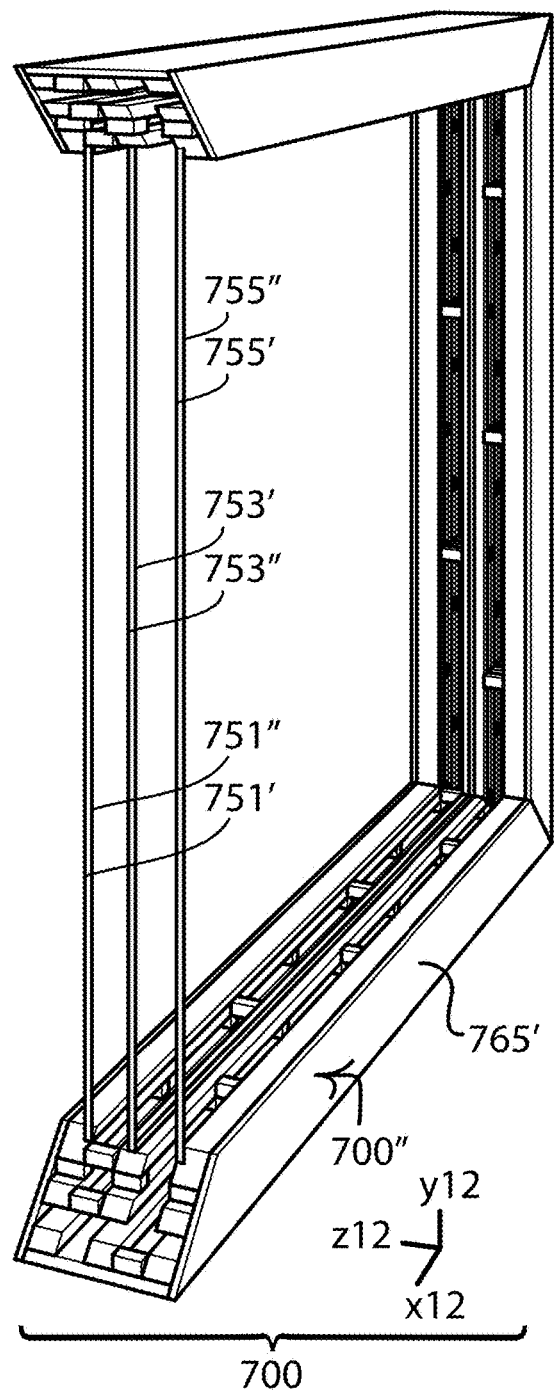
Fig. 12C
Fig. 12D

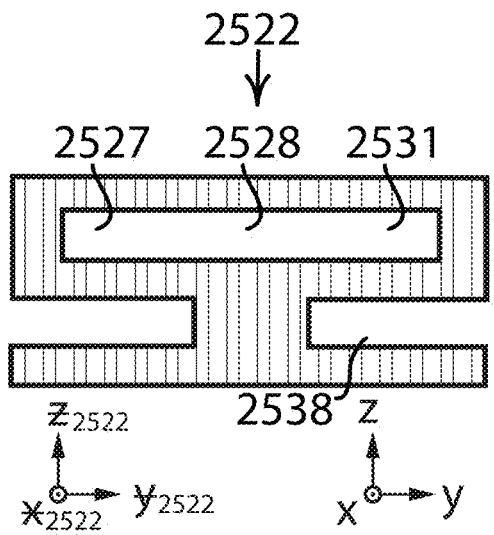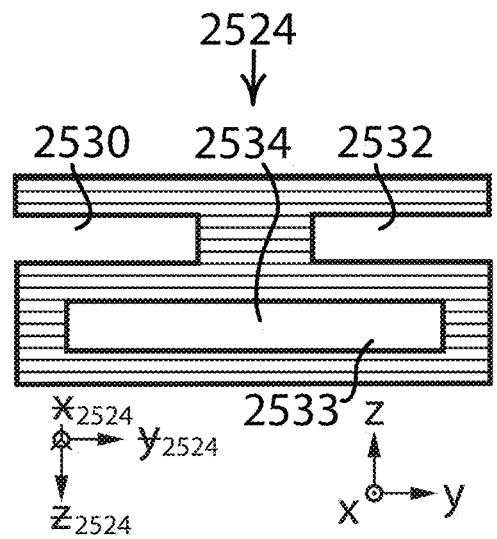
Fig. 30A          Fig. 30B
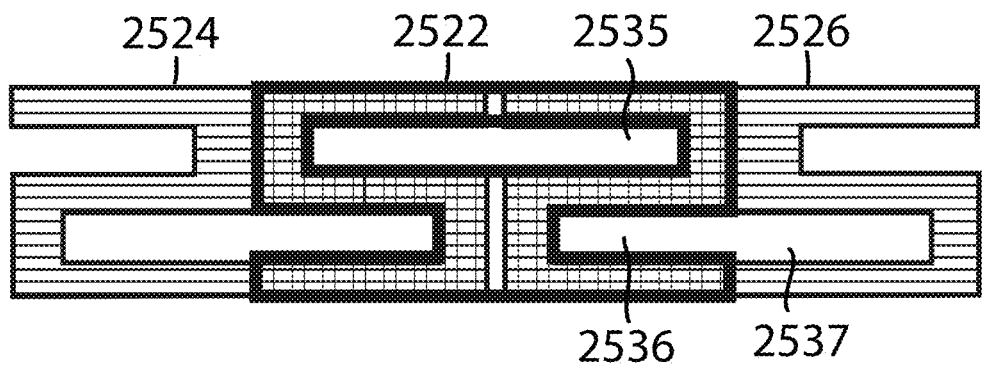
Fig. 30C
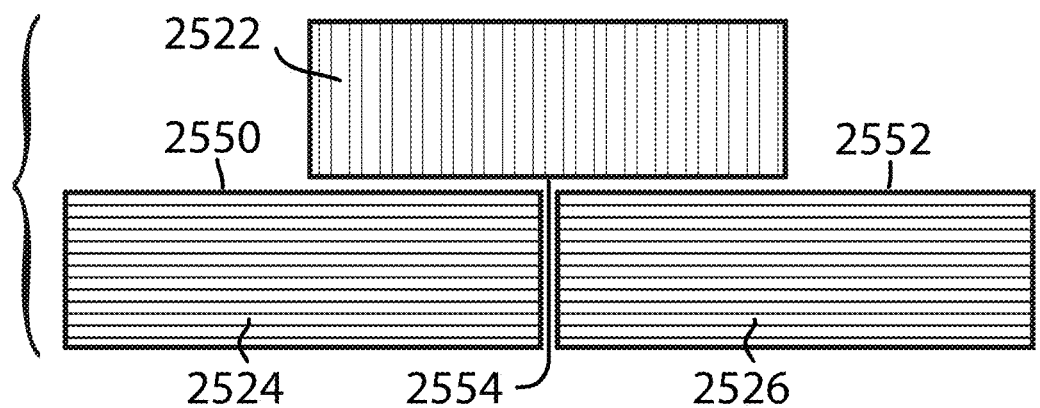
Fig. 30D 2565 2564 2563

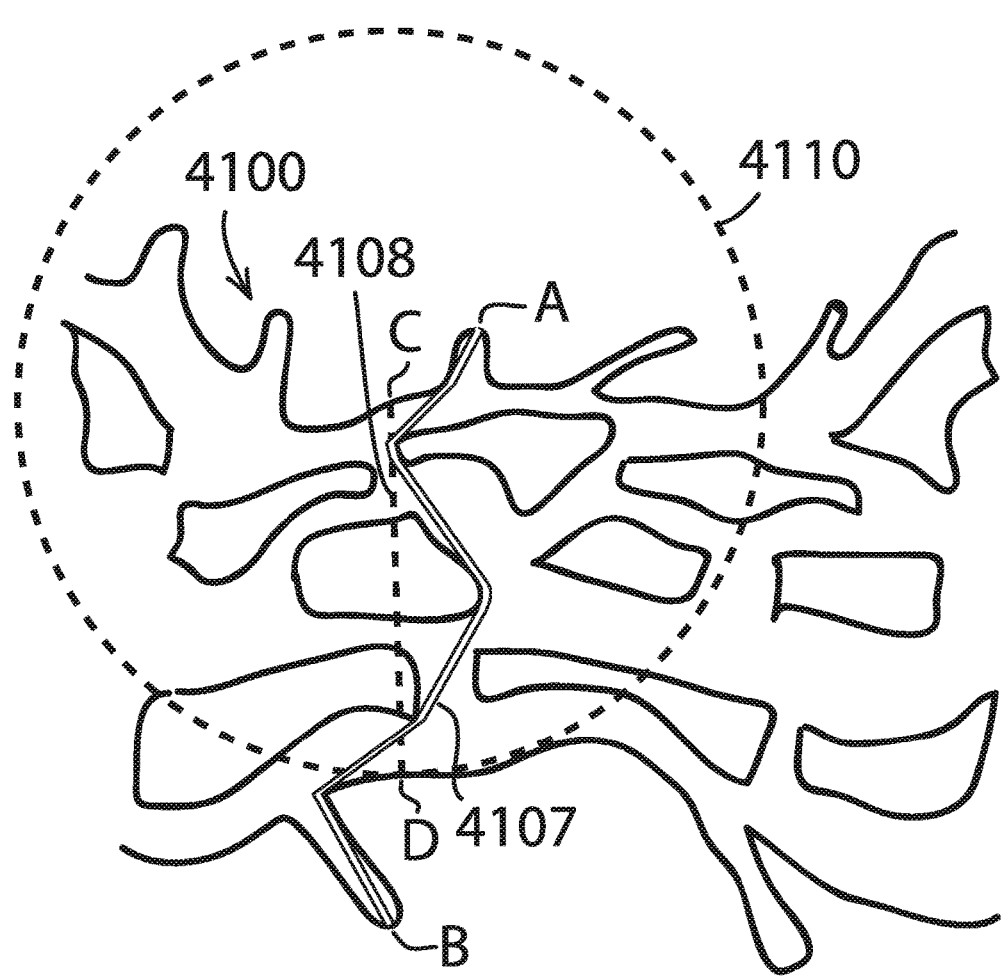
Fig. 40
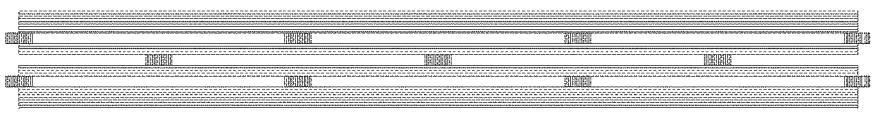 
Fig. 41A  Fig. 41B
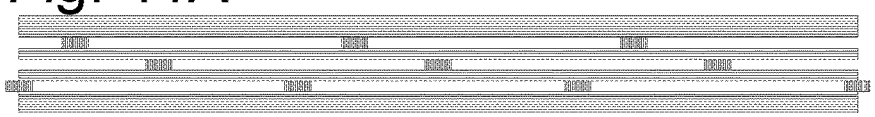 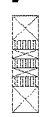
Fig. 42A  Fig. 42B

INSULATABLE, INSULATIVE FRAMEWORK APPARATUS AND METHODS OF MAKING AND USING SAME

CROSS-REFERENCE TO RELATED APPLICATIONS

The present application claims priority to U.S. patent application Ser. No. 16/547,326 filed Aug. 21, 2019, which claims the benefit of U.S. Provisional Patent Application No. 62/720,808 that was filed Aug. 21, 2018, the contents of which is hereby incorporated by reference in its entirety.

OTHER PUBLICATIONS

[1] "Measure Guideline: Wood Window Repair, Rehabilitation, and Replacement" by Peter Baker, Building America Report—120, Building Science Press, 2012. Retrieved from https://www.buildingscience.com/documents/bare-ports/ba-1203-wood-window-repair-rehabilitation-re-placement/view
[2] "Heat and Mass Transfer: a practical approach—$3^{rd}$ edition" by Y. A. Çengel, McGraw-Hill, New York, N.Y. (2003).
[3] "Acoustic Absorption in Porous Materials," by Kuczmarski et. al, NASA/TM-2011-216995.
[4] ASTM Designation C168-97 *"Standard Terminology Relating to Insulating Materials"* reprinted by the American Society for Testing and Materials.
[5] https://codes.iccsafe.org/content/iecc2018/chapter-4-re-residential-energy-efficiency?site_type=public
[6] "The Why of Psi" by Rolf Jacobson and Chris Petit, CertiPHIers Cooperative, Passive House Northwest Conference, 2017. Retrieved from
https://www.phnw.org/assets/Conference2017/presenta-tions/why% 200f% 20psi%20-%20jacobson%20petit.pdf.

BACKGROUND

This disclosure relates generally to construction, and more particularly to the construction of insulating structures with structural elements. Buildings account for approximately 30% of global energy consumption. The structural frame of a residential building framed with solid sawn lumber accounts for approximately 20% of the total inefficiency if no corrective measures are taken. This problem is called thermal bridging. Windows are a source of even greater inefficiency. For example, a calculation performed by Building Science Corporation shows that a wall with a nominal R-value of 15 (° F.·ft²·hr)/BTU, or 2.6 (° C.·m²)/W, has an actual R-value effectively equal to 7 (° F.·ft²·hr)/BTU, or 1.2 (° C.·m²)/W, producing an inefficiency of more than 50% when vinyl-frame double-pane windows with a nominal R-value of 5 (° F.·ft²·hr)/BTU that is 0.88 (° C.·m²)/W, constitute just 18% of the total wall area [1].

Experimental application of the present embodiments and methods using off-the-shelf parts such as common 2×4 lumber and glass produces a 2×4 wall with an actual R-value of 15 (° F.·ft²·hr)/BTU, or an actual $R_{SI}$ value of 2.6 (° C.·m²)/W, 0% inefficiency due to thermal bridging, and full efficiency (see FIG. 36E) relative to the nominal R-value of 15 (° F.·ft²·hr)/BTU, or 2.6 (° C.·m²)/W, for the wall (see Table 5) and more impressively a window with an actual R-value of 15 (° F.·ft²·hr)/BTU, an actual $R_{SI}$ value of 2.6 (° C.·m²)/W, 0% inefficiency due to thermal bridging, and full efficiency (see FIG. 36G) relative to the nominal R-value of 15 (° F.·ft²·hr)/BTU, or 2.6 (° C.·m²)/W, for the wall. Retrofitting every building with windows with full energy-efficiency relative to the rest of the building envelope over the course of 20 years alone would have a significant impact on the global energy consumption of buildings.

The embodiments and methods described herein represent a powerful way to address the problem and cost effectively construct buildings that can maintain a comfortable indoor environment via passive radiative heating by the sun in winter and passive radiative cooling to the sky in summer. The industry standard for calculating the energy efficiency of buildings is based on one-dimensional models of heat transfer. Due to this fact a rather lengthy disclosure is provided in order to explain how to intuitively understand heat flow in three dimensions and how to accurately correct the standard one-dimensional heat flow models to fully capture the effects of three-dimensional heat flow and thermal bridging.

For instance, the industry standard one-dimensional models of heat flow do not allow for the funneling type of effect where heat runs in a partially lateral direction across a wall into a thermal bridge and bypasses insulation (see wall assembly 3602 in FIG. 36B). For that reason, the effect of thermal bridging is usually underestimated. The more efficient a building the greater the impact of thermal bridging on the percentage of heat loss and heat gain. Industry standard two-dimensional models and three-dimensional models of heat transfer implemented by computer programs are inaccessible to most trades, require lengthy setup time, and yield little physical insight into the problems and solutions when actually used.

In contrast, this disclosure defines measurement paths (metric paths) that a builder can actually draw with a pencil and measure with a measuring tape (see FIGS. 1D-1H, FIG. 2AH, and FIG. 2AI). After measuring the length of the metric path in inches (mm) for heat flow the builder can simply multiply by the R-value per inch ($R_{SI}$ per mm) to obtain, the structurally insulative R-value, $R_{sval}$ ($R_{SIs}$), in imperial (metric) units. Conservatively this method can be as rigorous as a fully developed three-dimensional heat flow calculation but has the advantage of simplicity and greater physical insight into the paths of least resistance along which heat can and does actually flow in reality.

With experience, and based on this disclosure, the conscientious builder may come to appreciate that more indirect metric paths lead to larger structurally insulative R-values and more direct paths lead to smaller structurally insulative R-values. An experienced and conscientious builder may then develop an intuition about the lengths required to achieve a minimum structurally insulative R-value with common building materials such as wood without any actual measurements or calculations. The very concept of a structurally insulative R-value defined herein will help create awareness in the building industry about the problem of thermal bridging, how to accurately quantify the problem, and how to solve the problem.

The manufacturable products described herein have specified values of path lengths and indirectness built in to achieve any required minimum structurally insulative R-value and therefore do not require any calculations. After assembling the products, such as structurally insulative studs and plates (embodiments of the invention), into a structurally insulative frame (also an embodiment of the invention) using the same traditional methods as conventional stick framing, the builder has structurally insulated the building. After filling the air-sealed structural frame with insulation, the insulation contractor completes full insulation of the building against heat. A significant advantage is that the disclosed thermally and structurally insulative products also work to structurally insulate against sound and fire spread.

Non-structural insulative construction elements are generally known. Non-structural insulation has features generally including relatively high resistivity and relatively low density by comparison to the structural elements. It is problematic when the structural elements used to construct a structure allow energy in the form of heat, fire, electricity, radiation, sound, and vibration to bypass the insulation. It would be useful to provide sufficient strength to the structural element and provide sufficient space for insulation within the structural element yet reduce the flow of energy through the structural elements themselves in order to improve the performance of an insulating barrier or collection of insulating barriers that incorporate the structural elements.

A preferred solution to this problem is to design and build a structurally insulative insulatable framework that has (1) sufficiently long metric paths, i.e. the shortest paths along which heat flows between warmer and colder parts of the structure (insulative aspect), (2) sufficient interior space for insulation (insulatable aspect), (3) sufficiently thick and sufficiently wide structural parts (strength aspect), (4) balanced ratio of structural insulation length to thickness of insulation layers (balance between the insulative and insulatable aspects), (5) balanced ratio between thickness of insulation layers and thickness of structural parts (balance between insulatable and strength aspects).

Although developed for fire-safety and energy-efficiency in residential and commercial buildings, the present embodiments and methods have a broad range of application in other areas requiring structures that insulate not just against heat but also other forms of energy such as sound, fire, electricity, and vibration. For example application of the disclosed embodiments on a micro-structural or nano-structural level, with a sufficiently insulative gas filling the internal cavities, promises materials with high, engineered values of structurally insulative resistance and better overall resistance than that of state-of-the-art materials.

SUMMARY

One embodiment described herein is an apparatus comprising first, second, and third elongated structural members spaced apart from one another, a first web member connecting the first elongated structural member to the second elongated structural member, and a second web member connecting the second elongated structural member to the third elongated structural member. The second elongated structural member is positioned between the first and third elongated structural members. The first and second web members are configured to give a minimum rangewise indirectness greater than about zero+5%/−0% for the flow of energy along the shortest metric path between the first elongated structural member and third elongated structural member. The first and second web members are configured to make the cumulative distance between elongated structural members greater than 20% of the apparatus depth.

Another embodiment described herein is a framework apparatus comprising first, second, and third elongated structural members spaced apart from one another, a first web member connecting the first elongated structural member to the second elongated structural member, and a second web member connecting the second elongated structural member to the third elongated structural member. The third elongated structural member is positioned between the first and second elongated structural members. The first and second web members are configured to give a minimum rangewise indirectness greater than zero for the flow of energy along the shortest metric paths between the first elongated structural member and third elongated structural member. This condition means that the framework provides no direct paths and no straight diagonal paths for the conductive flow of energy through the elongated structural members and web members between the interior facing surfaces of the outermost structural parts of the framework.

A preferred embodiment is a building framework, comprising: a first elongated structural member, a second elongated structural member, and a third elongated structural member disposed between the first and second elongated structural members, a first web member connecting the first and third elongated structural members in a spaced apart relationship, and a second web member connecting the second and third elongated structural members in a spaced apart relationship, the second web member being closer to the first web member than any other web member disposed between the second and third elongated structural members. The first web member is positioned relative to the second web member such that the shortest distance between the first web member and second web member is greater than or equal 5 times the thickness of the third elongated structural member.

Another embodiment is a building apparatus comprising Nf frameworks joined together in a shape of an Nf-sided portion of an N-sided polygon around a perimeter of the apparatus with $2 \leq Nf \leq N$ and $N \geq 3$ wherein each of the Nf frameworks includes at least one set of three elongated structural members and at least two web members that maintain the three elongated structural members in a spaced apart, substantially parallel relationship, each of the at least two web members forming a connection between at least two structural members, each set of three elongated structural members and the web members forming a structural-member trio with the second structural member positioned between the first structural member and third structural member. In some embodiments, $3 \leq N \leq 20$.

As an alternative to any of the foregoing embodiments, each of the first, second and third elongated structural members is straight, and is in an aligned, coplanar relationship with the other elongated structural members.

As an alternative to any of the foregoing embodiments, the building framework is included as a portion in at least on member selected from the group consisting of a window frame, a wall stud, a cripple stud, a jack stud, a queen stud, a king stud, a sill plate, a sole plate, a header, a roof truss, a floor joist, a door frame, and a drywall frame.

As an alternative to any of the foregoing embodiments, the building framework further comprises an insulating substance positioned between at least one of the first elongated structural member and the third elongated structural member, and the second elongated structural member and the third elongated structural member.

As an alternative to any of the foregoing embodiments, each of the first and second web members has a structural strength per unit area greater than or equal to about 10% of the minimum structural strength per unit area of the weakest of the first, second, and third elongated structural members, wherein the structural strength is at least one of shear strength, tensile strength, flexural strength, and compressive strength.

As an alternative to any of the foregoing embodiments, the least cumulative distance between structural parts is greater than $(9\% \pm 1\%)$ times the normal depth of the framework and the structural parts include each elongated structural member and each web member.

As an alternative to any of the foregoing embodiments, the elongated structural members and web members are dimensioned and positioned so as to comprise a most direct path through the structural parts that is at least 1.5 times longer than the span of the most direct metric path through the structural parts.

A preferred embodiment is a building framework, comprising: a first elongated structural member, a second elongated structural member, and a third elongated structural member disposed between the first and second elongated structural members, a first web member connecting the first and third elongated structural members in a spaced apart relationship, and a second web member connecting the second and third elongated structural members in a spaced apart relationship. The first web member is positioned relative to the second web member such that the most direct metric path between the first elongated structural member and second elongated structural members establish a minimum span-wise indirectness greater than 100% (structural insulation factor greater than 2) for the flow of energy between the first elongated structural member and the second elongated structural member.

As an alternative to any of the foregoing embodiments, the apparatus further comprises any number of additional elongated structural members for a total of N_sm elongated structural members. Each of the elongated structural members has a web member, which is adjacent to the elongated structural member. The elongated structural members and the web members forms a uniaxial framework.

As an alternative to any of the foregoing embodiments, the elongated structural members are formed from at least one of wood, metal and carbon fiber.

As an alternative to any of the foregoing embodiments, the second web member is closer to the first web member than any other web member disposed between the second and third elongated structural members.

As an alternative to any of the foregoing embodiments, the apparatus further comprises any number of additional internetworking web members and uniaxial building frameworks that create a biaxial framework with the most direct metric path between the outermost uniaxial building frameworks having a path length and a span, wherein the path length is greater than 1.5 times the span.

As an alternative to any of the foregoing embodiments, the apparatus further comprises an insulating substance positioned between at least one of the pairs of elongated structural members and web members.

Yet another embodiment is a method of making a building framework, comprising: obtaining first, second, and third structural members, obtaining a first web member configured to be positioned between the first and third structural members, and a second web member configured to be positioned between the second and third structural members, determining connecting locations for the first and second web members to ensure the most direct metric through-path has a maximum span-wise indirectness greater than zero for the flow of energy between any point on the first structural member and any point on the second structural member, and connecting the web members to the structural members at the determined connecting locations.

A further embodiment is an insulatable building framework comprising: a first elongated structural member and a second elongated structural member in a coplanar arrangement; a first web member connecting the first and second elongated structural members; wherein either the web member is non-linear resulting in a range-wise indirectness greater than zero for the shortest metric path between the first and second structural members, or the web member is straight (linear) and has a slope substantially equal to r1/r2, wherein r1 is a thermal resistivity of an insulating material surrounding the web member and r2 is a thermal resistivity of the web member along its length. In embodiments, the web member is straight and the angle between the web member and first elongated structural member is between about 5° and about 40°. The thermal resisitivity r1 may also be a thermal resistivity of an insulating material surrounding the apparatus which may be different than the insulating material surrounding the web member.

Another preferred embodiment is a building apparatus comprising a set of structural parts, the structural parts comprising a first structural-member (a), a second structural-member (b), a third structural-member, a first web, a first web-member, a second web, and a second web-member, the second structural-member positioned between the first and third structural-members, the first web comprising the first web-member, the second web comprising the second web-member, each web-member in the first web connecting the first and second structural-members in a spaced apart relationship at a minimum distance greater than 30% times the thickness of the second structural-member, each web-member in the second web connecting the second and third structural-members in a spaced apart relationship, each web-member being made of a material with a tensile strength along the strongest axis of the material greater than about 1% of the least tensile strength of the structural-members. The structural parts are dimensioned and positioned so as to comprise at least one of (A) a most direct through-path through the structural parts at least 1.5 times longer than the span of the most direct path through the structural parts or (B) a most direct path through the structural parts at least 2 times longer than the span of the most direct path through the structural parts or (C) a most direct path through the structural parts at least 2.5 times longer than the span of the most direct path through the structural parts or (D) a most direct path through the structural parts at least 3 times longer than the span of the most direct path through the structural parts or (E) a web-member that connects a pair of structural-members in a spaced apart relationship at a minimum distance greater than 30% times the thickness of the second structural-member.

A preferred embodiment of the framework for any application, has a shortest metric path in the normal and/or lateral direction of a framework that defines a span, a path length, a range, a rangewise indirectness for the shortest subpath of the most-direct metric through-path, a spanwise indirectness, and a greatest web member thickness parallel to the span, such that (1) the ratio of the path length to the maximum web member thickness is less than a certain amount, (2) the maximum web thickness is greater than a certain percentage of the span, and (3) the framework has at least one of (A) a rangewise indirectness greater than 0% and spanwise indirectness greater than 10% or (B) a rangewise indirectness equal to zero and spanwise indirectness greater than 50%.

Another preferred embodiment is a building apparatus comprising a set of structural parts, the structural parts comprising a first structural-member (a), a second structural-member (b), a third structural-member, a first web, a first web-member, a second web, and a second web-member. The second structural-member is positioned between the first and third structural-members. The first web comprises the first web-member. The second web comprises the second web-member. Each web-member in the first web connects the first and second structural-members in a spaced apart relationship. Each web-member in the second web connects the second and third structural-members in a spaced apart relationship. The (a) the structural parts are dimensioned and positioned such that the least cumulative distance between structural parts is greater than (9%±1%) times the normal depth of the framework and (b) each web-member in the first web is longitudinally offset from each web-member in the second web such that the web members provide no direct path for conductive hear flow between interior-facing surfaces of the outmost structural members.

As an alternative to any of the foregoing embodiments, the building apparatus possesses a most direct metric path through the structural parts with a first length, a first range, and a first span wherein the structural parts are dimensioned and positioned such the first length is 1.5 times longer than the first range.

As an alternative to any of the foregoing embodiments, each web-member is made of a material with a tensile strength along the strongest axis of the material greater than about 1% of the least tensile strength of the structural-members.

As an alternative to any of the foregoing embodiments, the web members have a substantially similar thickness to at least one of the structural-members to which it connects.

As an alternative to any of the foregoing embodiments, each web members comprises at least one combination of floating tenons, tensionally-strong-web members, compressively-strong-web-members, shearly-strong-web-members, tension-web-members, compression-web-members, spaces, braces or web members each of which connects at least one pair of structural parts via a known wood-working joint.

As an alternative to any of the foregoing embodiments, the building apparatus is configured as at least one of a plate, plate with the web-members of at least one web protruding in the lateral direction, picture window frame, picture window, window sash housing, window sash, window frame, operable window, wall stud, cripple stud, jack stud, king stud, sill plate, sole plate, bottom plate, top plate, double top plate, cap plate, beam, post, header, roof truss, floor joist, rafter, door frame, door, building panel, structural insulated panel, or drywall frame wherein each structural member is a thinner version of the apparatus.

One method described herein is a method of making a building framework, comprising: obtaining first, second and third structural members; obtaining a first web member configured to be positioned between the first and third structural members; obtaining a second web member configured to be positioned between the second and third structural members; determining connecting locations for the first and second web members to ensure the most direct metric through-path has a maximum span-wise indirectness greater than zero for the flow of energy between any point on the first structural member and any point on the second structural member; and connecting the web members to the structural members at the determined connecting locations.

In addition to one or more of the features described above, the determined connecting locations provide the framework with a minimum span-wise indirectness for the most direct metric path through the framework within a range of 100% to 600%.

BRIEF DESCRIPTION OF THE DRAWINGS

FIG. 1A illustrates a first embodiment of the framework configuration.

FIG. 1B illustrates the first embodiment of the framework configuration with insulating substance.

FIG. 2AE illustrates a control with diagonal web members.

FIG. 2AF illustrates a truss with a straight web member.

FIG. 2AG illustrates a truss with a straight web member.

FIG. 2AH illustrates preferred embodiment of a nominal 2×6 stud which can be scaled to ascertain preferred embodiments of nominal 2×3, 2×4, N×M where N and M can take on integer values.

FIG. 2AI illustrates the metric path for the framework shown in FIG. 2AH.

FIGS. 2AJ-2AL illustrate sectional views of the embodiment shown in FIG. 2AH.

FIGS. 2B-2I schematically show various embodiments of 1 D and 2D (biaxial) frameworks with more than one layer of diagonal braces.

FIGS. 2J-2K schematically show additional embodiments of frameworks with more than one layer of diagonal braces.

FIGS. 2M-2T schematically show various embodiments of uniaxial/1D frameworks with straight braces.

FIGS. 3A-3F schematically show various web member (spacer or connector) shapes in the half-unit-cell of a framework with two chords.

FIGS. 3G-3L show various web member shapes in the full-unit-cell of a framework with two chords.

FIG. 12C shows the opposing view of FIG. 12A.

FIG. 12D shows the opposing view of FIG. 12B.

FIGS. 30A-30D schematically illustrate various stacked and rotated embodiments of the framework with seamless connections of structural web-members and braces.

FIG. 40 shows a metric path through an apparatus with irregularly shaped passages, cavities, protrusions, edges, and boundaries of the apparatus (shown with black lines).

FIGS. 41A, 41B, 42A, 42B illustrate different four chord uniaxial frameworks with different cross sectional shapes.

DETAILED DESCRIPTION

Figure 1C:
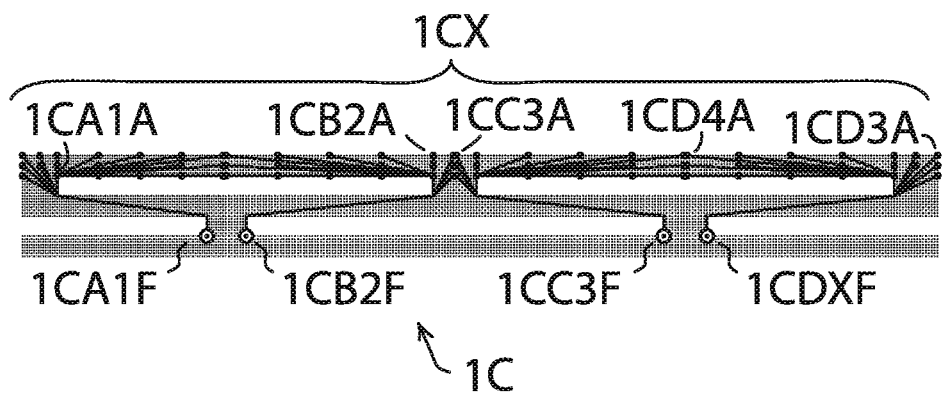
FIGS. 1C-1H illustrate energy flow paths through the structural members and web members of a framework.

Herein I disclose an embodiment of an apparatus that comprises a plurality of web-members or web-member-like structures disposed between and joining together a plurality of structural members or structural-member-like structures to form a labyrinth of passages with intervening cavities. The cavities are preferably filled with one or more than one insulative filler substance or an embodiment of the disclosed apparatus to reduce the flow of energy through the cavities. In some embodiments, no insulative filler substance is used. In some embodiments, the cavities are evacuated to create a vacuum with a residual partial pressure of any magnitude. The passages and cavities preferably have shapes and proportions such that the shortest paths, through the passages between different parts of the apparatus, have a sufficiently long length in proportion to their span and/or range to create a multiplicative gain in resistance to the throughput of energy along targeted axes of the apparatus. Any gain in resistance relative to that of a direct-path provides a means to reduce the flow of energy through the apparatus even when made with structural materials that by comparison to the insulative filler substance generally have a higher density and lower resistivity. The cavities preferably have a geometry that balances the set of goals comprising (1) minimizing any reduction in strength of the apparatus, (2) creating space for one or more than one insulative filler substance, (3) maximizing the length of metric paths through the apparatus, (4) reducing transfer of the targeted forms of energy along direct paths through the apparatus and (5) reducing transfer of the targeted forms of energy along any path through the apparatus. The relative importance of each goal depends on the particular application. Thus, the relative importance of each goal preferably factors into the design and engineering of any given apparatus for any particular application.

When designing and engineering an apparatus, one should take care to properly assess the resistivity for the targeted forms of energy of the materials used to make the structural members and web members. Resistivity for all forms of energy is generally described by a tensor with different components that depend on the direction of energy flow relative to the axes of the material, that depend on the internal structure of the material. One should also take care to properly assess the strength of the materials used to make the structural members and web members. Strength is also generally described by a tensor with different components that depend on the orientation of the axes of the material relative to applied force. For instance wood and other materials containing fibers have strength, conductivity, and resistivity values that depend on orientation of the fibers relative to stimuli. The strength along the fibers is greater than the strength perpendicular to the fibers. The conductivity along the fibers is also greater than the conductivity perpendicular to the fibers. The resistivity along the fibers is less than the resistivity perpendicular to the fibers. Additional benefits of the disclosed apparatus may include (0) reduction in the angle of the most shallow tangent to the bound path of least resistance through the framework, (1) increase in surface area for greater capacitance and contact resistance, (2) a reduction in area through which energy can flow, (3) increase in straightness, flatness, material quality, or dimensional stability including reduced bow, crook, kink, cup, twist, wind, wane, knots, or other kind of defect, (4) reduction in weight, (5) directing mechanical forces to flow along the strong axis of employed structural materials, (6) provision of space for installation of fasteners, for example nuts, bolts, floating tenons, rivets, and clinched nails, and other fasteners that require space for installation, (7) reduction in need to drill holes through framing members for installation of utilities, (8) provision of space to run structural bracing, structural reinforcement cables, and tie-down cables, (9) reduction in the moment arm on web-members under tension and compression, (10) reduction in labor costs, material costs, injury costs, and overall cost for construction of insulated buildings, (11) reduction in cost of manufacturing and distribution of insulative materials, (12) greater energy efficiency, (13) similar or higher strength, (14) higher strength to weight ratio relative to a similar size structural element that has no cavities, smaller cavities, or inferior geometry, (15) ability to be cut into two pieces (trimmability) without a significant loss of structural integrity, (16) reduced temperature (energy) gradient between web members in different webs, (17) simultaneous optimization of web-member wood-grain parallel to structural members for both strength and insulating against straight through heat (energy) transfer.

Furthermore, the disclosed means of reducing energy transfer can preserve or even increase the cross sectional area of the passages yet still reduce energy transfer through the passages. For instance an embodiment of the apparatus can have an arbitrarily large lateral dimension to achieve a targeted structural strength without compromising the thermal performance of the apparatus along its normal axis. An embodiment of the disclosed apparatus also enables the reduction of energy transfer along two, three, or any number of its axes called insulative axes. Embodiments can insulate even when web members and structural members are made from the same structural material or structural materials with similar values of resistivity to heat or other forms of energy. Embodiments can compensate for situations in which web-members, for reasons of structural integrity, economic cost or other practical concerns, are oriented such that the least resistive axis aligns with the path of energy flow through the structure in an undesirable direction. The material constituting the web members, do not need a significantly higher resistivity than the structural members. An embodiment can structurally insulate even when the structure constitutes a thermally unbroken framework for which the resistivity of web members is less than or equal to the resistivity of the structural members along the path of undesirable energy flow. Different embodiments of the disclosed apparatus may reduce the transmission of different forms of energy such as heat, sound, vibration, shock waves, electricity, electromagnetic energy, radiation, and fire. Thus, embodiments of the apparatus are useful for energy efficiency, temperature regulation, harnessing natural power sources, temperature control, construction, material science, energy storage, and numerous other applications. Corresponding usage, systems, and methods also are disclosed. Generally, the disclosed methods can be applied to improve the insulative value of an arbitrary structural frame or material, for instance through the selective removal of material or creating frameworks to engineer indirect metric-paths and properly sized cavities within the frameworks.

Statistical functions can characterize a set of metric paths for different embodiments of the disclosed apparatuses using various properties. Spanwise indirectness, rangewise indirectness, structural insulation factor, rangewise indirectness multiplier, spanwise number of switchbacks, rangewise number of switchbacks, planarity of spanwise indirectness, and planarity of rangewise indirectness, are all examples of properties that characterize the set of metric paths for different embodiments of the disclosed apparatuses. Normalized spread, statistical uniformity, average, standard deviation, average deviation, maximum, minimum, statistical range, variance, are all examples of statistical functions that may be applied to the properties in order to characterize the set of metric paths for different embodiments of the disclosed apparatuses. I anticipate use of these and other properties and statistical functions to further define the scope of the disclosed invention in future patent applications.

The section entitled "Definitions" provides a list of definitions to clarify the meaning of words and terminology used in this application. The remaining paragraphs in this section define terminology used to describe and illustrate directions in the next section which describes the figures in detail.

In FIGS. 1A and 1B and in general, any particular framework has three intrinsic directions, x (lateral), y (longitudinal), z (normal). Intrinsic direction y, the longitudinal direction, runs parallel to the length of the framework. Intrinsic direction z, the normal direction, runs perpendicularly relative to the longitudinal direction and parallel to a line that runs through the center of the first, second and third chords. Intrinsic direction x, the lateral direction, runs perpendicular to the normal direction and longitudinal directions. Each intrinsic direction has an associated axis that runs through the center of gravity by convention in this application unless otherwise specified. These directions apply generally to any object. If an object is part of a framework apparatus then the longitudinal direction y of the part corresponds to the lengthwise direction of the part. When the object is not elongated in any direction, then the longitudinal direction corresponds to that of the framework that comprises the part unless otherwise specified. When any particular intrinsic direction of an object is ambiguous, then the intrinsic direction corresponds to that of the framework that comprises the part unless otherwise specified.

The words "horizontal," "vertical," and "transverse" are associated with extrinsic directions x, y, z, respectively. The extrinsic directions may be indicated in a figure with three line segments labeled x, y, z that emanate from a single point. The line segment labeled with an x indicates the positive/negative horizontal directions which are sometimes referred to as right/left. The line segment labeled with a y indicates the positive/negative vertical direction which are sometimes referred to as up/down. The line segment labeled with a z indicates the positive and negative transverse directions which are sometimes described as "into the page" and "out of the page," respectively, or "inward" and "outward", respectively. The words "horizontal," "vertical," and "transverse" do not refer to the intrinsic axes of the frameworks and do not limit their use. If no other indication exists to the contrary, then, when the text is right side up, (a) the vertical direction runs parallel to the long axis of a figure page and defines the terms up and down, (b) the horizontal direction runs parallel to the short axis of the figure page defining the terms left and right, and (c) the transverse direction runs into and out of the page defining the terms inward and outward. In the absence of further detail, the longitudinal direction of a reference object is associated with the extrinsic directional adjective used to describe it. For example "horizontal framework 10" in reference to FIG. 1A would indicate that the horizontal direction runs parallel to the longitudinal axis of framework 10.

The three intrinsic directions x, y, z define intrinsic orbital directions Ox, Oy, Oz. Each intrinsic orbital direction Ox, Oy, Oz characterizes an orbital rotation around an intrinsic direction of any particular framework or object where the axis of rotation does not coincide with the axis for the particular intrinsic direction. Intrinsic angle Oy, the orbital roll angle, characterizes rotations around the longitudinal direction when the orbital roll axis and longitudinal axis are displaced as in a spiraling movement. Intrinsic angle Oz, the orbital yaw angle, characterizes rotations around the normal direction when the rotational yaw axis and normal axis are displaced as in a turn made by a car. Intrinsic angle Ox, the orbital pitch angle, characterizes rotations around the lateral direction when the orbital pitch axis and lateral axis are displaced as in a loop-the-loop movement. Each intrinsic orbital direction can be used to define positions, offsets, and differences in angle. When the axis of rotation around an intrinsic direction does coincide with the rotational axis for an intrinsic orbital direction, then the orbital rotation becomes a pure rotation called a spin. In that case each of the three intrinsic angles Ox, Oy, Oz characterize a spin rotation around an intrinsic direction of any particular framework or object because the rotational axis coincides with that of the intrinsic direction. To distinguish between orbital angles and spin angles, a slash is added to the symbol for spin angles. Intrinsic spin angle Øy, called the roll angle, characterizes spin rotations around the longitudinal direction when the orbital roll axis and longitudinal axis coincide. Intrinsic spin angle Øz, the orbital yaw angle, characterizes rotations around the normal direction when the rotational yaw axis and normal axis coincide. Intrinsic spin angle Øx, the pitch angle, characterizes rotations around the lateral direction when the orbital pitch axis and lateral axis coincide. Each of the extrinsic directions x, y, z define extrinsic orbital angles Ox, Oy, Oz and extrinsic spin angles Øx, Øy, Øz. The extrinsic orbital angles Ox, Oy, Oz apply to orbital rotation of an object around an axis parallel to an extrinsic direction that does not intersect the object. The extrinsic spin angles Øx, Øy, Øz apply to the spin rotation of an object around an axis parallel to an extrinsic direction that does intersect the object. Pure spin rotation of an object occurs when the rotational axis coincides with the axis of the associated extrinsic or intrinsic direction. The central axis of any orbital/spin angle can be inferred by finding the center of a circle that overlaps the arc drawn in a figure to indicate the orbital/spin angle. Each orbital angle and spin angle is also useful for describing angular position, offset and differences in angular position.

Each embodiment also has related embodiments based on the orientation of materials constituting the framework. The orientation of a material within a structural member, web-member, or any part of a framework apparatus is important when the material has non-isotropic strength properties. The present specification uses the arbitrary convention that $\underline{Y}$ indicates the direction of greatest strength for a material, $\underline{X}$ indicates the direction of least strength, and $\underline{Z}$ indicates the direction transverse to the $\overline{X}$ and $\overline{Y}$ directions. In the case of a wood structural member the direction of greatest material strength often runs parallel to the longitudinal direction of the structural member. Material orbital angles $O_{\underline{X}}$, $O_{\underline{Y}}$, $O_{\underline{Z}}$ and material spin angles $Ø_{\underline{X}}$, $Ø_{\underline{Y}}$, $Ø_{\underline{Z}}$ can also be defined for the linear material directions $\overline{X}, \overline{Y}, \overline{Z}$.

A label containing X̲, Y̲, Z̲, x, y, z, ẋ, ẏ, or ż, followed by a subscripted identification number indicates that the direction applies to an object labeled with the same identification number in a figure. Such a label is often accompanied by a line or arrow to visually indicate the direction. For example the arrow labeled Y̲104 in FIG. 3A indicates the chosen direction of greatest material strength for the diagonal web-member 104. Unless explicitly specified the illustrated or described orientation of materials is not limiting. The arrow labeled Y̲105 in FIG. 3G shows that the preferred direction of greatest material strength for web-member 105 runs in the same direction as the longitudinal direction of the web-member 105 indicated by the arrow ẏ 105. Unless explicitly noted otherwise, any indication of a material direction in a figure constitutes a preferred embodiment rather than a limitation. As a hypothetical example a lead line labeled ẏ 14 in FIG. 1A would indicate the longitudinal direction of framework 14. If an identification number corresponds to a grouping of parts, then an X̲, Y̲, Z̲, x, y, z, ẋ, ẏ, or ż, followed by the identification number indicates the direction for all parts in the grouping of parts. As a hypothetical example, an arrow labeled Y̲412 in FIG. 9 would indicate the direction of greatest strength for the material constituting all of the web-members in internet-working web array 412. Any set of linear directions can be generalized to any curvilinear coordinate system such as a paraboloidal coordinate system, ellipsoidal coordinate system, spherical coordinate system, or cylindrical coordinate system.

FIG. 1A illustrates a structure 10 with four 1D (uniaxial) frameworks, including vertical frameworks 12, 14 and horizontal frameworks 16, 18. In embodiments of structure 10, vertical frameworks 12, 14 function as studs, jack studs, cripple studs, posts, or mullions while horizontal frameworks 16, 18 function as top plates, double top plates, bottom plates, beams, rim joists, headers, sole plates, or sill plates. Vertical frameworks 12, 14 are mounted to horizontal frameworks 16, 18. Horizontal framework 18 is mounted to the upper ends 20, 22 of the vertical frameworks 12, 14, respectively. Horizontal framework 16 is mounted to the lower ends 24, 26 of the vertical frameworks 12, 14, respectively. Each framework comprises first, second and third (struts) chords 31, 33, 35, respectively, which in the embodiment of FIG. 1A are generally parallel to one another. For structural insulation purposes the first, second, and third chord 31, 33, 35, of each horizontal framework 16 are preferably mounted to the first, second, and third chord 31, 33, 35 of the vertical frameworks 12, 14, respectively, as shown in FIG. 1A. Each middle chord has a web member on each side. Each web member connects a chord to an adjacent chord. For instance, framework 18 has at least a first (spacer) web-member 32 between chords 31, 33 in the normal ż 32 direction which in the embodiment shown is positioned at the terminal end 37 of horizontal framework 18 in the longitudinal ẏ 32 direction. Framework 18 has at least a second web-member 34 between chords 33, 35 in the normal direction which in the embodiment shown is positioned at the terminal end 39. The embodiment shown in FIG. 1A also has a third web member 32b between chords 31, 33 in the lateral direction which is positioned longitudinally away from first web member 32, proximal to terminal end 39. The spacing between web members 32, 32b is chosen to match the spacing between vertical frameworks 12 and 14 or vice versa in a preferred embodiment like the one shown. In the embodiment shown in FIG. 1A there is also a fourth web-member 34b positioned longitudinally away from first web member 34, proximal to terminal end 37. In the embodiment shown in FIG. 1A, the fourth web-member 42b is longitudinally positioned halfway between web-members 32, 32b. This preferred relative positioning of web-members 32, 32b, 34 produces a preferred metric path 42 through web member 32b and 34b in framework 18. Preferred metric path 42 is the most direct metric path through web member 32b between chords 31 and 35. The intra-framework spacing of web-members in vertical frameworks might not or might (shown) match that of horizontal frameworks. Another embodiment (not shown) with web-member 34b positioned a third of the way between web-members 32, 32b would produce a greater path length and therefore greater resistance for metric path 42 but a lesser path length and therefore lesser resistance for the most direct metric path through web members 32 and 34b. The preferred embodiment shown in FIG. 1A has the same relative spacing between any given pair of web members. Therefore, the most direct metric path through any given pair of web members has the same spanwise indirectness as the preferred metric path 42. In a preferred embodiment with deeper framing members, the intra-framework spacing of web-members in the longitudinal direction of the framing members would be greater to preserve the level of spanwise indirectness. Web-members 32, 32b form a first web. Web-members 34, 34b form a second web. In a preferred embodiment of a framework with three structural members, two webs, and consistently spaced web members like the one shown in FIG. 1A, the web-members in adjacent webs are longitudinally offset by half the intra-web spacing of web-members as shown.

Vertical frameworks 12, 14 and horizontal framework 16 have configurations similar to that of horizontal framework 18. Vertical framework 14 is attached at the terminal ends of horizontal frameworks 16, 18 whereas vertical framework 12 is proximal to but not attached at the terminal ends of horizontal frameworks 16, 18 to permit attachment to other frameworks and to provide an unobstructed view of the terminal ends of horizontal framework 16 in the figure. In other embodiments, vertical framework 12 would be attached at the terminal ends of horizontal frameworks 16,18 to form a rectangular structure. In such embodiments vertical framework 12 would be preferably rolled 1800 around its longitudinal ẏ axis such that web-member 34b would lie closest to the web-member at the left end of horizontal framework 16.

Another embodiment (not shown) of the structure in FIG. 1A, incorporates a different embodiment of vertical framework 12 having a longitudinal spacing between web-members 34, 34b that differs from the on-center spacing of web-members 34, 34b in horizontal framework 18. Yet another embodiment (not shown) of the structure in FIG. 1A, incorporates a different embodiment of horizontal framework 18 in which the longitudinal spacing of web-members 34, 34b differs from the horizontal spacing of vertical frameworks 12, 14. An embodiment for which the longitudinal spacing of web-members 34, 34b equals the horizontal spacing of vertical frameworks 12, 14 produces larger values of spanwise indirectness for metric paths in the transverse direction z. Yet another embodiment (not shown) of the structure in FIG. 1A, incorporates another embodiment of horizontal framework 18 in which web-members 32, 32b have a greater length and extend down between structural members 31, 33 of other embodiments of vertical frameworks 12, 14 for which the web-members nearest ends 20, 22 are positioned further down to accommodate. Yet another embodiment (not shown) of the structure in FIG. 1A, incorporates another embodiment of vertical framework 12 in which the web-members nearest end 20 has a greater length and extends up between chords 31, 33 of horizontal framework 18. In this embodiment framework 18 is horizontally shifted enough to accommodate. One can also define the normal direction for an energy barrier with an interior surface and exterior surface comprising any number frameworks. The normal direction runs along the line of closest approach between the interior and exterior surfaces of the barrier at any given point on either surface. Frameworks are preferably oriented so that the normal direction of the framework substantially parallels the normal direction of the barrier.

FIG. 1B illustrates the framework 10' containing solid insulation. The framework 10' includes a central (gap) cavity 44' containing an insulating segment 46' formed from an insulating material. Additionally, FIG. 1B illustrates a first rectangular cavity 49' defined by opposite-facing surfaces, i.e. inner facing surface 50' of chord 31' and opposing surface 52' of chord 33', and opposite surfaces 54', 56' of web-members 32', 32b', respectively. Rectangular cavity 49' contains an insulating segment 58' formed from an insulating substance. The insulating substance used for insulting segment 58' may be the same or different insulating substance as is used for insulating segment 46'. Another type of rectangular cavity, i.e. rectangular cavity 62' is defined by three surfaces, i.e. inner facing surface 51' of chord 31', opposite surface 53' of chord 33', and outer side surface 64' of web member 32'. The length of cavity 62' extends to the edge 66' of the framework 10'. Rectangular cavity 62' contains an insulating segment 63'. The insulating substance used for insulting segment 63' may be the same or different insulating substance as is used for insulating segment 46' or insulating segment 58'. All other cavities between parallel chords are similarly created as 49' and 62' and optionally may contain similar insulating segments formed from a single type, or different types of insulating substances. Each embodiment of an insulatable insulative framework apparatus has a first related embodiment that comprises factory-installed insulation within the cavities and a second related embodiment that comprises installer-installed insulation within the cavities. For example one such embodiment comprises the vertical members 12 and 14 shown in FIG. 1B and rigid foam or other rigid insulation that holds the vertical frameworks 12 and 14 in the configuration shown in FIG. 1B as a prefabricated panel 10' so that an installer can efficiently make structural connections, that more permanently hold the configuration shown in FIG. 1B, by fastening the horizontal frameworks 16 and 18 to the vertical frameworks 12 and 14 and other vertical frameworks perhaps in a similar type of panel. In a more specific version of this embodiment, the vertical frameworks 12 and 14 are made from a wood product and function as studs. The horizontal frameworks 16 and 18, once attached to the prefabricated panel, function as the bottom and top plate of an insulated wall. In another such embodiment the longitudinal $y$ 14 axis of the prefabricated panel is oriented in the horizontal x direction to function as a floor panel. In another such embodiment the longitudinal $y$ 14 axis of the prefabricated panel is oriented horizontally or pitched diagonally to function as a roof panel. An embodiment of the horizontal framework 16 has factory-installed solid insulation fixed between any number of the cavities so as to eliminate the labor required to install insulation on site. An embodiment of the vertical framework 12 has factory-installed solid insulation fixed between any number of the cavities so as to eliminate the labor required to install insulation on site.

In other embodiments, the framework 10 can be positioned along any intrinsic direction to any suitable position and rotated around any intrinsic angle to any suitable orientation. The frameworks may run diagonally with respect to the horizontal, vertical, or transverse directions. In the embodiments shown in FIGS. 1A and 1B, the web members are shown as extending in a direction generally perpendicular to the chords, however, in different embodiments, for example that shown in FIG. 2AA, at least one web member is pitched diagonally relative to the chords. In other embodiments, not shown, at least one web member extends (b) diagonally yawed relative to the chords.

FIG. 1C shows representative metric path set 1CX of metric paths paths for framework 1C. Each black dot represents a start point for a different metric path as typified by start points 1CA1A, 1CB2A, 1CC3A, 1CD4A, 1CD3A. Each bullseye dot represents an end point of a metric path as typified by end points 1CA1F, 1CB2F, and 1CC3F. The representative metric paths converge to a focal point as typified by focal point 1CDXF which overlaps the end points for the metric paths with start points 1CD4A and 1CD3A and all other metric paths that converge to focal point 1CDXF. Any end point that overlaps a focal point can serve as a representative of the focal point. Thus, end points 1CA1F, 1CB2F, 1CC3F, and 1CDXF represent focal points one, two, three, and four respectively. Each focal point defines a bundle of metric paths that all converge on the same focal point or pass through the same focal point. Thus, focal points one, two, three, and four define bundles A, B, C, and D, respectively. For instance, all metric paths that pass through or converge to focal point 1CDXF form bundle D. Each bundle of metric paths includes a set of special paths, i.e. the shortest metric path, most-direct metric path, longest minor metric path, and longest metric path which all converge and end on the defining focal point as well as the most-direct metric through-path which passes through the defining focal point.

Figure 1D:
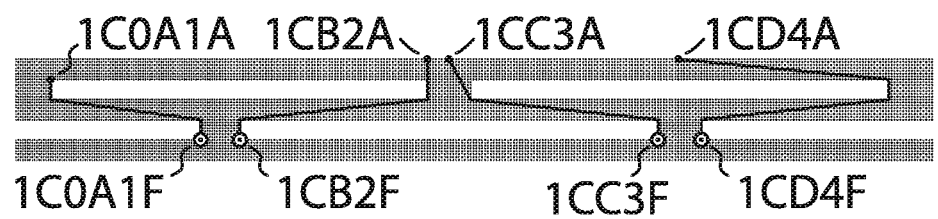
Figure 1E:
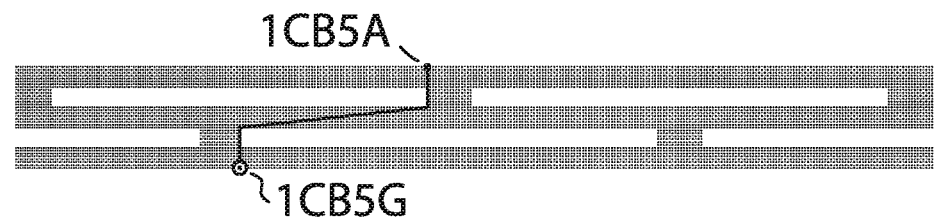
Figure 1F:
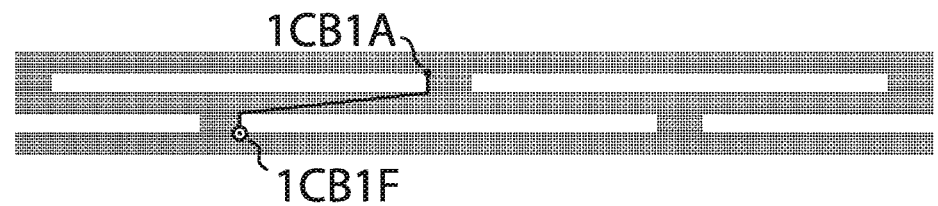

FIG. 1D shows examples of the special metric paths within different bundles. For instance, the longest metric path in bundle D is the path that originates at start point 1CD4A and terminates at focal point 1CD4F as shown in FIG. 1D. If start point 1CD4A were any further toward point 1CC3A, then the associated metric path would run in the opposite direction to end point 1CC3F instead of 1CD4F. Thus, points 1CD4A and 1CD4F are the furthest possible points connected by a metric path in bundle 1CD and define the start and end of the longest metric path in bundle 1CD. A similar idea applies to identifying the longest minor metric path. The longest minor metric path in bundle C is the path that originates at start point 1CC3A and terminates at focal point 1CC3F as shown in FIG. 1D. The longest minor metric path in a bundle falls on the other side of the most direct metric path relative to the longest metric path. The most direct metric path in bundle B is the path that originates at start point 1CB2A and terminates at focal point 1CB2F as shown in FIG. 1D. The shortest metric path in bundle A is the path that originates at start point 1C0A1A and terminates at focal point 1C0A1F as shown in FIG. 1D. The most direct metric through-path in bundle B shown in FIG. 1E is the path that originates at point 1CB5A, runs through the focal point at 1CB2F (shown in FIG. 1D) and terminates at point 1CB5G. The most direct metric through-path and most direct metric path require further explanation. If framework 1C has a well-defined outermost normally outward facing surface and a well-defined outermost normally inward facing surface that both face in a substantially similar direction, then the most direct metric path in bundle B may be defined as the shortest metric path in bundle B that originates on the outermost normally outward facing surface and terminates on the outermost normally inward facing surface. If framework 1C does not have a well-defined outermost normally outward facing surface and a well-defined outermost normally inward facing surface that both face in a substantially similar direction, then a more general definition is needed. More generally the most direct metric path in bundle B is defined as a metric path in bundle B with a length L, span S, and directness S/L greater than that of any other metric path in bundle B. To show that the path originating at start point 1CB2A in bundle B and terminating on point 1CB2F is the most direct metric path in bundle B one must prove that no other metric path in bundle B has a greater value of directness. To do so, start by proving that the most direct metric path in bundle B has a greater value of directness than that of the shortest metric path in bundle B (shown in FIG. 1F). The path segment beyond point 1CB2A of the most direct metric in bundle B is identical to the shortest metric path in bundle B and has the same length $L_0$, same span $S_0$, and same directness $D_0$ equal to $S_0/L_0$. Up to the point 1CB2A any metric path that deviates from the shortest metric path in a direction parallel to a span-wise direction line by a positive amount $\Delta S_1$ will have a span equal to $S_0+\Delta S_1$ and a length equal $L_0+\Delta S_1$ such that the directness $D_1$ equals $(S_0+\Delta S_1)/(L_0+\Delta S_1)$. A directness $D_1$ of $(S_0+\Delta S_1)/(L_0+\Delta S_1)$ is greater than a directness of $S_0/L_0$ for all positive value of $\Delta S_1$. Greater positive value of $\Delta S_1$ produce greater values of directness. The most-direct metric path in bundle B shown in FIG. 1D has the greatest possible deviation $\Delta S_1$ in the spanwise direction and thus has the largest value of directness. Up to the point 1CB2A any metric path that deviates from the shortest metric path in a direction parallel to a span-wise direction line by a positive amount $\Delta S_1$ and deviates in a direction perpendicular to a span-wise direction line by a positive amount $\Delta y_1$ will have a span equal to $S_0+\Delta S_1$ and a length equal $L_0+(\Delta S_1^2+\Delta y_1^2)^{1/2}$ such that the directness equals $(S_0+\Delta S_1)/\{L_0+(\Delta S_1^2+\Delta y_1^2)^{1/2}\}$. A directness $D_1$ equal to $(S_0+\Delta S_1)/(L_0+\Delta S_1)$ is always greater than a directness of $(S_0+\Delta S_1)/\{L_0+(\Delta S_1^2+\Delta y_1^2)^{1/2}\}$ for all positive values of $\Delta S_1$ and positive values of $\Delta y_1$. The same argument applies to any other possible combination of multiple deviations from the most direct metric path. Any number of deviations always leads to a metric path with a lesser value of directness than the most direct metric path. Thus, the path originating at start point 1CB2A in bundle B and terminating on point 1CB2F has the greatest value of directness of all metric paths in bundle B and therefore is the most direct metric path in bundle B.

Similarly the most direct metric through-path also requires further explanation. If framework 1C has well-defined outermost normally facing surfaces, then the most direct metric through-path in bundle B may be defined as a bound metric path that runs between the outermost normally facing surfaces and passes through the focal point at end point 1CB2F. If framework 1C does not have well-defined outermost normally facing surfaces, then a more general definition is needed. More generally the most direct metric through-path in bundle B is defined as the most direct bound path, i.e., a bound path that passes through the focal point at end point 1CB2F with a length L, span S, and directness S/L greater than that of any other bound path that passes through the focal point at end point 1CB2F. To show that the metric path originating at start point 1CB5A in bundle B and terminating on point 1CB5G is the most direct bound path in bundle B and therefore is the most direct metric through-path, one must prove that no other bound path in bundle B has a greater value of directness. To do so, start by proving that the most direct metric through-path in bundle B has a greater value of directness than that of the most direct metric path in bundle B (shown in FIG. 1F). The most direct metric path and most direct metric through-path are identical up to point 1CB2F having the same length $L_1$, same span $S_1$, and same directness $D_1$ equal to $S_1/L_1$. Beyond point 1CB2F any bound path that deviates from the most direct metric path in a direction parallel to a span-wise direction line by a positive amount $\Delta S_2$ will have a span equal to $S_1+\Delta S_2$ and a length equal $L_1+\Delta S_2$ such that the directness $D_2$ equals $(S1+\Delta S_2)/(L1+\Delta S_2)$. A directness $D_2$ of $(S1+\Delta S_2)/(L1+\Delta S_2)$ is greater than $S_1/L_1$ for all positive value of $\Delta S_2$. Greater positive value of $\Delta S_2$ produce greater values of directness. The most-direct metric through-path shown in FIG. 1D has the greatest possible deviation $\Delta S_2$ in the spanwise direction and thus has the largest value of directness. Beyond point 1CB2A any bound path that deviates from the most direct metric path in a direction parallel to a span-wise direction line by a positive amount $\Delta S_2$ and deviates in a direction perpendicular to a span-wise direction line by a positive amount $\Delta y_2$ will have a span equal to $S_1+\Delta S_2$ and a length equal $L1+(\Delta S_2^2+\Delta y_2^2)^{1/2}$ such that the directness equals $(S_1+\Delta S_2)/\{L+(\Delta S_2^2+\Delta y_2^2)^{1/2}\}$. A directness $D_2$ equal to $(S_1+\Delta S_2)/(L1+\Delta S_2)$ is always greater than $(S_1+\Delta S_2)/\{L1+(\Delta S_2^2+\Delta y_2^2)^{1/2}\}$ for all positive values of $\Delta S_2$ and positive values of $\Delta y_2$. The same argument applies to any other possible combination of multiple deviations from the most direct metric path. Any number of deviations always leads to a metric path with a lesser value of directness than the most direct metric path. Thus, the path originating at start point 1CB2A in bundle B and terminating on point 1CB2G has the greatest value of directness of all metric paths in bundle B, has the greatest value of span, and therefore is the most direct metric through-path in bundle B. To be completely accurate one must describe the path in FIG. 1D as the most direct metric through-path in a normal direction in bundle B. The most direct metric through-path has the extremely powerful geometrical feature of running between the outermost surfaces of a framework in the span-wise direction of the most direct metric through-path no matter how the outermost surfaces are shaped.

The longest metric path in any given bundle is a metric path with a length such that the length is greater than that of any other metric path in the bundle. The shortest metric path in any given bundle is a metric path with a length such that the length is less than that of any other metric path in the bundle. The longest minor metric path in any given bundle is a metric path with a length such that the length is greater than that of any minor metric path, that is, any metric path in the bundle starting at any point on the opposite side of the most direct metric path relative to the start point of the longest metric path. The set of locally most-direct metric paths in any specified direction is a set including each most direct metric path in the specified direction from each bundle. The set of locally shortest metric paths in a specified direction is a set including each shortest metric path in the specified direction from each bundle. The set of locally most-direct metric through-paths in a specified direction is a set including each most direct metric through-path in the specified direction from each bundle. The set of locally longest metric paths in a specified direction is a set including each longest metric path in the specified direction from each bundle. The set of locally longest minor metric paths in a specified direction is a set including each longest minor metric path in the specified direction from each bundle. Each of these sets defines a set of values for each physical property of interest such as path length. Each set of values for each physical property of interest then defines a set of statistical values for each statistical function of interest such as a statistical average. In that way the statistical average path length for the set of locally most-direct metric through-paths is available to characterize an insulatable, insulative framework apparatus. A non-limiting list of physical properties of interest include path length, span, range, span-wise indirectness, range-wise indirectness, structurally insulative resistance, structurally insulative resistivity, structural insulation factor, and other physical properties. A non-limiting list of statistical functions of interest includes maximum, minimum, standard deviation, average, uniformity, count, and other statistical functions. For example the average spanwise indirectness for the locally most-direct metric paths in the normal direction of uniaxial framework 1C means the statistical average for the set of each spanwise indirectness value for each most-direct metric path in each bundle of the framework. If no type of metric path is specified for a statistical function then the statistical function applies to all metric paths excluding the through-paths. For instance the average spanwise indirectness means the average of the set of spanwise indirectness values for the representative set of metric paths.

Figure 1G:
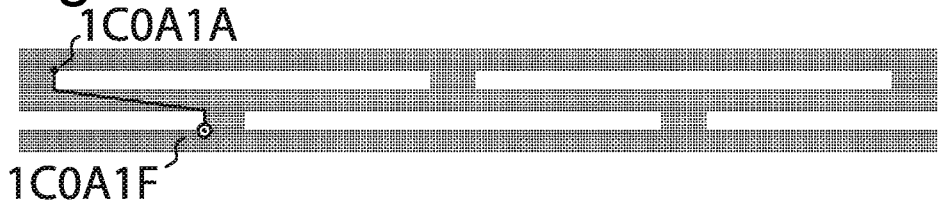
Figure 1H:
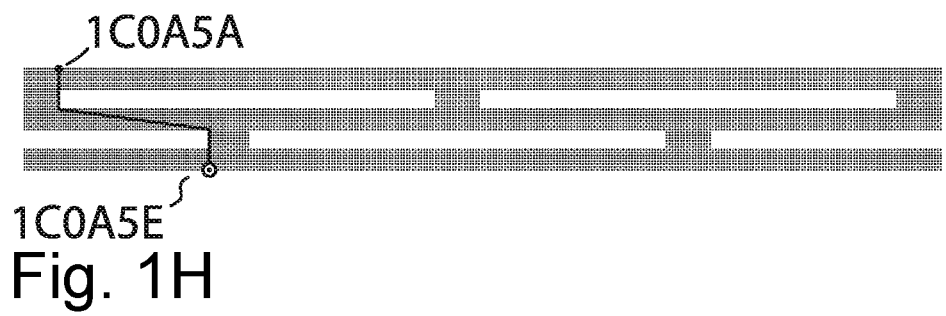

If no bundle is specified then (1) the term shortest metric path means a metric path with a length such that the length is less than that of any metric path in any bundle, (2) the term longest metric path means a metric path with a length such that the length is greater than that of any metric path in any bundle, (3) the term longest minor metric path means a metric path with a length such that the length is greater than that of any minor metric path in any bundle, (4) the term most-direct metric path means a metric path with a directness such that the directness is greater than that of any metric path in any bundle, (5) the term most-direct metric through-path means a bound path with a directness such that the directness is greater than that of any bound path in any bundle. For example, FIG. 1G shows the shortest metric path in the normal direction for framework 1C. As another example, FIG. 1H shows the most-direct metric through-path for framework 1C. Defining metric paths as the shortest paths between two locations led to the discovery that the most-direct through-path can also be described as the most-direct bound path. Therefore, maximally direct bound paths between two locations could be considered more fundamental than the shortest bound paths between the two locations. In that case one could redefine metric paths as the most-direct bound paths between two locations so that the most-direct through-path and most-direct metric path would equal the most-direct bound path. According to that redefinition the shortest metric path would also equal the most-direct bound path would remain the same, and the longest metric path and the longest minor metric path would terminate on the same end point as the most-direct bound path. One must infer which convention is used in any given context.

Figure 2A:
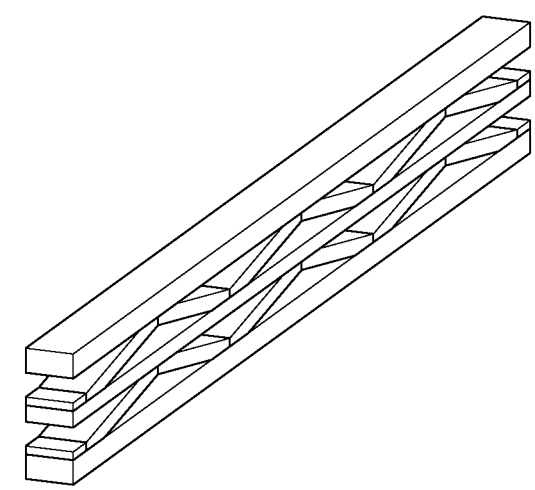
FIG. 2AA-2AD illustrates embodiments with diagonal web members.
Figure 2A:
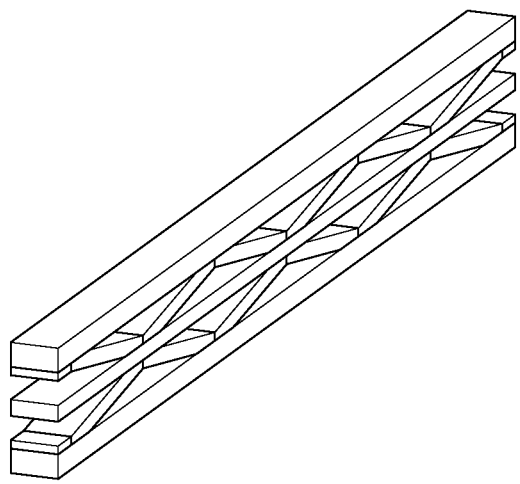
Figure 2A:
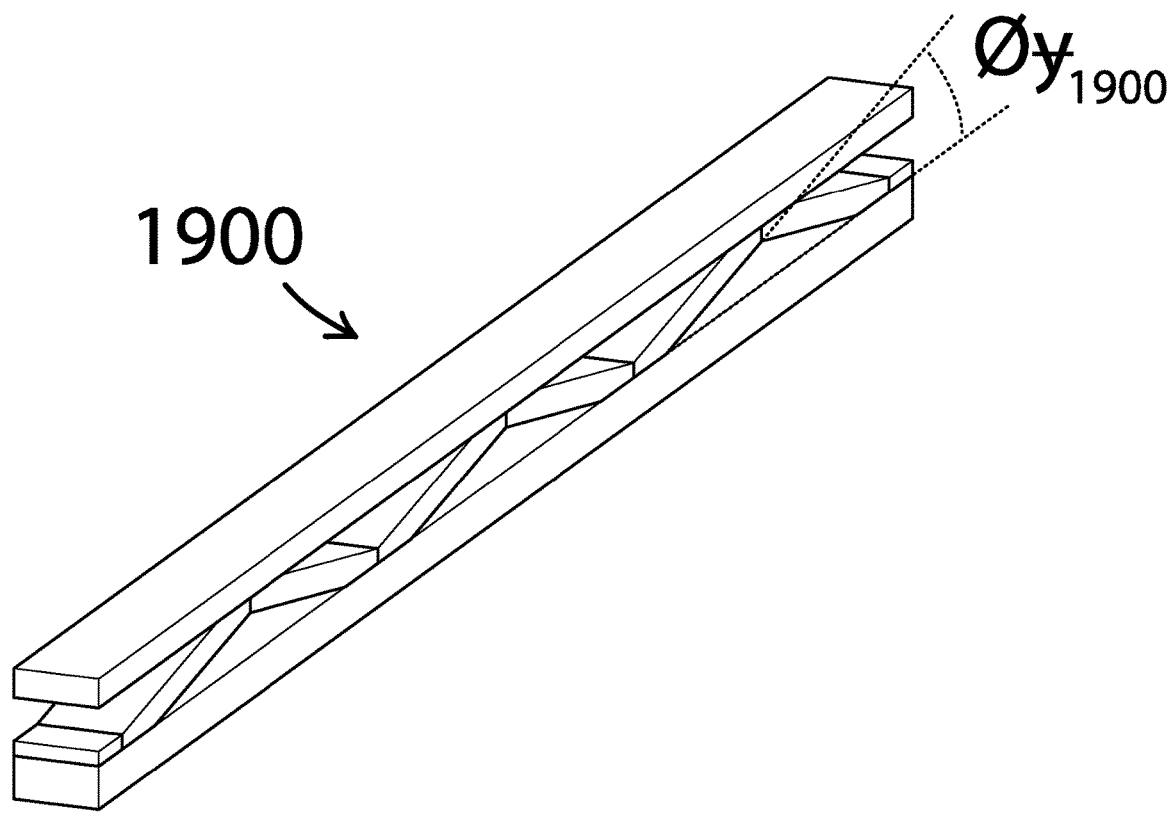
Figure 2A:
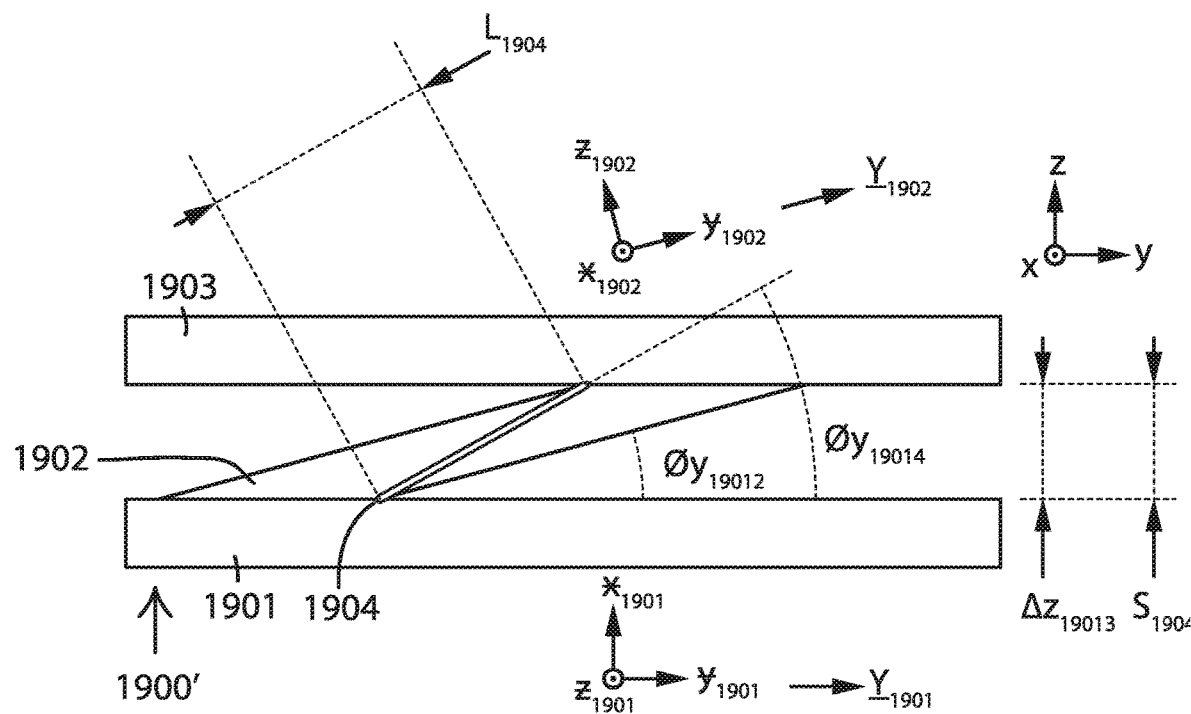
Figure 2A:
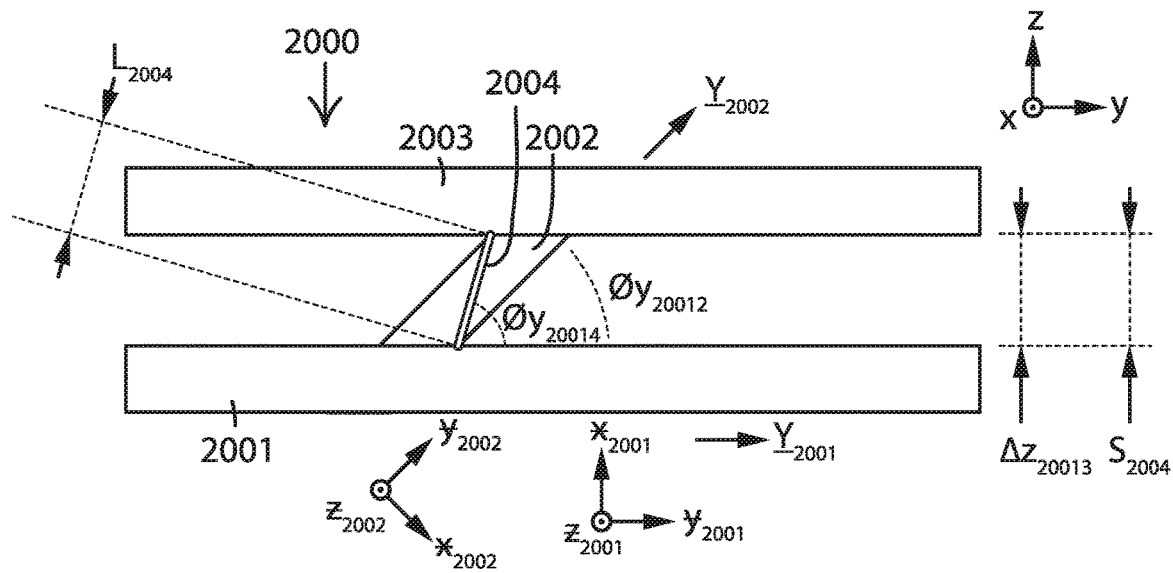
Figure 2A:
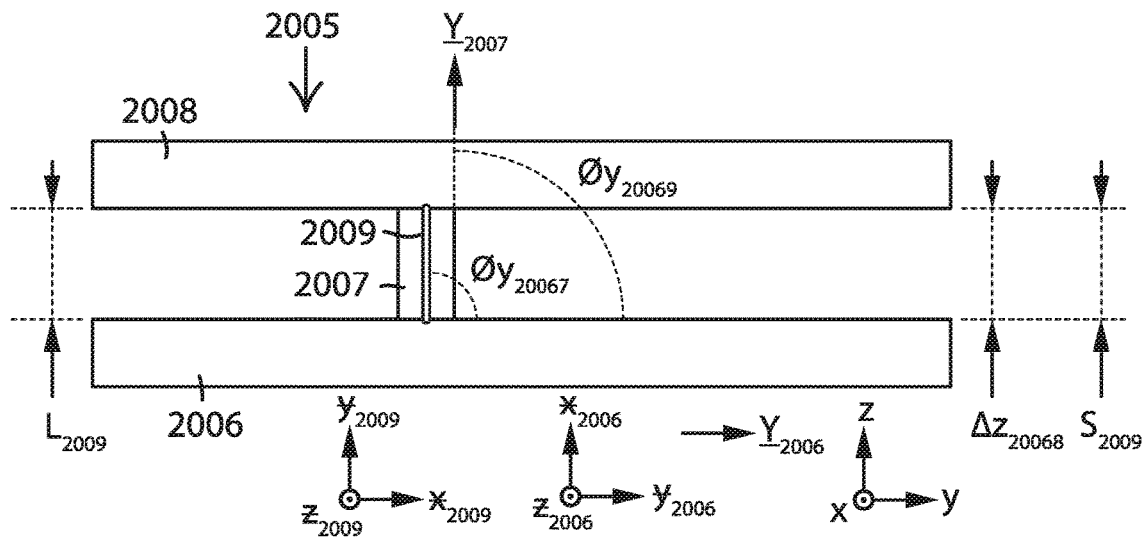
Figure 2A:
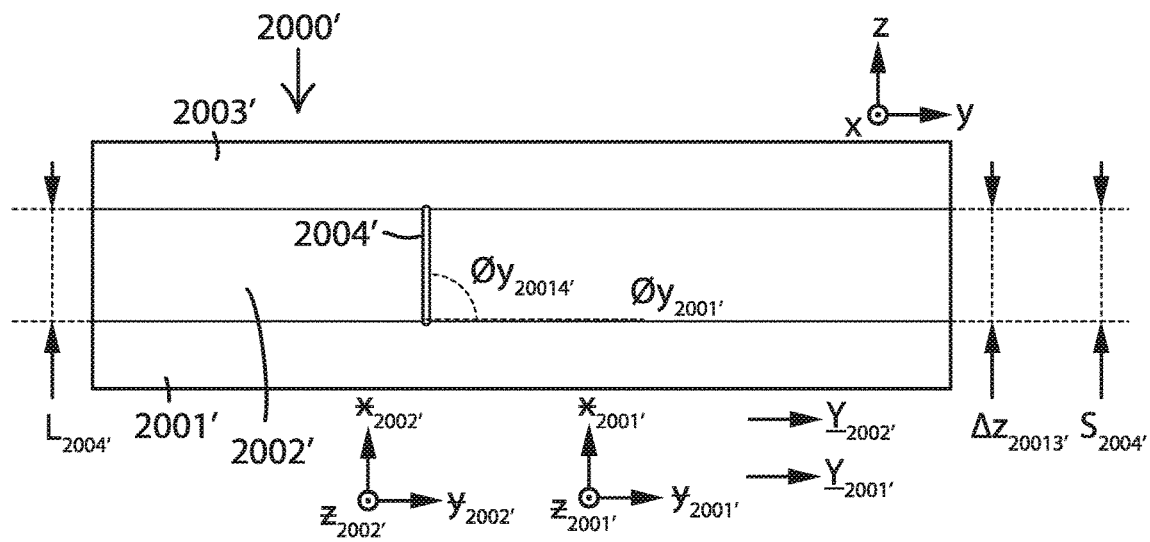
Figure 2A:
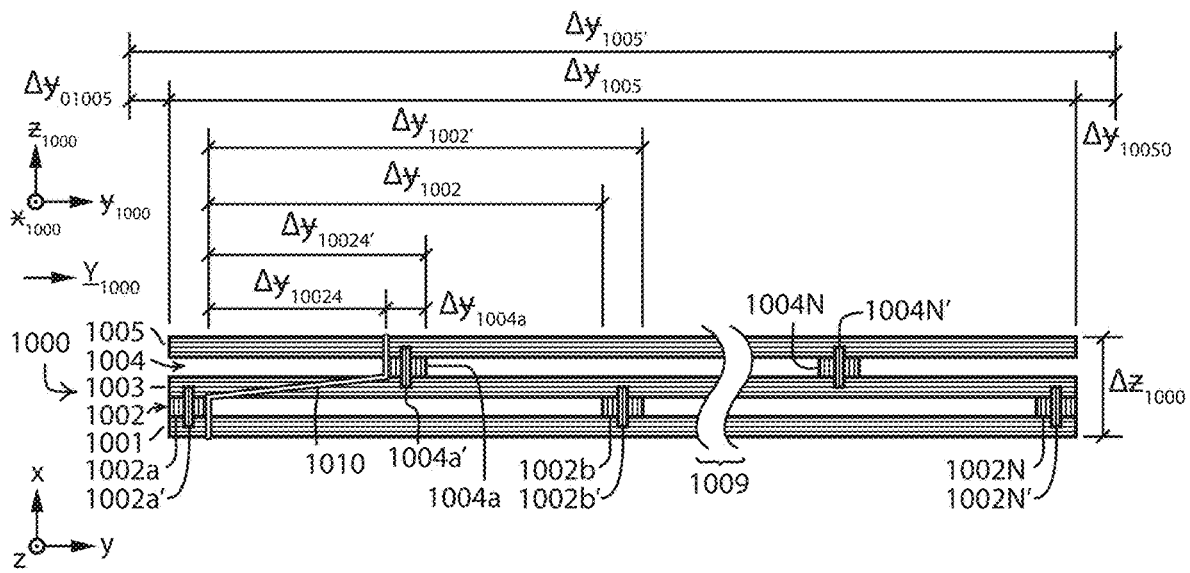
Figure 2A:
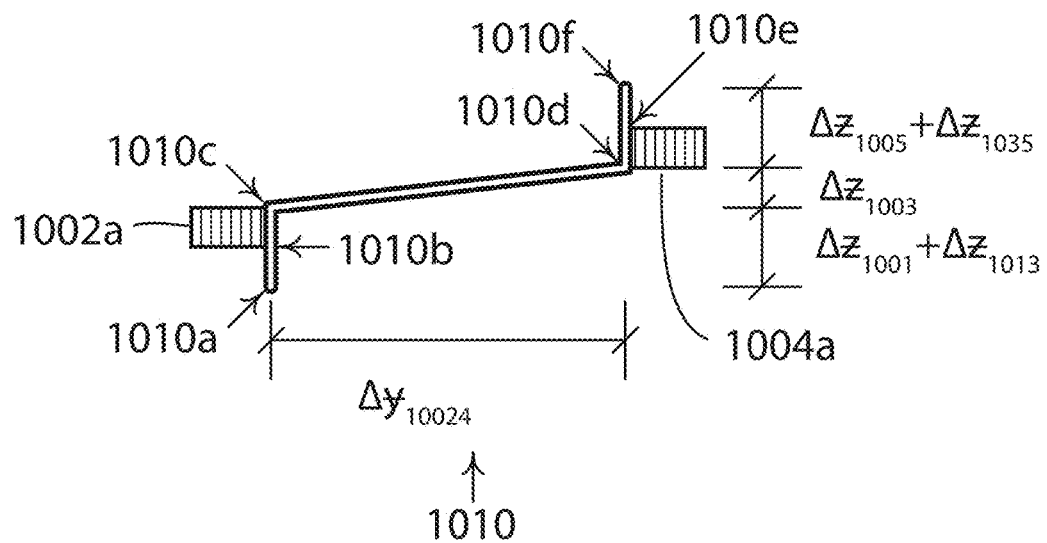
Figure 2A:
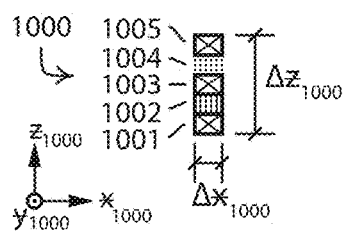
Figure 2A:
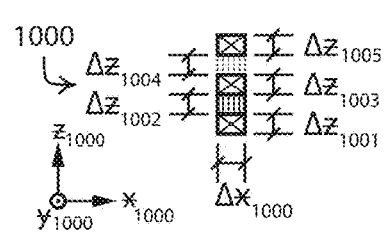
Figure 2A:
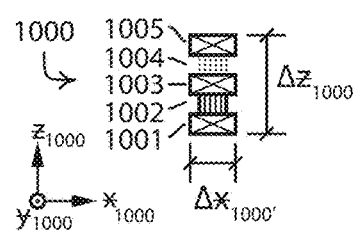

FIG. 2AA shows a framework with three structural members and diagonally pitched web members. The pitch angles shown are substantially less than ±450 relative to the chords, i.e. 15°. The diagonal web members in FIG. 2AA could make any angle between 0° and 90° with a positive or negative pitch angle relative to the chords. The diagonal web members in different layers create a chevron pattern. Another embodiment (not shown) has web members with a diagonal pitch and a diagonal yaw relative to the structural members.

FIG. 2AB shows a variant of the framework shown in FIG. 2AA comprising three parallel chords with a single row of diagonal braces positioned between each set of adjacent chords. This framework has diagonal braces/web-members with a constant intra-layer brace/web-member spacing and the maximum characteristic offset between braces/web-members, with the same pitch-angle sign, in different layers.

FIG. 2AC shows framework 1900 with a single open web of straight diagonal web members interconnecting two parallel chords. The web members for this type of embodiment have a characteristic pitch angle $Øy_{1900}$ relative to the bottom chord of less than 40°. The characteristic pitch angle $Øy_{1900}$ for the embodiment shown in FIG. 2AC is 150 with alternating positive and negative signs. U.S. Pat. No. 3,452,502, the contents of which is hereby incorporated by reference in its entirety, discloses a method of joining two diagonal web-members with each other and a chord of a truss using fingerjoints. Embodiments of diagonal-web trusses described herein include this type of finger joint as well as any other type of woodworking joint.

FIG. 2AD shows truss 1900', the same as truss 1900, except with a single straight diagonal web member 1902 interconnecting two chords 1901, 1903 at a separation distance $\Delta z_{19013}$. Straight diagonal web member 1902 has a pitch angle $Øy_{19012}$ relative to chord 1901 of 15°. This angle could be between less than 50° and less than 5°. Reducing the pitch angle $Øy_{19012}$ has the advantage of reducing the angle of the web member relative to any applied temperature gradient as it would be if truss 1900 had a solid web as shown in FIG. 2AG. Straight diagonal web member 1902 has a thickness $\Delta x_{1902}$ equal to half the separation distance $\Delta z_{1013}$. The pitch angle $\Delta y_{19012}$, thickness $\Delta x_{1902}$, and separation distance $\Delta z_{1013}$ determine the shortest path through the structure from chord 1901 to chord 1903 which is shortest metric path 1904. Shortest metric path 1904 has a 29° pitch angle $Øy_{19014}$ relative to chord 1901, a span $S_{1904}$ equal to the separation distance $\Delta z_{10013}$, and a length $L_{1904}$ equal to 2 times the separation distance $\Delta z_{19013}$. The structural insulation factor $F_{1904}$ for shortest metric path 1904 equals $L_{1904}$ divided by $S_{1904}$, that is 2. If straight diagonal web member 1902 is made from a material with an isotropic resistivity $r_{1902}$ then the structurally insulative resistivity $r_{s1902}$ equals the resistivity $r_{1902}$ multiplied by the structural insulation factor which in this case is $2 \cdot r_{1902}$. The physical quantity of span-wise indirectness, I, specifies the fractional improvement in resistivity afforded by the structural insulation factor, i.e., $\{2 \cdot r_{1902} - r_{1902}\}/r_{1902}$ which also yields the definition $\{r(L/S)-r\}/r$ which simplifies to $I=\{L/S-1\}$. Herein the span-wise indirectness is expressed as a percentage by convention. For the embodiment shown in FIG. 2AD the span-wise indirectness equals $\{2 \cdot r_{1902} - r_{1902}\}/r_{1902}$. Thus, truss 1900' has a span-wise indirectness of 100% which corresponds to a 100% improvement in structurally insulative resistivity for an isotropically resistive material. For any span-wise indirectness I and isotropic resistivity r, the structurally insulative resistivity is $\{I+1\} \cdot r$ with an improvement of $I \cdot r$ relative to the resistivity r. In an embodiment preferred for strength, the strong axis of the material that constitutes web member $\underline{Y}_{1902}$ is oriented parallel to the longitudinal $y_{1902}$ direction of web member 1902. In another embodiment preferred for resistance, the strong axis of the material that constitutes web member $\underline{Y}_{1902}$ is oriented perpendicularly or substantially non-parallel to the longitudinal $y_{1902}$ direction of web member 1902. These variations in orientation of the strong axis of a material relative to the axis of the structural part it constitutes apply to all embodiments.

For comparison with framework 1900, FIG. 2AE shows a control in the form of truss 2000 with two chords 2001, 2003 at a separation distance $\Delta z_{20013}$ interconnected by a straight diagonal web member. Straight diagonal web member 2002 has a pitch angle $Øy_{20012}$ relative to chord 2001 of 45°. Straight diagonal web member 2002 has a thickness $Δx_{2002}$ equal to half the separation distance $Δz_{20013}$. The pitch angle $Øy_{20012}$, thickness $Δx_{2002}$, and separation distance $Δz_{20013}$ determine the shortest path through the structure from chord 2001 to chord 2003 which is shortest metric path 2004. Shortest metric path 2004 has a pitch angle $Øy_{20014}$ relative to chord 2001 of 75°, a span $S_{2004}$ equal to the separation distance $Δz_{20013}$, and a length $L_{2004}$ equal to 1.04 times the separation distance $Δz_{20013}$. The structural insulation factor $F_{2004}$ for shortest metric path 2004 equals $L_{2004}$ divided by $S_{2004}$, that is 1.04. If truss 2000 is made from a material with an isotropic resistivity r then the structurally insulative resistivity equals the resistivity r multiplied by the structural insulation factor which in this case is 1.04·r.

For comparison, truss 2005 shown in FIG. 2AF incorporates chords 2006 and 2008 with a separation distance $Δz_{20068}$ interconnected by a straight direct web member 2007 with a pitch angle $Øy_{20067}$ relative to chord 2006 of 90°. These quantities determine that the shortest metric path 2009 between chords 2006 and 2008 has a length $L_{2009}$ and span $S_{2009}$ equal to the separation distance $Δz_{20068}$ and a structural insulation factor L/S equal to 1. If truss 2005 is made of the same material as truss 2000 with isotropic resistivity r, then the structurally insulative resistivity equals the resistivity r multiplied by the structural insulation factor which equals r. Thus, truss 2000 offers a fractional improvement of $\{1.04·r−r\}/r$, that is 4%, overtruss 2005. Span-wise indirectness quantifies the fractional improvement as $\{length/span\}−1$. For instance, shortest metric path 2004 has a span-wise indirectness $I_{2004}$ equal to $\{L_{2004}/S_{2004}\}−1$, that is 4%, so the geometry of truss 2004 offers an improvement of 4% to the structurally insulative resistivity.

FIG. 2AG shows a truss 2000' with chords 2001' and 2003' and a single solid web with a single solid web member 2002'. Metric path 2004' is a direct path between structural members 2001' and 2003'.

The straight-diagonal-web-member two-chord trusses in FIG. 2AC and FIG. 2AD compensate for the effects described for truss 2005 by (1) making the most direct metric path length between the chords long with respect to the inter-chord distance, (2) lessening the linear density of material along the longitudinal direction of the chords, (3) still allowing for an increase in lateral extent of material comprising the truss, (4) increasing the least angle between the shortest metric path and the local span-wise direction, (5) providing a greater area for the web member to interface with the chords which strengthens the joint, and (6) increasing the length L of the most direct metric path relative to its span S thereby increasing the structural insulation factor L/S and (a) increasing the resistance R=r·L along the most direct metric path where r is the resistivity approximately parallel to $ŷ_{2002}$ or equivalently (b) increasing the structurally insulative resistivity of the web member, $r_{sval}=r_{var}L/S$. Table 1A summarizes useful formulae and Table 1B summarizes the symbols and terminology. $Mθ$, associated with an angle relative to the span of a metric path, in the table corresponds to the span-wise slope of a tangent line (change in normal direction divided by change in longitudinal direction or change in lateral direction divided by change in longitudinal direction) to any straight subpath of the most direct metric path or shortest metric path. $Mø$, associated with an angle relative to the chords, in the table corresponds to the slope of a tangent line (change in longitudinal direction divided by change in normal direction or change in longitudinal direction divided by change in lateral direction) to any straight subpath of the most direct metric path or shortest metric path.

TABLE 1A

| | |
|---|---|
| $R_{sval} = r_{val} \cdot L$, | (1) |
| $R_{val} = r_{val} \cdot S$ | (2) |
| $F = R_{sval}/R_{val} = L/S$ | (3) |
| $I = R_{sval}/R_{val} - 1 = L/S - 1 = (L - S)/S$ | (4) |
| $Mθ = [(L^2 - S^2)^{1/2}]/S$ | (5) |
| $Mθ = [(L/S)^2 - 1]^{1/2}, = [F^2 - 1]^{1/2} = (I^2 + 2 \cdot I)^{1/2}$ | (6) |
| $F = L/S = I + 1 = (Mθ^2 + 1)^{1/2}$, | (7) |
| $I = (Mθ^2 + 1)^{1/2} - 1$, | (8) |
| $ΔR_{sval} = R_{sval} - R_{val} = r_{val} \cdot (L - S) = r_{val} \cdot I \cdot S = r_{val} \cdot (F - 1) \cdot S$ | (9) |
| $r_{sval} = R_{sval}/S = r_{val} \cdot L/S = r_{val} \cdot F = r_{val} \cdot (I + 1)$ | (10) |
| $Δr_{sval} = ΔR_{val}/S = r_{val} \cdot (L - S)/S = r_{val} \cdot (F - 1) = r_{val} \cdot I$ | (11) |
| $F = L/S = R_{sval}/R_{val} = r_{sval}/r_{val}$, | (12) |
| $R_{val} = r_{target}$ or $R_{val} = R_{target}$ | (13) |
| $r_{sval} = r_{target}$ or $R_{sval} = R_{target}$ | (14) |
| $Mθ = [(r_{sval}/r_{val})^2 - 1]^{1/2} = [(r_{target}/r_{val})^2 - 1]^{1/2}$ | (15) |
| $Mθ ≈ r_{target}/r_{val}$, for $r_{target}/r_{val} \gg 1$. | (16) |
| $Mø = 1/Mθ$ | (17) |
| $D = S/L$ | (18) |

TABLE 1B

| | |
|---|---|
| S | span of the metric path |
| L | length along the metric path |
| $R_{val}$ | areal resistance |
| $R_{SI}$ | areal resistance (metric units) |
| $R_{sval}$ | structurally insulative resistance |
| $R_{SIs}$ | structurally insulative resistance (metric units) |
| $r_{sval}$ | structurally insulative resistivity |
| $r_{val}$ | direct resistivity |
| F | structural insulation factor |
| I | span-wise indirectness |
| D | Directness of the metric path |
| $Mθ$ | metric path slope relative to the span-wise direction |
| $Mø$ | metric path slope relative to a structural member |

FIG. 2AH shows uniaxial framework 1000 which possesses three chords 1001, 1003, 1005 and two webs 1002, 1004 like uniaxial framework 12 in FIG. 1A. Webs 1002, 1004 each comprise at least one web member 1002a, 1004a, respectively. Webs 1002, 1004 comprise terminal web members 1002N and 1004N which could be the same as web members 1002a, 1004a in a framework with only one web member in each of webs 1002, 1004. For the embodiment shown in FIG. 1A, web 1002 incorporates web members 1002a, 1002b, 1002N and web 1004 incorporates web members 1004a, 1004N. For the embodiment shown in FIG. 1A, web 1002 incorporates floating tenons 1002a', 1002b', 1002N' and web 1004 incorporates floating tenons 1004a', 1004N'. The two wavy lines 1009 indicate the possibility for additional length of chords 1001, 1003, 1005, additional web members, and additional floating tenons. Table 2 shows preferred values for the key dimensional parameters. Preferred dimensional parameters for any other embodiment can be obtained by multiplying these parameters by a scaling factor. For instance multiplication by a scaling factor of 2 produces the preferred dimensional parameters of an 11 inch (~280 mm) deep framework.

TABLE 2

| Dim. Param. | Imperial Units Preferred Value | Imperial Units Range | SI Units Preferred Value | SI Units Range |
|---|---|---|---|---|
| $A^z_{1000}$ | 5.5 in | 5-7 in | 148 mm | 123-175 mm |
| $A^y_{1002}$ | 24 or 16 in | 12-36 in | 600 mm | 300-900 mm |
| $A^y_{10024'}$ | 12 or 8 in | 6-24 in | 300 mm | 150-450 mm |
| $A^y_{1004a}$ | 2.4 or 1.5 in | 0.75-3 in | 61 or 48 mm | 19-75 mm |
| $A^z_{1001}$ | ¾ or 1.1 in | 0.5-2.5 in | 19 or 30 mm | 12-61 mm |
| $A^z_{1002}$ | 1¼ or 1.1 in | 0.5-2.5 in | 36 or 30 mm | 12-61 mm |
| $A^z_{1003}$ | 1⅛ or 1.1 in | 0.5-2.5 in | 36 or 30 mm | 12-61 mm |
| $A^z_{1004}$ | 1.25 or 1.1 in | 0.5-2.5 in | 36 or 30 mm | 12-61 mm |
| $A^z_{1005}$ | 1.125 or 1.1 in | 0.5-2.5 in | 36 or 30 mm | 12-61 mm |
| $A^y_{10050}$ | 3.0625 or 0 in | 0-6 in | 0 mm | 0-150 mm |
| $A^y_{1005'}$ | 92.625 or 96 in or 104.625 or 108 in | 72-288 in | 2400 mm | 1800-7200 mm |

FIG. 2AI illustrates a metric path for the framework shown in FIG. 2AH. Metric path 1010 is a most-direct metric through path between any point on structural member 1001 and any point on structural member 1005. The points labeled 1010a, 1010b, 1010c, 1010d, 1010e, 1010f, delimit straight-line segments of metric path 1010 that can be used to calculate the length and span of metric path 1010 in terms of the Δz distances according to the definitions of path length and path span. For reference, FIG. 2A1 shows web members 1002a 1004a.

FIGS. 2AJ-2AL illustrate non-limiting possibilities for sectional views of the embodiment shown in FIG. 2AH.

FIG. 2B is a control schematically showing a chord 230 with no web members and can be described by code 1. FIGS. 2C-2I schematically show various non-limiting embodiments of 1D (uniaxial) frameworks with each pair of chords connected by a web of diagonally pitched web members.

FIG. 2C shows a chord having a vertical row of pitched diagonally extending web members 236 connected thereto, and can be described by code 1a.

FIG. 2D shows an embodiment similar to that of FIG. 2C except that the direction of the diagonal braces is reversed. This embodiment is described by code 1b.

FIG. 2E show three parallel chords with a single row of diagonal braces positioned between each set of adjacent chords. In FIG. 2E, horizontally spaced diagonal braces extend in different directions from one another. This embodiment shows constant intra-layer web-member spacing and a characteristic offset of zero between braces/web-members, with the same pitch-angle sign, in different webs and can be described by code 1a1a1. Horizontally spaced diagonal braces are substantially parallel to one another.

FIG. 2F shows 2 chords and two sets of diagonal braces, one set to the right of each chord. This framework is a code 1a1a framework which is the same as FIG. 2E except with one peripheral chord omitted.

FIG. 2G is similar to FIG. 2E except that the braces spaced in the vertical direction from one another have a different alternating pattern. This is a code 1a1a1 framework with diagonal web members sloping one way in the first half of the framework and then the opposite way along the second half of the framework along longitudinal axis.

FIG. 2H is similar to FIG. 2E except all of the diagonal braces are parallel to one another. This code 1a1a1 framework has diagonal web members sloping one and only one way. For any framework of this type one can omit one or both of the peripheral struts/chords. For some embodiments of the framework in FIGS. 2C-2I some or all adjacent web members in the same horizontal layer touch one another like the embodiments shown in FIGS. 2A and 2B. For other embodiments of the framework in FIGS. 2C-2I (not shown), some or all adjacent web members in the same horizontal layer do not touch one another as in the embodiments shown in FIGS. 3C, 3F. Some embodiments incorporate half-unit-cells and an odd number of web members per horizontal layer of web members. The number of web members per horizontal layer of web members ranges between one and any positive integer.

FIG. 2I shows four chords with diagonal braces there between. Horizontally spaced braces are parallel to one another. Vertically spaced braces alternate in their diagonal direction. This can be described as a code 1a1a1a1 framework with two units cells, 4 struts/chords, and 3 webs wherein each web is a layer of diagonal braces/web-members with a constant intra-layer brace/web-member spacing and an interlayer characteristic offset of zero between same-polarity web members.

FIG. 2J shows four chords with diagonal braces there between. Horizontally spaced braces alternate in their diagonal direction. Vertically spaced braces also alternate in their diagonal direction. This can be described as a code 1a1b1a1 framework with two units cells, 4 struts/chords, and 3 layers of diagonal braces/web-members with a constant intra-layer brace/web-member spacing and a maximum interlayer characteristic offset between same-polarity braces/web-members.

FIG. 2K shows five chord with diagonal braces there between. This is a code 1a1b1a1b1 framework with two units cells, 5 struts/chords, and 4 layers of diagonal braces/web-members with a constant intra-layer brace/web-members spacing and a maximum interlayer characteristic offset between same-polarity braces/web-members.

FIGS. 2M-2T schematically show various embodiments of uniaxial/1D frameworks with straight braces. The framework in each figures shows 1.5 unit-cells with each pair of chords connected by a web containing two web-members.

FIG. 2M shows 1 chord 330 with two straight web members 336 attached thereto. This framework is a control described with code 1a.

FIG. 2N shows 1 chord with two straight web members attached at lower vertical locations than the embodiment of FIG. 2B, but with substantially the same spacing from one another as in the embodiment of FIG. 2B. This framework is a control described with code 1a.

FIG. 2O shows three chords with two straight web members between each set of adjacent chords. The pair of web members between the first and second chords is vertically higher than the pair of web members between the second and third chords. This framework has a code of 1a1b1.

FIG. 2P depicts four chords with two straight web members between each set of adjacent chords. The pair of web members between the first and second chords is at the same vertical height as the pair of web members between and third and fourth chords, following a pattern of code 1a1b1a1.

FIG. 2Q shows four chords with two straight web members between each set of adjacent chords. Each pair of web members is at a different vertical height than the other pairs of web members, following a pattern of code 1a1b1c1.

FIG. 2R depicts five chords and four pairs of straight members. The vertical height of the first and third pairs of web members is the same. The vertical height of the second and fourth pairs of web members is the same. This arrangement follows the pattern of code 1a1b1a1b1.

FIG. 2S shows three chords in a pattern of code a1b1a1b with no chord on the left, showing that a web can be left unconnected on one side so as to create an extra layer of insulatable cavities when connected to another object.

FIG. 2T shows four chords in a pattern of code 1a1 b1o in which o indicates a web of horizontally extending web members running into and/or out of the page. In this case, the web members do not connect two chords in the normal direction but function to connect a chord in one framework (shown) to a laterally disposed chord in one or more than one other framework (not shown but illustrated as a non-limiting example in FIG. 17A).

FIGS. 3A-3F show six non-limiting examples of web shapes in a half-unit-cell of framework 129. Each web shape is shown between two adjacent chords. The vertical lines in each of FIGS. 3A-3F schematically show chords as shown by labeled chords 130 and 132 in FIG. 3A. The dotted lines 104, 106, 108, 110, 111 and 112 between adjacent chords schematically show webs 104, 106, 108, 110, 111, and 112 between chords 130 and 132. Web 104 shown in FIG. 3A is straight and runs diagonally between the chords 130 and 132. A preferred embodiment of a framework apparatus to have no thermal bridging upon installation in an insulated, wood-frame building with a resistivity of approximately r1 for the wall cavity insulation, comprises the FIG. 3A truss made from a material with a resistivity of approximately r2 along the longitudinal direction of the diagonal web member 140, wherein the diagonal web member 104 has a slope ($\Delta y/\Delta x$) substantially equal to r1 divided by r2, the x and y directions are shown in the FIG. 3A, and the resistivities have thermal units of ° F.·ft$^2$·hr per BTU per inch as a non-limiting example.

The web shown in FIG. 3B incorporates a third chord 131 and two web members 105 and 105B which function together as a web-like structural member 106. Web 108 shown in FIG. 3C is similar to web-like structural member 106 in that (1) web members 105 and 105B are present in both web 108 and 106 and (2) web member 107C runs in the longitudinal direction of the framework and connects web member 105 and 105B, which are relabeled as 107 and 107B for distinction in the FIG. 3C framework, like structural member 131 runs in the longitudinal direction of the framework and connects web members 105 and 105B in the FIG. 3B framework. However, web member 107C is not a structural member like structural member 131. Thus, web 108 is not a web-like structural member because web 108 does not include a structural member. Instead the structural-member like segment 107C does not run the entire longitudinal length of the half-unit-cell delimited by black circles in FIG. 3C. Each embodiment with a half-unit-cell shape like that of web 106 has a related embodiment with a shape like that of web 104, 108, 110, 111, 112 and all other implicit web shapes. Each closed circle 102 in FIGS. 3A-3F represents an interface between a key pair of structural parts. Each closed circle 102 in FIGS. 3A-3F appears in a corresponding figure in the grouping of FIGS. 3G-3L and FIGS. 4A-4F to illustrate the process of replicating a half-unit-cell to create a new framework. Generally any half-unit-cell with three structural members can be replaced by a half-unit-cell with two structural members and vice versa in embodiments where the shape of the web for the replacement half-unit-cell has an advantage. The same method applies to half-unit-cells with more than three structural members. Generally the spanwise indirectness can be preserved for such replacements although. Frameworks with a non-zero rangewise indirectness generally provide a higher spanwise indirectness than frameworks with zero rangewise indirectness for any given span of the most direct metric path along any targeted direction. When the length of a path does not equal the range it must have deviations from a straight-through path and a straight diagonal path and saying that the rangewise indirectness is non-zero captures the essence of this insight.

FIGS. 3G-3L show various web member shapes in a full-unit-cell of framework 129 created by replicating a half-unit-cell to create a new framework. The upper and lower halves of each full unit cell are mirror images of one another but the upper and lower halves could be the same or different in a unlimited variety of ways as indicated by the many variations shown in FIGS. 2B-2T.

FIGS. 4A-4F show six non-limiting examples of web shapes in the half-unit-cell of a framework based on a horizontal repetition, translation and overlap of each half-unit-cell in FIGS. 3A-3F. The web shapes are shown between adjacent chords in a framework that includes at least 3 chords.

Figure 4A:
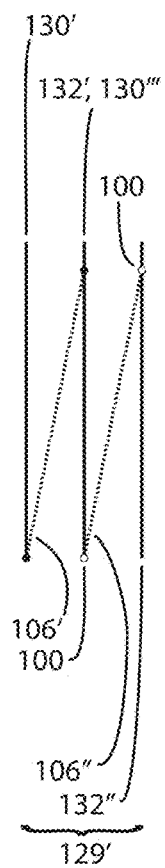
FIGS. 4A-4F show various web member shapes in a three chord truss.

For instance, the FIG. 4A framework has three chords labeled 130', 132', and 132''. By comparison to the FIG. 3A framework, the FIG. 4A framework has an additional chord, chord 132''.

Figure 4B:
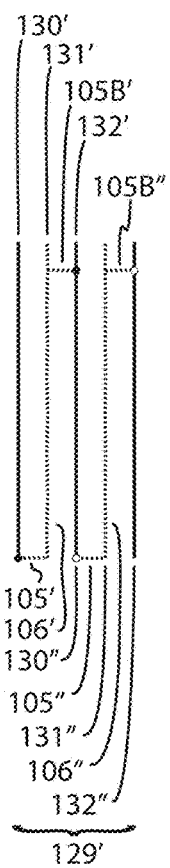
Figure 4C:
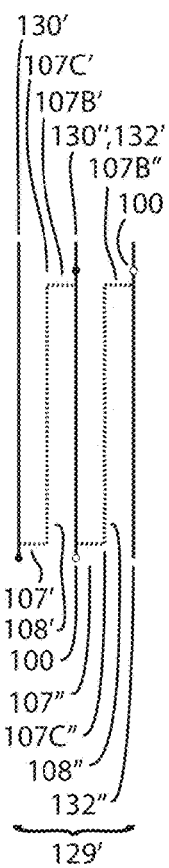
Figure 4D:
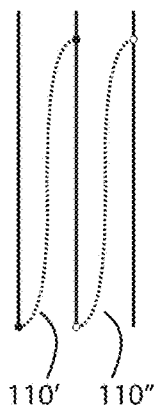
Figure 4E:
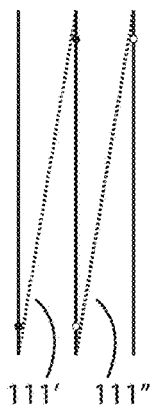
Figure 4F:
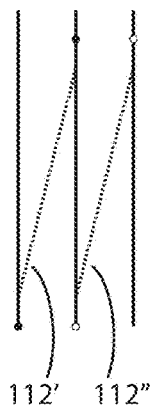
Figure 5A:
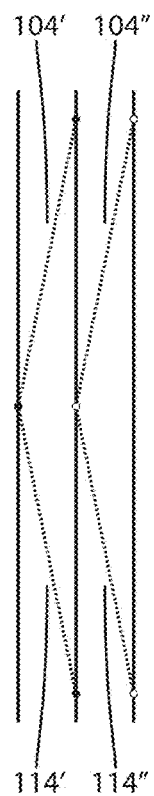
FIGS. 5A-5F schematically show various web member shapes in the half-unit-cell of a framework with three chords.
Figure 5B:
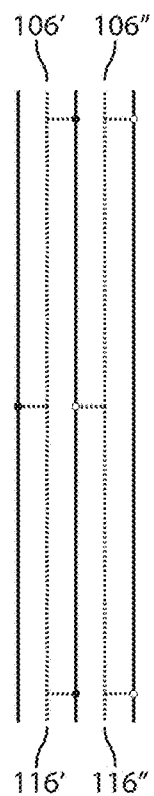
Figure 5C:
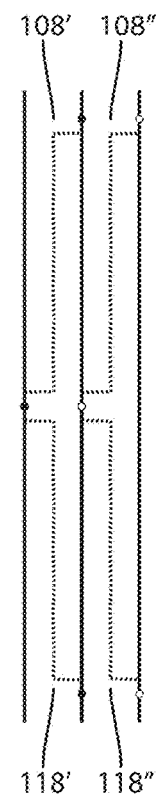
Figure 5D:
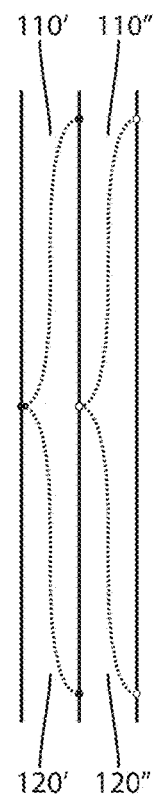
Figure 5E:
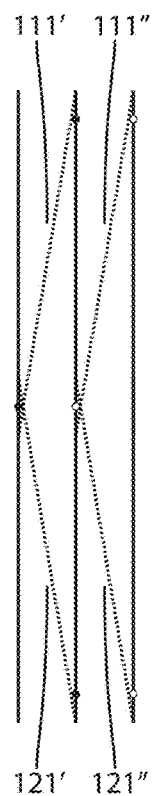
Figure 5F:
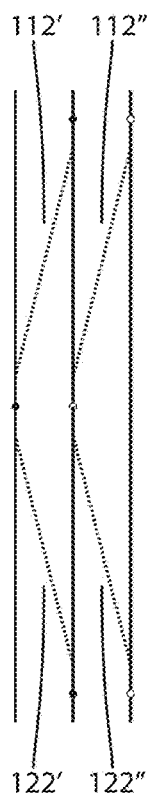

The FIG. 4B framework has 5 chords labeled as 130', 131', 132', 131'', and 132''. Chord 132'' is analogous to chord 132 in the sense that chord 132'' is the last chord to the right in the figure and is the last chord in the structural-member-array comprising chords 130', 131', 132', 131'', and 132'' just as chord 132 is the last chord to the right in FIG. 3A and is the last chord in the structural-member-array comprising chords 130, and 132. Chord 132'' has two labels 130'' and 132''. In the FIG. 4B embodiment, chord 130'' is the same as chord 132''. In another embodiment (not shown) chord 130'' is attached to chord 132'' and they are different objects joined together. Dashed lines 104'', 106'', 108'', 110'', 111'', and 112'' between chords 130'' and 132'' schematically show web members between chords 130'' and 132'' analogous to dashed lines 104, 106, 108, 110, 111, and 112 in FIG. 3A-3F. In FIGS. 3A-3F, 3G-3L, 4A-4F, and 5A-5F, each closed circle 102, 102' represents the interface of a key pair of structural parts which is translated to the right and transformed into each open circle 100' to illustrate the process of replicating a half-unit-cell to create a new framework. Each closed circle 102' is created by vertically translating each half-unit cell, indicated by the collection of closed circles 102 in FIGS. 3A-3F, downward by the length of the half-unit cell to create a full unit cell as shown in FIGS. 3G-3L. In the non-limiting cases illustrated by FIGS. 3G-3L, 4A-4F, and 5A-5F, each vertically translated cell is also vertically inverted. The vertical lines schematically show chords as illustrated by chords 130', 132' and 132'' in FIG. 4A. The dotted lines 104', 106', 108', 110', 111' and 112' between adjacent chords 132' and 132'' schematically show web members between chords 132' and 132''.

FIGS. 5A-5F show six non-limiting examples of web shapes in the full-unit-cell of a framework based on a horizontal repetition, translation, and overlap of each half-unit-cell in FIGS. 3G-3L. Each of FIGS. 5A-5F also illustrates how to create a new framework by combining each framework of FIGS. 4A-4F, respectively, with a vertical reflection of each framework of FIGS. 4A-4F, respectively. Dashed lines 114', 116', 118', 120', 121' and 122' represent a vertical reflection of the dashed lines 104', 106', 108', 110', 111' and 112' in FIGS. 4A-4F. Dashed lines 114'', 116'', 118'', 120'', 121'', and 122'' represent a vertical reflection of the dashed lines 104'', 106'', 108'', 110'', 111'', and 112''. Dashed lines 114', 116', 118', 120', 121', and 122' represent a vertical reflection of the dashed lines 104', 106', 108', 110', 111', and 112'. An analogous process applies to the creation of the new frameworks of FIGS. 3G-3L from those of FIGS. 3A-3F. Dashed lines 114", 116", 118", 120", 121", and 122" represent a horizontal reflection of the dashed lines 114', 116', 118', 120', 121', and 122'. Dashed lines 104", 106", 108", 110", 111", and 112" represent a horizontal reflection of the dashed lines 104', 106', 108', 110', 111', and 112'. This process of replication, vertical reflection, and/or horizontal reflection can be repeated ad infinitum to create uniaxial frameworks of arbitrary size.

Figure 6A:
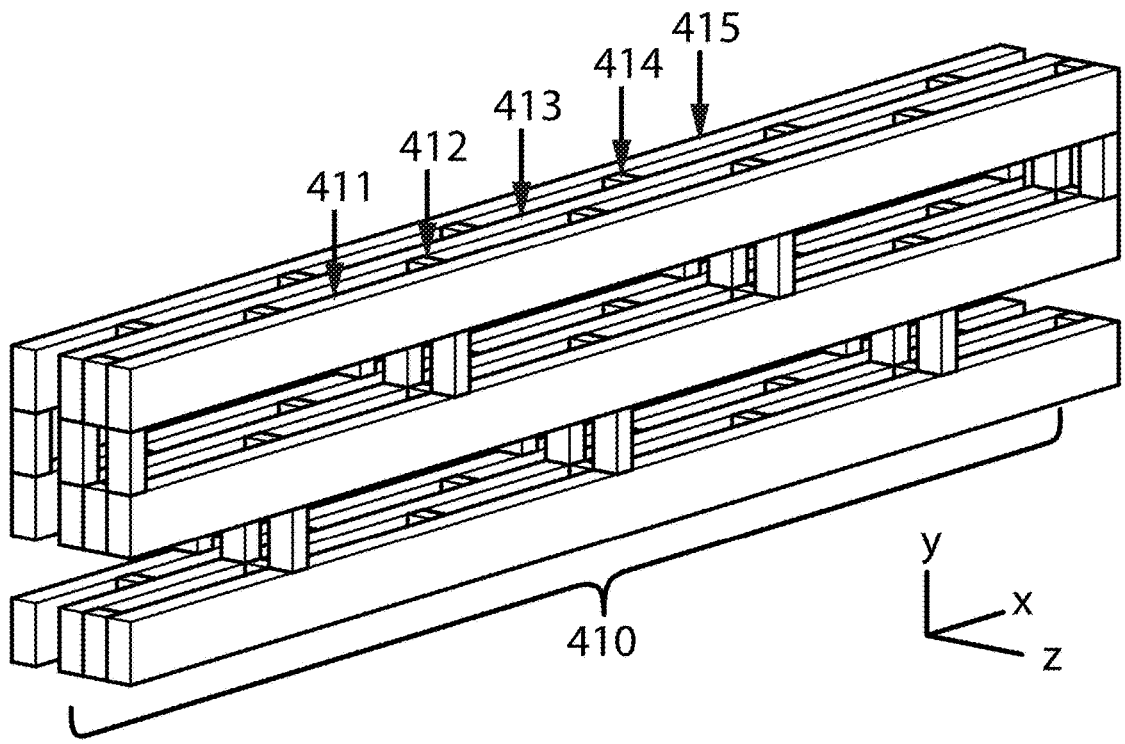
FIGS. 6A-6C illustrate embodiments having three chords in one direction and three chords in another direction.

FIG. 6A shows a biaxial framework 410 that comprises multiple pieces of material, i.e. structural parts, including a 3 by 3 matrix of chords or structural members, 2 by 3 matrix of internetworking webs, and a 2 by 3 matrix of intranetworking webs, wherein each internetworking web comprises a plurality of internetworking web members formed separately from the chords and each intranetworking web comprises a plurality of intranetworking web members formed separately from the chords. The internetworking web members and intranetworking web members are arranged so that biaxial framework 410 structurally insulates in any direction perpendicular to the chords. In other embodiments the interworking web members and/or intranetworking web members are formed as part of the structural members. These structural parts can be conceptually grouped into frameworks, intranetworking webs (webs within a framework) and into internetworking webs (webs between frameworks) in more than one way as typified by the following example of a first conceptual grouping. A first layer 411 is framework 411. A second layer 412 is an internetworking web array 412. A third layer 413 is framework 413 which is a replica of framework 411. A fourth layer 414 is an internetworking web array 414 containing internetworking web-members that are offset relative to those of internetworking web array 412. A fifth layer 415 is framework 415 which is a replica of framework 411. Each of the internetworking web arrays 412 and 414 comprise substantially perpendicular intranetworking web members. In other embodiments (not shown) the internetworking webs arrays 412 and 414 and the biaxial framework 410 comprise intranetworking web-members running diagonally in either pitch angle, yaw angle, or both the pitch and yaw angle. Each of the frameworks 411, 413 and 415 comprise first and second intranetworking webs and first, second, and third chords. Each of the frameworks 411, 413 and 415 has substantially perpendicular intranetworking webs. In other embodiments (not shown) the uniaxial frameworks 411, 413, 415 and biaxial framework 410 have diagonal intranetworking web-members in either pitch angle, yaw angle, or both pitch and yaw angles. In other embodiments (not shown) these frameworks have diagonal web-members such that the biaxial framework 410 also has diagonal web members. Frameworks 411, 413 and 415 align in a side-by-side arrangement such that the first chords of the framework align with each other, the second chords of the framework align with each other, and the third chords of the framework align with each other in a first non-limiting configuration.

Figure 6D:
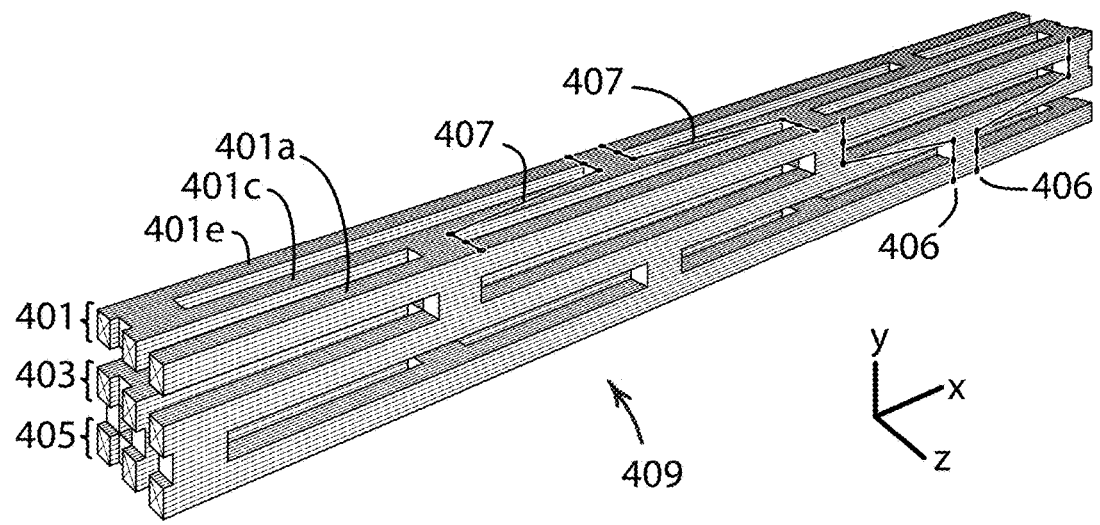
FIGS. 6D-6F illustrate different structurally insulative biaxial frameworks.
Figure 7:
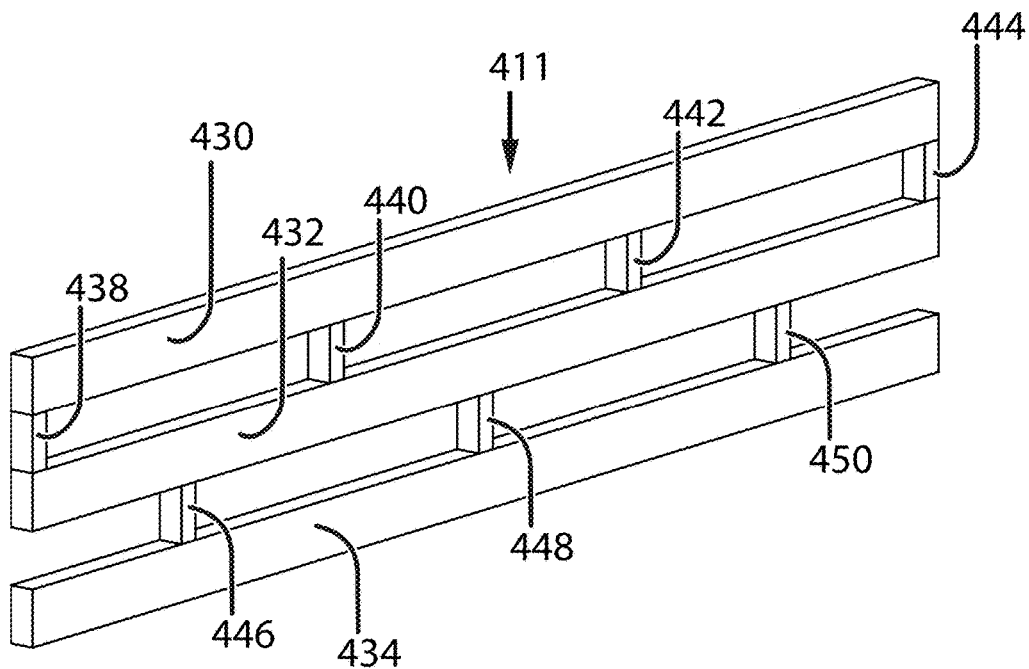
FIGS. 7-10 each illustrate a combination of a uniaxial framework and an internetworking web array that each constitute a biaxial framework 6A and constitute an embodiment of an insulatable, insulative framework.
Figure 8:
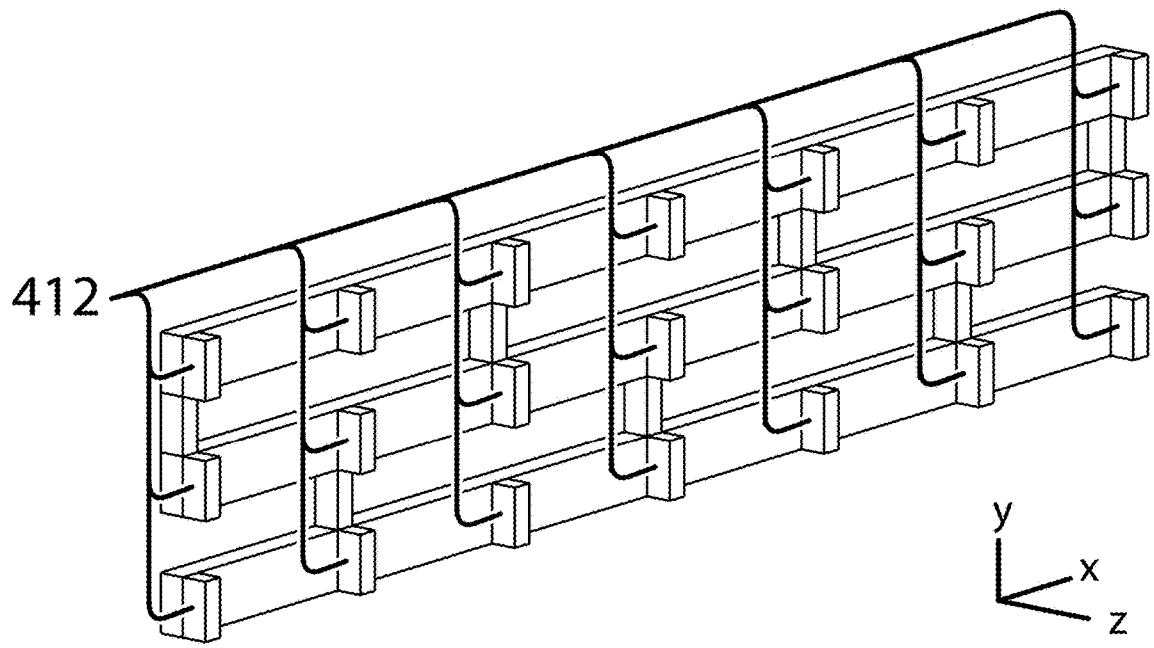
Figure 9:
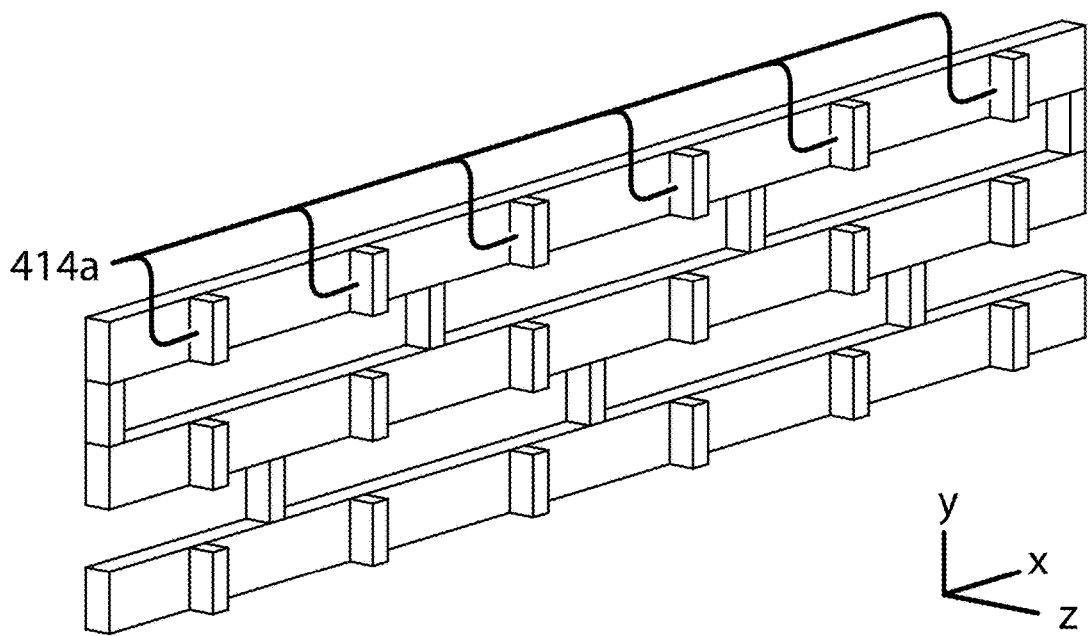

Framework 411 is individually illustrated in FIG. 7. Internetworking web array 412 is illustrated in FIG. 8 with framework 413 included to clarify the spatial web-to-framework relationship. Frameworks 413 and 415 are replicas of the Framework 411 illustrated in FIG. 7. Internetworking web array 414 is illustrated in FIG. 9 with framework 415 included to clarify the spatial web-to-framework relationship. Relative to a solid piece of the same material with the same dimensions, biaxial framework 410 reduces the flow of energy along its normal axis $z$, into and out of the page along a diagonal line z sloping downwardly from left to right on the page, and also reduces the flow of energy along its lateral axis $x$, up and down the page in the direction shown by line y. This reduction in energy flow stems from the geometrical relationship between the structural parts and the metric paths produced by that geometrical relationship. The metric paths for biaxial framework 410 are substantially the same as the metric paths for biaxial framework 409, illustrated in FIG. 6D. A preferred embodiment of a framework apparatus, (not shown) for installation in an insulated building, comprises biaxial framework 410 and an insulating material that fills the cavities of biaxial framework 410.

A preferred embodiment of a framework apparatus, (not shown) for installation in an insulated, wood-frame building with 2×4 walls and an R-value of 13 (° F.·ft$^2$·hr)/BTU, or 2.3 (° C.·m$^2$)/W for the wall cavity insulation, comprises biaxial framework 410 made from a wood product to have a normal dimension of 3.5 inch (89 mm), wherein the cavities of biaxial framework 410 hold an insulating material with a thermal resistivity greater than about 2.6° F.·ft$^2$·hr per BTU per inch, or 18 (° C.·m)/W, to achieve minimum code compliance for R5ci, that is an R-value of 5 (° F.·ft$^2$·hr)/BTU, or 0.88 (° C.·m$^2$)/W, of continuous insulation over the structural members.

A preferred embodiment of a framework apparatus, (not shown) for installation in an insulated, wood-frame building with 2×4 walls and an R-value of 13 (° F.·ft$^2$·hr)/BTU, or 2.3 (° C.·m$^2$)/W, for the wall cavity insulation, comprises biaxial framework 410 made from a wood product to have a normal dimension of 3.5 inch (89 mm), and a normal dimension totaling 1.5 inch (38 mm), for the two cavities, wherein the cavities of biaxial framework 410 have a total normal dimension of 1.5 inch (38 mm), hold an insulating material with a thermal resistivity greater than about 5.8° F.·ft$^2$·hr per BTU per inch, or 40.2 (° C.·m)/W, and achieve minimum code compliance for R10ci, that is an R-value of 10 (° F.·ft$^2$·hr)/BTU, or 1.76 (° C.·m$^2$)/W, of continuous insulation over the structural members.

Biaxial framework 410 has cavities that are similar in width to the width of the chord-like features. A convention itself is a choice and other choices are possible. By convention I will take the normal direction of an orthogonal biaxial framework, such as biaxial framework 410, to parallel the direction of a line that orthogonally intersects the plane of each component uniaxial framework. This same convention in the context of a manufacturing process that produces uniaxial frameworks in a first step and then joins uniaxial frameworks together into biaxial frameworks in a second step, implies that the normal axis of biaxial frameworks produced in the second step is perpendicular to the normal axis of the uniaxial frameworks produced in the first step.

Figure 6B:
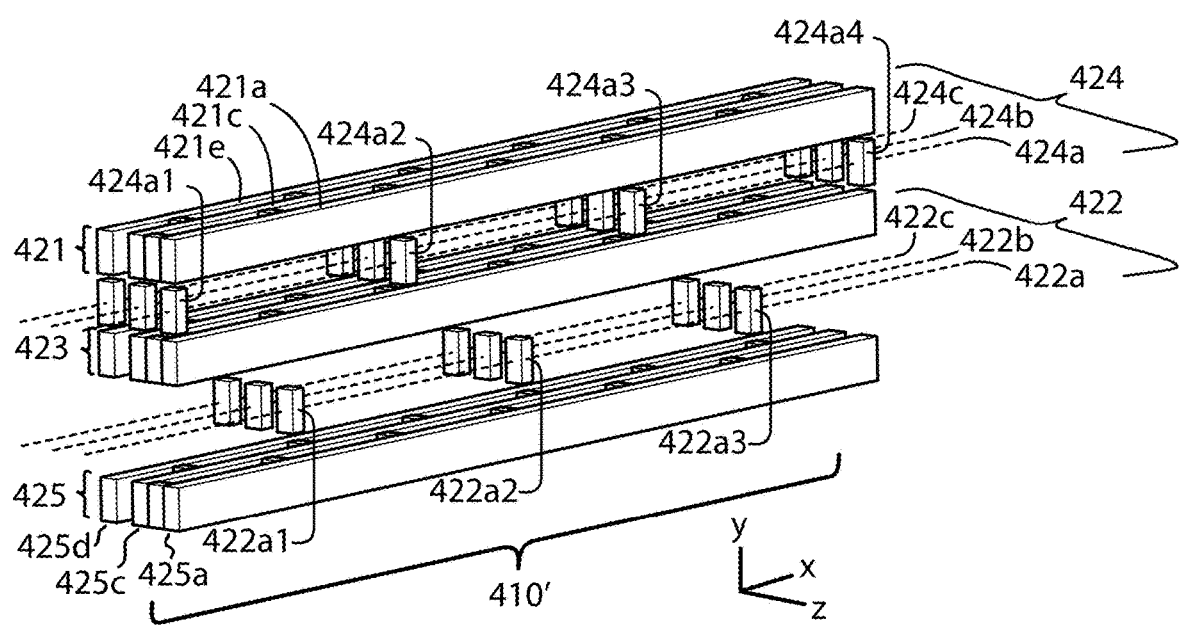

FIG. 6B illustrates such a manufacturing process whereby two internetworking webs longitudinally oriented along the horizontal direction x are positioned in the two spaces between three uniaxial frameworks which are also longitudinally oriented along the horizontal direction x to form biaxial framework 410' by pressing everything together along the vertical direction y. FIG. 6B also illustrates an exploded view for biaxial framework 410' which is a replica of biaxial framework 410 but is constructed via a second conceptual grouping of the structural parts. This conceptual grouping contrasts with the conceptual grouping illustrated by FIGS. 7-11 and the conceptual grouping described for framework 410 and FIG. 6A. Biaxial framework 410' comprises three uniaxial frameworks 421, 423, 425. The pair of frameworks 421, 423 are interconnected by internetworking web array 422. Internetworking web array 422 incorporates three internetworking webs 422a, 422b, 422c each of which comprises three internetworking web members as typified by internetworking web members 422a1, 422a2, 422a3 shown in FIG. 6B.

Figure 6C:
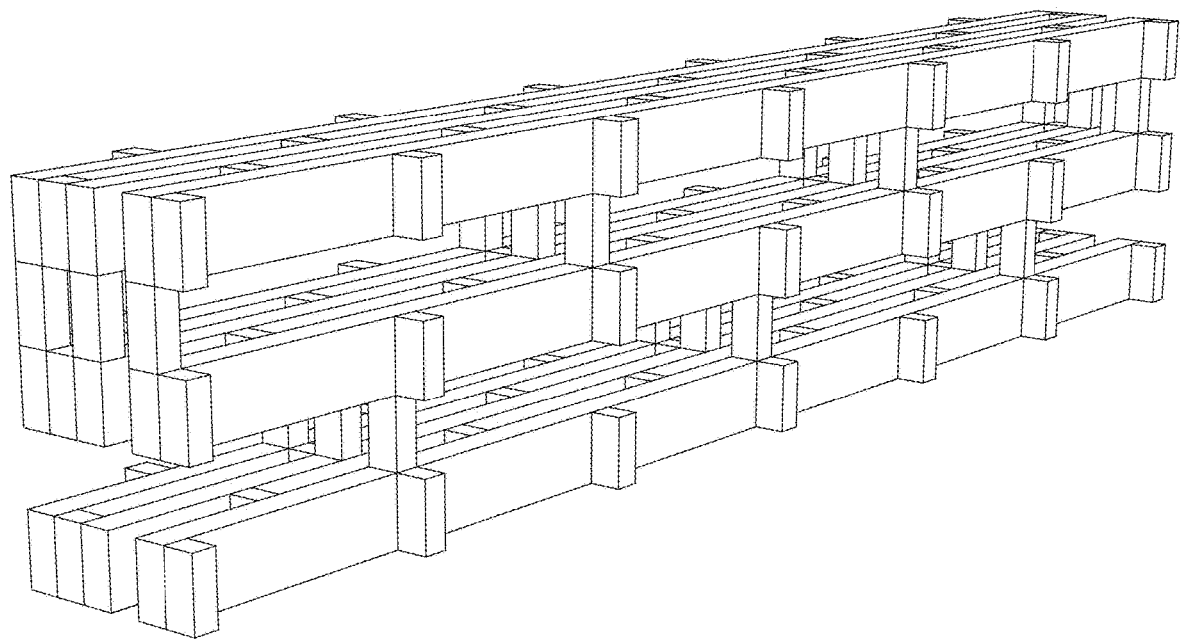

FIG. 6C shows a biaxial framework with a 3 by 3 matrix of chords and 7 web members separately formed along each chord, including a peripheral internetworking web array on the front of the biaxial framework, comprises 3 peripheral internetworking webs each of which comprises 7 web members. The peripheral internetworking web array on the back of the biaxial framework, comprises 3 peripheral internetworking webs each of which comprises 6 web members.

FIG. 6D shows a biaxial framework 409. Framework 409 has a similar shape, size, and cavity structure as biaxial framework 410 shown in FIG. 6A but is compressed by a factor of 2 along the vertical y direction. The features of framework 409 are modeled with reference to the structural parts of biaxial framework 410 shown in FIG. 6A so as to possess a 3 by 3 matrix of chord-like features and a 2 by 2 matrix of web-like features which are analogous to the chords, internetworking webs, and intranetworking webs of framework 410. These features can be conceptually grouped into framework-like features, chord-like features, internetworking web-like features, and intranetworking web-like features which respectively correspond to the frameworks, internetworking webs, and intranetworking webs described for biaxial framework 410 in the description of FIG. 6A. Biaxial framework 409 reduces the flow of energy along its normal axis $\hat{z}$, into and out of the page along a diagonal line z sloping downwardly from left to right on the page, and also reduces the flow of energy along its lateral axis $\hat{x}$, up and down the page in the direction shown by line y. Framework 409 is a biaxial framework because it reduces the flow of energy along two axes. FIG. 6D shows two most-direct metric through-paths 407 for two different bundles of metric paths with spans in the normal direction to structurally insulate against energy flow from the first chord-like feature to the third chord-like feature analogous to chords 421a and 421e of framework 410'. FIG. 6D shows two most-direct metric through-paths 406 for two different bundles of metric paths with spans in the lateral direction for energy flow from the first framework-like feature to the third framework-like feature. The first and third framework-like features of framework 409 are analogous to the first uniaxial framework 421 and third uniaxial framework 425 of biaxial framework 410' shown in FIG. 6B. Metric paths 406, 407 for biaxial framework 409 are similar to the metric paths for biaxial framework 410 and 410' because frameworks 409, 410 and 410' have the same shapes. However, metric paths 406, 407 are compressed by a factor of roughly two in the y-direction relative to the metric paths for biaxial frameworks 410 and 410'. The path length of all of these metric paths 406, 407 is calculated as the cumulative length of all path segments between the start point, intermediate points, and end point which are shown as circles along each of the paths 406, 407.

Figure 6E:
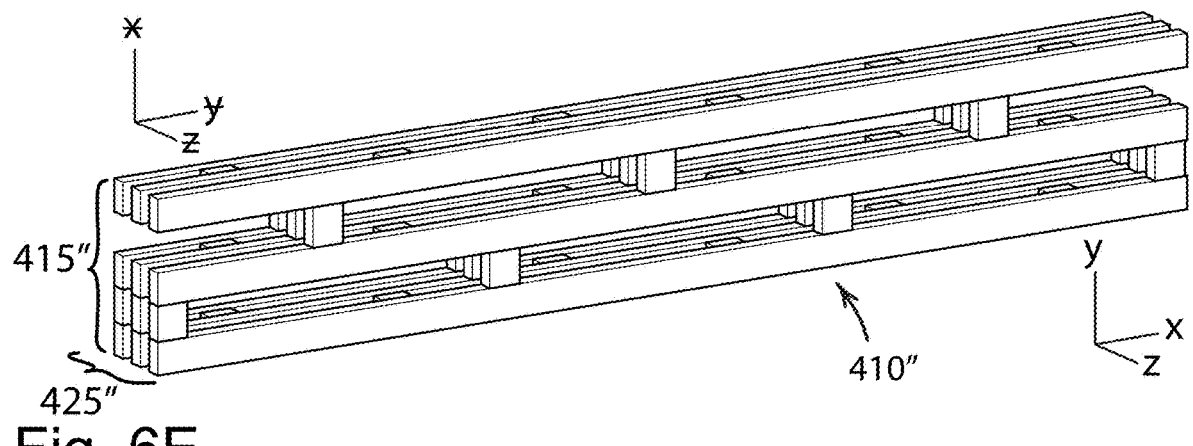

FIG. 6E shows an embodiment of a biaxial framework 410" wherein the internetworking web members, running between structural members in the vertical y direction, are offset in the longitudinal direction $\hat{y}$ relative to the intranetworking web members. The intranetworking web members being the web members that run between structural members the transverse z direction. This configuration is advantageous for manufacturing frameworks wherein the structural members are finger jointed together because the joints internetworking web-members fall at different locations than the intranetworking web-members.

Figure 6F:
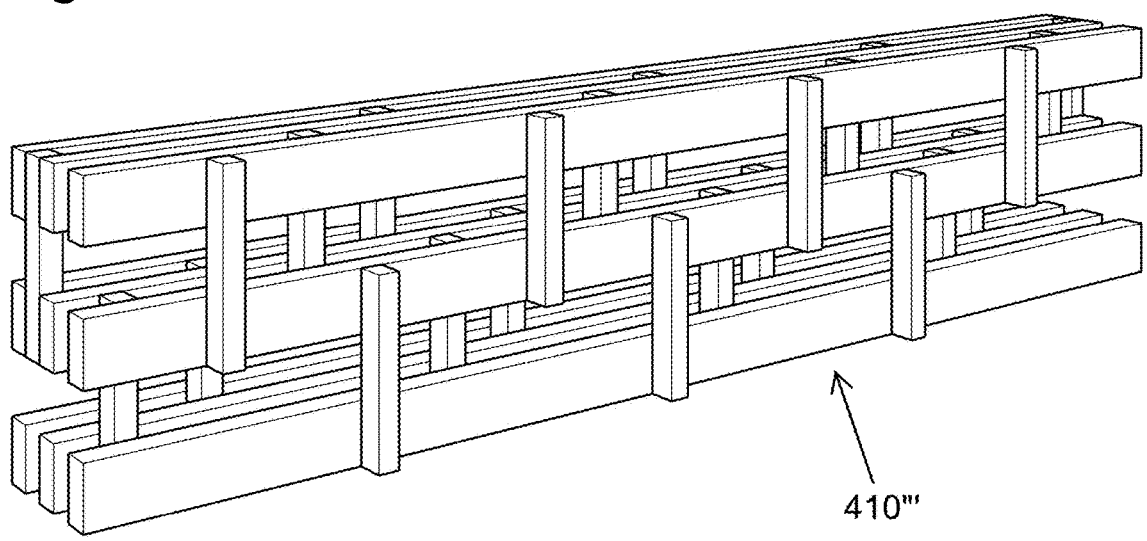

FIG. 6F illustrates a different structurally insulative biaxial framework 410''' wherein the internetworking webs also serve as intranetworking webs.

Figure 6G:
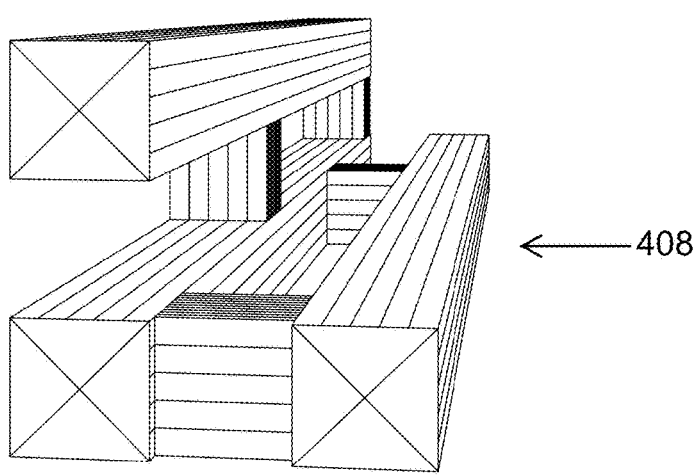
FIGS. 6G-6H illustrate structurally insulative, insulatable frameworks with a bend in them.
Figure 6H:
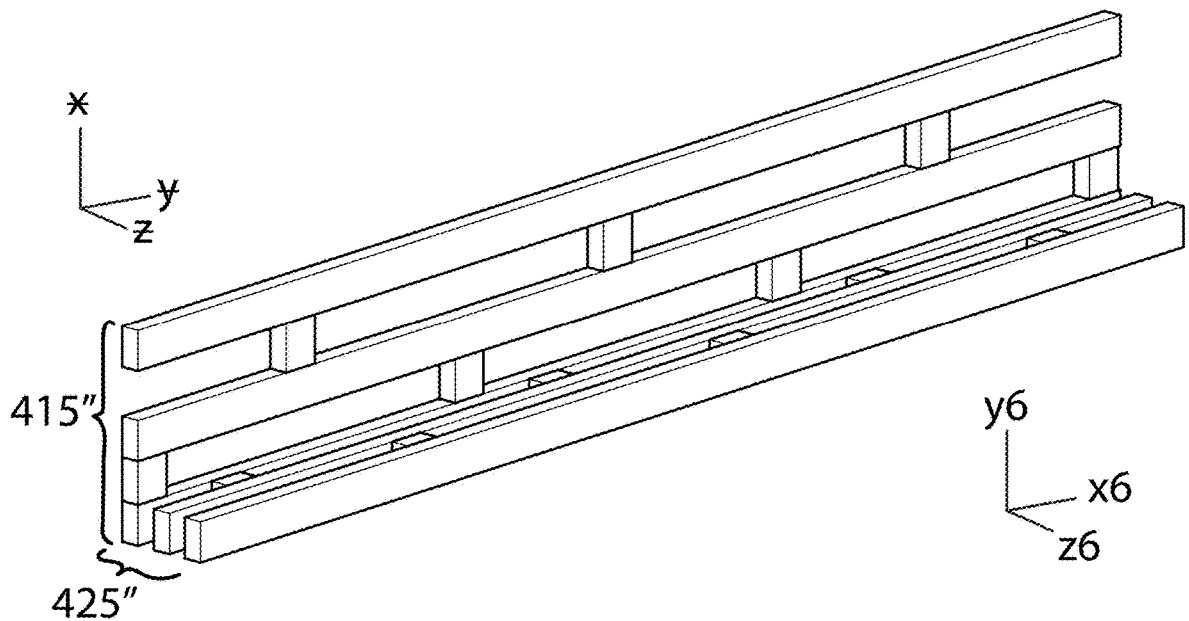

FIGS. 6G-6H illustrate structurally insulative, insulatable frameworks with a bend in them. FIG. 6G shows framework 408. FIG. 6H also shows uniaxial framework 415" and 425" for the framework 410" shown in FIG. 6E without the other structural parts in order to reveal the structure.

Figure 6I:
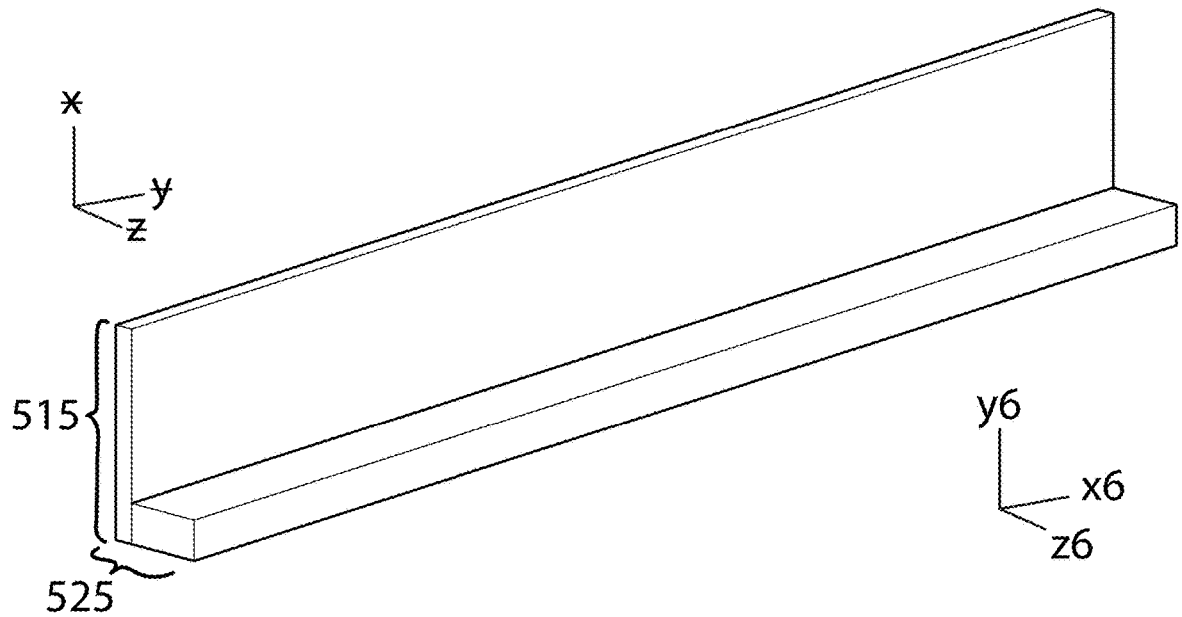
FIG. 6I shows a structure that is not itself an embodiment of an insulatable, insulative framework but is a potential component in embodiments of a biaxial framework.
Figure 6J:
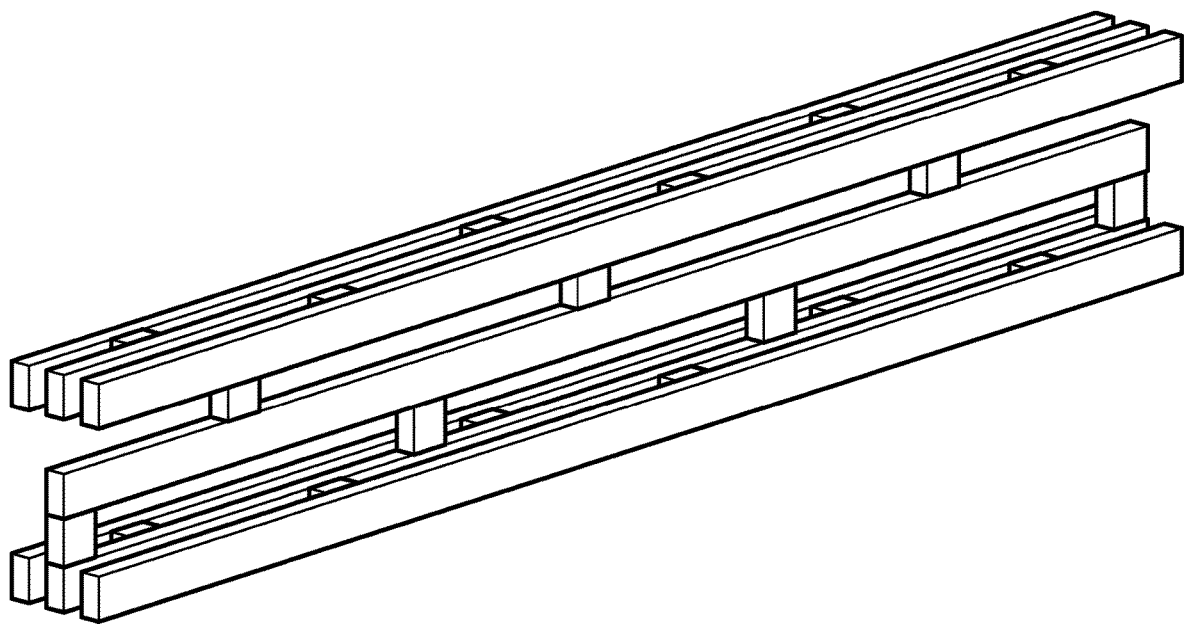
FIG. 6J illustrates another embodiment of a structurally insulative biaxial framework.
Figure 6K:
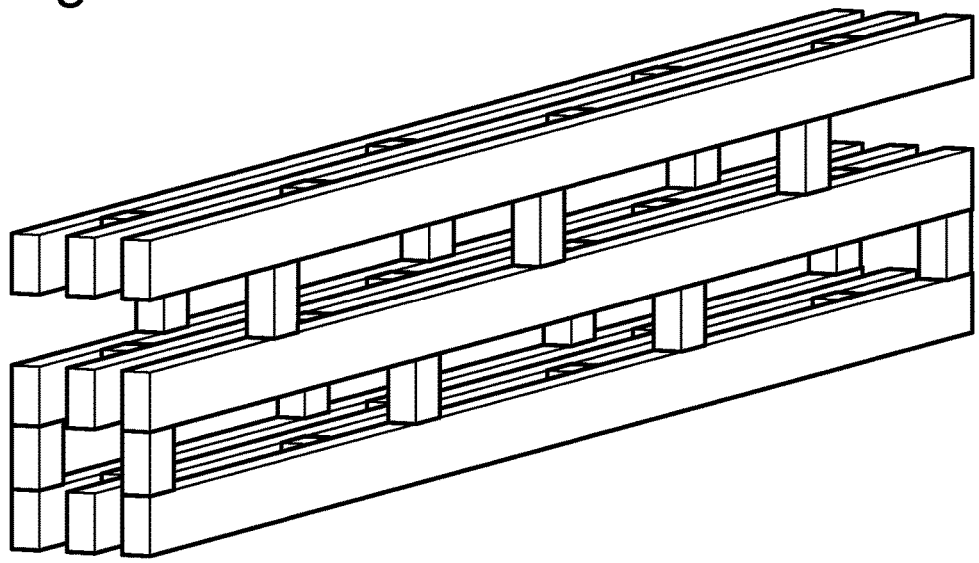
FIG. 6K illustrates yet another embodiment of a structurally insulative biaxial framework.

FIG. 6I conceptually illustrates the transformation of uniaxial framework 415 or 425 into solid 515 or 525, respectively which is a useful process for other disclosed embodiments. Solids 515 and 525 are controls used to illustrate the process and represent part of an embodiment for which uniaxial framework 415, 415" or uniaxial framework 425, 425" is respectively replaced by solid 515 or solid 525 in framework 410, 410', or 410" as non-limiting examples of the process and embodiments that result from the process.

Other embodiments (not necessarily shown) of the frameworks shown in FIGS. 6A-6K have (1) web members with circular, hexagonal, octagonal, polygonal, Nsp-pointed star where Nsp is an integer, or other shaped cross sections, (2) Niw internetworking webs per internetworking web array where Niw is an integer.

FIGS. 7-11 show non-limiting examples of frameworks and internetworking webs that can be used to build the biaxial frameworks of FIG. 6A and FIG. 6C as non-limiting examples.

FIG. 7 shows a uniaxial framework 411 which is the first layer of the biaxial framework 410 shown in FIG. 6A according to the first conceptual grouping. Uniaxial framework 411 includes 4 intranetworking web members 438, 440, 442 and 444 that form the first intranetworking web between the first chord 430 and the second chord 432. Uniaxial framework 411 includes three intranetworking web members 446, 448, 450 that form a second intranetworking web between the second chord 432 and the third chord 434. Intranetworking web members 446, 448, 450 are longitudinally offset from the 4 intranetworking web members 438, 440, 442 and 444, in this non-limiting case, by a distance equal to half the distance between intranetworking web members 438 and 440.

FIG. 8 shows uniaxial framework 413 for reference and internetworking web array 412 which is the second layer of the biaxial framework 410 shown in FIG. 6A according to the first conceptual grouping. Internetworking web array 412 comprises 18 internetworking web members extending in the transverse z direction. Internetworking web array 412 connects uniaxial framework 411 to uniaxial framework 413. The combination of uniaxial framework 413 and internetworking web array 412 also constitutes an embodiment of a uniaxial framework with a peripheral web array.

Figure 10:
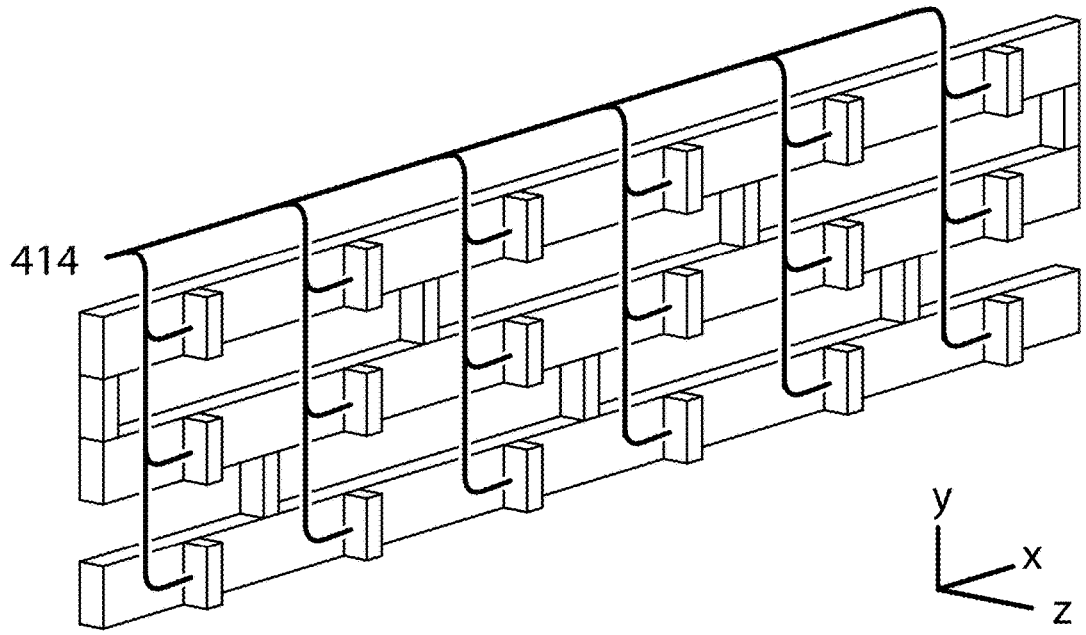

FIG. 9 shows uniaxial framework 415, for reference, and internetworking web 414a which typifies all three of the internetworking webs in the internetworking web array 414, shown in FIG. 10. Each of the three internetworking webs incorporates six internetworking web members typified by the web members of internetworking web 414a. The web members of internetworking web 414a correspond to the branches of the lead line for internetworking web 414a.

FIG. 10 shows uniaxial framework 415, for reference, and internetworking web array 414 which is the fourth layer of the biaxial framework 410 shown in FIG. 6A according to the first conceptual grouping. Internetworking web array 414 connects uniaxial framework 413 to uniaxial framework 415. The combination of uniaxial framework 415 and internetworking web array 414 also constitutes an embodiment of a uniaxial framework with a peripheral web. Internetworking web array 414 comprises 18 internetworking web members that all extend in the same direction transverse to the plane of uniaxial framework 415 outwardly from the page along a diagonal line z sloping downwardly from left to right on the page. Pressing together framework 411, internetworking web array 412, framework 413, internetworking web array 414, and framework 415 produces framework 410 shown in FIG. 6A. Pressing together internetworking web array 414, framework 411, internetworking web array 412, framework 413, internetworking web array 414, framework 415, and internetworking web array 412 produces the biaxial framework in FIG. 6C.

Figure 11A:
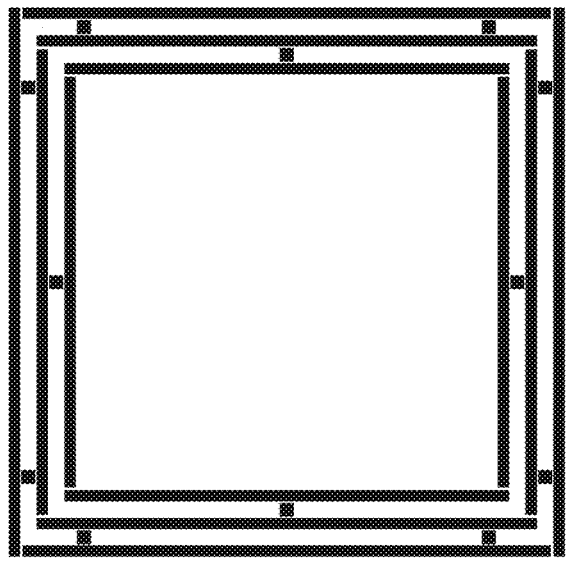
FIG. 11A illustrates the union of four uniaxial frameworks using a first method of joinery.
Figure 11B:
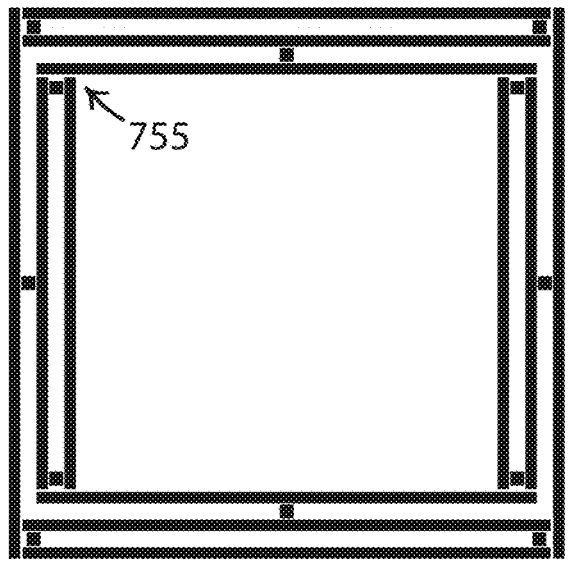
FIG. 11B illustrates the union of four uniaxial frameworks using a second method of joinery.
Figure 11C:
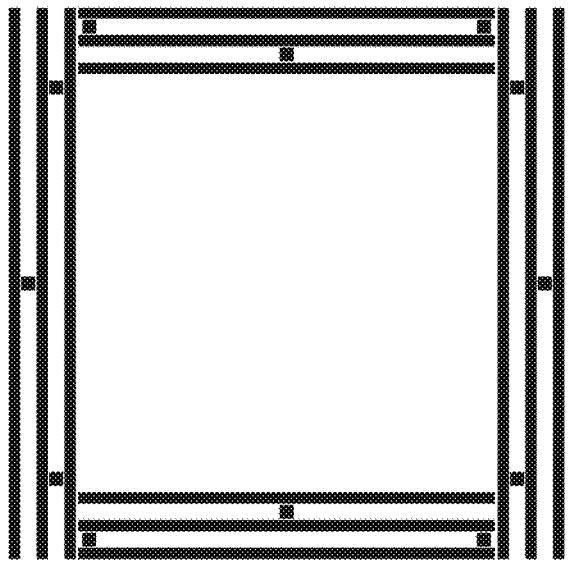
FIG. 11C illustrates the union of four uniaxial frameworks using a third method of joinery.

FIGS. 11A, 11B and 11C each illustrate an embodiment incorporating four uniaxial frameworks and a different method of joining the four uniaxial frameworks together into a rectangular frame. FIG. 11B illustrates a method of joining the four uniaxial frameworks by joining each structural member in one framework to another structural member in a like layer of another framework. Instead of joining single structural members one can join a pair of structural members in one framework to a single structural member in another framework as illustrated by interface 755 in FIG. 11A.

Figure 12A:
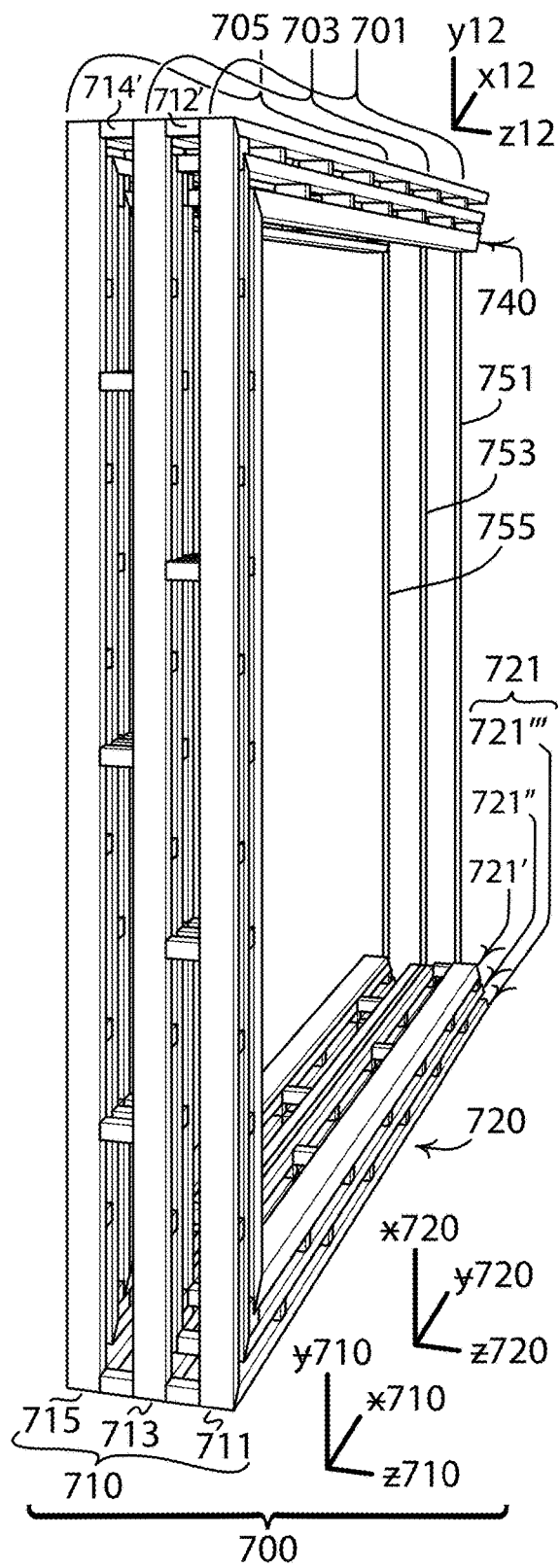
FIG. 12A shows a triple-pane window comprising first, second, and third biaxial frameworks that are shown and fourth biaxial framework that is not shown to better illustrate the structure.

FIG. 12A discloses a triaxial window frame 700 comprising four biaxial frameworks 710, 720, 730, 740 similar to that shown in FIG. 6A. Triaxial window frame 700 structurally insulates in the horizontal x12, and vertical y12 directions in the plane of the frame as indicated by the line segments labeled x12 and y12 in FIG. 12A, respectively, as well as transverse z12 directions, perpendicular to the plane of the frame, shown as z12 in FIG. 12A. In summary the triaxial window frame 700 structurally insulates in any direction perpendicular to any of the component biaxial frameworks. The embodiment shown in FIG. 12A includes first, second, and third sheets 751, 753, 755 of material within the inner perimeter of window frame 700. Each of first sheet 751, second sheet 753 and third sheet 755 may be rigid sheets such as glass, acrylic, plexiglass, polycarbonate, polymer, crystalline solid, sapphire, diamond or a non-rigid sheet of optically transparent material such as window film, insulating window film, acetate, polyester. In embodiments using non-rigid material, the non-rigid material is preferably stretched across one of the sub-frames 701, 703, and 705 and possibly shrunk with application of heat so as to be taut and free of creases. In other embodiments (not shown) each of the sub-frames 701, 703, and 705 holds more than one sheet of material. In some embodiments like the one shown in FIG. 12A sheets 751, 753, 755 and any other sheets comprise an optically transparent material or an optically transparent but light-diffusive material. In variations of the prior embodiments, the sheets have a coating such as a security film, UV protection film, low-emissivity coating on any of the front and/or back surfaces of any additional sheets as well as on the front and/or back surfaces 751', 751", 753', 753", 755', 755" shown in FIG. 12D of sheets 751, 753, and 755, respectively. In a preferred embodiment for maximum durability and strength the sheets 751, 753, 755 and any other additional sheets are made of a rigid material. In a preferred embodiment for durability with reduced weight, the outermost sheets are made of a rigid material, i.e. sheets 751 and 755 in embodiment 700 illustrated in FIG. 12A. The window frame 700 shown in FIG. 12A can function as a picture window or a window sash as non-limiting examples. The window frame 700 comprises four biaxial frameworks, including first framework 710, second framework 720, third framework 730 (not shown and only labeled here in the text for reference), and fourth frameworks 740. First framework 710 and third framework 730 are oriented vertically and joined together by second framework 720 and fourth framework 740 which are oriented horizontally. The first and second panes 751, 753 are positioned next to each other forming a cavity that can be filled with a gas, preferably an insulative gas. The second and third panes 753, 755 are positioned next to each other forming a cavity that can also be filled with a gas, preferably an insulative gas. The vertical third framework 730 has been removed to show the internal part of the window frame 700. Each framework is a 3 by 3 framework formed by joining 3 uniaxial/1D frameworks, each of which comprises an array of 3 chords. For instance framework 710 comprises three uniaxial frameworks, i.e., uniaxial frameworks 711, 713, and 715 which each respectively comprise an array of 3 chords, {711', 711", 711'''}, {713', 713", 713'''}, and {715', 715", 715'''} which are labeled here in the text but not in FIG. 12A to preserve visual clarity of the illustration. To illustrate the composition of a uniaxial framework, FIG. 12A shows the array of chords {721', 721", 721'''} which constitute uniaxial framework 721. Uniaxial frameworks 711, 713, and 715 are connected by internetworking webs 712 and 714, not labeled to avoid clutter but exemplified in the FIG. 12A by internetworking web members 712' and 714', to form biaxial framework 710. Each component biaxial framework 710, 720, 730, 740 structurally insulates along its own normal direction z and its own lateral direction x . In the illustrated embodiment, the ends of the frameworks are cut on a diagonal and joined together with miter joints in the corners. Each chord to chord joint can be a miter joint, spline joint, butt joint, biscuit joint, mortise-tenon joint, half-lap joint, bridle joint, dado rabbet joint, dovetail joint, finger joint, or any other known type of joint. The component frameworks are joined such that chord in like chord layers are joined together. Then energy will flow around the corners instead of running out the end of any chord in any given component framework. In contrast, solid window frames present thermal bridges in all three spatial directions. In this embodiment, the corners have thermal bridges in that the web members in an adjacent layer are not offset. One of the two web members at each corner, like the one labeled 714' in the upper left corner of window frame 700, is a temporary web member that is added to preserve the form of the frame during shipping and then removed during installation to remove the thermal bridge and improve energy efficiency or is a modifiable web member. Any embodiment may incorporate one or more than one such temporary web member and/or one or more than one such modifiable web member. This configuration can be further modified by adding to the front or back side a fourth 1D framework that has 3 chords, and a fourth pane of glass. Frame 699, another embodiment of window frame 700 not shown but labeled here in the text for reference, has no panes of glass and forms a frame for an opening that structurally insulates in all directions x12, y12, z12. Such an opening frame can install in a larger framework such as the wall framework 827 shown in FIG. 13A. Such an opening frame could function as a door frame, portal frame, sash for a window, casement for an operable window, conduit for a penetration, tunnel through a wall, utility chase, two-way flange for mounting insulated shafts on either side, the structural frame of a building, etc. Such an opening frame could comprise three frameworks as shown in FIG. 12A but turned such that the longitudinal direction y 720 of framework 720 aligns with the vertical axis y 710.

Figure 12B:
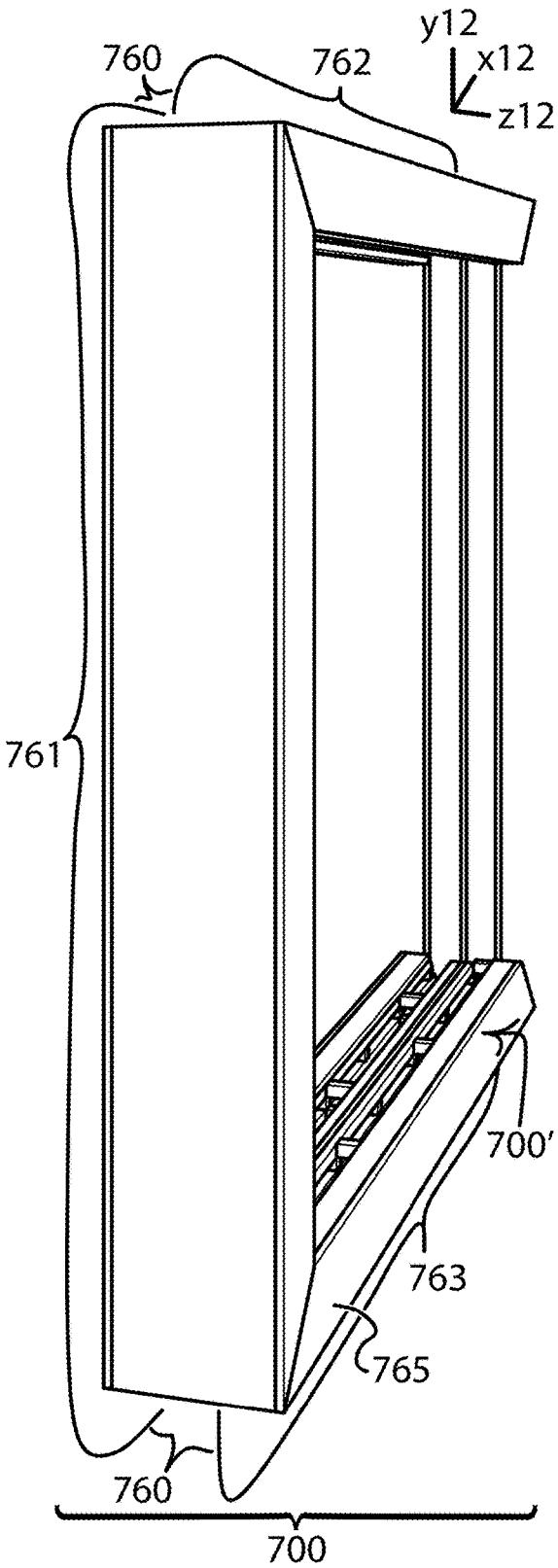
FIG. 12B shows the embodiment of FIG. 12A with sheathing.

FIG. 12B shows the embodiment of FIG. 12A with side molding or sheathing 760 around the outer perimeter of the window frame 700 which can also apply to frame 699. The sheathing 760 is preferably an insulating material. Sheathing 760 can also be a veneer or film for example as a means of sealing the sides against the infiltration or exfiltration of gas from inside the cavities of frame 760. Some variants of frame 699 and 700 have sheathing on the inner perimeter 760'. Other embodiment have no sheathing on (A) the outer perimeter, (B) the inner perimeter, and/or both A and B. In other embodiments the cavities between the structural parts of frame 699 and 700 are filled with material. This material is preferably insulating. When the insulating material is a gas then the cavities between the sheets 751, 753, 755 and any additional sheets can be filled along with the cavities between structural parts of the framework. When the outer perimeter of the framework does not have sheathing or the sheathing does not prevent the infiltration or exfiltration of gas then the fill material can provide a means of sealing against the infiltration/exfiltration of gas through the cavities. Sealant can be applied to seal around the edges of sheets 751, 753, and 755 and any additional sheets. Sheets can interface with a normal face of a structural member near the edge of the sheet as illustrated by interface 759 shown in FIG. 12C. Structural member 735' has a groove at interface 759 which provides a seat on which sheet 755 sits. The groove also provides a bed for sealant when sealant is applied before seating sheet 755. Any structural member with a groove like structural member 735' can have no groove like structural member 733' as shown at interface 757 in FIG. 13C. For this type of interface the sheet and/or sealant rests on the inner lateral face of structural member 733'. A groove can be created for interface 757 without removing material by adding a spacer to the inner lateral face of structural member 733'. Frame 699 and 700 could have muntins. Non-structural or structural, insulative muntins can be incorporated using the same methods described for window frame 700. Frame 359 in FIG. 36C incorporates a structurally insulative muntin in the form of uniaxial framework 360' that runs horizontally. In some embodiments the four framework 710, 720, 730, and 740 form a four way cross. The described method of joinery can also be used to construct elbows, tees, four-way crosses, planar grids, six-way crosses, and spatial grids (not shown). At interface 755 a single structural member in one uniaxial framework joins with a pair of structural members in another uniaxial framework. Any of the front facing uniaxial frameworks and any of the back facing frameworks in frame 700 can be solid as illustrated by the transformation of framework 425 shown in FIG. 6H into solid 425' shown in FIG. 6I. Although the resulting embodiment no longer structurally insulates directly through the solid portions, the interior uniaxial frameworks still structurally insulate the remainder of frame 700.

Biaxial frameworks 710, 720, 730, and 740 may also have molding or sheathing on the outward front normal surfaces. The sheathing could be like that of the side sheathing. The sheathing is visible when installed and could be for decoration. In a preferred embodiment for excellent insulative performance the sheathing is an insulative material. In embodiments, the side molding 760 includes two vertical components 761, 764 (not shown and only labeled here in the text for reference) and two horizontal components 762, 763. In embodiments the front molding 765 is formed around all four sides of the front side 700' of the window frame 700, and the back molding 765' (FIG. 12D) is formed around all four sides of the back side 700" of the window frame 700. FIGS. 12C and 12D show the window frame 700 from the opposite side. FIG. 12D shows an embodiment of frame 700 with sheathing.

Figure 12E:
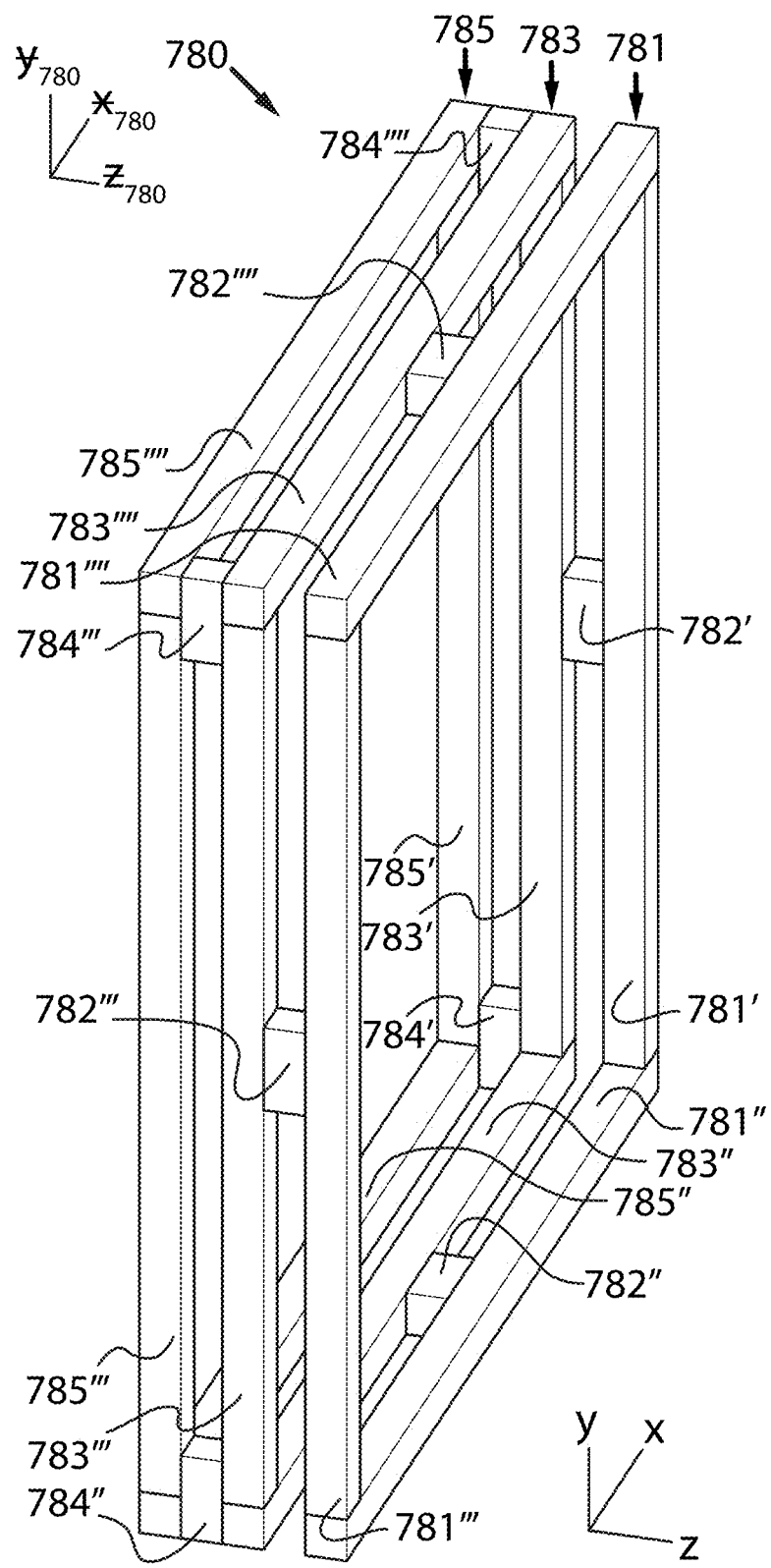
FIG. 12E shows a frame embodiment incorporating four uniaxial frameworks.

FIG. 12E discloses frame 780, a uniaxial variant of triaxial frame 700, that structurally insulates in the normal z direction coinciding with the transverse z direction in the figure. The framework 780 comprises three thin frames 781, 783, and 785 that are stacked in the transverse z direction. The first thin frame 781 is a combination of structural-members 781', 781", 781''', and 781''''. Embodiments of frame 780 can have any of the variations mentioned for opening frame 699. For instance frame 780 can incorporate sheathing. By discretizing any full rotation around an intrinsic angle into N discrete angles, which are not necessarily evenly spaced, one can conceptually create a framework in the shape of an N-sided polygon or any portion of an N-sided polygon, represented as Nf. For example a four-step rotation in orbital pitch angle of structural member 781' produces the elements 781", 781''', and 781'''' and the whole frame 781 as a single part rather than a collection of four parts in FIG. 12E, For example four-step rotation in orbital yaw angle of the structural parts 781', 782', 783', 784', 785' produces a functional equivalent of whole framework 780 as a single part rather than a collection of 20 parts. One can build the same window framework 780 by applying a four-step rotation in orbital yaw angle of the structural members 781', 783', and 785', placing web-members 782', 782", 782''', 782'''' between reference frames 781 and 783 with an even spacing being preferred, and then placing the web-members 784', 784", 784''', 784'''' between reference frames 783 and 785 so that they are offset from web-members 782', 782", 782''', 782'''' with a preference toward orbital yaw angles half way between those of web-members 782', 782", 782''', 782''''. Additional constraints such as structural integrity at the joints and aesthetic design can alter the preferred orbital yaw angle of the web members. Another embodiment of framework 780 has an octagonal shape produced by eight-step rotation of structural parts 781', 782', 783', 784', 785'. This same conceptual process applies to any embodiment not just framework 780. One can start with a biaxial framework like biaxial framework 720. For instance, four-step rotation in orbital yaw angle of biaxial framework 720 produces multi-axial framework 700. The mitered end conditions of the structural members in framework 720 give a different aesthetic than the un-mitered ends of the structural members of framework 780. Given a particular embodiment one can infer how many discrete steps in angle are used for rotation. A number N steps can be applied to rotation of structural members and a different number M steps can be applied to rotation of web members. An offset is applied to web-members in one of two adjacent webs.

Figure 12F:
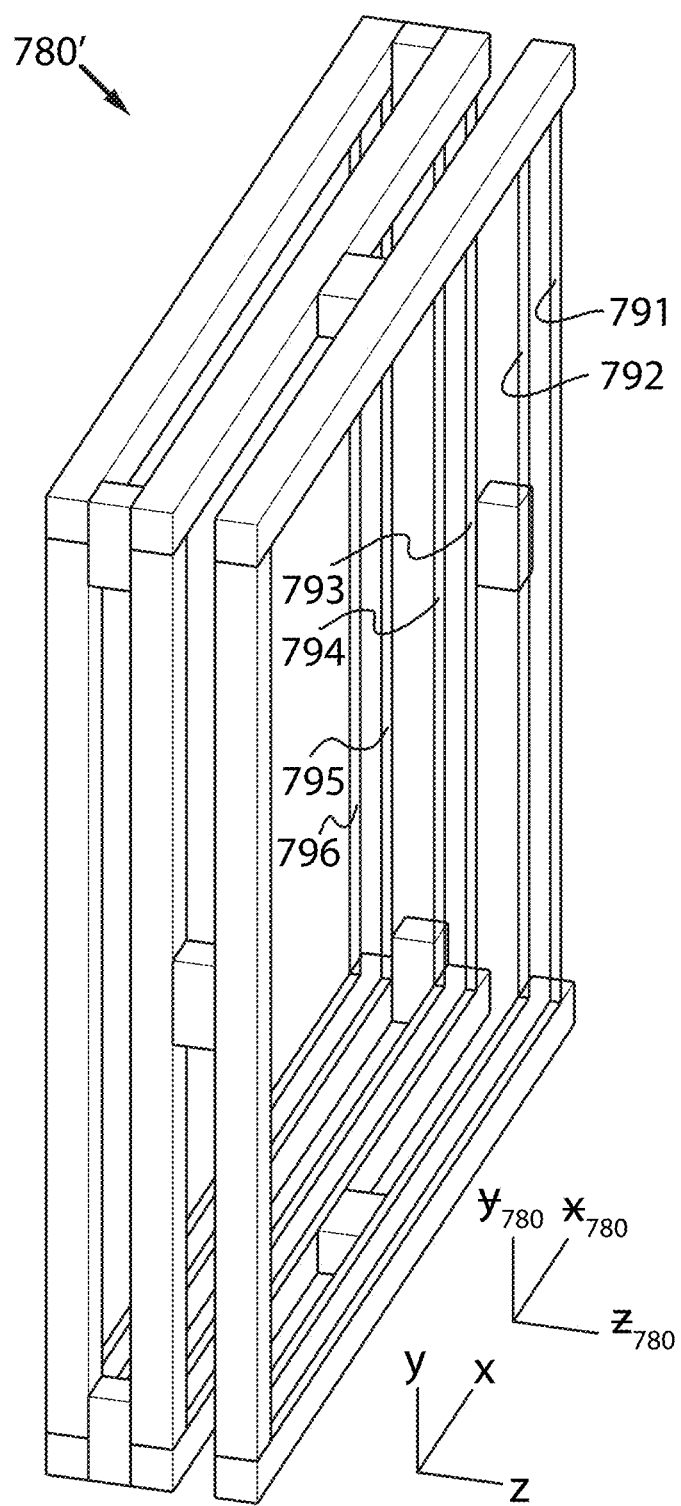
FIG. 12F shows the embodiment of FIG. 12E with one of the four uniaxial frameworks removed and additionally comprising six sheets of material between the uniaxial frameworks.

FIG. 12F discloses window frame 780' with first, second, third, fourth, fifth, and sixth sheets 791, 792, 793, 794, 795, and 796 of material within the inner perimeter of window frame 780. Each sheet noticeably reduces the convective transfer of heat between the outermost sheets which are sheets 791 and 796 for the embodiment shown in FIG. 12F. Any sheet incorporated into window frame 780' or window frame 700 could be a number of thinner sheets pressed together. Other embodiments have fewer than six sheets. For instance window 2963, built for testing, has five sheets in the form of glass panes. Other embodiments have more than six sheets, more than three structural members, and more than two webs of web members. Embodiments of window frame 780' can have any of the variations mentioned for window frame 700. For instance, window frame 780' can also serve as a window sash, a casement for a casement window, and the like. Any variations mentioned here also apply to windows 700 and 840'. In embodiments of windows 700, 780', and 840' the space between each pair of sheets is filled with an insulative gas. In embodiments of windows 700, 780', and 840' preferred for energy efficiency, the space between each pair of sheets is filled with an insulative gas with molecular weight greater than that of air in order to slow the convective flow of heat between the sheets 751, 753, 755, 791, 792, 793, 794, 795, 796, 851, 852, 853, 854. In embodiments of windows 700, 780', and 840' preferred for reducing convection and reducing radiative heat loss and radiative heat gain through the window, the space between each pair of sheets is filled with a greenhouse gas with a molecular weight greater than that of air. The greenhouse gas being for example carbon dioxide, methane, or any other gas that absorbs solar radiation. The greenhouse gas works to absorb incoming radiation and then reradiate the energy into all directions with approximately 50% of the incident radiation being reradiated backward to some extent relative to the incident direction. In the heating season the greenhouse gas works to prevent heat loss from the building in which the window is installed by absorbing and reradiating incident radiation back into the building. In the cooling season the greenhouse gas works to actively reject infrared and visible radiation produced by the sun and surrounding objects. Any other gas with a large molecular weight and/or absorption line in the visible or infrared spectrum could be used instead. Experimental window 2963 shown in FIG. 36G was filled with carbon dioxide gas non-limitingly generated by sublimation of dry ice which was non-limitingly accelerated with heat. Experimental window 2963 used window frame 708'. A greenhouse gas can also serve as a filler for an other embodiment of the present invention. Furthermore, a greenhouse gas could also be used to fill apparatuses that do that do not incorporate an insulatable, insulative framework such as an insulating glass unit, a window, a wall cavity, or other type of air-sealed framework.

Figure 12G:
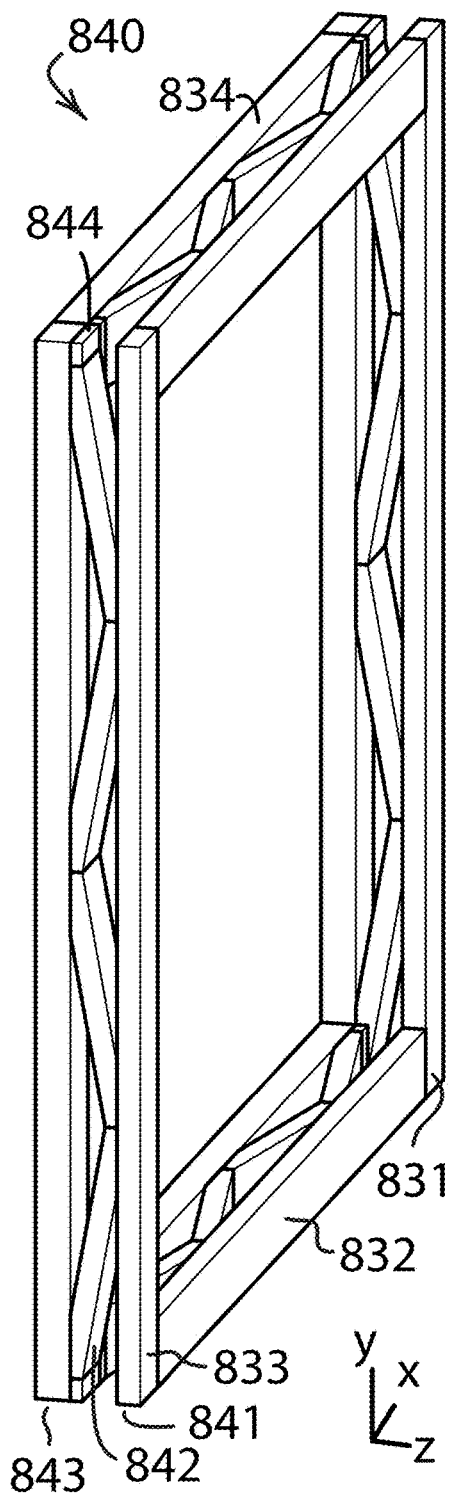
FIG. 12G shows another embodiment of a framework.
Figure 12H:
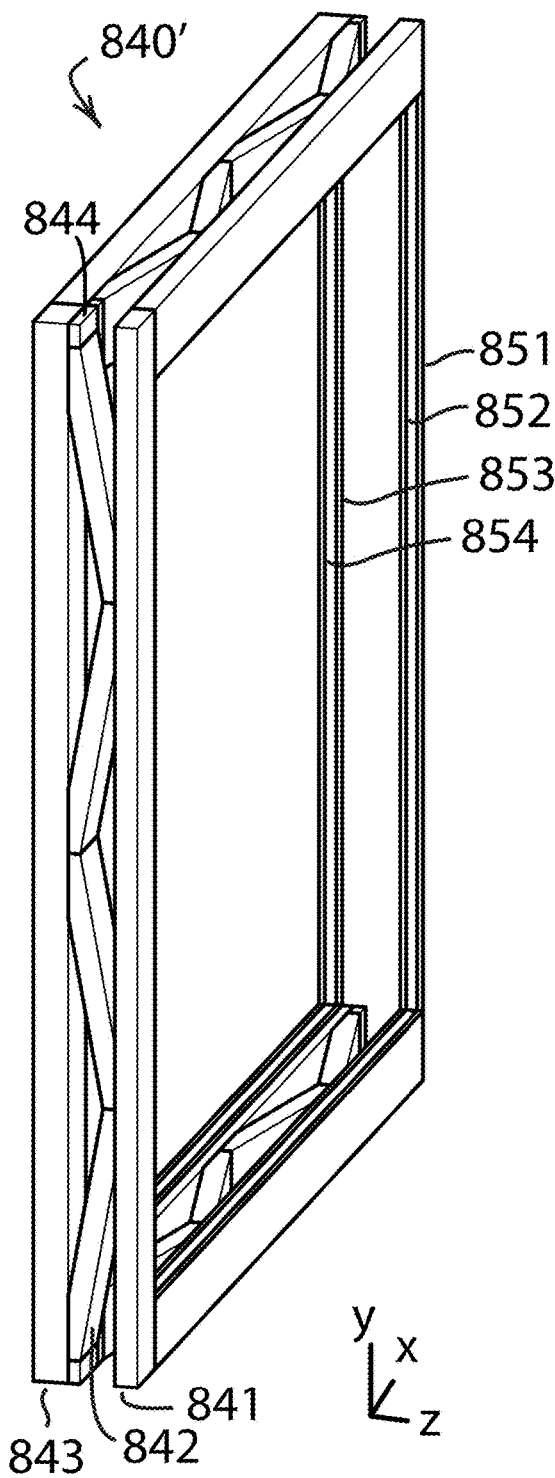
FIG. 12H shows the embodiment of FIG. 12G with one of the four unaxial frameworks removed and additionally comprising four sheets of material between the uniaxial frameworks.

FIGS. 12G and 12H disclose a structurally insulative frame 840 and structurally insulative window 840' each of which incorporates four uniaxial frameworks 831, 832, 833, 834. Each of the uniaxial frameworks 831, 832, 833, 834 incorporates two chords 841 and 843 interconnected by a web of diagonal web members typified by diagonal web member 842. These web members could have any pitch angle between 0° and ±90° relative to one of the chords 841. The web members shown have a pitch angle of 15°, relative to the nearest chord, with an alternating positive and negative sign. In other embodiments (not shown) the web members 842 are dowels with polygonal or circular cross sections. Retainers, typified by retainer 844, provide a brace to retain diagonal web members 842 that terminate at the ends of a framework 831, 832, 833, or 834. In some embodiments structurally insulative frame 840 is spun 900 around its central axis running in the transverse z direction of the figure such that the bottom framework 833 would support frameworks 832 and 834. In that configuration frameworks 832 and 834 can function as studs and frameworks 831 and 833 can function as a top plate and bottom plate or vice versa. In the current configuration frameworks 831 and 833 can function as studs and frameworks 832 and 834 can function as cross braces. FIG. 12H shows a cutaway view with uniaxial framework 831 omitted to more clearly reveal the edges of glass panes 851, 852, 853, and 854 which are incorporated into frame 840 to create structurally insulative window 840'. All of the variations mentioned for windows 700 and 780' apply to window 840'.

Figure 13A:
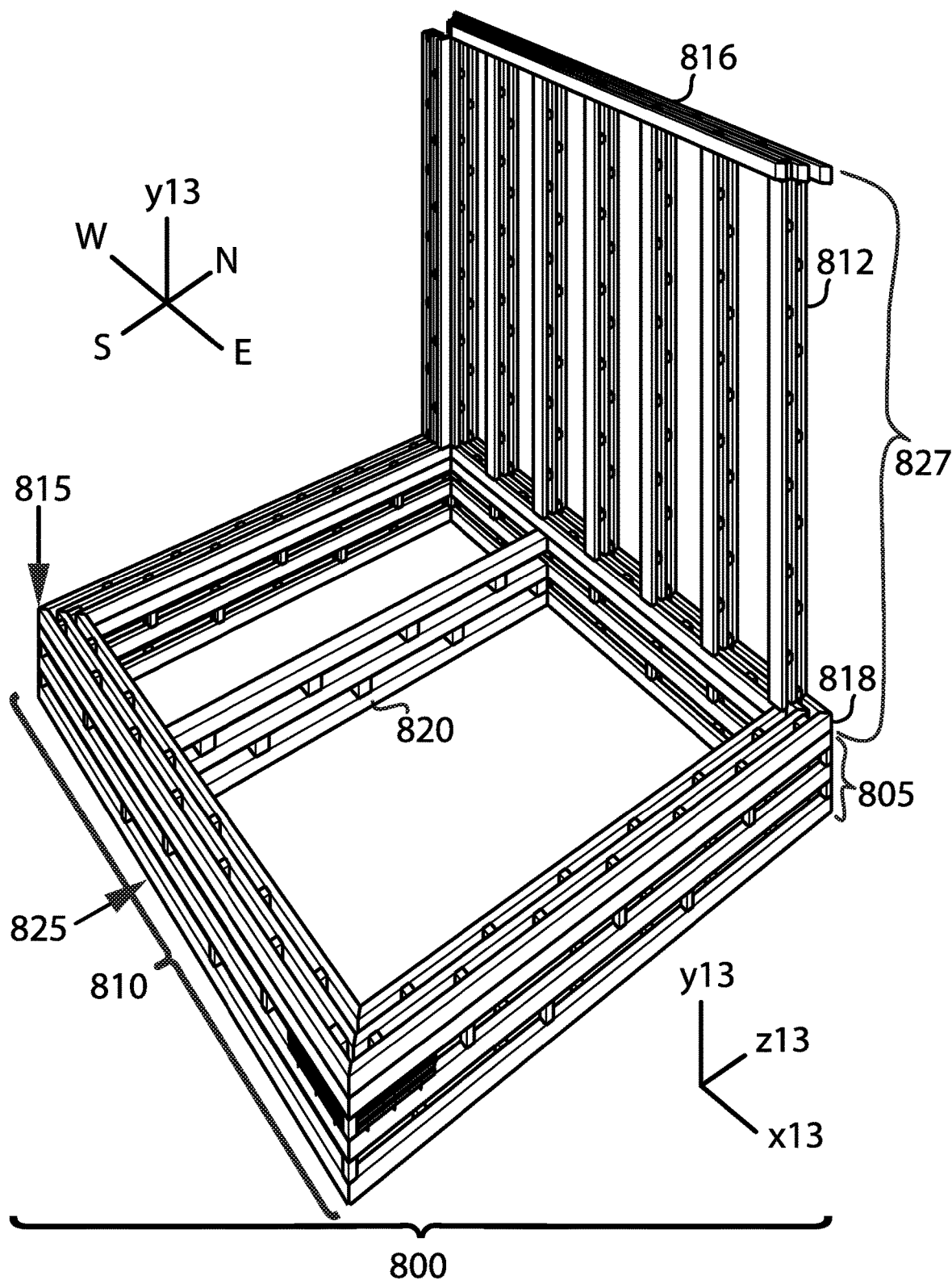
FIG. 13A shows structure 800 and demonstrates how uniaxial frameworks and biaxial frameworks can combine to form a frame that structurally insulates in three directions.

FIG. 13A shows a structure 800 that structurally insulates in three directions. More particularly, this figure show how uniaxial/1D frameworks and biaxial/2D frameworks can combine to form a frame that structurally insulates in three directions in this case (1) upward and downward through the foundation framework in the vertical y13 direction (2) inward and outward through the foundation framework along the north/south axis, transverse z13 axis, and (3) inward and outward through the foundation framework along the west/east axis, horizontal x13 axis. Four frameworks, exemplified by biaxial framework 825 in FIG. 13A, joined together at right angles create a framework that serves as an insulatable, insulation foundation for building walls. FIG. 13A also discloses a means of constructing a wall with uniaxial/1D frameworks that serve as studs, exemplified by uniaxial framework 812, and uniaxial/1D frameworks that serve as top plates, exemplified by uniaxial framework 816, and bottom plates, exemplified by uniaxial framework 818. The embodiment of stud-like uniaxial framework 812, illustrated in FIG. 13A, and constituting each stud, has web members that are (1) the same thickness and width as the structural members and (2) spaced along the longitudinal direction y 812 with the same spacing as the web members of top-plate-like uniaxial framework 816. As an example of all frameworks in which the web members are parallel to the structural members, stud-like uniaxial framework 812 derives strength from the fact that the web members have a short span in the normal direction z 812 so that applied forces have a short lever arm on which to work. Note that any biaxial framework can benefit from the joinery method shown in FIGS. 11A and 11B. Any number of floating tenons, between a web-member and adjacent structural members can strength the framework against shear forces acting along the longitudinal direction. Note that the corners of the foundation framework might appear to have thermal bridges in that the braces in an adjacent layers are not offset. However, unlike the framework in FIGS. 12A-12D, this framework has only one edge that is exposed to the indoor environment. An entire face of the framework is not exposed to the indoor environment as for the window frame in FIGS. 12A-12D. Thus, the web members in an adjacent layer that are not offset do not constitute a thermal bridge. They represent a purely mechanical bridge that strengthens the corner. Biaxial framework 810 has a uniaxial framework 815 with its normal z axis oriented along the vertical y direction analogous to framework 415 and has a uniaxial framework 825 analogous to framework 425 with its normal z axis oriented along the transverse z direction. In an embodiment (not shown) vertical uniaxial framework 815 is a solid board with the same envelope dimensions as framework 815 in order to provide additional strength and function as a rim joist for mounting other structures like a deck. In an embodiment (not shown) horizontal uniaxial framework 825 is a solid board with the same envelope dimensions as framework 815 in order to provide additional strength and function as a sole plate to fasten down to a sill plate, j-bolts, or similar means of connecting framework 810 with any additional portion of the foundation which might include a masonry wall, concrete wall, concrete slab, pier system, solid timber frame, as non-limiting examples. In an embodiment (not shown) both vertical uniaxial framework 815 and horizontal uniaxial framework 825 are solid boards configured as in the prior two embodiments in analogy to FIG. 6I which shows frameworks 415 and 425 as solid boards with the same envelope dimensions as frameworks 415 and 425.

In FIG. 13A, the lower portion 805 of the structure 800 is formed from a total of four biaxial framework segments, like biaxial framework 810, connected to form a rectangle, that resist heat flow in the directions that are not parallel to the length of the chords. Each of the four biaxial framework segments include three uniaxial frameworks and three structural members per uniaxial framework for a total of nine structural members. In the south east corner of lower portion 805 of foundation 800 is the biaxial framework shown in FIG. 13B. Another embodiment includes uniaxial frameworks typified by uniaxial framework 820 running in the horizontal direction between two opposing biaxial frameworks of lower portion 805 which function as structurally insulative joists in embodiments of structure 800. The vertical portion 827 of the structure 800 is formed from seven 1-by-3-chord uniaxial framework segments 812 that resist heat flow in the direction z13, which is perpendicular to the plane of the framework portion 827 and function as studs in embodiments of structure 800. These seven segments 812 are connected across their bottom terminal ends to uniaxial framework 818, which serves as a bottom plate for the wall, and are connected at the top to uniaxial framework 816, which serves as a top plate, across their top terminal ends. In one embodiment of a building method the entire vertical portion 827 is assembled lying down on a horizontal surface and then stood up into position as often done in conventional stick framing. The reduction in weight afforded by the cavity structure of each framework in the vertical portion 827 has the advantage of (a) reducing strain and injury on workers, (b) easing the process of raising the vertical portion 827 into position, and (c) enabling larger wall sections to be constructed when the total weight of vertical portion 827 is comparable to that of a conventional wall frame. In another embodiment (not shown) sheathing, wrap, or other surface defining means is applied to the interior and exterior surfaces of the structure 800 to create fully enclosed cavities which are filled with an insulating material to block convective flow of gas trapped within the enclosed cavities caused by temperature differences across the wall or heat from a fire and block the conductive flow of energy through the enclosed cavities including those of the framework members. The three chords of each uniaxial framework segments 812 enhance structural reliability, for instance, by (1) avoiding sudden failure if any one of the three chords is compromised by fire, chemicals, projectile, shockwave, earthquake, hurricane, or other attack and (2) increasing the time until failure under sustained conditions of attack in the aforementioned scenarios relative to two-chord embodiments. Another advantage is that the binary connections between each web member and each structural member mean that the structure is determinate for a structural engineering analysis. Another embodiment includes a web or horizontal web members that connect adjacent uniaxial framework segments 812 into a lattice similar to the one shown in FIG. 35A. This embodiment may further increase the time until failure during a fire especially when insulated with a fire resistant insulative fill material such as mineral wool or borated cellulose insulation such that fire burns along the most direct metric path.

Figure 13B:
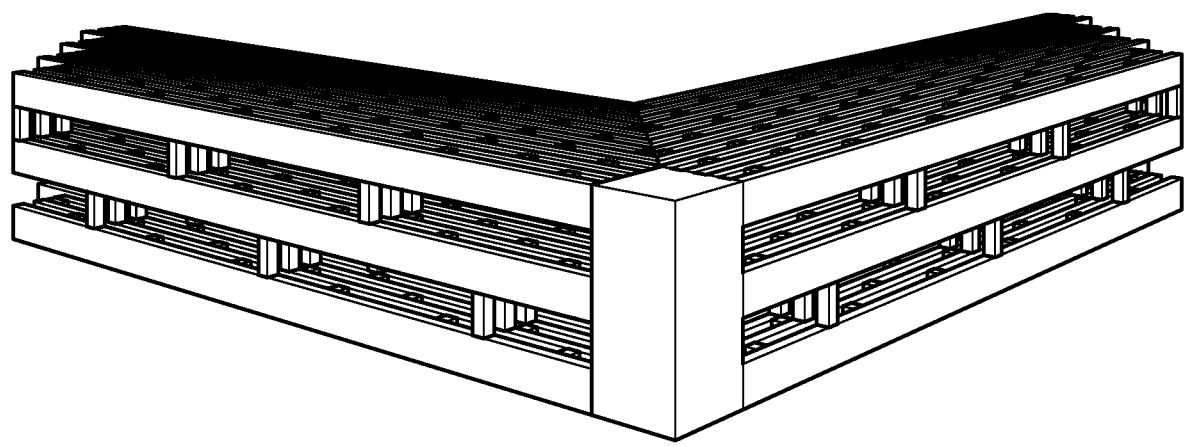
FIG. 13B shows a close-up view of the south east corner of structure 800 shown in FIG. 13A.

FIG. 13B shows a close-up view of the south east corner of structure 800 shown in FIG. 13A. This framework is a smaller biaxial framework which is inserted into the larger biaxial framework 825 to strengthen the corner.

Figure 14:
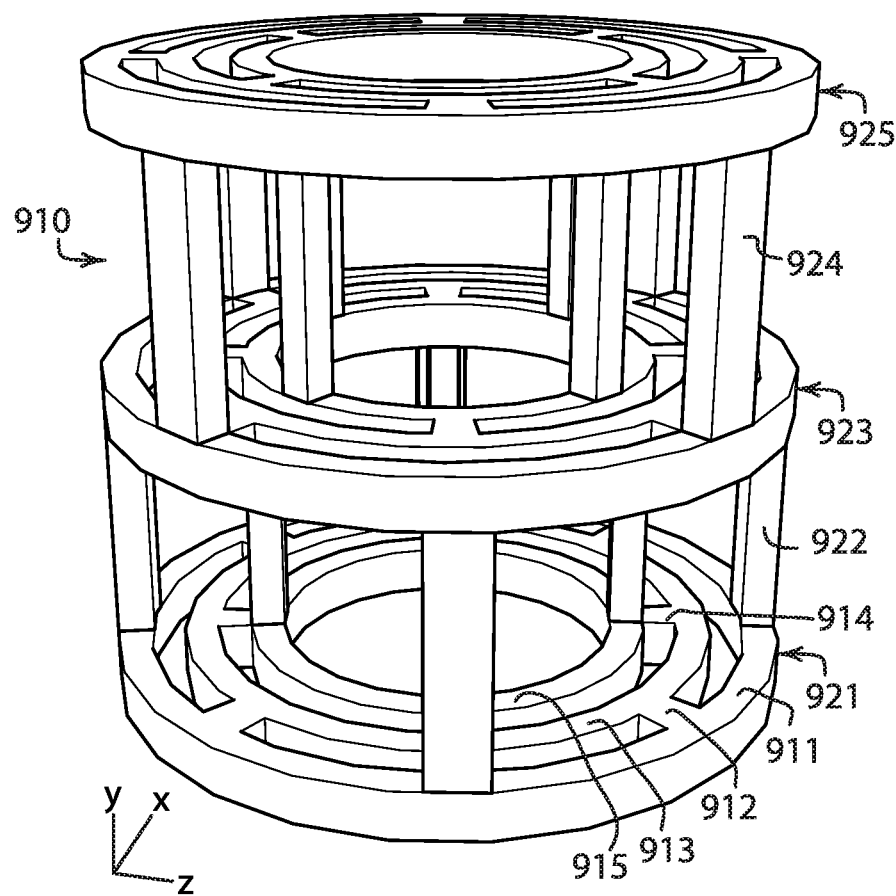
FIG. 14 illustrates one embodiment of a cylindrical tube framework.

FIG. 14 shows a cylindrical tube-shaped triaxial structure 910 that includes first, second and third circular frameworks 921, 923, 925 of concentric, coaxial first, second and third circular chords 911, 913, 915 with each circular framework being vertically spaced from the others along a common vertical axis and being parallel to the others. The circular structural members 911, 913, 915 and web members between them are integrally formed. In other embodiments the web members and circular structural members are separate sets of structural parts joined together. This configuration structurally insulates along (a) the axial direction of the cylindrical framework and (b) the radial direction which encompasses both the horizontal and transverse directions. In summary the triaxial structure 910 structurally insulates along any perpendicular to the chords. This is a variation of FIG. 6A. The configuration can be modified to include (a) fewer concentric chords, or (b) additional concentric chords, and/or (c) fewer vertically spaced circular frameworks, and/or (d) additional vertically spaced chord sets. In the embodiment shown in FIG. 14, the concentric chords have a spacing that is similar to the thickness of the individual chords, however, other embodiments (not shown) have smaller relative spacing and larger spacing relative to the thickness of the individual chords. The spacing between first and second chords can be the same as, or different from, the spacing between third and fourth chords as a non-limiting example. In the embodiment shown in FIG. 14, the distance between vertically spaced chord sets is about 4-5 times the thickness of the individual chords to provide a substantially non-zero span-wise indirectness in the vertical direction and to better illustrate the internal structure of the circular frameworks. However, smaller or larger spacing can be used. Smaller spacing yields greater span-wise indirectness and greater values of structural insulation factors in the vertical direction as well as the radial direction. In the embodiment shown in FIG. 14, the horizontally extending web members 936 are spaced such that there are four horizontally extending web members between adjacent pairs on concentric chords at a given height. The appropriate spacing between web members can be inferred by scaling the dimensional parameters in Table 2 and then using them as arc lengths around the circumference of a circular structural member. The arclength spacing can also be calculated using the equations in Table 2 and working backwards from the targeted structural insulation factor, $F_{target}$, corrected for the effects of non-isotropic resistivity along metric paths in the targeted direction to solve for the spacing which relates to the length along the metric path. For example, referring to the metric path diagrammed in FIG. 2AI for the three-chord framework shown in FIG. 2AH, the spacing $\Delta_y$ approximately equals $L-\{\Delta_z\ \mathbf{1001}+\Delta_z\ \mathbf{1002}+\Delta_z\ \mathbf{1004}+\Delta_z\ \mathbf{1005}\}$ where L equals $F_{target}S$. In this case the spacing the spacing $\Delta_y$ corresponds to an arclength rather than a linear length. To understand this idea wrap uniaxial framework 1000, shown in FIG. 2AH, into a circle. Alternatively imagine cutting one of the circular structural members and straightening it out. Finally, one can rework the equations in table 2 for arclength and do the calculation directly in cylindrical coordinates. Similar ideas hold for calculating the spacing of web members in the vertical directions (axial direction). In the embodiment shown in FIG. 14, the vertically extending web members 938 are spaced such that there are four vertically extending web members between adjacent sets of the outermost chords and four vertically extending web members between adjacent sets of the innermost chords. In other embodiments there also are vertically extending web members positioned between adjacent intermediate chords in analogy to the biaxial framework shown in FIG. 6E. In other embodiments there are vertically extending web members positioned between only adjacent intermediate chords in analogy to the biaxial framework shown in FIG. 6J. The embodiment of framework 910 shown in FIG. 14 corresponds to bending a slightly longer embodiment of the biaxial framework shown in FIG. 6K with additional web members around an orbital pitch axis such that the ends of the biaxial framework wrap around and join with each other end to end. Other embodiments of triaxial frameworks can be created by bending any biaxial framework like those shown in FIGS. 6A-6K in the orbital yaw axis, orbital pitch axis or any other orbital axis that allows the structural members to wrap around and join end to end. Framework 910 in FIG. 14 represents an embodiment of ~20-step rotation in orbital pitch angle of the structural members and 4-step rotation in orbital pitch angle of the web members. An offset of 450 is applied to rotation in orbital pitch angle for the outermost web of each uniaxial framework. This figure practically illustrates continuous rotation of infinitely short structural members but does not exactly illustrate continuous rotational extrusion of a cross section of structural members because the 3D CAD software is not capable of modeling continuous curves, that is, non-discretized curves. Continuous rotation along a first spin axis of a spin-symmetric array of structural-member cross sections creates concentric structural shells. These structural shells can be structurally insulated by discrete-step rotation, around the same spin axis but in orbital angle, of web-member cross sections with web-members in adjacent webs having a different angular offset. Further continuous spin rotation of the structural member array along an orthogonal spin direction creates completely closed concentric structural cells. These structural shells can be structurally insulated by discrete orbital rotation, along the orthogonal spin direction, of web-member cross sections with web-members in adjacent webs having a different offset in orbital angle. All internetworking web members could be solid cylinders but are shown here to (a) reveal the internal structural (b) structurally insulate along the axial direction and (c) create a triaxial framework.

Figure 15:
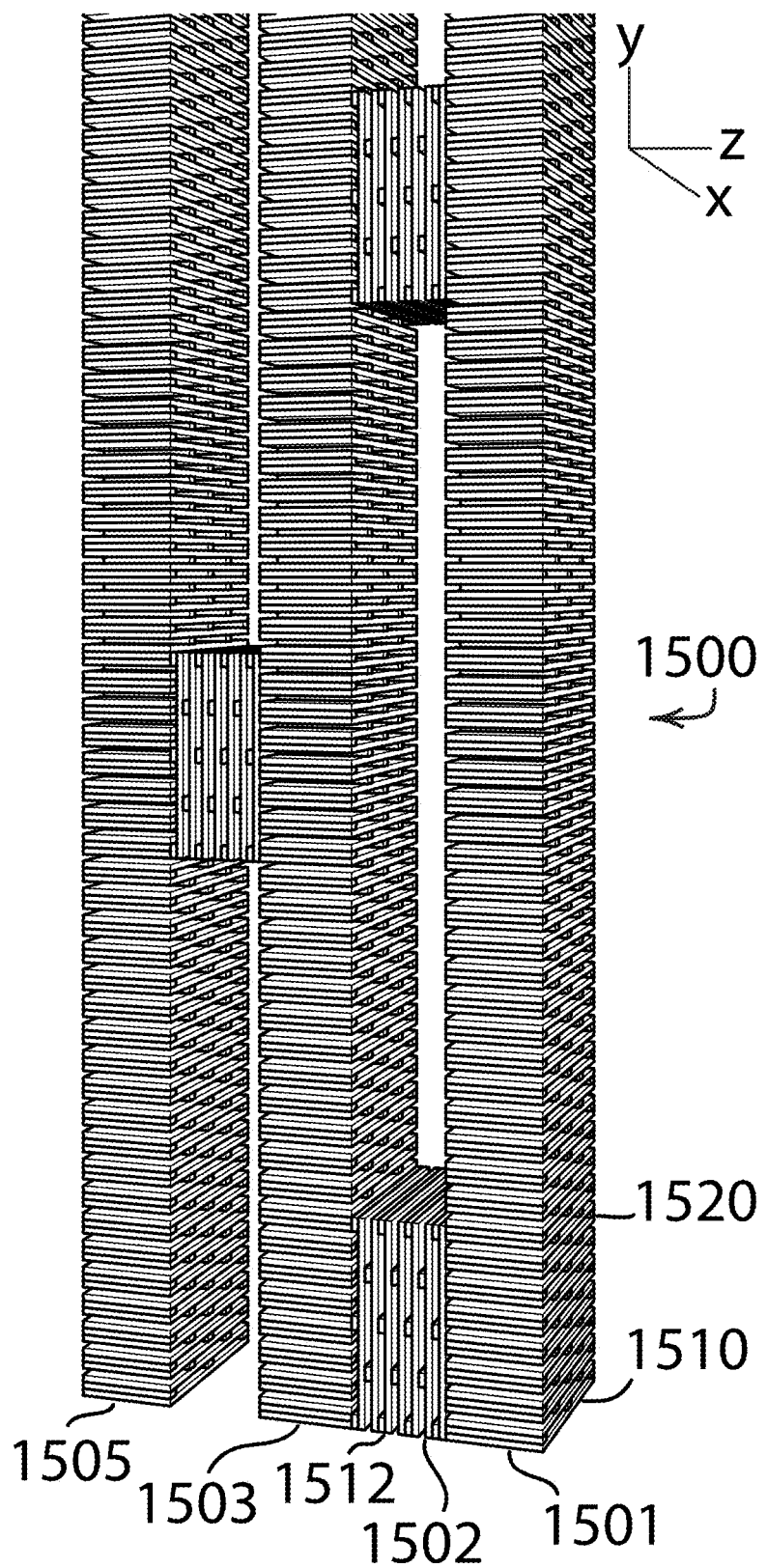
FIG. 15 illustrates one embodiment of a biaxial framework that structurally insulates in the longitudinal direction of the biaxial framework.

FIG. 15 shows an embodiment of a multiscale, biaxial framework 1500. In this embodiment, the chords 1501, 1503 and 1505 are each made from a stack of frameworks 1510, and each web member 1502 is made from a stack of frameworks 1512. More specifically, in the illustrated embodiment, each chord is made from a stack containing about 50-60 frameworks, and each web member is made from a stack containing about 5 frameworks. Larger or smaller number of frameworks can be used in the stacks depending on the desired size and strength of multiscale, biaxial framework 1500. Multiscale, biaxial framework 1500 structurally insulates in the longitudinal direction (the vertical y direction in FIG. 15) and the normal direction (the horizontal x direction in FIG. 15). In the version shown in FIG. 15, the frameworks in the chord stack extend horizontally and the frameworks in the web member stack extend vertically.

Figure 16:
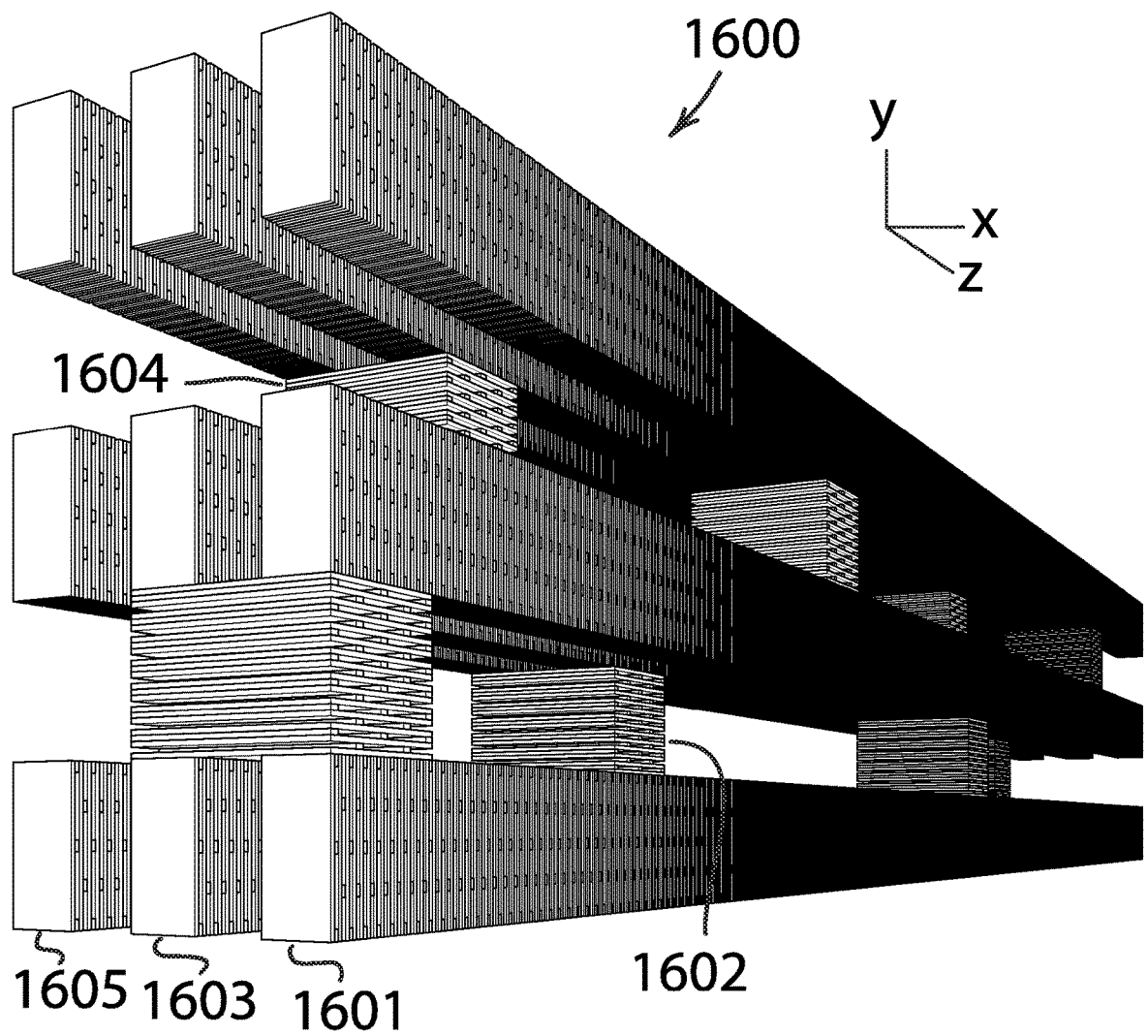
FIG. 16 illustrates one embodiment of a triaxial framework with a front layer of three strut-like structures and a front layer of four brace-like structures.

FIG. 16 shows triaxial framework 1600 made from three aligned frameworks 1601, 1603 and 1605. The web members 1602 are staggered relative to web members 1604. In both sets of web members 1602 and 1604 each web member extends across two out of the three aligned frameworks. Triaxial framework 1600 is a multiscale framework made with web members and chords that are small frameworks in and of themselves. One can create an embodiment with any arbitrary number of scales by making the structural parts at any given scale into small frameworks in and of themselves. Likewise one can create an embodiment with any arbitrary number of scales by making the structural parts into a larger structurally insulative framework. Triaxial framework 1600 structurally insulates in all three directions, i.e. the longitudinal direction along the long axis of the framework (transverse z direction in the figure), normal direction (horizontal x direction in the figure), and lateral direction (vertical y direction in the figure). This framework reduces energy flow in the vertical direction with a similar geometry to that of the framework disclosed in FIG. 6F. The front layer of three strut-like structures and front layer of four web members 1602 constitutes a single layer biaxial framework that suppresses energy flow along the transverse z direction in the picture and the vertical y direction in FIG. 16. In another embodiment shown in FIG. 26 of U.S. Provisional Patent Application No. 62/720,808 the general cross sectional shape of the chords is square rather than rectangular.

Figure 17A:
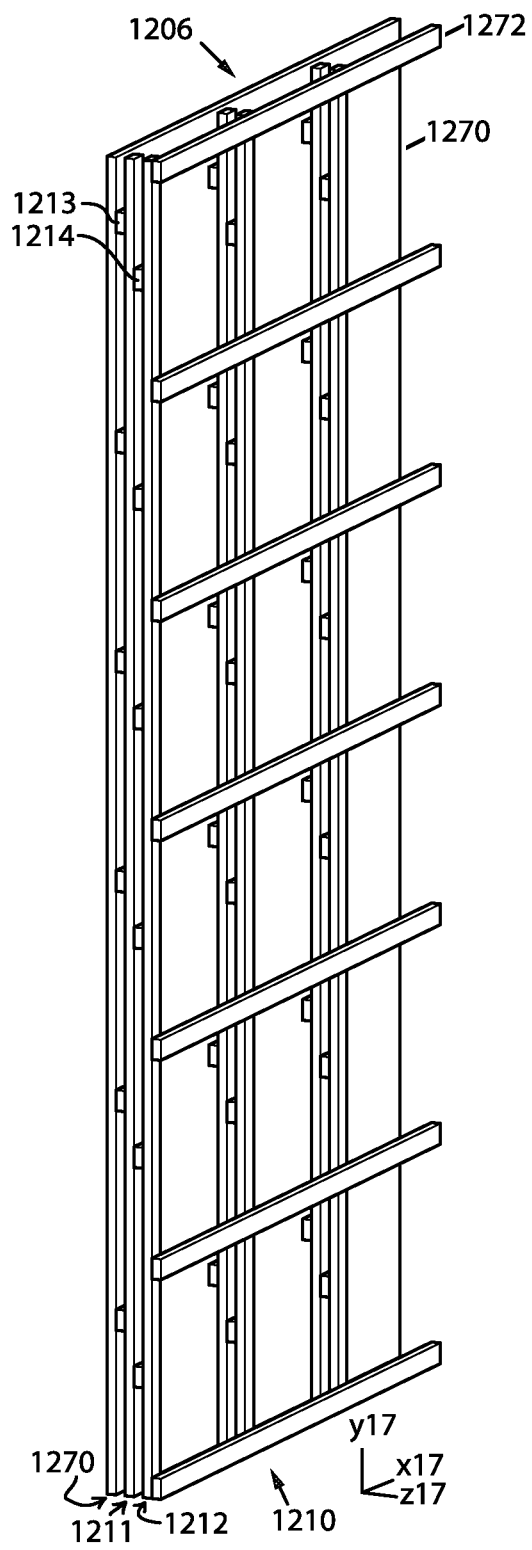
FIG. 17A illustrates one embodiment of an insulatable, insulative framework in the form of a building panel.
Figure 17B:
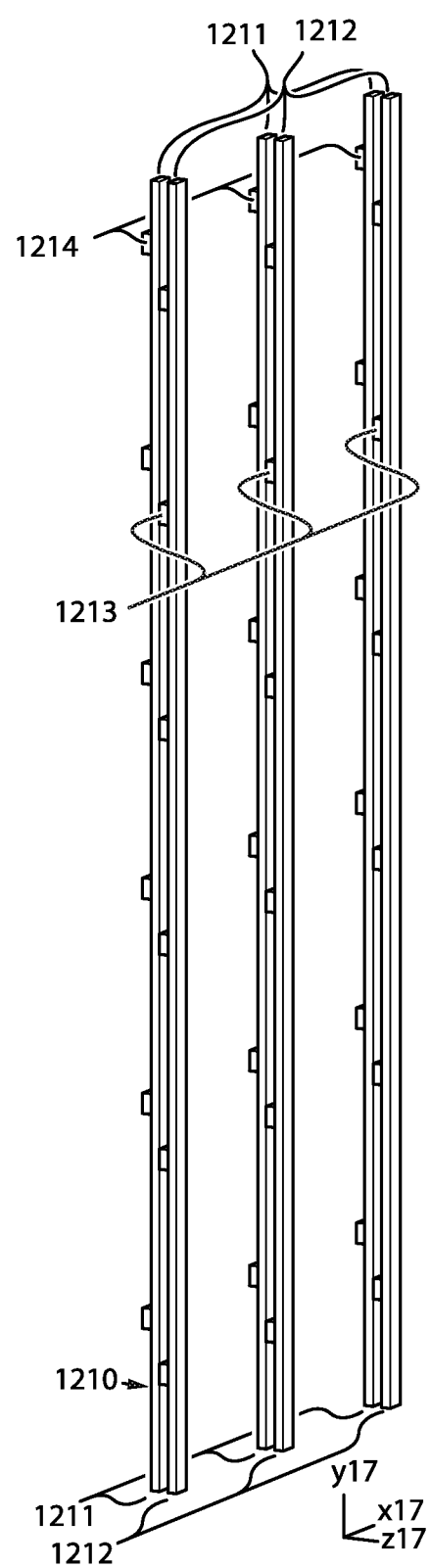
FIG. 17B shows the structural members and web members of the three uniaxial frameworks of the building panel of FIG. 17A without the other parts.

FIG. 17A illustrates an embodiment of a laterally extended framework of structural formations as a building panel 1206 with three vertical stud-like uniaxial frameworks 1210 that each have two structural members, in this case chords, and two layers of web-members. Framework panel 1206 also includes a rigid, planar solid board 1270, and horizontal strapping 1272. Insulatable framework panel 1206 structurally insulates along the transverse z17 direction perpendicular to the plane of the board 1270. Framework panel 1206 contains three structural formations 1270, 1211, and 1212. Structural formation 1270 is the board 1270. Structural formations 1211, 1212 each incorporate three chords that are not directly connected and are spaced apart in the horizontal x direction as shown in FIG. 17B. The branches of the lead line labeled 1211 correspond to individual chords in the structural formation 1211. The branches of the lead line labeled 1212 correspond to individual chords in the structural formation 1212. Each pair of structural formations is interconnected by one of the web formations 1214, 1213. Each of web formations 1213, 1214 contains 3 webs. Each of the 3 webs in each of the web formations 1213, 1214 contains six web members. Each of the three branches of the line labeled 1213 in FIG. 17B points to the first web member in each of the three webs that constitute web formation 1213. Each of the three branches of the line labeled 1214 in FIG. 17B points to the first web member in each of the three webs that constitute web formation 1214. In other embodiments (not shown) each chord is an array of structural members such as a group of veneer strips laminated together or laminations. In other embodiments (not shown) each structural formation is an array of structural formations such as a multiplicity of framework panels connected together either using the present methods or not using the present methods. As a non-limiting example, using the present methods to connect such an array of framework panels can provide protection against the lateral spread of fire between structurally connected framework panels that form an insulatable, insulative wall framework apparatus.

Figure 18:
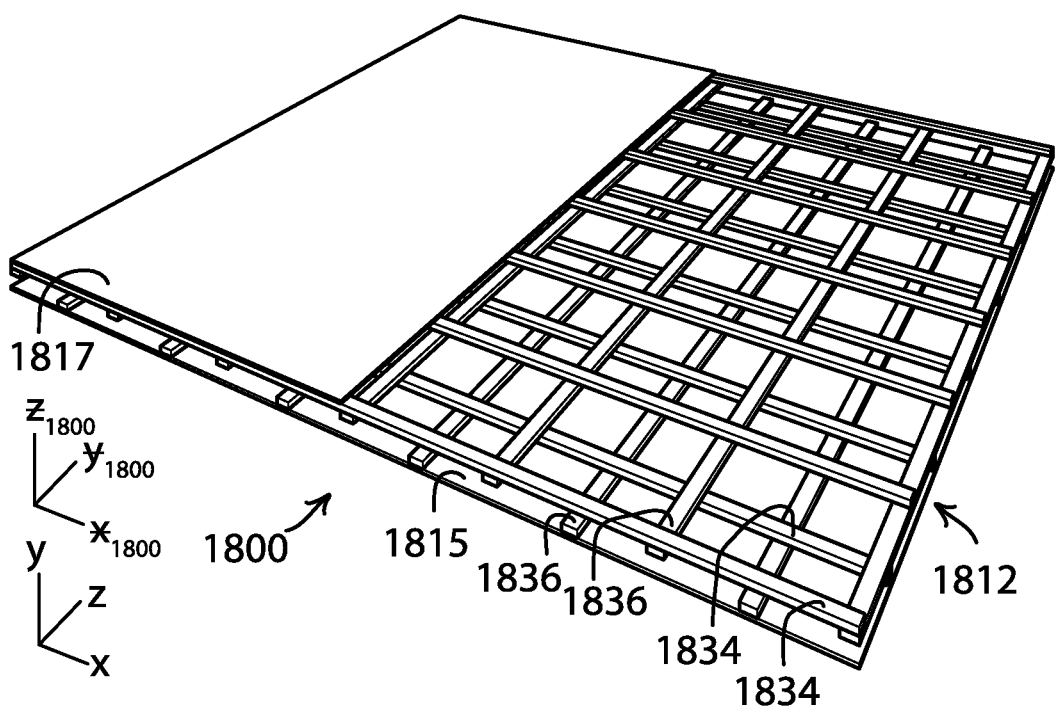
FIG. 18 illustrates one embodiment of an insulatable, insulative framework as a building panel containing a lattice structure between two coverings.

FIG. 18 illustrates an embodiment of an insulatable, insulative building panel 1800 comprising a lattice framework 1812 between two sheets 1815, 1817 which serve as sheathing to contain insulating material as well as block convective and radiative transfer in the normal z direction (vertical y direction in the figure). Different embodiments of sheets 1815, 1817 are rigid while others are flexible. Different embodiments of the two sheets 1815, 1817 are structural while others are non-structural. Different embodiments of the two sheets 1815, 1817 are transparent while others are semi-opaque or opaque. Two layers of structural members 1836 run in the transverse z direction in the figure. Structural members 1836 in different layers are offset in the horizontal x direction of the figure. Web members 1834 in different layers are offset in the transverse z direction of the figure. Two layers of web members 1834 run in the horizontal x direction in the figure and join with the structural members to create the lattice framework 1812. Framework 1812 structurally insulates along its own normal $z_{1800}$ axis parallel to the vertical y direction. To conductively flow from the bottom sheet 1815 into a structural member 1836 and then to the top sheet 1817 along the vertical y direction, energy must additionally flow in the transverse z direction, then in the horizontal x direction, and then again in the transverse z direction along the way. To conductively flow from the bottom sheet 1815 into a web member 1834 and then to the top sheet 1817 along the vertical y direction, energy must additionally flow in the horizontal x direction, then in the transverse z direction, and then again in the horizontal x direction along the way. The top layer of sheathing 1817 is partially cut away in order to better show the underlying structure. One layer of sheathing or both layers of sheathing could be omitted.

Figure 19:
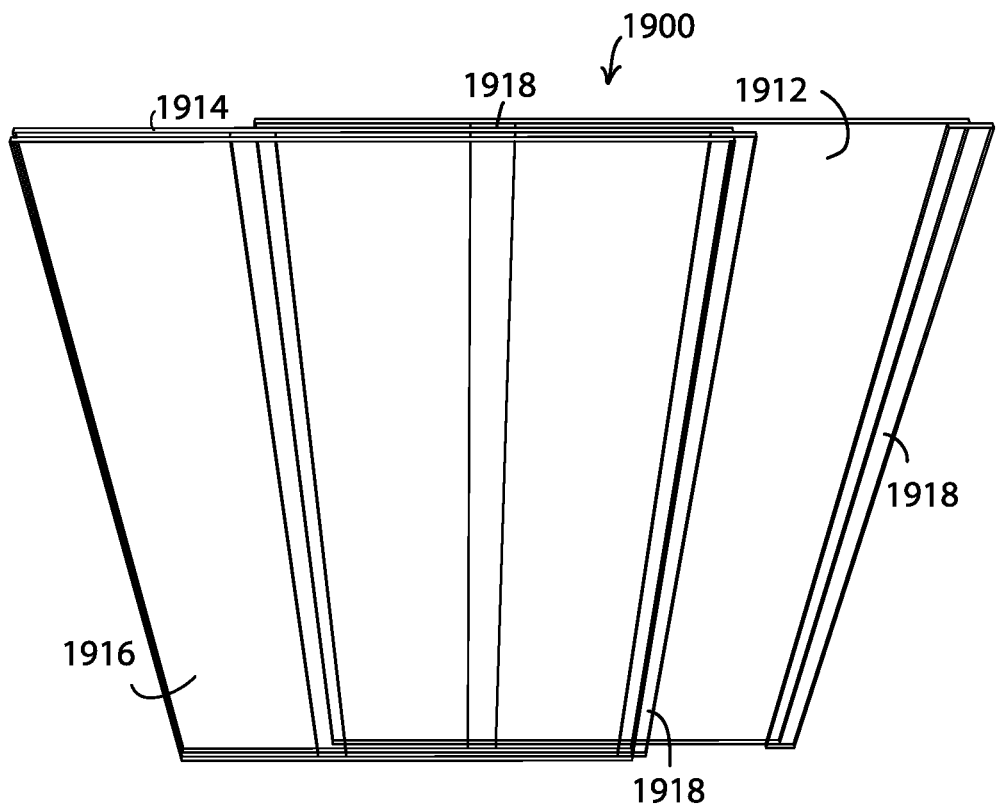
FIG. 19 illustrates one embodiment of an insulatable, insulative framework as a triple-pane window with a scarf joint.

FIG. 19 illustrates one embodiment of the framework as an insulative panel 1900 comprising three or more sheets 1912, 1914, and 1916 of material with two or more layers of spacer ribs 1918 staggered relative to those of the adjacent layer. In some embodiments of panel 1900 the sheets are made of transparent material and together function as a triple-pane window 1900 with a scarf joint. The illustration shows one sheet of material offset from the other. This design allows multiple panels to scarf-join together and maintain their full insulative capability. The illustration shows a transparent material that allows one to better see the structure.

Figure 20A:
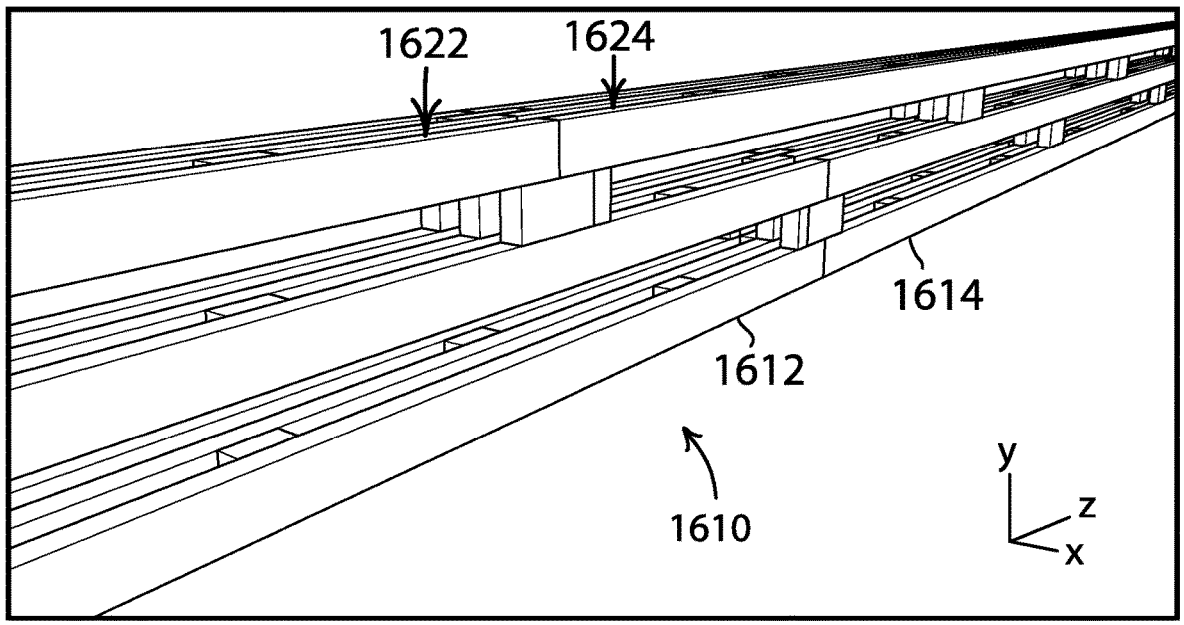
FIG. 20A illustrates an embodiment of the framework demonstrating how to make and use a scarf joint to connect biaxial frameworks together.
Figure 20B:
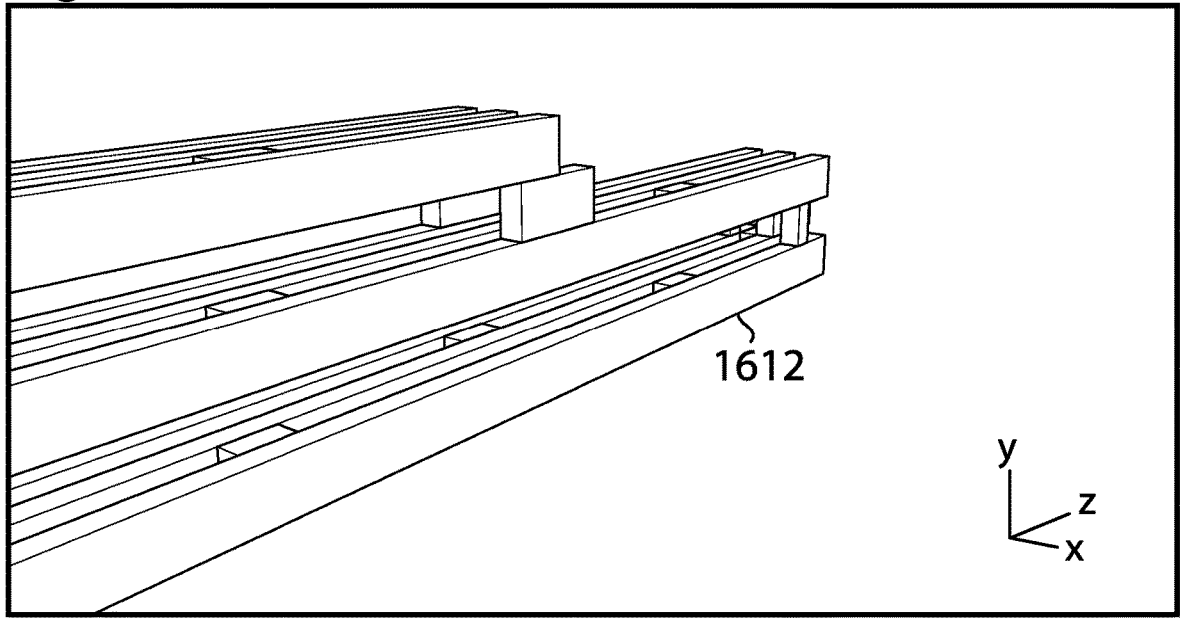
FIGS. 20B-20C schematically illustrate various embodiments of the type of framework depicted in FIG. 20A, that is a framework created by connecting other frameworks together with a method of joinery.
Figure 20C:
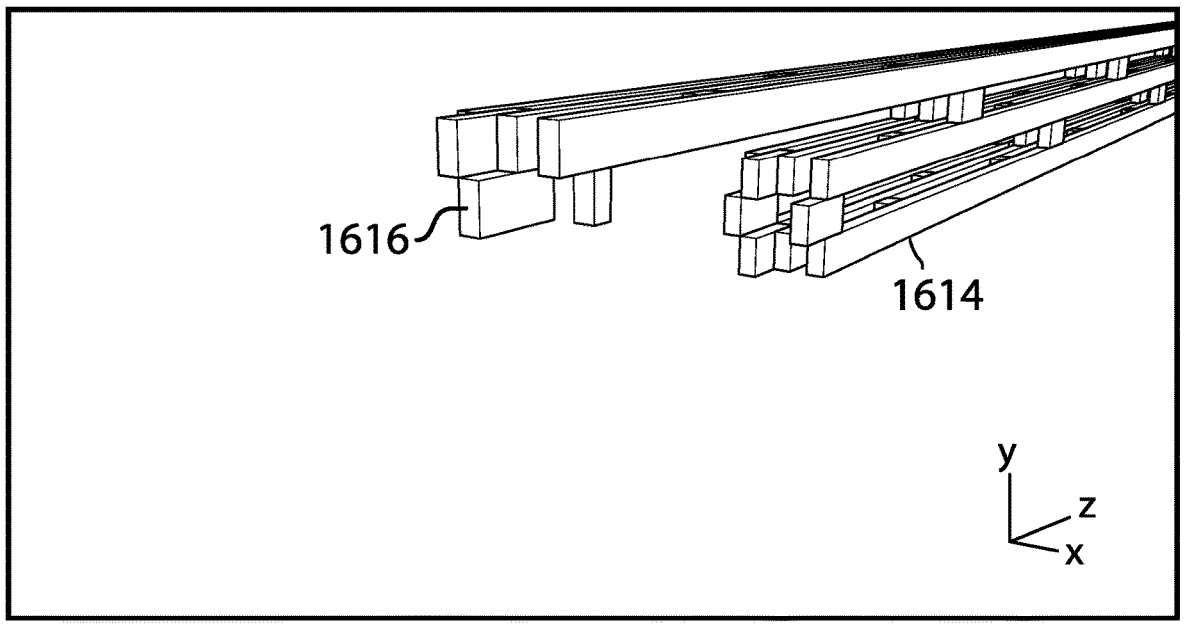
Figure 34:
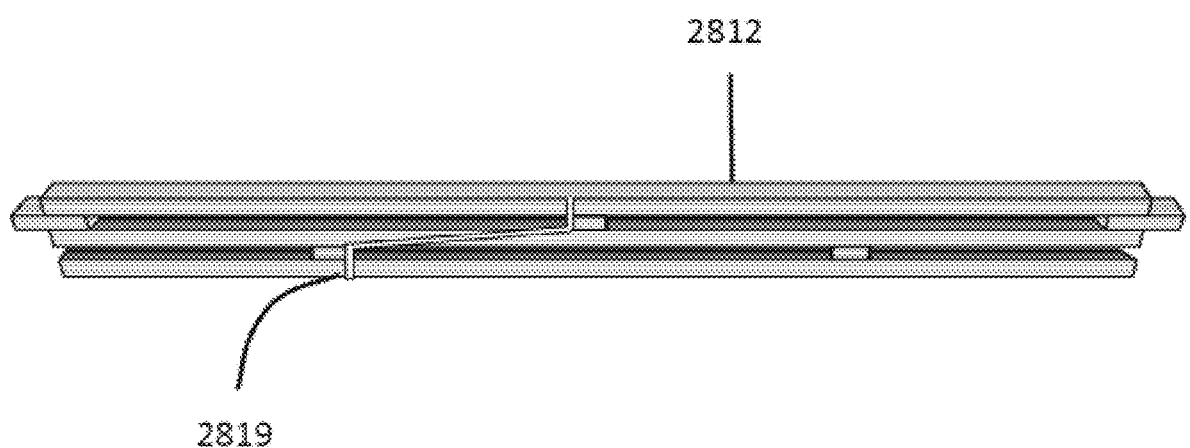
FIG. 34 depicts one embodiment of the three-chord framework and potential energy path. The terminal blocks at either end of the framework protrude in the longitudinal direction.

FIG. 20A illustrates on embodiment of the framework demonstrating how to make and use a scarf joint to longitudinally connect together biaxial frameworks 1612, shown separately in FIG. 20B, and 1614, shown separately in FIG. 20C. In the embodiment shown, each framework has nominal exterior dimensions of 4 inch by 8 inch (100 mm by 200 mm) along the non-longitudinal axes. This figure also illustrates the required configuration for the ends of the chords. In some cases, these frameworks are made of wood. A worker can glue these frameworks together in the field. The protruding blocks, typified by block 1616 in FIG. 20C, lock the two frameworks together along their normal and lateral axes. Holes drilled through overlapping pieces of the frameworks filled with pins made from wood dowels or any other material can further secure the two frameworks together along their longitudinal axes. Nails or screws driven through overlapping pieces of the frameworks could serve the same the purpose. This same method also works for uniaxial frameworks. FIG. 20A also illustrates this concept. For instance the foreground set of chords and web-members 1622, 1624 for halves 1612 and 1614, respectively, constitute uniaxial frameworks and shows how they can be scarf joined. FIGS. 32 and 34 in U.S. Provisional Patent Application No. 62/720,808 show other embodiments of scarf joined biaxial frameworks.

Figure 21:
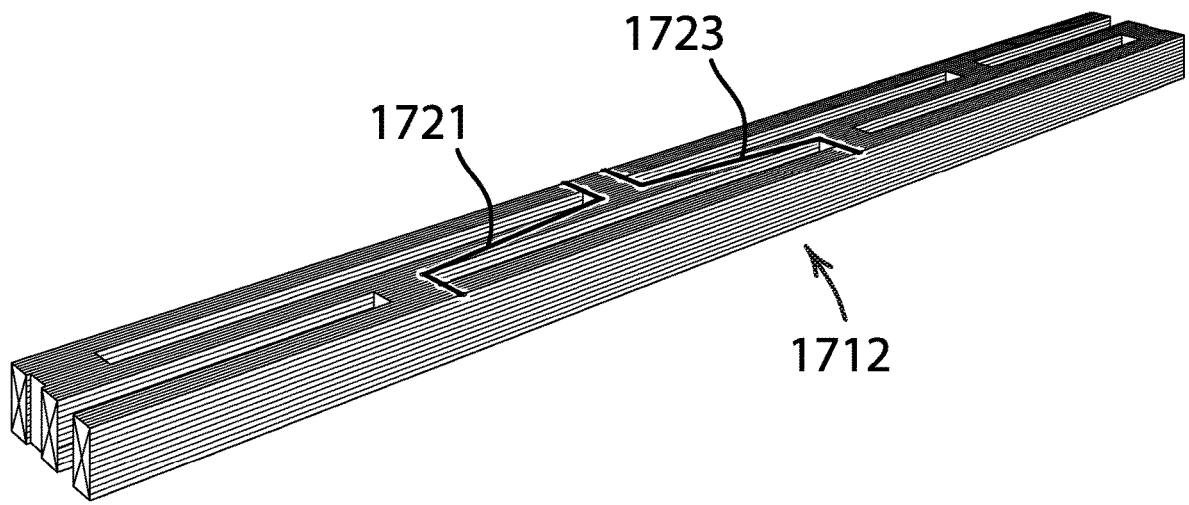
FIG. 21 illustrates one embodiment of the framework 1712 that reduces the flow of energy along its normal axis.

FIG. 21 shows an elevation view of a uniaxial framework 1712 that structurally insulates along its normal axis (into and out of the page along a diagonal sloping downward from left to right on the page) and most-direct metric through-paths 1721 and 1723 from two different bundles of metric paths with a span in the normal direction.

Figure 22A:
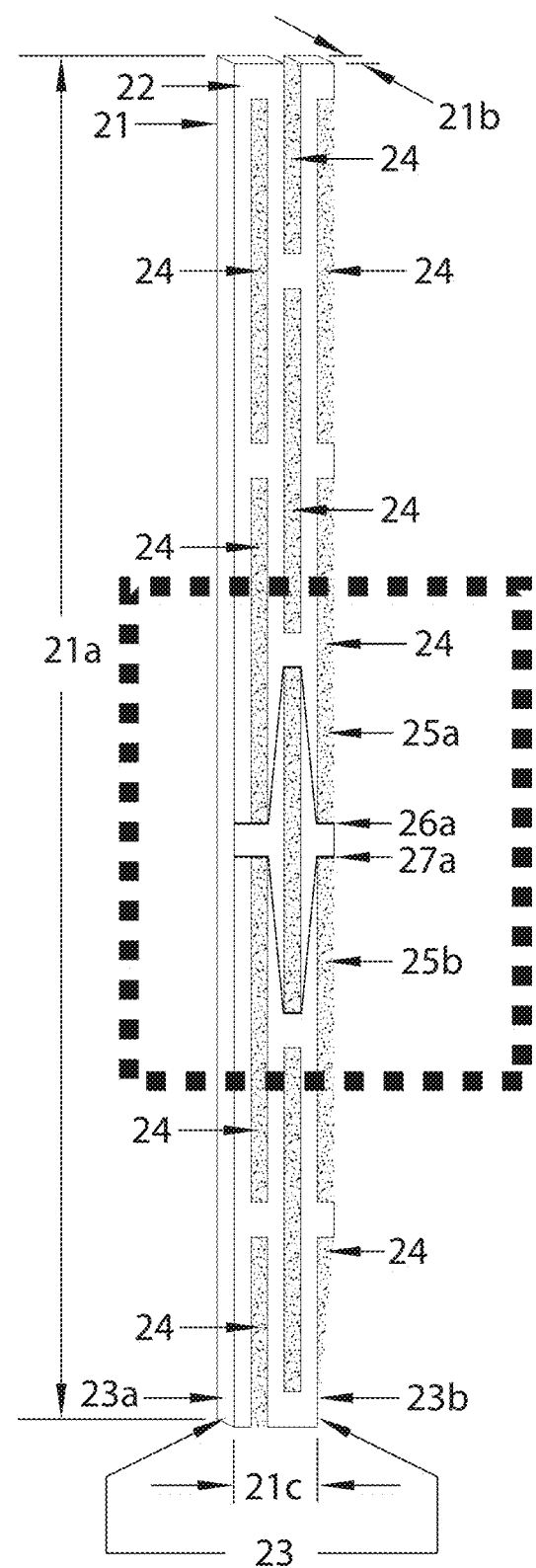
FIG. 22A illustrates one embodiment of the uniaxial/1D framework 1 filled with insulating substance.

FIG. 22A illustrates one embodiment of a vertically extending uniaxial framework 21 having intr-framework cavities 24 filled with insulating material and integrally formed chord-like, web-like, and web-member-like features which create an integrally formed body 22 similar in shape to framework 1712. The framework has protrusions which provide space, typified by cavities 25a and 25b, for insulation between the nearest chord-like feature and the interior facing surface of any cooperative object attached to the protrusions. One example protrusion contains the points labeled 26a and 27a in FIG. 2A. The points 26a and 27a are the start points for two most-direct metric through-paths from two different bundles of metric paths with a span in the normal direction. The protrusions also significantly increase the length of the two most-direct metric through-paths shown relative to what they would be in the absence of protrusions.

Figure 22B:
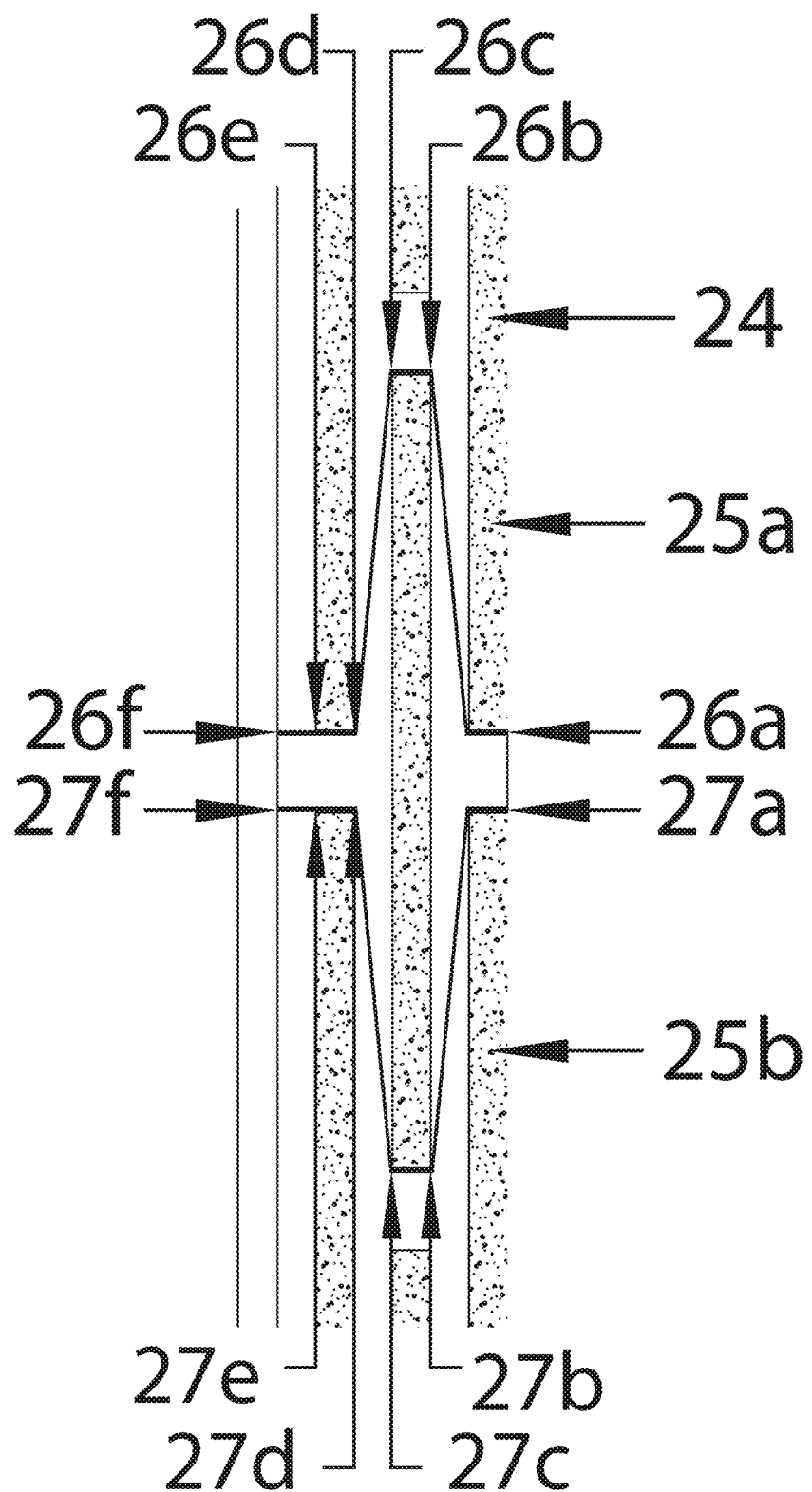
FIG. 22B magnifies the dotted-line region of FIG. 22A.

FIG. 22B magnifies the dotted-line region of FIG. 22A and shows intermediate points 26b, 26c, 26d, 26e as well as end point 26f for the path beginning at start point 26a. FIG. 22B also shows intermediate points 27b, 27c, 27d, 27e as well as end point 27f for the path beginning at start point 27a. The path length of each path is calculated as the cumulative length of all path segments between the start point, intermediate points, and end point.

Figure 23A:
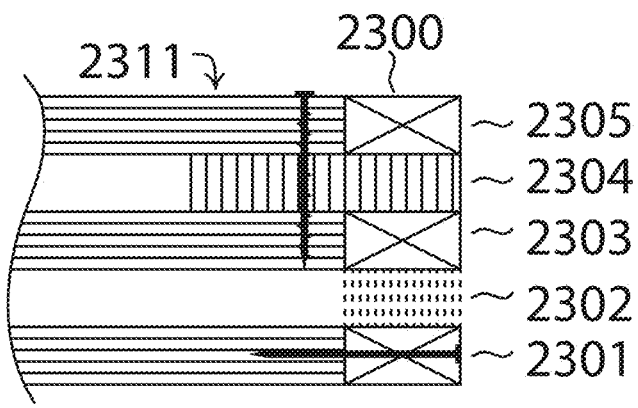
FIGS. 23A and 23B illustrate two types of connections between a structurally insulative stud and a structurally insulative top plate.
Figure 23B:
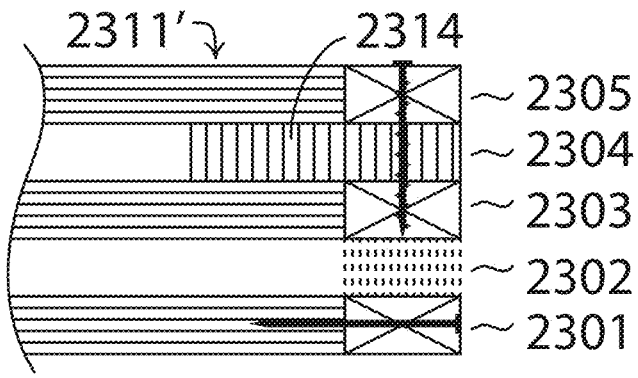

FIGS. 23A and 23B show two different configurations of a stud and plate joined together with a screw and a nail. In FIG. 23A the web member 2304 of plate-like framework 2300 extends into the cavity created by a pair of structural members in stud-like framework 2311 lying down as it would be when framing a wall for instance. FIG. 23A shows a screw driven through the pair of structural members and web member 2304. However, a dowel, nail, or any other appropriate fastener could be used instead of the screw. This type of connection is preferred for strength over the other connection show in FIG. 23A in which a nail is driven through chord 2301 of the plate-like framework 2300 into the adjacent chord of stud-like framework 2311. Web member 2302 is shown with a dotted line to indicate that it is not in the same plane as web member 2304. This convention is used in other figures as well. Thus, the web members 2302 and 2304 are offset and provide no direct path for conductive energy flow between chords 2305 and 2301 through chord 2303 of framework 2300. Furthermore, the greater the offset between web members 2302 and 2304 the more indirect the most-direct metric path through them becomes making the structural insulation factor larger. In FIG. 23B web member 2314 of framework 2311 extends into a cavity created by chords 2305 and 2303 of framework 2300. Then frameworks 2300 and 2311 are secured together with a screw driven through chords 2305 and 2303 and web member 2314.

Figure 24A:
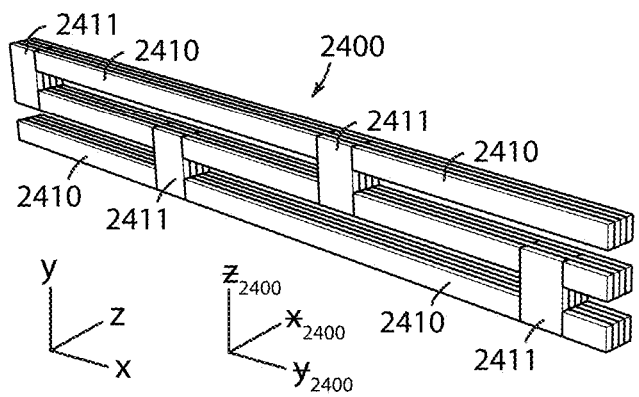
FIGS. 24A and 24B illustrate a framework comprising laminations.
Figure 24B:
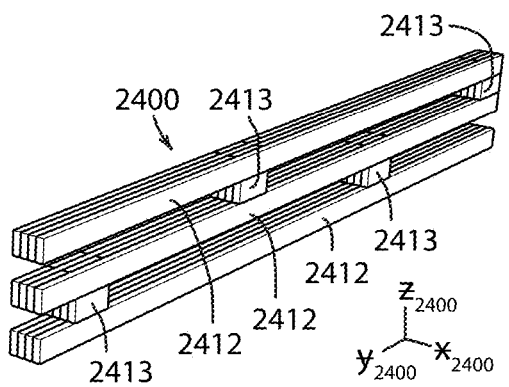

FIGS. 24A and 24B illustrate a uniaxial framework 2400 comprising laminations 2410, 2411, 2412, and 2413. Framework 2400 is rotated in FIG. 24B relative to that in FIG. 24A to show the opposite side as indicated by the axis label ⅄ 2400. Laminations 2410 and 2412 build to form chords. Laminations 2412 run the entire length of framework 2400. Additional laminations like laminations 2412 could be added to make an I-beam cross section and strengthen the overall framework. Laminations 2410 run between web-member-like laminations 2411. Web-member-like laminations 2413 run between chord-like laminations 2412. In order to manufacture framework 2400, one could assemble the laminations into a form with the orientation of the framework in FIG. 21. Then the laminations could be pressed together. Heat could be applied conductively through the form and faces of the press. Heat could also be applied via radiative heating with microwaves or other suitable form of radiation. Other embodiments use laminations characteristic of oriented strand lumber, cross laminated timber, parallel strand lumber, laminated strand lumber, or another wood product as non-limiting examples. The laminations 2410, 2411, 2412, and 2413 shown in FIG. 24 are characteristic of laminated veneer lumber. The laminations could be prepressed with or without heat before being fully pressed together into final form. Frameworks can also be glued together in the configuration shown in FIG. 6 of U.S. Provisional Patent Application No. 62/720,808. Frameworks can be manufactured by creating a wide framework as shown in FIG. 6 of U.S. Provisional Patent Application No. 62/720,808 and then cutting the wide framework into more narrow frameworks. FIG. 6 of U.S. Provisional Patent Application No. 62/720,808 also shows that laminations can be stacked in the normal direction $z_{2400}$ as well as the lateral direction $x_{2400}$. When the laminations have a distinctive grain, FIG. 7 of U.S. Provisional Patent Application No. 62/720,808 shows that the grain can run along the lateral direction $x_{2400}$ in addition to the longitudinal direction $y_{2400}$, that is the conventional direction.

FIGS. 25A-25D schematically illustrate different embodiments and views of a structurally insulative joist framework 2512 with and without straight-through, web-member braces. This set of figures shows a structure that is trimmable, insulatable, and insulative with a portion that has two structural members and diagonal web members. A preferred embodiment, shown in 25D, for framing a barrier insulated along its entire length has no straight-thru braces.

Figure 25A:
FIGS. 25A-25C schematically illustrate different embodiments of a joist-like framework in cross sectional views.
Figure 25B:
Figure 25C:
Figure 25D:
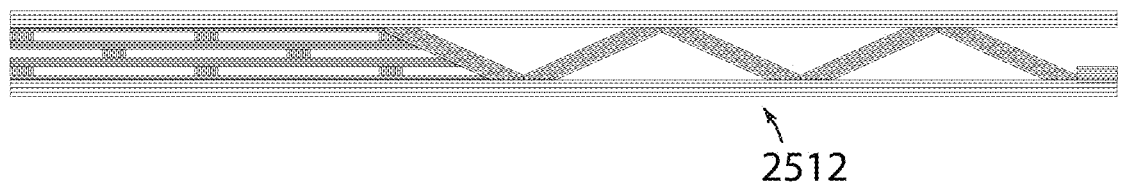
FIG. 25D illustrates a joist-like framework that combines one type of web which incorporates diagonal web members and a second type of web which incorporates multiple chords connected together by blocks.
Figure 26A:
FIG. 26A illustrates a joist-like framework with two parts that are each similar to the joist-like framework of of FIG. 25D and a third part with two chords connected by straight-through web members that create a rectangular opening in the center of the joist-like framework.
Figure 26B:
FIG. 26B illustrates a joist-like framework incorporating multiple chords connected together by blocks that could incorporate straight-through web.

FIG. 26 shows a different embodiment of a structurally insulative joist framework with straight-through braces/web-members. The structure of FIG. 26A may be preferred when the joist need only be structurally insulative at its ends. In that case the straight-thru web members do not degrade thermal performance and provide space for running utilities for example. The end views of FIGS. 25A, 25B and 25C show different possible profiles of (a) nominal 2 inch by 2 inch (40 mm by 40 mm) top and bottom chords (c) nominal 2 inch by 4 inch (40 mm by 80 mm) top and bottom chords (e) nominal 2 inch by 3 inch (40 mm by 60 mm) top and bottom chords, for the apparatuses in the lengthwise view 25D.

Figure 27A:
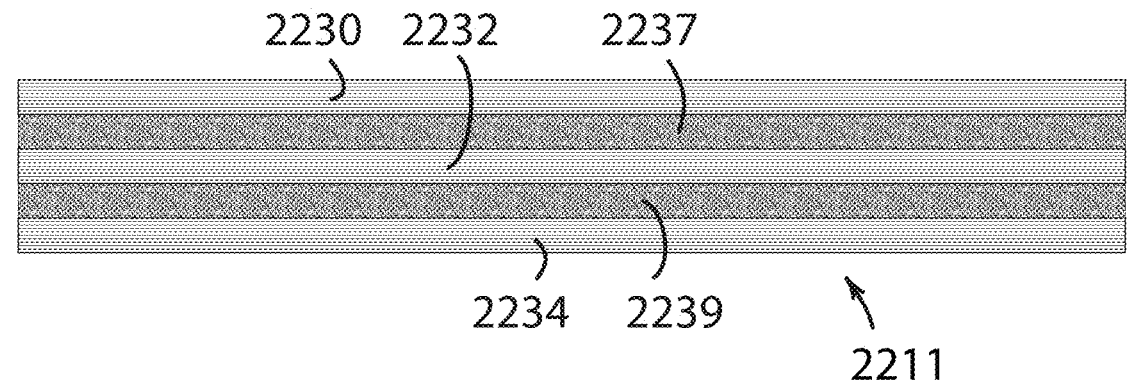
FIGS. 27A and 27B illustrate another embodiment of the three-chord framework containing two closed web-members.
Figure 27B:
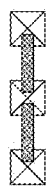

FIG. 27A shows a side view of a framework pre-form 2211 that includes three parallel chords 2230, 2232 and 2234 with a first continuous web member 2237 extending along the length of the structure pre-form 2211 between first and second chords 2230, 2232, and a second continuous web member 2239 extending along the length of the structure pre-form 2211 between second and third chords 2232, 2234. FIG. 27B illustrates an end view of the structure, showing that the web members 2237, 2239 are thinner than the chords. Openings can be cut in the web members 2237 and 2239 to create indirect paths in the vertical direction on the page between the first chord 2230 and the third chord 2234 in order to form the finished structure.

Figure 28A:
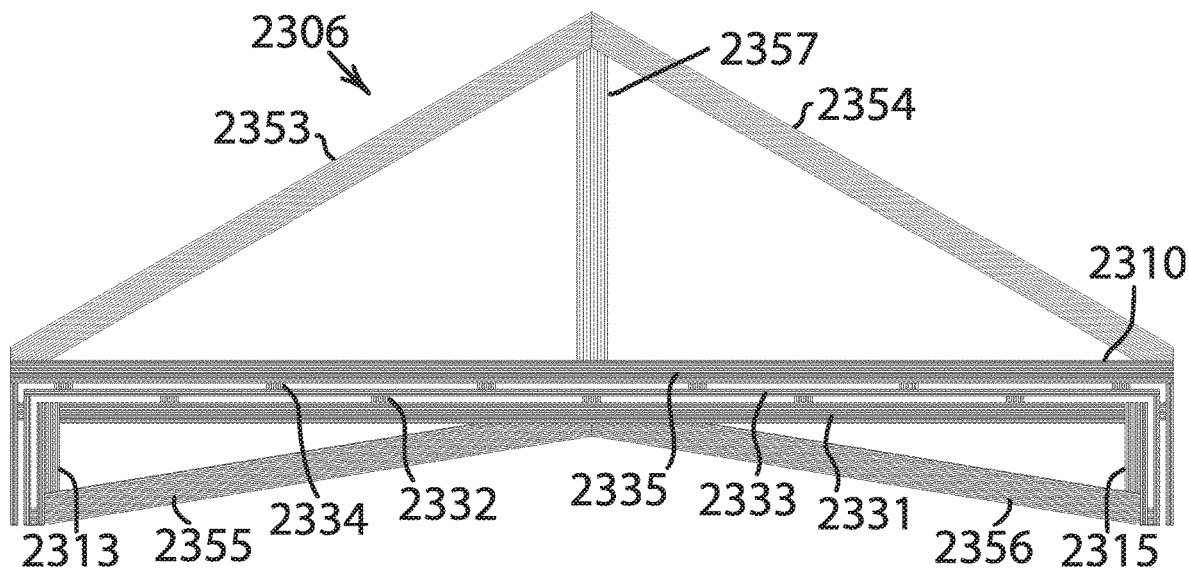
FIG. 28A illustrates one embodiment of a roof framework.

FIG. 28A illustrates an end view of one embodiment of a roof frame 2306. Each end of the roof frame 2306 includes a pair of slanted beams 2353, 2354 that are joined in an upside-down V configuration to form the peak of the gable. A vertical support 2357 provides reinforcement to the beams 2353, 2354 by carrying some of the load of the roofing material. The main horizontal tie 2310 is formed from first, second and third chords 2331, 2333, 2335, respectively, with web members 2332 positioned between the first and second chords 2331, 2333, and web members 2334 positioned between the second and third chords 2333, 2335. Vertical small frameworks 2313 and 2315 support opposite ends of the main horizontal support 2310. Each of the vertical frameworks is made from three chords and two web members. Diagonal beams 2355 and 2356 provide reinforcement to the center of the main horizontal tie beam 2310. The roof framework has a main horizontal apparatus that incorporates three structural members. Each structural member has a horizontal tie member and a vertical heel member. The three structural members are connected together by two intervening webs. Each of the webs has a plurality of braces. Instead of joining structural members and braces one could cut openings into a single heel in order to create the same indirect paths of the three braced heels. In this embodiment, the various truss members are joined together with metal truss plates that can be stamped to form an array of integrated nails.

Figure 28B:
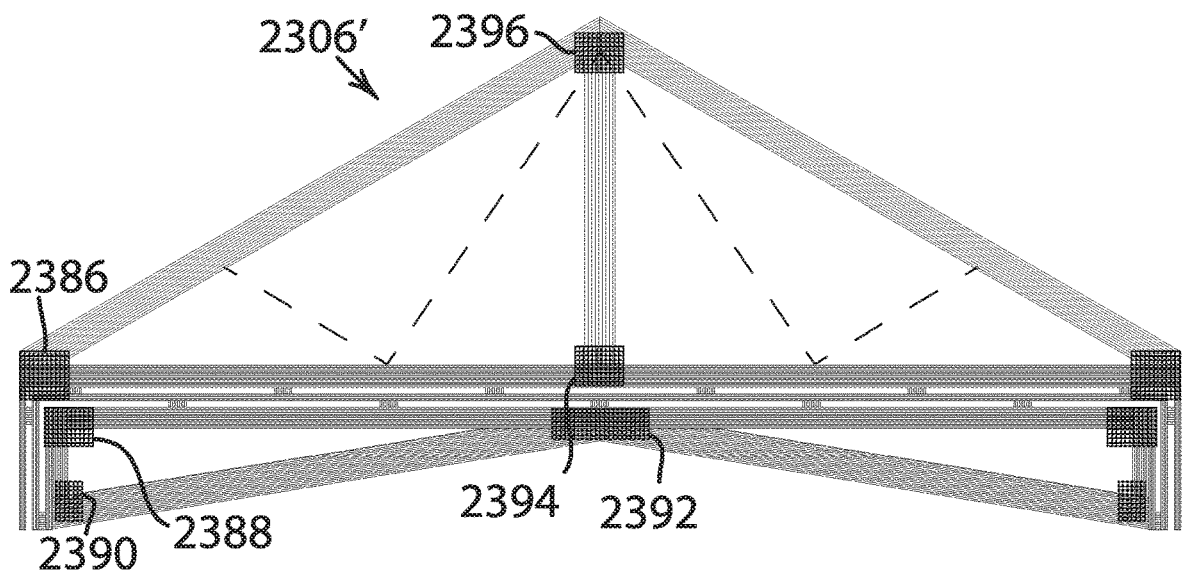
FIG. 28B illustrates the framework in FIG. 28A with gussets to join the framework members together.

FIG. 28B illustrates a roof frame 2306' similar to that of FIG. 28A with gussets 2386, 2388, 2390, 2392, 2394 and 2396 to join the framework members together. The gussets can be glued, nailed, or attached in another suitable manner. The gussets do not modify the minimum rangewise indirectness of the main horizontal tie member. The broken line 2397 shows a "W" shaped web that could substitute for the single vertical support that rises to the peak of the gable.

Figure 29:
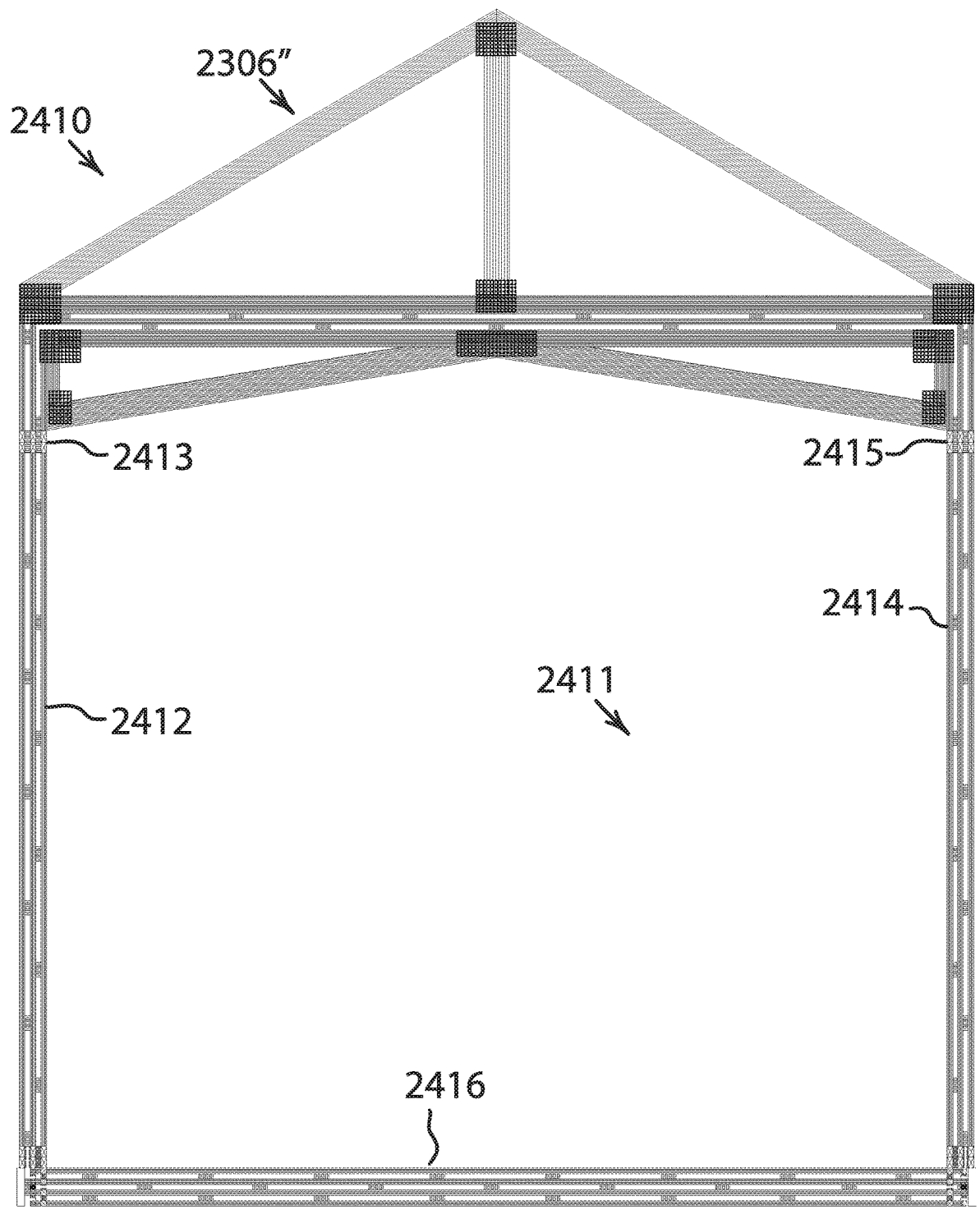
FIG. 29 illustrates another embodiment of the framework incorporating a roof truss on an enclosure.

FIG. 29 illustrates an end view of a structure 2410 that includes a roof frame 2306" similar to that of FIG. 28A mounted on an enclosure 2411, such as a building. Any one of the illustrated frameworks 2412, 2414, 2413, and 2415 can be uniaxial frameworks each comprising a 3 by 1 matrix of structural members or a biaxial framework comprising a 3 by 3 matrix of structural members, or can have other dimensions depending on the building size and load requirements. The illustrated embodiment shows 3 by 1 frameworks for ease of understanding. In the construction of a building, the opposite end of the building would have a similar structure, and there would be four horizontal frameworks connecting the two opposite end of the building frame. Two transversely oriented top-plate-like uniaxial frameworks 2413 and 2415 sit on top of each wall and tie together the stud-like frameworks 2412 and 2414 at their top ends. A transversely oriented bottom-plate-like and sole-plate-like uniaxial frameworks sit at the base of each wall and tie together the stud-like frameworks 2412 and 2414 at their bottom ends. Uniaxial framework 2416 is a floor-joist-like framework.

Figure 30E:
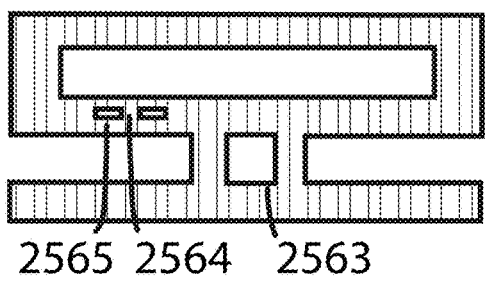
FIG. 30E illustrates a brick-like framework with cavities.

FIGS. 30A-30E schematically illustrate various stacked and rotated embodiments of the framework where the structural members and web members are seamlessly connected so that they become an integrated unit with structural-member-like features and web-member-like features without joints. FIG. 30A shows a first unit 2522 decorated with vertical stripes for the purpose of illustration. FIG. 30B shows a second unit 2524. The second unit 2524 is the same as the first unit 2522 except that it has been rotated by 180° around its longitudinal axis and decorated with horizontal stripes for the purpose of illustration. FIG. 30C shows the first unit 2522 stacked on the second unit 2524 and a third unit 2526, which is identical to the second unit 2524. The second unit 2524 is underneath and to the left while the third unit 2526 is underneath and to the right. The first unit 2522 is drawn with a transparent background to illustrate the positional relationship of the first unit with the second and third unit. The left half 2527 of the closed cavity 2528 in the first unit 2522 lines up with the right open cavity 2532 of the second unit 2524. The right half 2531 of the closed cavity 2528 in the first unit 2522 lines up with the left open cavity 2535 of the third unit 2526. The right half 2533 of the closed cavity 2534 in the second unit 2524 lines up with the open cavity on the left side of the first unit 2522. The left half 2536 of the closed cavity 2537 of the third unit 2526 lines up with the open cavity 2538 on the right side of the first unit 2522. This feature means that the first unit 2522 can form a "running bond" with copies of itself as shown FIG. 30D. Running bonds are important for strength in a wall assembly. In FIG. 30D the inner edges 2550, 2552 of the lower units 2524, 2526, respectively, are offset essentially half way between the inner edge 2554 of the upper unit 2522 in a "running bond" configuration. The gaps between the units provide space for a substance to bond the units together.

Embodiments of frameworks 2522, 2524, 2612, and 2614 take the form of bricks, masonry units, and blocks. Embodiments of frameworks 2522, 2524, 2612, and 2614 could be made from any material but ceramics, concrete, adobe, and rammed earth are commonly used materials for bricks, masonry units, and blocks. FIG. 30E shows a brick-like framework with a structurally non-insulating cavity 2563. Cavity 2563 can be considered as structurally non-insulating cavities because no metric path intersects cavity 2563. Structurally non-insulating web members and structural members are also possible when no metric path intersects them. Cavity 2563 does contribute somewhat to the insulatable aspect of the brick. Embodiments preferred for their insulatable aspects may have structurally non-insulating cavities. Embodiments preferred for their strength have few to zero structurally non-insulating cavities. Features 2564 and 2565 are ineffective features because the presence of features 2564, 2565 do not change the insulation characteristics of the overall structure by more than 10%. The analog of these ineffective features in the case of a framework made of structural parts would be ineffective web members and structural members whose presence does not change the insulation characteristics of the overall structure by more than 10%.

Figure 31A:
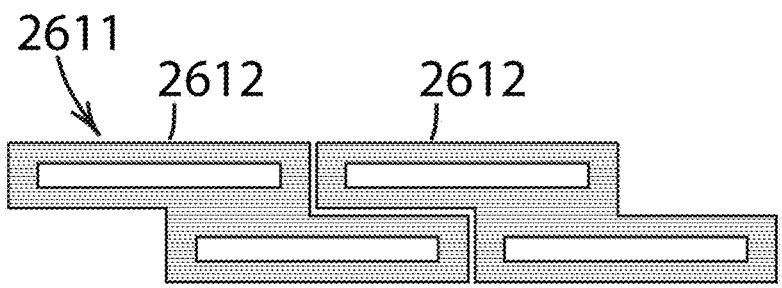
FIGS. 31A-31D schematically illustrate various embodiments of the framework stacked and rotated.
Figure 31B:
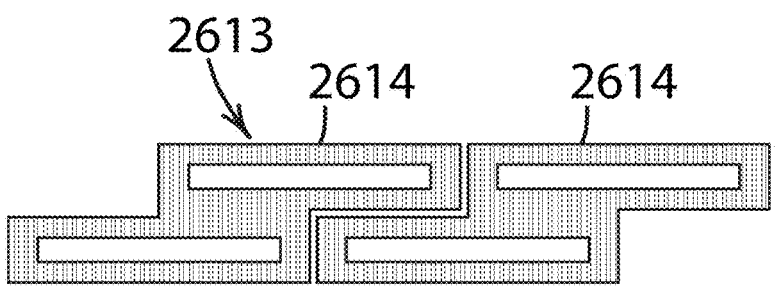
Figure 31C:
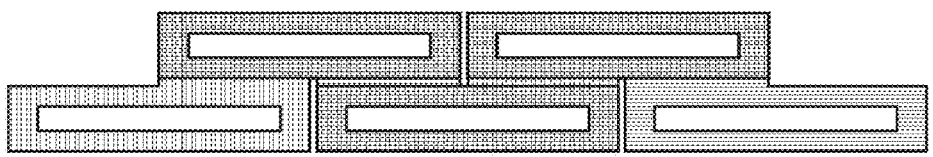
Figure 31D:
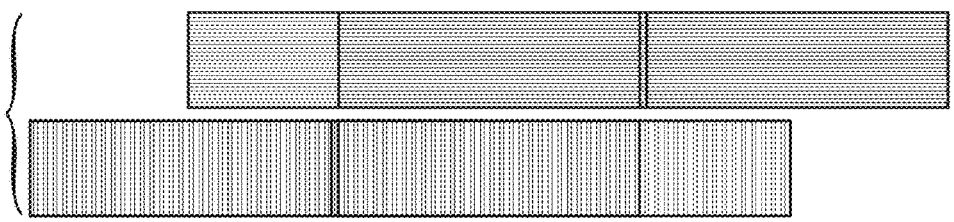

FIGS. 31A-31D schematically illustrate various embodiments of the framework stacked and rotated. These figures show embodiments where the chords and web members are seamlessly connected so that they become an integrated unit with structural-member-like features and brace-like web members without joints. FIG. 31A shows a first set 2611 of two side by side staggered units 2612 (shown with horizontal stripes). FIG. 31B shows a second set 2613 of two side by side stagger units 2614. The second unit is a copy of the first unit except rotated by 180° around its longitudinal axis and decorated with vertical stripes for the purpose of illustration. FIG. 31C shows the first set 2611 stacked partially on top of the second set 2613. This arrangement gives the same functionality as a "running bond" with the look of a "stack bond" from either side of the wall. FIG. 31D shows how the forward half of the first unit (outlined with a bold line) in the foreground looks like it is "stack bonded."

Figure 32A:
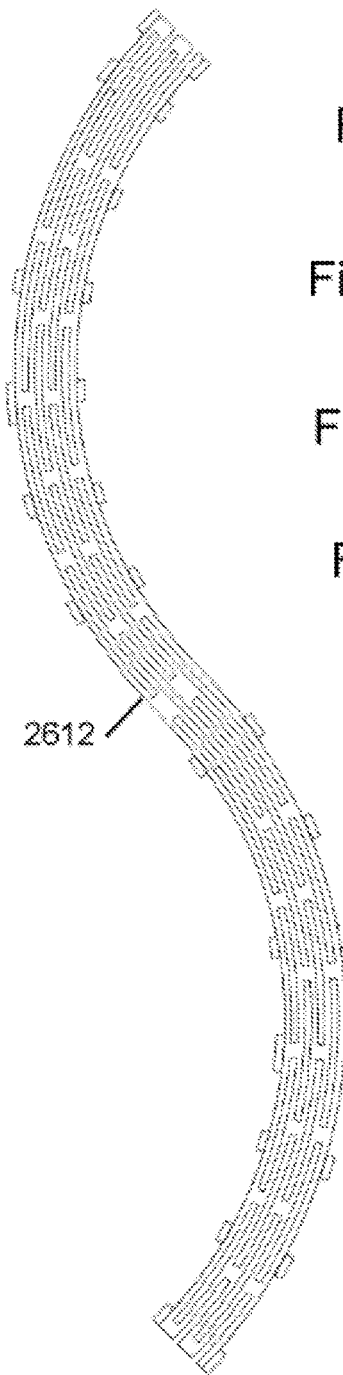
FIGS. 32A-32J schematically illustrate different embodiments of the framework with curves, bends, twists, bulges, and other distortions.
Figure 32B:
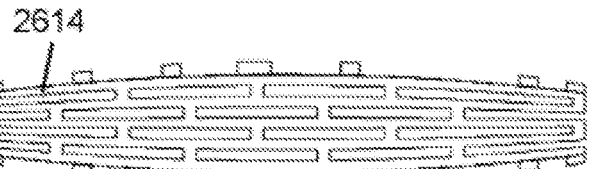
Figure 32C:
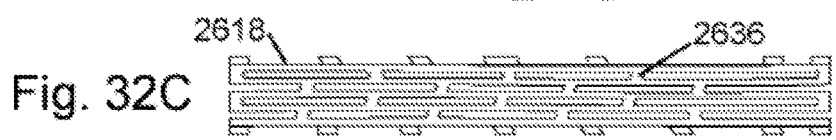
Figure 32D:
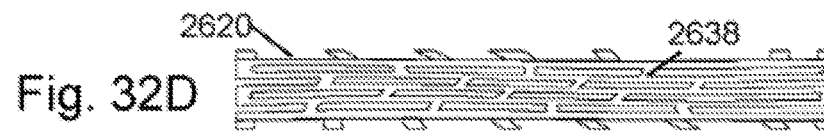
Figure 32E:
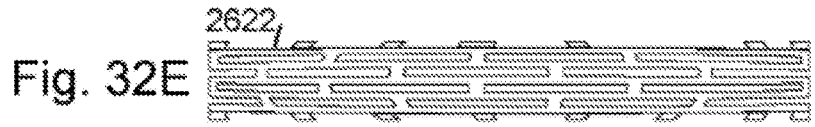
Figure 32F:
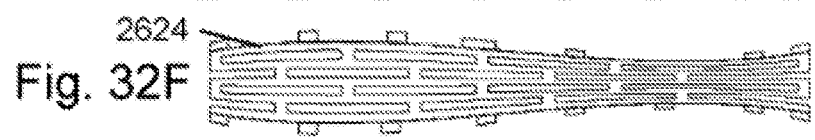
Figure 32G:
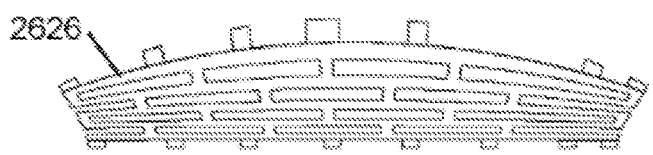
Figure 32H:
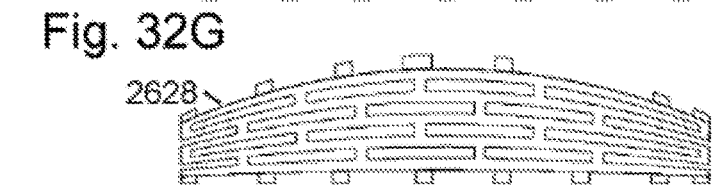
Figure 32I:
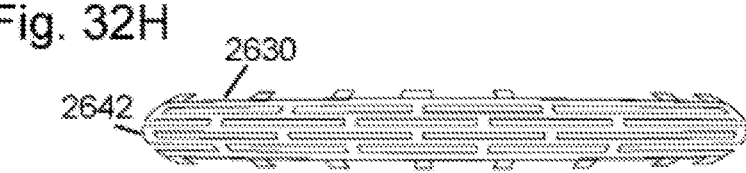
Figure 32J:

FIGS. 32A-32J schematically illustrate different embodiments of the framework with curves, bends, twists, bulges, and other distortions. Each figure shows a 5 chord configuration. Each may be partially (as shown) or wholly formed as a one-piece component or may be configured by connecting 5 separate chords with individual web members. FIG. 32A shows an S-shaped framework 2612 with a generally uniform thickness along its length. FIG. 32B shows a framework 2614 that is wider in the middle than on the ends. Additional width can be occupied by making cavities of varying width, and/or by using chords of non-uniform width. FIG. 32C depicts a straight framework 2618 with a generally uniform thickness and diagonally extending web members 2636. The structure of FIG. 32D is similar to that of FIG. 32C except that the pattern of web members 2638 is different. The framework 2622 of FIG. 32E has wider web members 2640 than the web members of FIG. 32D. FIGS. 32F, 32G and 32H show frameworks 2624, 2626 and 2628 with non-uniform thicknesses along their length. The framework 2630 of FIG. 32I has curved longitudinal ends 2642, 2644.

Figure 33:
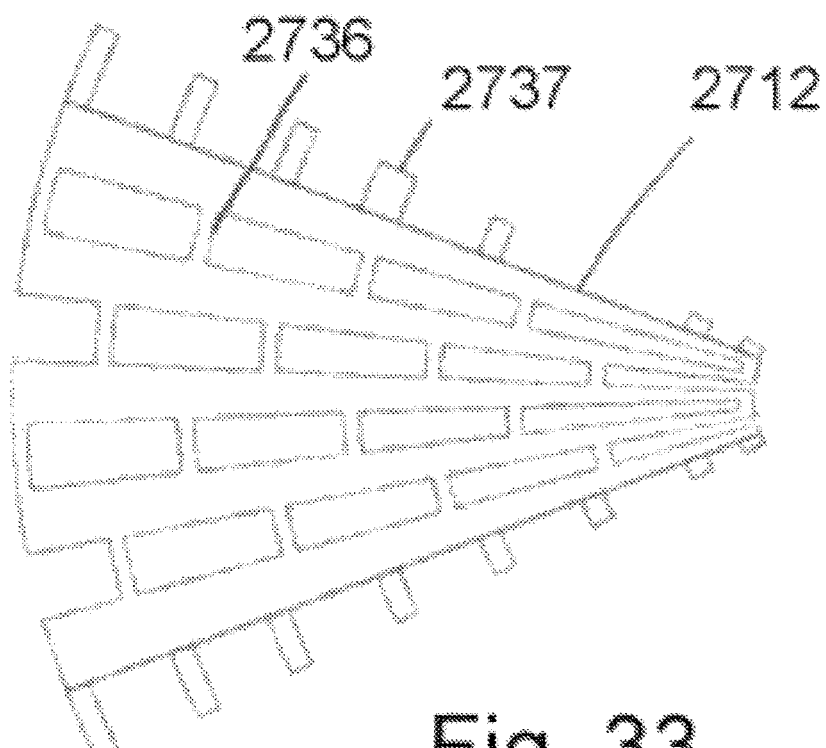
FIG. 33 illustrates one embodiment of the framework in radial form with surface web-member protrusions.

FIG. 33 illustrates one embodiment of a framework 2712 in radial form with web members 2736 and surface web member protrusions 2737. By removing one or more of the protrusions, one can create other embodiments of the disclosed apparatus.

FIG. 34 shows a photograph of one embodiment of a three-chord framework, framework 2812, and the most direct metric path 2819 between the outermost chords of framework 2812. In this case the structural members are the chords. The photograph shows the first ever built prototype of an embodiment of an insulatable, insulative three-chord truss. This paragraph describes non-limiting, historical details about this particular non-limiting design. The normal depth of the framework is 3.5 inches (89 mm). Each chord and web member is 0.7 inches (18 mm) thick in the normal, depthwise direction.

Figure 35A:
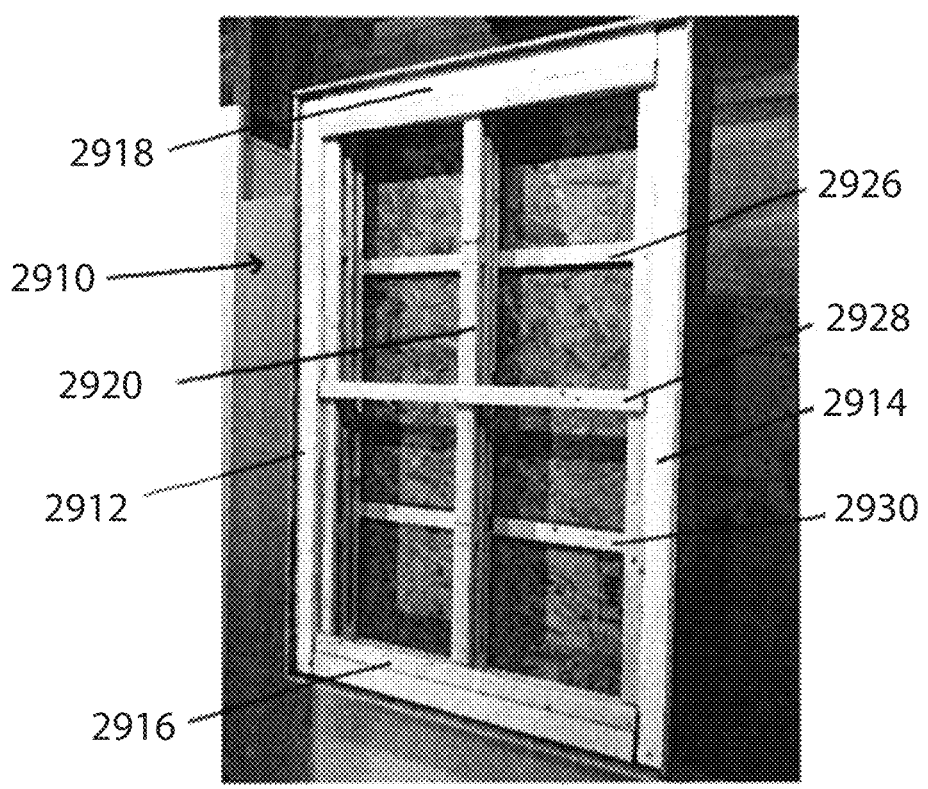
FIGS. 35A-35C depict embodiments of the framework in a rectangular frame with and without insulating substance.
Figure 35B:
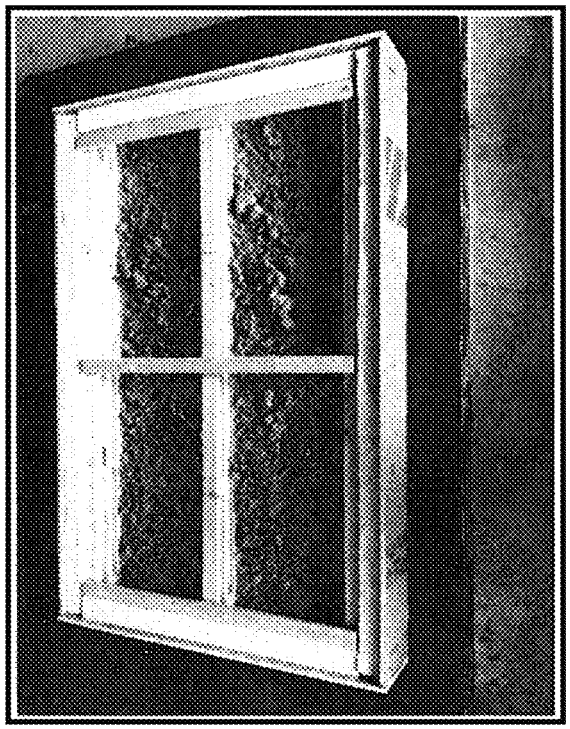
Figure 35C:
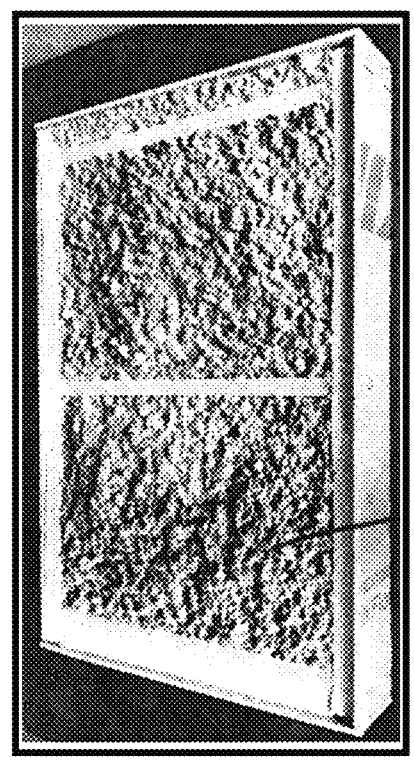

FIGS. 35A-35C depict embodiments of the framework in a rectangular frame with and without insulating substance in accordance with Example 5. FIG. 35A shows an insulative panel 2910 made from five frameworks 2912, 2914, 2916, 2918 and 2920. The vertical frameworks 2912 and 2914 in combination with the horizontal frameworks 2916 and 2918 form a box-type structure. Vertical framework 2920 acts as a single central stud. Each of the cross braces 2926, 2928 and 2930 and each of the web members, in each of the frameworks, creates a stand-off, relative to the deepest connected structural member. Each of these stand-offs forces heat, sound, and/or fire, conducted through the cross braces and structural parts of each framework, to flow through a longer than direct path before getting to the deepest connected structural member, when the intra-framework and inter-framework cavities are filled with insulation that resists the conductive flow heat, sound, and/or fire. In other words, properly offset stand-offs and web members increase the spanwise indirectness of the most-direct metic throughpaths and increase the structurally insulative resistance of the panel. FIG. 35B shows cellulose insulation partially filling the cavities. Cellulose insulation is an example of insulation that resists the conductive flow heat, sound, and fire. FIG. 35C shows cellulose insulation completely filling the cavities before applying a layer of sheathing to completely enclose the cavities and airseal the assembly. It is important to eliminate any potential air pockets.

Figure 36A:
FIGS. 36A, 36B show results of thermal imaging in side-by-side comparison testing of wall assemblies built with battens and structurally insulative studs (an embodiment of the invention on the left side) versus conventional studs with exteriorly applied rigid foam insulation (on the right side).

FIG. 36A shows a conventional stud wall 3602 and insulative panel 2910 configured as an insulative stud wall 3601 corresponding to an embodiment described herein in accordance with Example 6. The conventional stud wall 3602 has a continuous layer of foam on the exterior with an R-value of 2.5 (° F.·ft$^2$·hr)/BTU, or 0.44 (° C.·m$^2$)/W, and an estimated total nominal R-value of 20 (° F.·ft$^2$·hr)/BTU, or 3.5 (° C.·m$^2$)/W. Table 3 shows the values used in the estimate. The estimated total nominal R-value of the conventional stud wall 3602 does not include the effects of thermal bridging.

TABLE 3

| (Imperial Units) | | | |
|---|---|---|---|
| Control Stud Wall 3602 | normal thickness inch | $r_{val}$ (° F.·ft$^2$·hr)/ (BTU·inch) | Nominal $R_{val}$ (° F.·ft$^2$·hr)/BTU |
| stud cavity (true 4-inch studs) | 4 | 3.7 | 14.80 |
| furring cavity | 0 | | 0.00 |
| foam | 0.5 | 5 | 2.50 |
| siding | | | 0.81 |
| sheathing | | | 0.55 |
| drywall | 0.5 | 0.9 | 0.45 |
| interior air film | | | 0.68 |
| exterior air film | | | 0.17 |
| Total | | | 19.96 |

TABLE 3-continued (SI Units)

| Control Stud Wall 3602 | normal thickness mm | $r_{val}$ (°C · m)/W | Nominal $R_{val}$ (°C · m²)/W |
|---|---|---|---|
| stud cavity (true 4-inch studs) | 102 | 25.6 | 2.60 |
| furring cavity | 0 | | 0.00 |
| foam | 13 | 34.6 | 0.44 |
| siding | | | 0.14 |
| sheathing | | | 0.10 |
| drywall | 13 | 6.2 | 0.08 |
| interior air film | | | 0.12 |
| exterior air film | | | 0.03 |
| Total | | | 3.50 |

TABLE 4

(Imperial Units)

| Insulative Stud Panel 3601 | normal thickness inch | $r_{val}$ (°F · ft² · hr)/ (BTU · inch) | Nominal $R_{val}$ (°F · ft² · hr)/BTU |
|---|---|---|---|
| insulative stud cavity | 3.5 | 3.7 | 12.95 |
| furring cavity | 1.36 | 3.7 | 5.03 |
| foam | 0 | | 0.00 |
| siding | | | 0.00 |
| sheathing | | | 1.10 |
| drywall | | | 0.00 |
| interior air film | | | 0.68 |
| exterior air film | | | 0.17 |
| Total | | | 19.93 |

(SI Units)

| Insulative Stud Panel 3601 | normal thickness mm | $r_{val}$ (°C · m)/W | Nominal $R_{val}$ (°C · m²)/W |
|---|---|---|---|
| insulative stud cavity | 89 | 26.7 | 2.28 |
| furring cavity | 35 | 26.7 | 0.89 |
| foam | | | 0.00 |
| siding | | | 0.00 |
| sheathing | | | 0.19 |
| drywall | | | 0.00 |
| interior air film | | | 0.12 |
| exterior air film | | | 0.03 |
| Total | | | 3.50 |

TABLE 5

(Imperial Units)

| Insulative Stud Panel 359 | normal thickness inch | $r_{val}$ (°F · ft² · hr)/ (BTU · inch) | Nominal $R_{val}$ (°F · ft² · hr)/BTU |
|---|---|---|---|
| insulative stud cavity | 3.5 | 3.7 | 12.95 |
| furring | | | 0.00 |
| foam | | | 0.00 |
| siding | | | 0.00 |
| sheathing | | | 1.10 |
| drywall | | | 0.00 |
| interior air film | | | 0.68 |
| exterior air film | | | 0.17 |
| Total | | | 14.90 |

(SI Units)

| Insulative Stud Panel 359 | normal thickness mm | $r_{val}$ (°C · m)/W | Nominal $R_{val}$ (°C · m²)/W |
|---|---|---|---|
| insulative stud cavity | 89 | 26.7 | 2.28 |
| furring | | | 0.00 |
| foam | | | 0.00 |
| siding | | | 0.00 |
| sheathing | | | 0.19 |
| drywall | | | 0.00 |
| interior air film | | | 0.12 |
| exterior air film | | | 0.03 |
| Total | | | 2.62 |

Figure 36B:
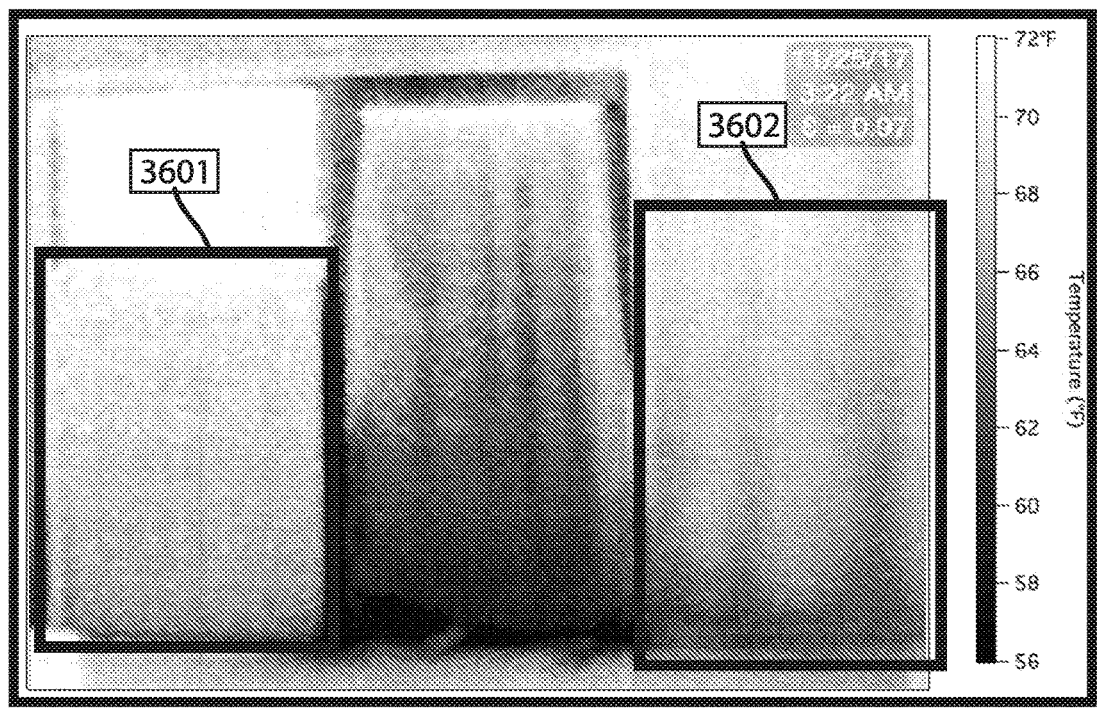

FIG. 36B shows a thermal image of stud walls 3601 and 3602. When the image was taken, the outdoor temperature was 34° F. (1.1° C.) and the indoor temperature was 72° F. (22° C.). The low temperature on insulative stud wall panel 3601 was 68° F. (20° C.), and not significantly different than the room temperature whereas the low temperature on the conventional stud wall 3602 was 57° F. (13.8° C.) and occurred in the region of a stud visible in the thermal image of FIG. 36B.

Figure 36C:
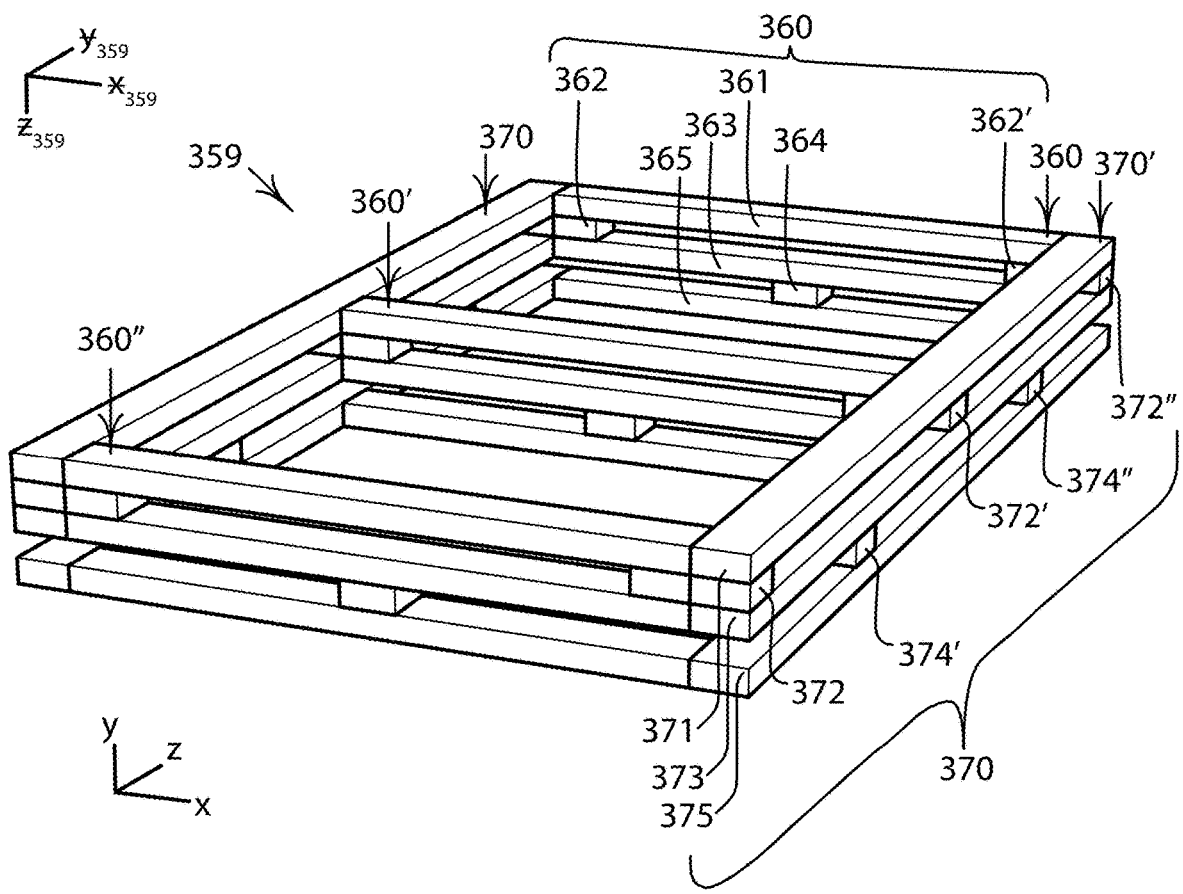
FIGS. 36C, 36D show drawings of a test assembly incorporating structurally insulative studs and cross braces (embodiments of the invention).

FIG. 36C shows an embodiment of a rectangular uniaxial framework 359 lying down as it might be built while platform framing, for example, with its longitudinal $y_{359}$ direction aligned with the transverse z axis of the figure page. This embodiment of framework 359 has two uniaxially structurally insulating stud-like frameworks 370, 370' and three uniaxially structurally insulating cross-brace-like frameworks 360, 360', 360". Each of the cross-brace-like frameworks has two webs with two web members in a first web, as typified by web member 362, 362', and one web member in a second web as typified by web member 364. The web members in each of web interconnects a pair of structural members as exemplified by the connection of structural members 361 and 363 by web members 362, 362' and the connection of structural members 363 and 365 by web member 364 in cross-brace-like framework 360. Stud-like framework 370' has three structural members 371, 373, and 375. Structural members 371 and 373 are connected by web members 372, 372', 372" while structural members 373 and 375 are connected by web member 374, 374', 374". Each of the web members is 1.5 inches by 1.5 inches (40 mm by 40 mm) in the longitudinal y and lateral x directions and 0.7 inches deep (18 mm) in the normal direction. Each of the structural members is 0.7 inches (18 mm) deep in the normal direction. The web members within a web are spaced by 13.75 inches (350 mm) in all of the stud-like frameworks and all of the brace-like frameworks. Web members in adjacent webs are offset by 6.125 inches (155 mm) relative to each other. Each of stud-like frameworks 370, 370' is 32 inches in longitudinal length, 1.5 inches in lateral width, and 3.5 inches in normal depth (813 mm, 40 mm, 89 mm, respectively). Each of cross-brace-like frameworks 360, 360', 360" is 16.75 inches in longitudinal length, 1.5 inches in lateral width, and 3.5 inches in normal depth (425 mm, 38 mm, 89 mm, respectively). Thus, uniaxial framework 359 is 19.75 inches ($\Delta y_{359}$) by 32 inches ($\Delta x_{359}$) by 3.5 inches ($\Delta z_{359}$) or 502 mm by 813 mm by 89 mm, respectively.

These key parameters determine that the most direct metric path between the outermost structural members of any framework has a length of about 0.7+0.7+6.125+0.7+0.7 inches or 8.925 inches (227 mm), a span of 3.5 inches (89 mm), a span-wise indirectness of 155%, and a structural insulation factor of 2.55. The longest direct metric path between the outermost structural members of any framework has a length of about 0.7+0.7+12.25+0.7+0.7 inches or 15.05 inches (382 mm), a span of 3.5 inches (89 mm), a span-wise indirectness of 330%, and a structural insulation factor of 4.3. The average span-wise indirectness is 242% and average structural insulation factor is 3.42. The average structural insulation factor satisfies an average condition for zero thermal bridging which is that the average structural insulation factor equal the ratio of the resistivities for the insulating material in the inter-stud-like framework cavities and the structural material. The insulating material used in the test was cellulose insulation within a resistivity of 3.7 (° F.·ft$^2$·hr)/(BTU·inch), or 25.6 (K·m)/W. The structural material was wood with a resisitivity of 1 (° F.·ft$^2$·hr)/(BTU·inch), or 6.9 (K·m)/W. The average structural insulation factor of 3.42 which is within 10% of 3.7, i.e. the ratio of the resistivities for the insulating material in the inter-stud-like framework cavities and the structural material. This embodiment was built as a prototype for thermal testing. Another embodiment of this framework has sheets of transparent material similar to the transformation of frame-like framework 780 into window framework 780' illustrated by FIGS. 12E, 12F.

Figure 36D:
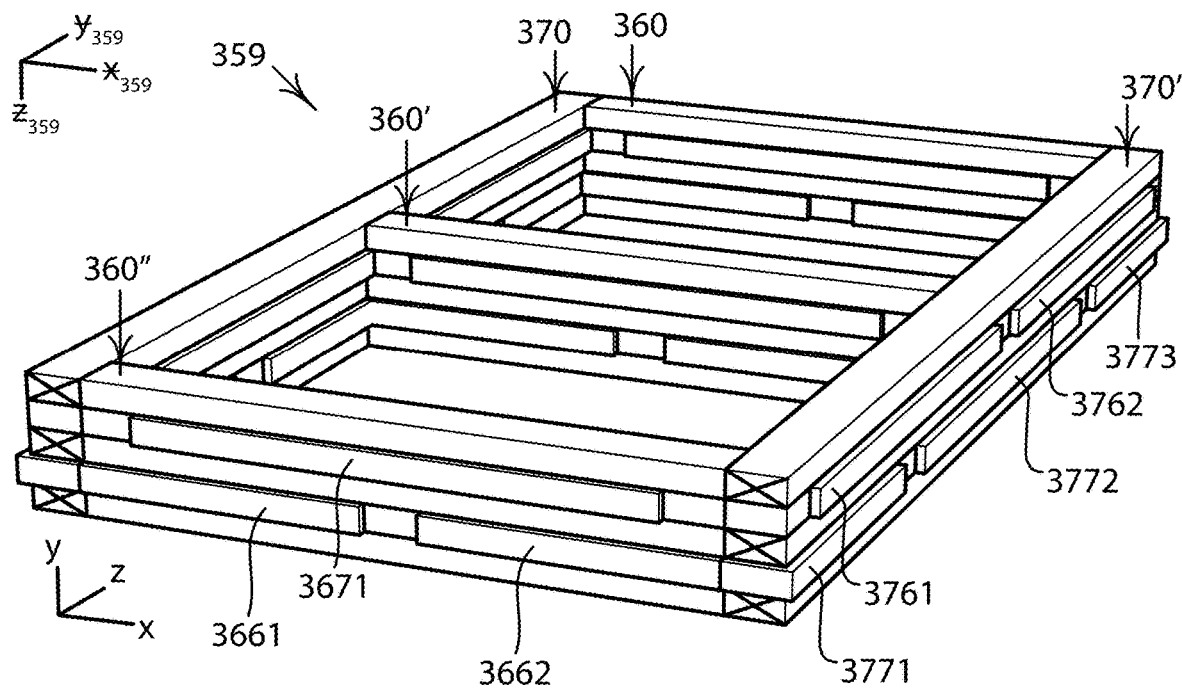

FIG. 36D shows framework 359 with cuboidal pieces of rigid foam insulation, exemplified by pieces 3661, 3662, 3671, 3761, 3762, 3771, 3772, and 3773, inserted into each of the intra-framework cavities defined by the structural members and web members. The resistivity of the rigid foam insulation was 6.6 (° F.·ft$^2$·hr)/(BTU·inch), or 46 (° C.·m)/W, for a total R-value of 12 (° F.·ft$^2$·hr)/BTU, or 2.1 (K·m$^2$)/W, over the 1.4 inch (35.5 mm) cumulative distance of the cavities and including the 2.1 inches (53 mm) of wood with a total R-value of 2.1 (° F.·ft$^2$·hr)/BTU, or 0.37 (K·m$^2$)/W which is also within 10% of the target R-value of 13 (° F.·ft$^2$·hr)/BTU, or 2.3 (K·m$^2$)/W. In other embodiments pieces of any rigid insulation are used in place of pieces 3661, 3662, 3671, 3761, 3762, 3771, 3772, and 3773 both extending beyond the outermost lateral facing surfaces as shown and not extending past the outermost lateral facing surfaces of the framework. Pieces of insulation that do extend past the outermost lateral facing surfaces of the framework help to block direct paths of heat flow along the outermost lateral facing surfaces of the framework. The inter-stud-like-framework cavities between frameworks 370 and 370' and between frameworks 360, 360', and 360" were filled and air-sealed with cellulose insulation enclosed by two pieces of sheathing on opposing sides of the resulting insulated panel.

Figure 36E:
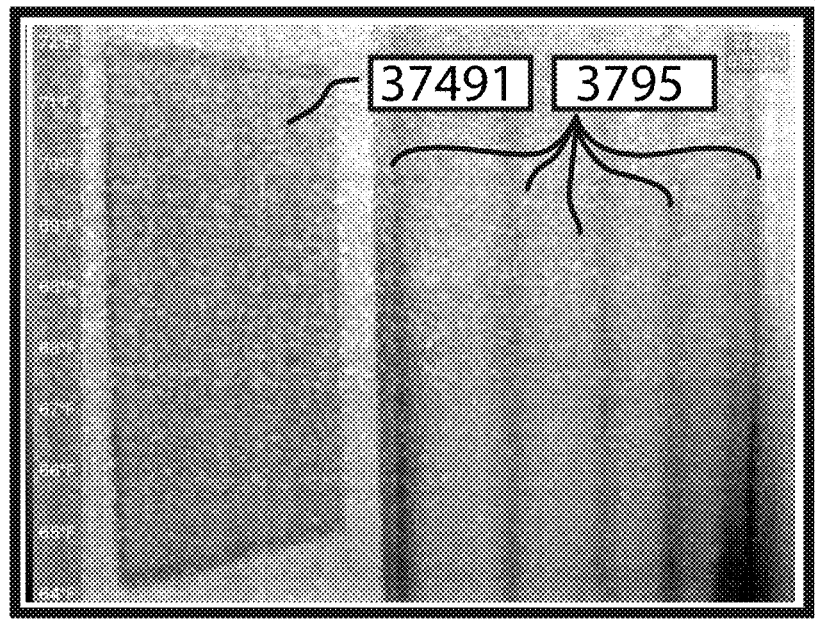
FIG. 36E shows results of thermal imaging in a side-by-side comparison testing of wall assemblies built with structurally insulative studs (an embodiment of the invention) versus conventional studs with exteriorly applied rigid foam insulation.
Figure 36F:
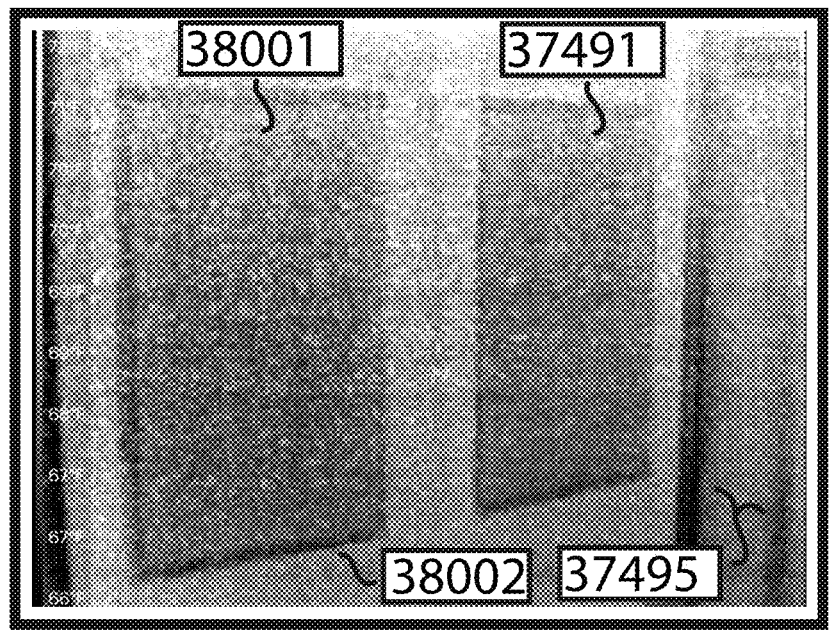
FIG. 36F shows results of thermal imaging in a side-by-side comparison testing of wall assemblies built with structurally insulative studs (an embodiment of the invention) versus control studs with foam web members instead of wood web members.

FIGS. 36E and 36F show the results of thermal imaging to compare insulative stud-wall module 359 versus conventional stud wall 3795. Table 3 summarizes the parameters of conventional stud wall 3795 and the parameters of insulative stud-wall module 359. FIG. 36E shows that the conventional stud wall 3795 shows thermal bridging in that the regions of the wall over the studs 3795 are cold relative to the surrounding portions of wall. The insulative stud wall module 37491 show no thermal bridging in that the regions of the wall over the stud-like frameworks and cross-brace-like frameworks is the same temperature as the surrounding portions of wall. Conventional stud wall 3602 has a higher nominal R-value and greater normal depth than the insulative stud wall module 37491. Therefore a second type of control experiment was performed to compare the insulative stud wall module 37491 to replica insulative stud wall module 38001 which was exactly the same as module 37491 except with solid foam for the webs and no structural web members. FIG. 36F shows that the two modules perform equally well in that they both have the same even temperature profile across their interior surfaces. The slightly darker border 38002 around the replica insulative stud wall module 38001 corresponds to a region where the surrounding insulation was tucked under the sheathing at the edge of insulative stud wall module 37491 creating a border region of slightly lesser R-value.

Figure 36G:
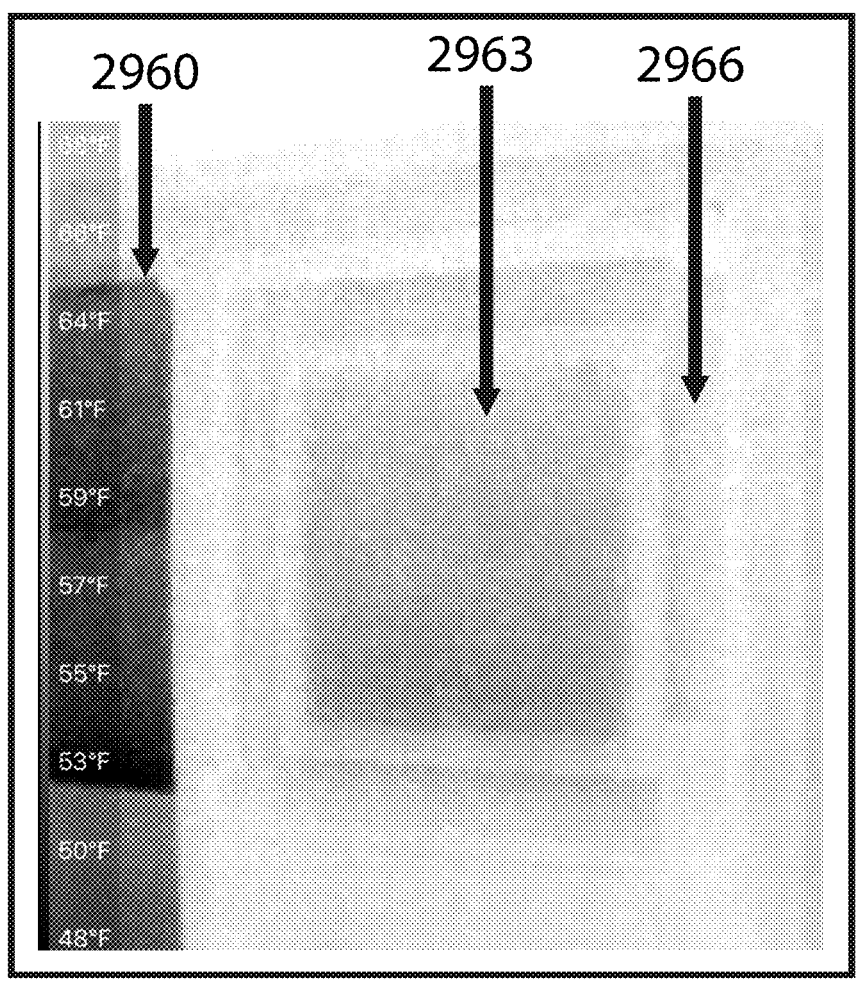
FIG. 36G shows a thermal photograph of interior surfaces for (1) a prototype window 2963, (2) R-15 (° F.·ft$^2$·hr)/BTU, or 2.6 (° C.·m$^2$)/W, insulation 2966 surrounding the prototype window, and (3) a standard double pane window 2960.
Figure 36H:
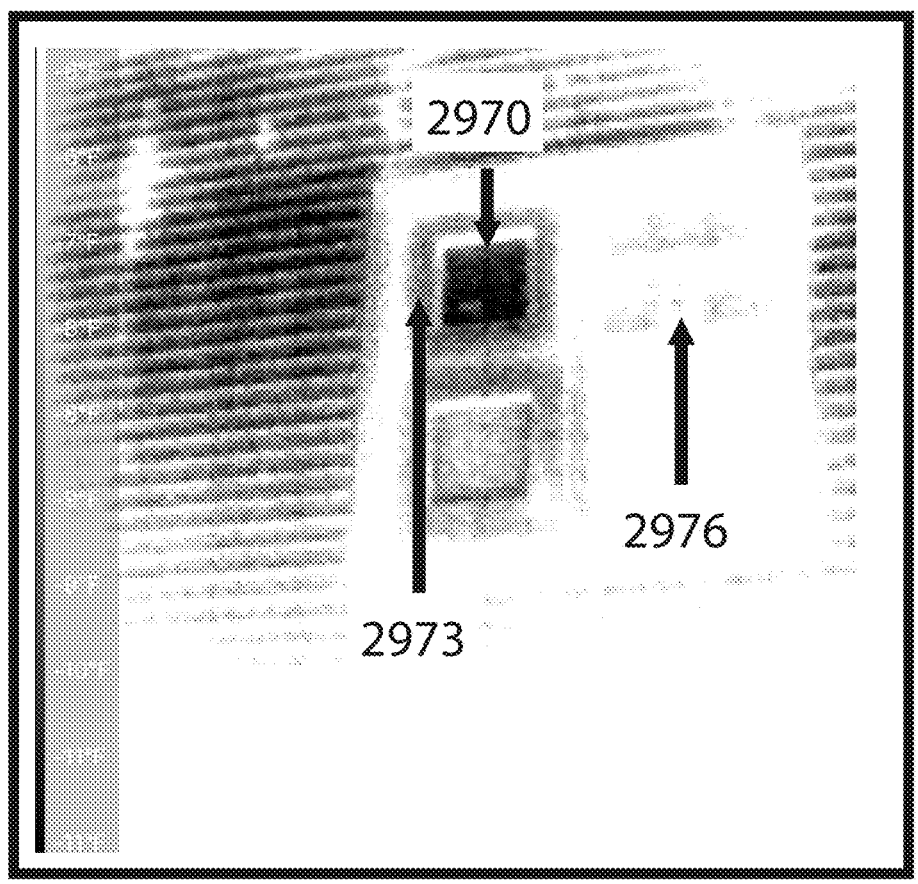
FIG. 36H shows a thermal photograph of exterior surfaces for (1) the prototype window 2970, (2) R-15 (° F.·ft$^2$·hr)/BTU, or 2.6 (° C.·m$^2$)/W, insulation 2973 surrounding the prototype window, and (3) a standard double pane window 2976.
Figure 36I:
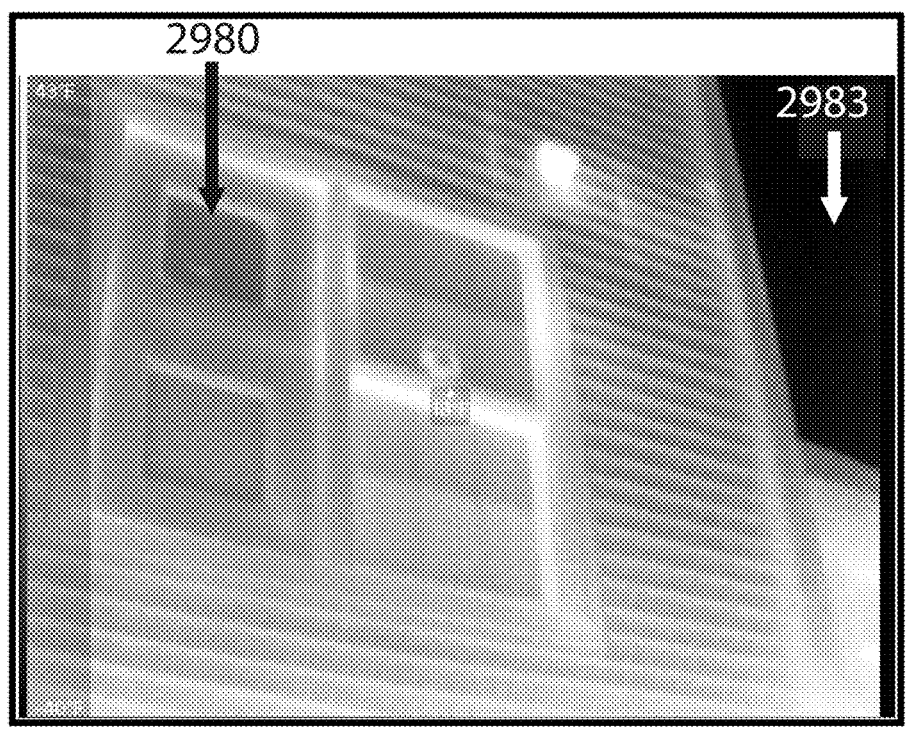
FIG. 36I shows a thermal photograph like that of FIG. 36H but showing a portion of cold sky 2983 with a temperature of −40° F. and another view of window 2980 with a different exposure level for the thermal imager.

FIGS. 36G-36I show the results of testing for a prototype window as one embodiment. The prototype window has a significantly warmer temperature than the standard double pane window. The outdoor temperature was 27° F. (−2.8° C.) on that day. Radiative cooling to the cold sky made surrounding buildings and surfaces colder than the ambient air temperature. The prototype picture window 2963 has a frame like the one illustrated in FIG. 12E and five panes of uncoated glass. The energy efficiency is equivalent to that of the surrounding insulation 2966 with an R-value of 15.6 (° F.·ft$^2$·hr)/BTU, or 2.75 (K·m$^2$)/W, as explained in the next few paragraphs. Window 2963 keeps the warm side warm, as shown in FIG. 36G, and the cool side cool, as shown in FIG. 36H. The performance of the window can be improved by (1) filling the window with an insulative gas and/or (2) applying a low emissivity coating to one or more panes of glass, especially the exterior one. FIG. 36G shows that convective heat flow between the window panes makes the top of the window slightly warmer than the bottom and makes the bottom of the window cooler than the top. The bottom of the window sustains a temperature difference of 75° F. (from 64° F. down to −11° F.), equivalently 23.9° C. (17.8° C. down to −23.9° F.), which equals the temperature difference of 75° F. (from 66° F. down to −9° F.), equivalently 23.9° C. (from 18.9° C. down to −22.8° C.), sustained by the foam insulation 2966. Thus, the R-value at the bottom of window 2963 equals that of the foam insulation 2966. The top of window 2963 sustains a temperature difference of 77° F. (from 66° F. down to −11° F.), equivalently 25° C. (from 18.9° C. down to −23.9° C.), that exceeds the temperature difference of 75° F. (23.9° C.) sustained by the surrounding foam insulation 2966. The surrounding insulation (four layers of 0.7-inch-thick XPS foam board) has an R-value per inch of 5.6 (° F.·ft$^2$·hr/BTU) per inch, or 38.8 K/(W·m), a thickness of 2.8 inches (71 mm), and a total R-value of 15.6 (° F.·ft$^2$·hr/BTU), or 2.75 (K·m$^2$/W), at a mean temperature of 25° F., (−3.9° C.). The actual R-value is higher because air films between the 4 layers of XPS foam board increase the effective R-value per inch of each layer of foam.

FIG. 36H shows that the exterior surface of the window 2970 is colder than that of the insulation 2973 because glass has a higher emissivity (0.92) than insulation (0.6). Therefore a window pane has a relatively high rate of radiative cooling to the sky and surrounding surfaces that have radiatively cooled below the ambient air temperature. FIG. 36I shows that the sky 2983 has an extremely cold temperature of −40° F. (−40° C.). Notice that the surfaces of the building can cool below the ambient air temperature (27° F., or −2.8° C., on the day the images were acquired) via to the same effect of radiative cooling to the cold sky. This effect is similar to the surfaces of a building heating above the ambient air temperature due to radiative heating by the sun. The exterior surface of the insulative window 2970 and the insulation 2973 are colder than the exterior surface of the standard double pane window 2976.

Figure 37:
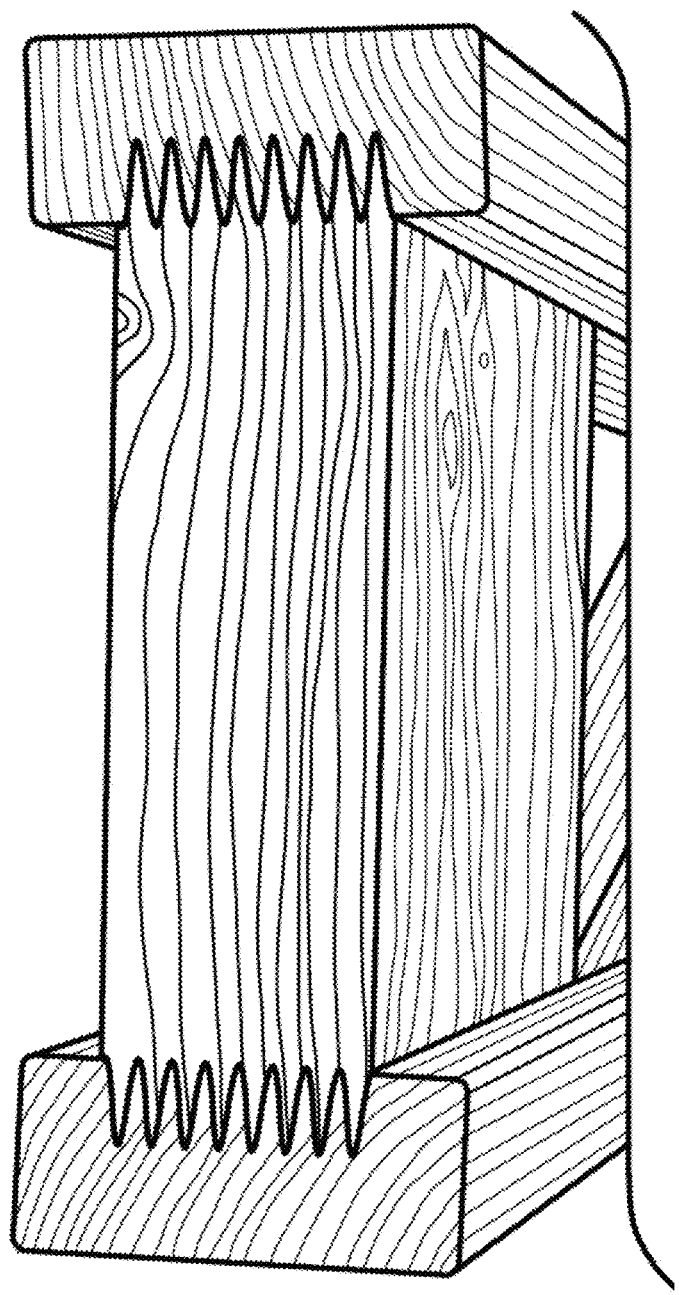
FIG. 37 depicts one type of joint used between framework structures.

FIG. 37 depicts one type of joint used between framework structures, namely a finger joint. Other suitable types of joints are described below.

Figure 38A:
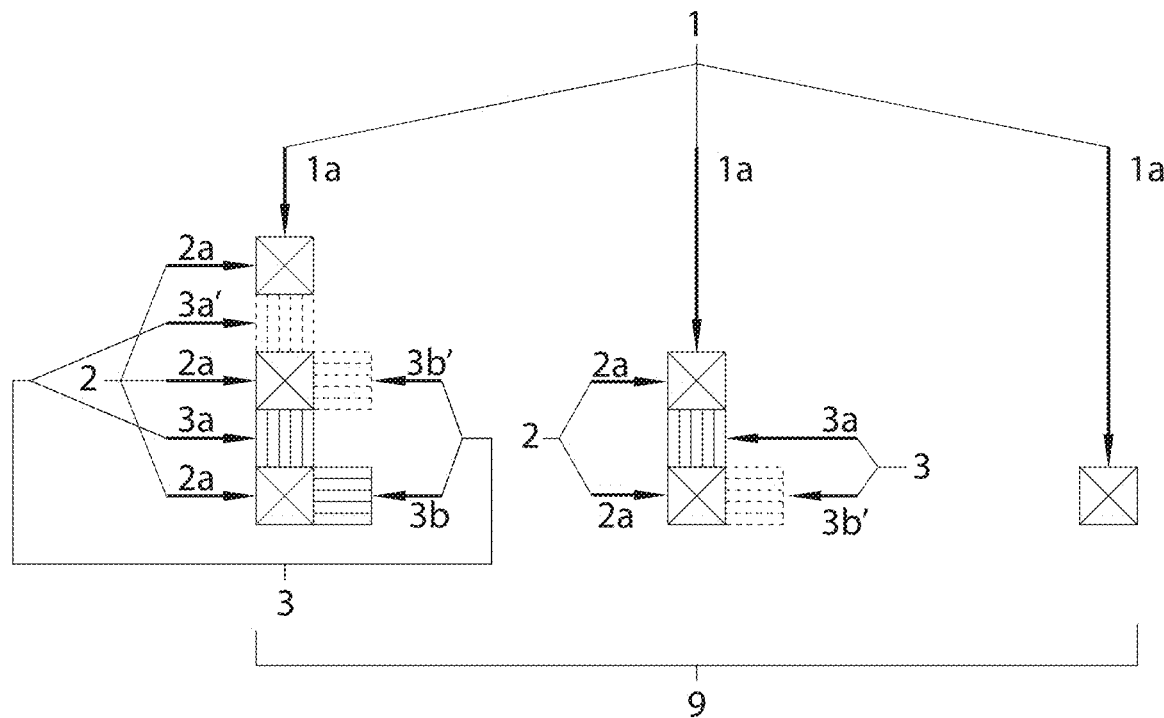
FIG. 38A-38F illustrate different embodiments of uniaxial frameworks joined together into a biaxial framework.

FIG. 38A illustrates a non-limiting example of a technique for joining an array 1 of sub-frameworks 1*a* together into a biaxial framework embodiment 9.

Figure 38B:
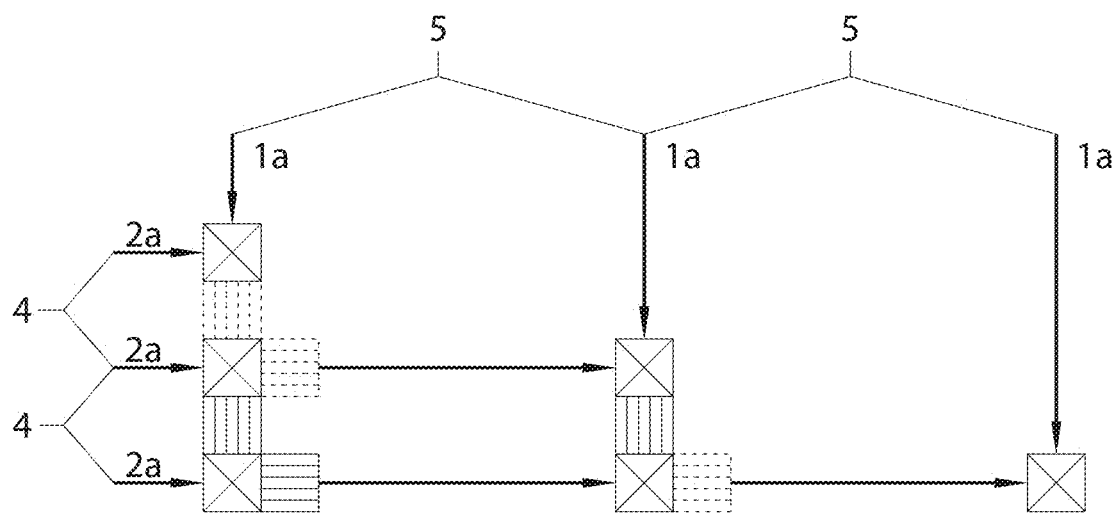

FIG. 38B shows a pair 4 of structural members 2*a*, which are joined by an intranetworking web 3*a* or 3*a*', and a pair 5 of sub-frameworks 1*a*, which are joined by an internetworking web 3*b* or 3*b*'.

Figure 38C:
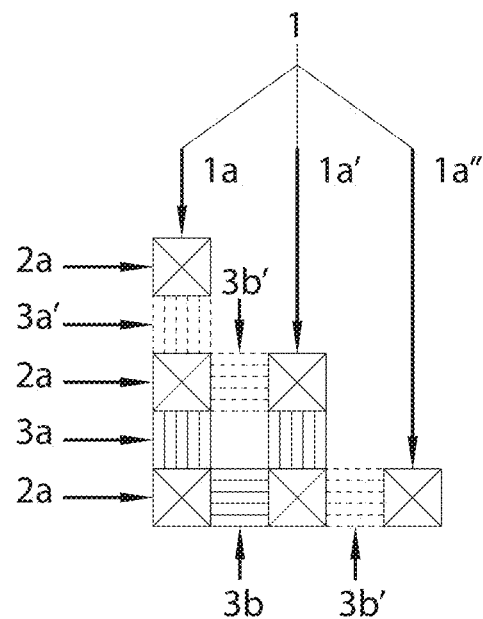

FIG. 38C shows sub-frameworks 1*a*, 1*a*', 1*a*" and biaxial framework 9 in an assembled state ready for use as a rim joist as a non-limiting example.

Figure 38D:
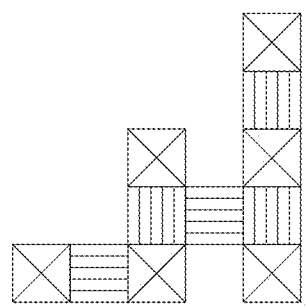

FIG. 38D shows that an internetworking web can connect web members together.

Figure 38E:
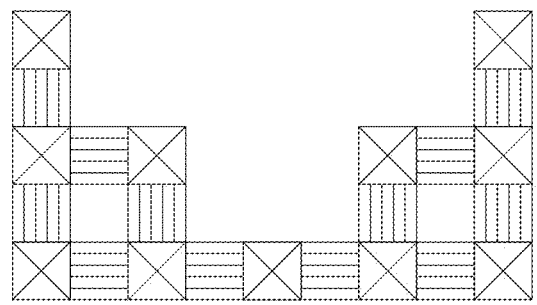
Figure 38F:
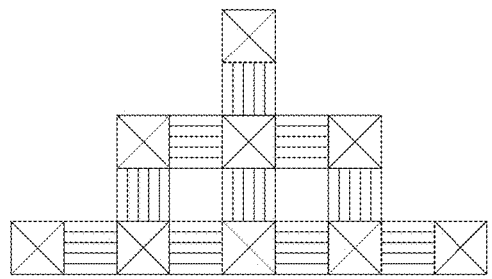

FIGS. 38E-F show other possible embodiments of biaxial frameworks created from sub-frameworks 1*a*, 1*a*', 1*a*".

Figure 38G:
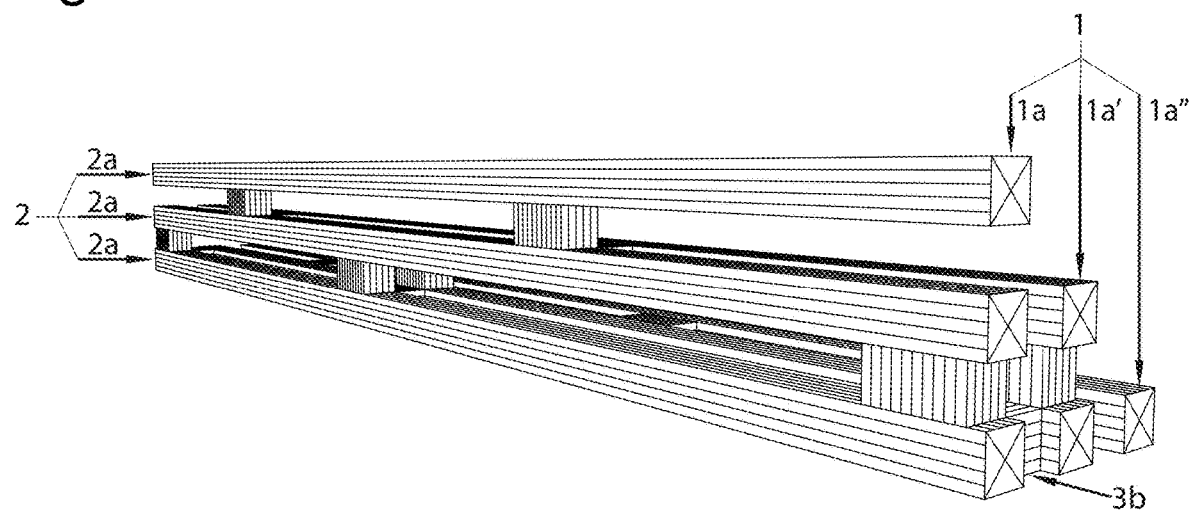
FIGS. 38G-38H illustrate multiple three-dimensional views of the biaxial framework.
Figure 38H:
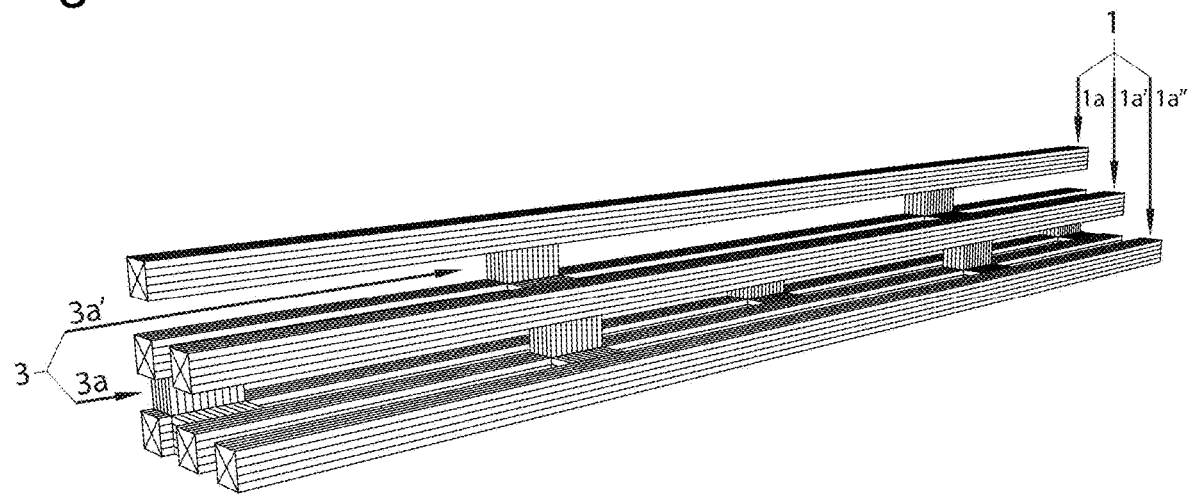
Figure 38I:
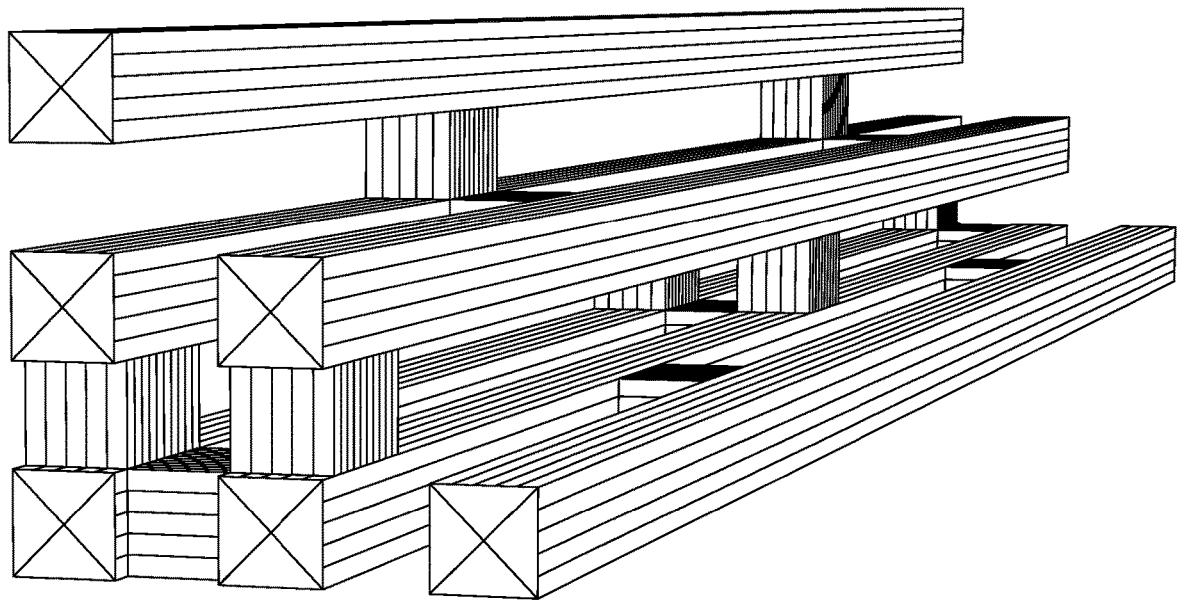
FIG. 38I illustrates further details on the intranetworking web of the framework.

FIGS. 38G-I show different three-dimensional representations of biaxial framework 9 from different view points. FIG. 38H shows a variation on the placement of the intranetworking web in the second sub-framework.

Figure 39A:
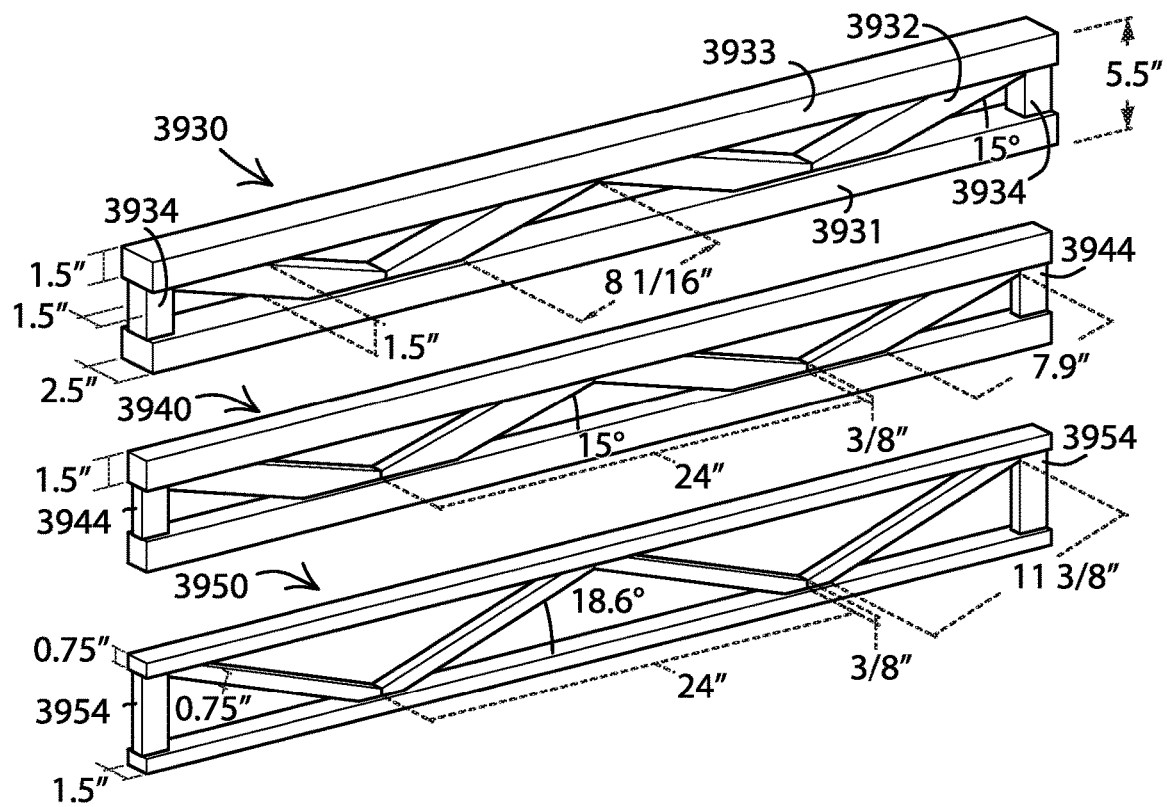
FIGS. 39A-39B show multiple structurally insulative two chord frameworks.

FIG. 39A shows three embodiments of frameworks 3930, 3940 and 3950 with two chords each, exemplified by first chord 3931 and second chord 3933, and with diagonal web members exemplified by diagonal web member 3932 as well as straight-direct web members 3934, 3944, 3954 which are modifiable. Any embodiment may incorporate one or more than one such modifiable web member. Non-limiting examples of dimensions for chord thickness, chord width, web member width, web member angle, etc. are shown.

Figure 39B:
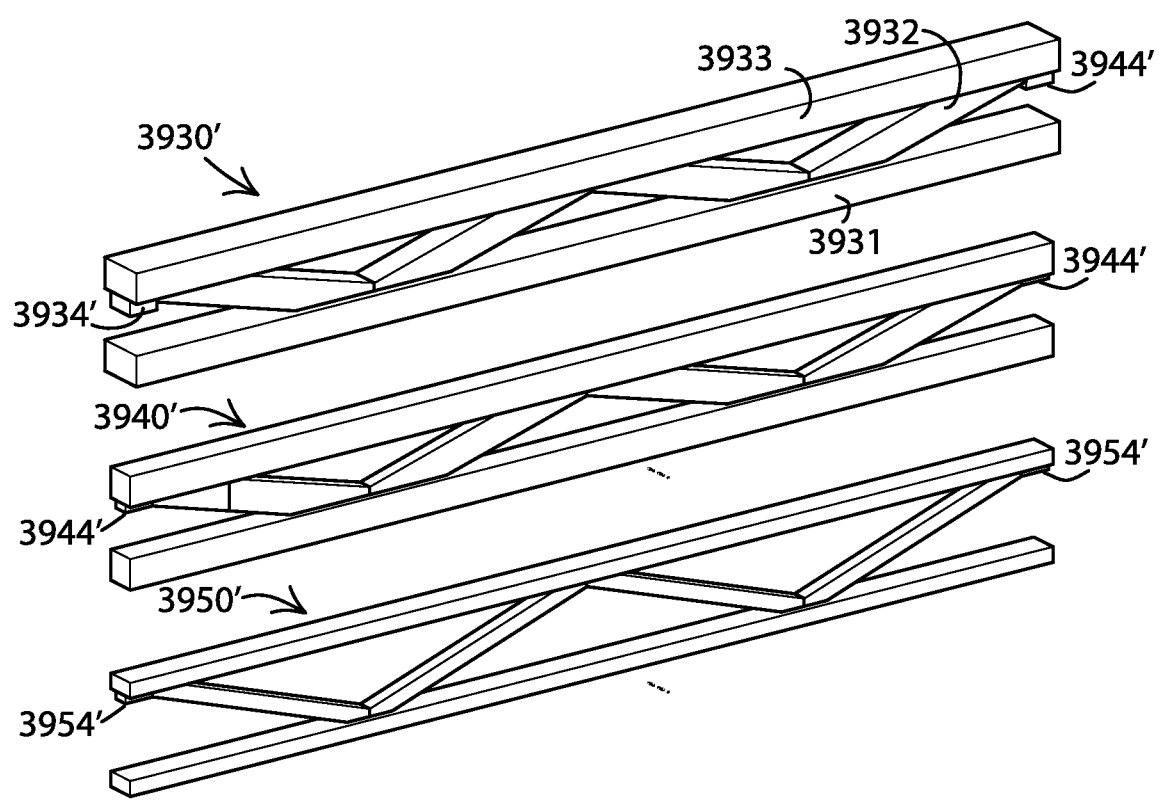

FIG. 39B shows frameworks 3930, 3940 and 3950 with the modifiable, terminal straight-direct web members 3934, 3944, 3954 modified into retaining members 3934', 3944', 3954'. Other embodiments of frameworks 3930, 3940, 3950 have fewer, possibly zero, modifiable web members. Other embodiments of frameworks 3930, 3940, 3950 have more than two modifiable web members and do not have retaining members.

FIG. 40 shows a metric path through an apparatus with irregularly shaped passages, cavities, protrusions, edges, and boundaries of the apparatus (shown with black lines). The line 4107 is an approximation to the metric path from point A to point B created with 10 path segments that are each straight lines. The approximate length of the metric path from point A to point B is the sum of the lengths of all 10 path segments. The range of this metric path is the direct distance between points A and B. The span must be calculated using the method described in the definition of span due to the irregularity of the boundaries. Circle 4110 drawn with a dotted line exemplifies one of many circles drawn for the purposing of determining the line of closest approach between a first point, point C for this example, on the uppermost boundary of the apparatus and the lowermost boundary on the apparatus. Circle 4110 is centered on the uppermost boundary and drawn to osculate with the lowermost boundary such that no other circle that osculates with the lowermost boundary has a smaller radius. Circle 4110 is an osculating circle of least radius. The dotted line segment 4108 is the line of closest approach between the point C on the uppermost boundary and the lowermost boundary. The line of closet approach runs from point C, the center of circle 4110 i.e. the osculating circle of least radius, to point D, i.e. the point where the osculating circle of least radius touches the lowermost boundary. The line of closest approach serves as a direction line for the purpose of determining the span according to the definition. The method illustrated by FIG. 41 is only one of more than one method for determining the lines of closest approach between opposing surfaces of an object. The method of determining the lines of closest approach between opposing surfaces for all possible choices of point C on one of the opposing surfaces, or a representative set thereof, also serves to map out the set of direct paths between opposing surfaces of an object. The method of determining a line of closest approach in three dimensions uses an osculating sphere of least radius centered at point C and drawing a line from the center of the osculating sphere of least radius to the point at which the osculating sphere of least radius touches the opposing boundary. In general a three dimensional analysis is required unless an object has planar structure that can be exploited to perform a two dimensional analysis.

FIGS. 41A, 41B, 42A, 42B shows different embodiments of an apparatus with a single framework with a uniform shape or I-beam shape. FIG. 41A shows a 93.5 inch (2375 mm) long, 11.25 inch (280 mm) deep, framework with two 1.5 inch (38 mm) wide, 2.5 inch (64 mm) thick flanges, three 3.5-inch (89 mm) long webs offset by 16 inch (305 mm) and 1.25 inch (32 mm) deep web members spaced by 32 inch (813 mm) that can serve as joist, stud, rafter, or similar building component. FIG. 41B shows a cross section of the framework in FIG. 41A with an I-beam shape created by a 2.5 inch (64 mm) wide top flange and bottom flange and 1.5 inch (38 mm) wide chords and web members in between. FIG. 42A shows the framework in FIG. 41A wherein the web-members in each different web are offset from web members in all other webs. FIG. 42B shows a cross section of the framework in FIG. 41A with a 2.5 inch (64 mm) wide chords and web-members.

Additional Features

One can combine frameworks in many different ways which basically follow the same pattern as timber framing joinery techniques. One can use scarf joints, fingerjoints, finger-scarfing joints, mortise and tenon joints, miter joints, concealed miter joints, dovetail joints, Japanese-type joints, simple lap joints to name a few. The joint patterns can be applied in the longitudinal, normal, and lateral directions to lock the frameworks together. Fasteners such as truss plates, mending plates, cables, chain, rope, string, lashing, straps, ties, collars, screws, nails, and dowels can be used to secure frameworks to each other and other structural components. The open architecture of the frameworks allows for rivets, rivnuts, clinched nails, nuts, and bolts to be used to similar effect and provides an advantage over solid framing members to use these types of fasteners. One can angle fasteners depending on the application. One can add features such as actuators, adhesive, apertures, bearings, bushings, buttons, clasps, conduit, cords, cranks, detachable frames, dials, electrical wire, electronic elements, film, flanges, flashing, gaskets, guides, handles, hanging mechanisms, hardware characteristic of doors, hardware characteristic of windows, hinges, holes, hoses, indentations, indicators, insulative mullions, kick plates, knobs, lights, locks, lubricant, metal pieces, mirrors, molding, mullions, o-rings, pipes, pockets, protrusions, rabbets, retractable cords, retractors, screens, sealant, seals, sensors, shades, sheathing, solvents, springs, transparent materials, trim, tubing, valves, weather stripping, wheels, and wire. Another example is adding a concave curvature to the outermost chords of a wall truss to flatten the seams between drywall pieces that fall over a stud-like framework. Another example is cutting the frameworks into smaller pieces to produce battens, furring strips, and backer boards for floating drywall pieces that do not fall over stud-like framework. Another example is applying adhesives, fire-retardants, and other coatings to frameworks, low-emissivity coatings (particularly window panes). Radiant barrier can be applied in the intra-framework, inter-framework cavities, surfaces of a framework. The ideas of cross-laminated timber, dowel-laminated timber, nail-laminated timber, structural-composite lumber, laminated-veneer lumber, laminated-strand lumber, oriented-strand lumber, can be applied to many of the present embodiments. One can exploit differences in moisture content when using dowels or floating tenons to make intra-framework and inter-framework connections. One can mill, plane, route, and cut to customize the shape of manufactured frameworks. One can customize the frameworks on-site by cutting a piece off one framework and fastening it to another. The references cited teach many ideas that can combine with the present embodiments to produce a wide array of other embodiments. Generally any variation described herein for one framework can be applied to any other framework.

Universal Possibilities

The $\tilde{x}$, $\tilde{y}$, and $\tilde{z}$ axes of a framework can have any arbitrary alignment with respect to a set of fixed reference axes x, y, and z. A framework can have any arbitrary yaw, pitch, or roll and any arbitrary orbital yaw, orbital pitch, or orbital roll. For instance a structurally insulative stud is an embodiment of an insulative, insulatable framework with its $\tilde{y}$ axis oriented parallel to the vertical y direction defined by gravity. Whereas the same framework oriented with its $\tilde{y}$ axis perpendicular to the vertical y direction defined by gravity becomes a top plate or bottom plate. Rolling the framework 90° transforms the framework into a joist. Embodiments can be joined with one another. The strongest axis $\underline{Y}$ of a material that constitutes of a web member can run parallel to the longitudinal $\tilde{y}$ direction of web member, often enhancing strength, or substantially non-parallel or even perpendicular to the longitudinal direction of a web member, often enhancing insulative resistance. In summary the strongest axis $\underline{Y}$ of a material can align in any direction relative to the longitudinal direction of a web member or any other structural part. A structural member can be flanged. The lateral width of a structural member can be greater than that of web members or vice versa. All key geometric parameters for any given structural part can be customized relative to all other structural parts. Key geometric parameters are lateral width, normal depth, longitudinal length, surface qualities, joint structure, shape, twistedness, cuppedness, bowedness, crookedness, kinkiness, smoothness, roundness, squareness, curviness, flatness, planarity. etc. as non-limiting examples. The density of wood, as a non-limiting example of the base material from which a framework is made, can be higher in certain places. Physical parameters such as density can be customized for any given structural part. For instance one part could have a higher density or moisture content. Higher density material at joints between structural parts represents one way of increasing strength of the joint and the overall structure by extension. The structurally insulative resistance of any material can be enhanced by selectively removing linkages between adjacent elongate structural members. A chemical compound can be engineered to selectively bind at specific sites and/or resist binding at other sites such that a material naturally assembles into an embodiment of the present invention.

The disclosed embodiments can be manufactured with available methods of manufacturing and future methods of manufacturing. The disclosed embodiments can be manufactured with currently available materials and materials developed in the future. A non-limiting non-exhaustive list of materials includes: metal, ceramics, carbon compounds, carbon nanotubes, graphene, graphite, wood fiber, nanomaterial, nanocrystals, wood, artificial wood, composite materials, wood/plastic composite material, wood-based materials, FRP, fiber-reinforced plastic (FRP), plastic, carbon fiber, kevlar, fiberglass, structural composite, composite plastic, ceramic, glass, polymer, autoclaved aerated concrete, concrete, stone, brick, compressed earth, mineral, glass, crystalline material, elemental material, colloidal material, transparent material, textile, nanomaterials, biomaterials, composite material, metal, alloy of metals, semiconductor material, structural material, rigid insulation, foam, elements, minerals, chemicals, chemical compounds, insulation The disclosed embodiments can be engineered and manufactured for all forms of energy. A non-limiting list of methods for manufacturing insulatable, insulative framework apparatuses includes: 3D printing, 3D printing with pumped concrete, additive manufacturing, carpentry, carving, casting, chemical deposition, CNC machining, coating, cutting, directed extrusion, dowel lamination, electron beam forming, etching, extrusion, fastening parts with nails, fastening parts with screws, fastening parts together with truss plates, forging, forming, friction welding, future industrial process, future manufacturing process, gluing, joinery, joining, lamination with adhesive, lamination, laser ablation, laser etching, lashing, machining, masonry, microwave heated pressing, milling, molding, nail lamination, permanently clamping and gluing, plasma cutting, plating, pottery, preheated prepressing, pressing, pultrusion, robotic assembly, routing, screw lamination, selective removal of pre-existing material to form a new material with greater structural insulation factor, self-assembly, sintering, soldering, sputtering, stamping, steam-injection pressing, subtractive manufacturing, temporarily clamping and gluing, turning, water-jet cutting, weaving, and welding.

Parameters and Ranges

In embodiments, when the apparatus is a building element selected from the group consisting of: a stud, king stud, plate, top plate, bottom plate, sole plate, sill plate, cripple stud, post, beam, joist, rafter, jack, header, window buck, door buck, window, and door, the minimum rangewise indirectness between the interior face and the exterior face of the building element is non-zero. This means that the apparatus does not provide a direct path nor a straight diagonal path for the conductive flow of energy between the interior facing surface of the outermost structural parts of the framework contained in the apparatus. The global minimum spanwise indirectness between the interior face and the exterior face of the building element is greater than 0%. This means that the apparatus provides no direct path for the conductive flow of energy between the interior face and exterior face of the building. The uniformity of global indirectness between the first feature and the second feature has a value of about 0.074 to about 0.962, or about 0.222 to about 0.814, or about 0.370 to about 0.666.

In embodiments, when the framework apparatus is a building element selected from the group consisting of: a stud, joist, rafter, jack, header, window buck, door buck, window, and door, the minimum rangewise indirectness between the interior-facing surfaces of the outermost structural parts of the framework is non-zero. The global minimum path resistance between the first feature and the second feature has a value of about 3.5 to about 72° F.·ft$^2$·hr per BTU, equivalently about 0.61 (° C.·m$^2$)/W to about 12.7 (° C.·m$^2$)/W, or about 4.5 to about 22° F.·ft$^2$·hr per BTU, equivalently about 0.79 to about 3.9 (° C.·m²)/W, or about 5.0 to about 12° F.·ft²·hr per BTU, equivalently about 0.88 to about 2.1 (° C.·m²)/W.

In embodiments, when the building element is a roof truss with a global minimum spanwise indirectness greater than 0 (0%) between the top surface of a layer of insulation on the floor of an attic created by the roof truss and the bottom chord of the truss, the maximum and minimum indirectness have values of: about equal to about 200% of being equal, or about 10% to about 150% of being equal, or about 25% to about 100% of being equal, or about 50% to about 75% of being equal.

Methods

Method 1 (Designing/Building an Insulative, Insulatable Framework Apparatus)
1. Optimize the length of the most direct metric path, i.e., the most direct path through the structural material alone excluding the surrounding space and non-structural material.
2. Optimize the cumulative distance between structural members encountered along the most direct metric path.
3. Iterate on 1 and 2 by adjusting the number of structural parts and geometry of structural parts until achieving satisfactory results Note: the identity of the most direct metric path and longest direct path can change during the process
wherein the criteria for optimization are:
1. strength of the framework apparatus
2. least resistance Ra along any path through the framework apparatus, wherein Ra is the lesser of values R1 and R2 as defined in the definitions below.
3. optional constraints like: structural strength, cost effectiveness, level of thermal bridging, resistance along the most direct metric path, resistance along the longest direct path, resistance along the shortest direct path, resistance along the shortest or longest direct path in the same bundle as the most direct metric path, level of structural redundancy (for resistance to fire, corrosive chemicals, earthquake, hurricane, wild fire, ballistics, military attack, etc)

and adjusting geometry includes but is not limited to:
1. modifying the relative position of structural parts
2. modifying the dimensions of structural parts
3. modifying the cross sectional shape of structural parts (circular, rectangular, trapezoidal, triangular)
4. modifying the cross sectional shape of cavities (circular, ellipsoidal, rounded-corner rectangular, rectangular, stadium-shaped, trapezoidal, triangular)

Method 2 (Designing/Building Insulated Barriers Such as Frameworks, Panels, Walls, Roofs, Floors, Etc)
Same as method 1 with one additional criterion:
4. targeted resistance Ro for the whole barrier Method 3
same as method 2 wherein the targeted resistance Ro is the resistance Rb along the longest direct path through the non-intervening material within the barrier Method 4
Method 4 is the same as method 2 wherein the targeted resistance is a minimum required value of Rci Method 5
To achieve a code-minimum R-value [1] for a two-chord truss, three-chord truss, or any N-chord truss
1. $r2=(Rci+Rstd-Rextra)/L2 \Leftrightarrow L2=(Rci+Rstd-Rextra)/r2 \Leftrightarrow M=sqrt(((Rci+Rstd-Rextra)/r2/S)^2-1) \Leftrightarrow \Delta x$=forthcoming formula
2. $r1=(Rn+Rci-Rextra)/L1 \Leftrightarrow L1=(Rn+Rci-Rextra)/r2$ Method 6
To practically eliminate thermal bridging for a two-chord truss with diagonal webs:
1. the slope of diagonal web-members in a truss should approximately equal r2/rb.
2. r1>rb>r2

Method 7
To practically eliminate thermal bridging for a three-chord truss with diagonal webs:
1. the slope of the shortest line segment through a middle chord of a three-chord framework between web-members attached to opposite sides of the middle chord should approximately equal r2/rb
2. r1>rb>r2

Variations on Methods 1-7
1. Instead of the most direct metric path use the most medial metric path, i.e., the most medial metric path within the same bundle as the most direct metric path.
2. Instead of the most direct metric path use the longest metric path, i.e., the longest metric path within the same bundle as the most direct metric path.
3. Instead of the most direct metric path length use the most direct metric path resistance.
4. Instead of the most direct metric path length use the most medial metric path resistance.
5. Instead of the most direct metric path length use the longest metric path resistance.
6. Instead of cumulative distance between structural members encountered along the most direct metric path use the cumulative thickness of structural material crossed by the longest direct path
7. Instead of cumulative distance between structural members encountered along the most direct metric path use the cumulative web member thickness for web members encountered along the most direct metric path.
7. Instead of cumulative distance between structural members encountered along the most direct metric path use the cumulative web member thickness for web members encountered along the metric path of interest.
8. Instead of cumulative distance between structural members encountered along the most direct metric path use the longest direct path resistance
9. Similar variations changing the metrics.

Definitions Related to Methods 1-7
Ra: the lesser of values R1 and R2.
R1: resistance along the longest direct path through the structural material of the framework and any intervening material.
R2: resistance along the longest direct path through the structural material alone.
Rb: (in the context of a direct path through a framework apparatus installed in a barrier) resistance along the longest direct path through the non-intervening material within the barrier (barrier-cavity insulation)
Rn: 1. R-value of non-continuous insulation required by the ICC building code such as "13" in the "13+5" standard or "20" in the "20+5" standard [5].
Rci: 1. the R-value of continuous insulation required by the ICC building code such as "+5" in the "13+5" standard or "+10" in the "13+10" standard [5].
Rextra: 1. Rtotal-Ra, 2. the R-value of extra material, outside the framework, intersected by the longest direct path between the outer surface and inner surface of a barrier that overlaps the most direct metric path.

Rtotal: 1. R-value along the longest direct path between the outer surface an inner surface of a barrier that overlaps the most direct metric path.
code-minimum R-value: 1. Rn+Rci where Rn is 13 and Rci is 10 in the 13+10 standard for example.
Rstd: 1. standard R-value associated with the relevant framing member for a code-minimum R-value such as 3.5° F.·ft²·hr/BTU, or 0.62 (° C.·m²)/W, associated with a 3.5 inch (89 mm) deep wood stud associated with the 13+5 standard [5], 2. rstd multiplied by depth of the relevant framing member associated with a code-minimum standard such as a 3.5 inch (89 mm) deep wood stud associated with the 13+5 standard [5].
rstd: 1. standard thermal resistivity value associated with the relevant framing member for a code-minimum standard such as 1° F.·ft²·hr per BTU per inch, or 6.9 (° C.·m)/W, associated with a 2×4 wood stud associated with the 13+5 standard [5].
r1: R1 divided by L1
r2: R2 divided by L2
ra: ra divided by La
rb: Rb divided by Lb
L1: path length of the longest direct path through the structural material of the framework and any intervening material.
L2: path length of the most direct metric path
La: path length of the path associated with Ra
Lb: path length of the longest direct path through the non-intervening material within the barrier (barrier-cavity insulation)
M: slope of diagonal web-members in a two-chord truss
cumulative distance between structural members: 1. (in the context of a metric path) the sum of distances between each pair of structural members as measured along the metric path.
directness: (in the context of a metric path with a length and a span) span divided by length
direct path: 1. path through the structural material of a framework and any intervening material with a directness value of 1.
most direct metric path: 1. path through the structural material of the framework that has the least value of directness, 2. path through the structural material of the framework that has the least span-to-length ratio.
most direct metric path: 1. most direct path through the structural material of a framework bypassing any intervening material, 2. path through the structural material of a framework bypassing any intervening material with the least value of directness.
most direct path: 1. path through the structural material of the framework and any intervening material that has the least value of directness
longest direct path: longest direct path through the structural material of a framework and any intervening material
resistance: 1. areal thermal resistance, 2. R-value measured in Imperial units of ° F.·ft² per BTUh or (° F.·ft²·hr)/BTU and metric units Kelvin by square meter per Watt, 3. areal resistance associated with any form of energy transfer
resolution: 1. (in the context of a metric path) span of the metric path divided by the path length of the subpath through the structural part with the least length measured along the metric path.
path: 1. (in the context of a specified resolution) path as determined to the specified resolution, 2. (in the context of a resolution that is not explicitly specified) path as determined to a resolution of 1000, 3. (in the context of a resolution that is not explicitly specified but inferable by context) path as determined to a resolution inferred by context.
span-to-length ratio: (in the context of a path with a span and a path length) the path length divided by the span.
Δx: (in the context of a three-chord truss with web members) spacing between web-members attached to opposite sides of the middle chord.

Method 8 is a method of making and/or using an apparatus with an improved value of minimum spanwise indirectness for at least one metric path between a first feature and second feature relative to a building component of prior art. The method involves reducing thermal bridging by increasing rangewise indirectness, controlling thermal bridging by controlling rangewise indirectness, increasing spanwise indirectness, and/or controlling spanwise indirectness. In embodiments, the method involves increasing spanwise indirectness along metric paths and equalizing the spanwise indirectness along metric subpaths. In some cases, the method comprises controlling spanwise indirectness along metric paths and equalizing the spanwise indirectness along metric subpaths.

Method 9 is a method of manufacturing an apparatus described herein by pultrusion and intermittent insertion and removal of at least one barrier during the pultrusion process in order to create the cavities. In some cases, the apparatus is manufactured by extrusion and intermittent insertion and removal of at least one barrier during the extrusion process in order to create the cavities.

Method 10 is a method of building a house with crisscrossing furring strips and the apparatus described herein so as to produce a nonzero spanwise indirectness between the inside and outside of the house.

Method 11 is a method of designing buildings by calculating indirectness for the minimized paths and minimized subpaths through the frame of the building;

Method 12 is a method of manufacturing an apparatus described herein wherein structural members with cooperative finger joints join to form the whole apparatus. In embodiments, structural members with cooperative finger joints join to form the whole apparatus wherein the finger joints are cut with a saw; and/or structural members with cooperative finger joints join to form the whole apparatus wherein the finger joints are stamped with a stamping tool with the shape of the negative space of the finger joints. Strands of lumber are arranged into a mat with the shape of the apparatus and then pressed into a structural component, and/or veneers of lumber are pressed into a mat with the shape of the apparatus and then pressed into a structural component.

Method 13 is a method of calculating spanwise indirectness for one or more metric paths through a building frame.

Method 14 is a method of calculating rangewise indirectness for one or more metric paths through a building frame.

Method 15 is a method of simultaneously maximizing the adiabatic one-dimensional model of effective resistance in combination with maximizing the spanwise indirectness calculated using the methods described herein.

Method 16 is a method of simultaneously maximizing the adiabatic one-dimensional model of effective resistance in combination with maximizing the rangewise indirectness calculated using the methods described herein.

ADDITIONAL EMBODIMENTS DISCLOSED HEREIN

Embodiment A is an apparatus comprising: a matrix of structure arrays (the structure matrix), a matrix of web arrays (the web matrix), the structure matrix comprising one or more structure arrays (the structure arrays) and the web matrix comprising one or more web arrays (the web arrays). Each of the web arrays comprises one or more webs (the webs), each of the structure arrays comprising three or more structural members (the structural members), and each of the webs comprising one or more web members (the web members). Every two sequential structural members in every structure array forming a doublet array of first and second structural members and an intervening cavity. Every three sequential structural members in every structure array forming a triplet array of first, second, and third structural members. The web matrix is configured to give a non-zero rangewise indirectness for the shortest metric path along which energy can flow between the first and third structural members of at least one triplet array containing only structural members from the first structure array of the structure matrix. In embodiments, the web matrix is configured to give a non-zero rangewise indirectness for the shortest metric path along which energy can flow between the first and third structural members of at least one triplet array containing only structural members from the first structure array of the structure matrix.

Embodiment B is an apparatus comprising: a framework array, a structure matrix, and a web matrix. The framework array comprising one or more frameworks, and each of the frameworks comprising one or more structure arrays. The structure matrix comprising one or more structure arrays (the structure arrays), the web matrix comprising one or more web arrays (the web arrays), and each of the web arrays comprising one or more webs (the webs). Each of the structure arrays comprises three or more structural members (the structural members), and each of the webs comprising one or more web members (the web members). Every two sequential structural members in every structure array form a doublet array and an intervening cavity of first and second structural members, and every three sequential structural members in every structure array forming a triplet array of first, second, and third structural members.

In some cases, the web matrix is configured to give a non-zero rangewise indirectness for the shortest metric path along which energy can flow between the first and third structural members of at least one triplet array containing only structural members from the first structure array of the structure matrix. In embodiments, the web matrix is configured to give a non-zero rangewise indirectness for the shortest metric path along which energy can flow between the first and third structural members of at least one triplet array containing a structural member from two different structural arrays. This embodiment includes a structural member array, the first array, a web array, the second array, the cardinality of the first array being three or more, the cardinality of the second array being two or more, each web array comprising one or more web members, the first array structural members being spaced apart, every two adjacent structural members in the first array forming an adjacent pair, every first-array structural member adjacent to any adjacent pair forming an adjacent trio, every adjacent pair forming an intervening cavity, with each web contributing an increase in the rangewise indirectness.

Embodiment C—(See FIGS. 38A, 38B, 38C, 38D, 38E, 38F) Inherently Biaxial Framework Apparatus; Three Structural Members Minimum in at Least 1 Framework Embodiment C is an apparatus comprising an structural parts and a matrix of intraframework cavities, each intraframework cavity defined by a pair of structural parts, the structural parts comprising an array (1) of frameworks, the array of frameworks comprising at least one framework (1a), each framework comprising an array of structural members (2) and an array of webs (3),—the array of structural members within each framework comprising one or more than one structural member (2a), and the array of structural members within at least one framework comprising three or more structural members. Every two adjacent structural members within every framework forms a structural-member pair (4) of first and second structural members, and every two adjacent frameworks forms a framework pair (5) of first and second frameworks. Every three adjacent structural members within a framework forms a structural-member trio of first, second, and third structural members, and every three adjacent frameworks forms a framework trio of first, second, and third frameworks. Every array of webs comprises one intranetworking web (3a) for each structural-member pair and one internetworking web (3b) for each framework pair. Each intranetworking web for a specified structural-member pair comprises one or more intranetworking-web members. The intranetworking-web members connect the first and second structural members within the specified structural-member pair. Each internetworking web for a specified framework pair comprises one or more internetworking-web members, the internetworking-web members connecting the first and second frameworks of the specified framework pair. The intranetworking webs are configured to give a minimum rangewise indirectness within a statistical range of values for the shortest metric path along which energy can flow between the first and third structural members of one or more than one structural-member trio, the statistical range of values being selected from the group consisting of: greater than 0% but less than 50%, greater than 50% but less than 100%, greater than 100% but less than 120%, greater than 120% but less than 140%, greater than 140% but less than 160%, greater than 160% but less than 180%, greater than 180% but less than 200%, greater than 200% but less than 250%, greater than 250% but less than 300%, greater than 300% but less than 400%, greater than 400% but less than 500%, greater than 500%.

In other embodiments the internetworking webs are configured to give a minimum rangewise indirectness within a statistical range of values for the shortest metric path along which energy can flow between the first and third frameworks of one or more than one framework trio, the statistical range of values being selected from the group consisting of: greater than 0% but less than 50%, greater than 50% but less than 100%, greater than 100% but less than 120%, greater than 120% but less than 140%, greater than 140% but less than 160%, greater than 160% but less than 180%, greater than 180% but less than 200%, greater than 200% but less than 250%, greater than 250% but less than 300%, greater than 300% but less than 400%, greater than 400% but less than 500%, greater than 500%.

Embodiment D—Sandwich 2D Framework Apparatus—See FIG. 6F

Embodiment D is an apparatus comprising an array (1) of frameworks and a matrix of cavities, the matrix of cavities being formed by the array of frameworks in and of themselves ipso facto, the array of frameworks comprising one or more than one framework (1a), each framework comprising an array of structural members (2) and an array of webs (3), the array of structural members within each framework comprising one or more than one structural member (2a).

The array of structural members within at least one framework comprise three or more structural members, every two adjacent structural members within every framework forming a structural-member pair (4) of first and second structural members, and every two adjacent frameworks forming a framework pair (5) of first and second frameworks. Every three adjacent structural members within a framework form a structural-member trio of first, second, and third structural members, and every three adjacent frameworks form a framework trio of first, second, and third frameworks. Every array of webs comprises one intranetworking web (3a) for each structural-member pair. Each web for a specified structural-member pair comprises one or more networking-web members. Each networking-web member connects the first and second structural members within the specified structural-member pair, and each networking-web member connects the first and second frameworks of the specified framework pair. The array of webs is configured to give a maximum rangewise indirectness within a statistical range of values for the shortest metric path along which energy can flow between the first and third structural members of one or more than one structural-member trio. In embodiments, the statistical range of values is as described above in Embodiment C.

Embodiment E—Lattice 2D Framework Apparatus—See FIG. 17B

Embodiment E is an apparatus comprising an array (1) of frameworks and a matrix of cavities. The matrix of cavities is formed by the array of frameworks in and of themselves ipso facto. The array of frameworks comprises one or more than one framework (1a). Each framework comprises an array of structural formations and an array of webs (3), the array of structural formations within each framework comprising one or more structural formations. The array of structural formations within at least one framework comprises three or more structural formations, with each structural formation comprising one or more than one array of structural members (2a). Each array of structural members comprises one or more than one structural member. Every two adjacent structural formations within every framework form a structural-formation pair (4) of first and second structural formations, and every two adjacent frameworks forming a framework pair (5) of first and second frameworks. Every three adjacent structural formations within a framework form a structural-member trio of first, second, and third structural formations, and every three adjacent frameworks forming a framework trio of first, second, and third frameworks. Every array of webs comprises one intranetworking web (3a) for each structural-formation pair and one internetworking web (3b) for each framework pair. Each intranetworking web for a specified structural-formation pair comprises one or more intranetworking-web members, with the intranetworking-web members connecting all structural members in the first and second structural formations within the specified structural-formation pair. Each internetworking web for a specified framework pair comprises one or more internetworking-web members. The internetworking-web members connect the first and second frameworks of the specified framework pair. The intranetworking webs are configured to give a maximum rangewise indirectness within a statistical range of values for the shortest metric path along which energy can flow through one or more than one structural-formation trio between any structural member in the first structural formation and any structural member in the third structural formation. In embodiments, the statistical range of values is as described above in Embodiment C.

In Embodiments C, D, E and F with three or more frameworks in the array of frameworks, the internetworking webs can be configured to give a maximum rangewise indirectness within a statistical range of values for the shortest metric path along which energy can flow between the first and third frameworks of one or more than one framework trio, the statistical range of values being selected from the group consisting of: greater than 0% but less than 1%, greater than 1% but less than 10%, greater than 10% but less than 20%, greater than 20% but less than 40%, greater than 40% but less than 60%, greater than 60% but less than 80%, greater than 80% but less than 100%, greater than 100% but less than 120%, greater than 120% but less than 140%, greater than 140% but less than 160%, greater than 160% but less than 180%, greater than 180% but less than 200%, greater than 200% but less than 250%, greater than 250% but less than 300%, greater than 300% but less than 400%, greater than 400% but less than 500%, greater than 500%.

In Embodiments C, D, E and F with three or more frameworks in the array of frameworks, the internetworking webs can be configured to give a minimum rangewise indirectness within a statistical range of values for the shortest metric path along which energy can flow between the first and third frameworks of one or more than one framework trio, the statistical range of values being selected from the group consisting of: greater than 0% but less than 1%, greater than 1% but less than 10%, greater than 10% but less than 20%, greater than 20% but less than 40%, greater than 40% but less than 60%, greater than 60% but less than 80%, greater than 80% but less than 100%, greater than 100% but less than 120%, greater than 120% but less than 140%, greater than 140% but less than 160%, greater than 160% but less than 180%, greater than 180% but less than 200%, greater than 200% but less than 250%, greater than 250% but less than 300%, greater than 300% but less than 400%, greater than 400% but less than 500%, greater than 500%

In Embodiments C, D, E and F with one framework in the array of frameworks, the intranetworking web of the framework being configured to give a maximum rangewise indirectness within a statistical range of values for the shortest metric path along which energy can flow between the first and third structural members of one or more than one structural-member trio, the statistical range of values being selected from the group consisting of: greater than 0% but less than 1%, greater than 1% but less than 10%, greater than 10% but less than 20%, greater than 20% but less than 40%, greater than 40% but less than 60%, greater than 60% but less than 80%, greater than 80% but less than 100%, greater than 100% but less than 120%, greater than 120% but less than 140%, greater than 140% but less than 160%, greater than 160% but less than 180%, greater than 180% but less than 200%, greater than 200% but less than 250%, greater than 250% but less than 300%, greater than 300% but less than 400%, greater than 400% but less than 500%, greater than 500%.

In embodiments C, D, E and F with one framework in the array of frameworks, the intranetworking web of the framework being configured to give a minimum rangewise indirectness within a statistical range of values for the shortest metric path along which energy can flow between the first and third structural members of one or more than one structural-member trio, the statistical range of values being selected from the group consisting of: greater than 0% but less than 1%, greater than 1% but less than 10%, greater than 10% but less than 20%, greater than 20% but less than 40%, greater than 40% but less than 60%, greater than 60% but less than 80%, greater than 80% but less than 100%, greater than 100% but less than 120%, greater than 120% but less than 140%, greater than 140% but less than 160%, greater than 160% but less than 180%, greater than 180% but less than 200%, greater than 200% but less than 250%, greater than 250% but less than 300%, greater than 300% but less than 400%, greater than 400% but less than 500%, greater than 500%.

In embodiments C, D, E and F with one framework in the array of frameworks, the intranetworking web of the framework being configured to give a maximum spanwise indirectness within a statistical range of values for the flow of energy between the first and third structural members of one or more than one structural-member trio, the statistical range of values being selected from the group consisting of: greater than 0% but less than 1%, greater than 1% but less than 10%, greater than 10% but less than 20%, greater than 20% but less than 40%, greater than 40% but less than 60%, greater than 60% but less than 80%, greater than 80% but less than 100%, greater than 100% but less than 120%, greater than 120% but less than 140%, greater than 140% but less than 160%, greater than 160% but less than 180%, greater than 180% but less than 200%, greater than 200% but less than 250%, greater than 250% but less than 300%, greater than 300% but less than 400%, greater than 400% but less than 500%, greater than 500%.

In embodiments C, D, E and F with one framework in the array of frameworks, the intranetworking web of the framework being configured to give a minimum spanwise indirectness within a statistical range of values for the flow of energy between the first and third structural members of one or more than one structural-member trio, the statistical range of values being selected from the group consisting of: greater than 0% but less than 1%, greater than 1% but less than 10%, greater than 10% but less than 20%, greater than 20% but less than 40%, greater than 40% but less than 60%, greater than 60% but less than 80%, greater than 80% but less than 100%, greater than 100% but less than 120%, greater than 120% but less than 140%, greater than 140% but less than 160%, greater than 160% but less than 180%, greater than 180% but less than 200%, greater than 200% but less than 250%, greater than 250% but less than 300%, greater than 300% but less than 400%, greater than 400% but less than 500%, greater than 500%.

Embodiment F—Two Structural Members Minimum in at Least 1 Framework

Embodiment F is an apparatus comprising an array (1) of frameworks and a matrix of cavities, the matrix of cavities being formed by the array of frameworks in and of itself ipso facto. The array of frameworks comprises one or more than one framework (1*a*), with each framework comprising an array (2) of structural members and an array (3) of webs. The array of structural members within each framework comprises one or more than one structural member (2*a*). The array of structural members within at least one framework comprises two or more structural members. Every two adjacent structural members within every framework forms a structural-member pair (4) of first and second structural members, and every two adjacent frameworks form a framework pair (5) of first and second frameworks. Every three adjacent structural members within a framework form a structural-member trio of first, second, and third structural members, and every three adjacent frameworks forming a framework trio of first, second, and third frameworks. Every array of webs comprises one intranetworking web (3*a*) for each structural-member pair and one internetworking web (3*b*) for each framework pair, each intranetworking web for a specified structural-member pair comprising one or more intranetworking-web members. The intranetworking-web members connect the first and second structural members within the specified structural-member pair. Each internetworking web for a specified framework pair comprises one or more internetworking-web members. The internetworking-web members connect the first and second frameworks of the specified framework pair. The intranetworking webs are configured to give a maximum rangewise indirectness within a statistical range of values for the shortest metric path along which energy can flow between the first and second structural members of one or more than one structural-member pair. In embodiments, the statistical range of values is as described above in Embodiment C.

Embodiment G—Sandwich 2D Framework Apparatus

Embodiment G is an apparatus comprising an array (1) of frameworks and a matrix of cavities, the matrix of cavities being formed by the array of frameworks in and of themselves ipso facto, the array of frameworks comprising one or more than one framework (1*a*), each framework comprising an array of structural members (2) and an array of webs (3), the array of structural members within each framework comprising one or more than one structural member (2*a*). The array of structural members within at least one framework comprise two or more structural members. Every two adjacent structural members within every framework form a structural-member pair (4) of first and second structural members, and every two adjacent frameworks forming a framework pair (5) of first and second frameworks. Every three adjacent structural members within a framework form a structural-member trio of first, second, and third structural members, and every three adjacent frameworks form a framework trio of first, second, and third frameworks. Every array of webs comprises one intranetworking web (3*a*) for each structural-member pair. Every intranetworking web in the array of webs additionally may be an internetworking web. Each web for a specified structural-member pair comprises one or more networking-web members. Each networking-web member connecting the first and second structural members within the specified structural-member pair. Each networking-web member connects the first and second frameworks of the specified framework pair. The array of webs is configured to give a maximum rangewise indirectness within a statistical range of values for the shortest metric path along which energy can flow between the first and third structural members of one or more than one structural-member trio. In embodiments, the statistical range of values is as described above in Embodiment C.

Embodiment H—Lattice 2D Framework Apparatus

Embodiment H is an apparatus comprising an array (1) of frameworks and a matrix of cavities, the matrix of cavities being formed by the array of frameworks in and of themselves ipso facto, the array of frameworks comprising one or more than one framework (1*a*), each framework comprising an array of structural formations and an array of webs (3), the array of structural formations within each framework comprising one or more structural formations. The array of structural formations within at least one framework comprise two or more structural formations. Each structural formation comprises one or more than one array of structural members (2a). Each array of structural members comprises one or more than one structural member, every two adjacent structural formations within every framework form a structural-formation pair (4) of first and second structural formations, and every two adjacent frameworks form a framework pair (5) of first and second frameworks. Every three adjacent structural formations within a framework form a structural-member trio of first, second, and third structural formations, and every three adjacent frameworks forming a framework trio of first, second, and third frameworks. Every array of webs comprises one intranetworking web (3a) for each structural-formation pair and one internetworking web (3b) for each framework pair. Each intranetworking web for a specified structural-formation pair comprises one or more intranetworking-web members, the intranetworking-web members connecting all structural members in the first and second structural formations within the specified structural-formation pair. Each internetworking web for a specified framework pair comprises one or more internetworking-web members, the internetworking-web members connecting the first and second frameworks of the specified framework pair.

The intranetworking webs are configured to give a maximum rangewise indirectness within a statistical range of values for the flow of energy through one or more than one structural-formation trio between any structural member in the first structural formation and any structural member in the third structural formation. In embodiments, the statistical range of values is as described above in Embodiment C. The indirectness ranges are as described in Embodiment E.

In embodiments, one or more than one framework member is an element selected from the group consisting of a collection of fibers, a collection of strands, a collection of threads, a collection of laminations, and a collection of veneers. In some cases, the framework is a solid formwork with a series of contiguous tunnels.

Embodiment I—Explicitly Uniaxial and Implicitly Multiaxial Framework Apparatuses Embodiment I is an apparatus comprising two or more cavities, comprising a body, and a set of body members, the body exhibiting a set of metric paths and a first subset of metric paths. The set of body members comprises three or more structural members, including first, second, and third structural members, spaced apart from one another, two or more web members, including first and second web members, each connecting at least one of the three or more structural members to an adjacent structural member in a fixed positional relationship under self loading conditions, and together ensuring that every one of the three or more structural members is connected to the apparatus. The apparatus includes two or more webs, including a first and second web, each comprising one or more of the two or more web members, the first web more specifically comprising the first web member, each web member in the first web at least connecting the first and second structural members, the second web more specifically comprising the second web member, each web member in the second web at least connecting the second and third structural members. Each metric path in the first subset of metric paths is defined by the shortest path along which energy can flow through the body between a first end point, that is, any point on the first structural member and a second end point, that is, any point on the third structural member represented by a set of path segments with a sufficiently large cardinality. Each metric path is characterized by a range, a path length, and a rangewise indirectness equal to the path length divided by the range minus one. The first subset of metric paths is characterized by a first subset maximum rangewise indirectness equal to the maximum value of the rangewise indirectness for each and every path therein. The first and second webs are configured to give a first subset maximum rangewise indirectness greater than zero. The first and second webs are configured to give a value greater than zero for a statistical quantity selected from the group consisting of: maximum value of rangewise indirectness, minimum value of rangewise indirectness, maximum value of spanwise indirectness, and minimum value of spanwise indirectness.

Embodiment J—Explicitly Uniaxial and Implicitly Multiaxial Framework Apparatuses Embodiment J is an apparatus comprising: a body with five or more body members, a first subset of the five or more body members, three or more structural members each of which is one of the five or more body members, two or more metric paths, a first subset of the two or more metric paths, two or more pairs of adjacent structural members comprising a first paired member of the three or more structural members and a second paired member of the three or more structural members, adjacent to the first paired member. The apparatus further includes two or more web members, each of which is one of the five or more body members and connects a pair from the set of two or more pairs of adjacent structural members together in a fixed positional relationship under self loading conditions such that the first paired member does not touch the second paired member, and two or more webs, each of which comprises one or more of the two or more web members. The apparatus exhibits two or more span direction line candidates, a first subset of the two or more span direction line candidates, two or more span direction lines, a first subset of the two or more span direction lines, two or more statistics, and a first subset of the two or more statistics. The first subset of the five or more body members comprises: a first structural member of the three or more structural members, a second structural member of the three or more structural members that is offset away from the interior of the first structural member, a third structural member of the three or more structural members that is offset away from the interior of the first structural member to a greater extent than the second structural member, a first web member of the two or more web members that connects the first structural member to the second structural member, and a second web member of the two or more web members that connects the second structural member to the third structural member, a first of the two or more webs, that comprises one or more of the two or more web members including the first web member each of which connects the first structural member to the second structural member, a second of the two or more webs, that comprises one or more of the two or more web members including the second web member each of which connects the second structural member to the third structural member, wherein the set of the two or more metric paths, the first subset of the two or more metric paths, the set of the two or more span direction line candidates, the first subset of the two or more span direction line candidates, the set of the two or more span direction lines, and the first subset of the two or more span direction lines have a cardinality that is large enough to achieve any required accuracy for the calculation of any dependent quantities.

Each candidate in the first subset of the two or more span direction line candidates is a line that runs through an initial point, that is any point on the surface of the first structural member and a reflection point, that is the point of closest approach between the initial point and the third structural member wherein each span direction line in the first subset of the two or more span direction lines is a line based upon a candidate in the first subset of two or more span direction line candidates and runs through an origination point, that is the point of closest approach between the reflection point of the candidate and the first structural member and a termination point, that is the point of closet approach between the origination point and the third structural member.

Each path in the first subset of the two or more metric paths is the shortest path, that is fully confined to the body, between a first end point, that is one origination point from the first subset of the two or more span direction lines, and a second end point, that is one termination point from the first subset of two or more span direction lines and is approximated by a set of path segments with a cardinality large enough to achieve any required accuracy for the calculation of any dependent quantity. Each path exhibits a range defined as the distance between the first end point and the second end point; a path length that is approximated as the sum total of each segment length for the set of path segments; a rangewise indirectness equal to a difference, that is the path length minus the range, divided by the range, wherein the first subset of statistics comprises a first subset maximum rangewise indirectness equal to the maximum value of each and every rangewise indirectness for the first subset of the two or more metric paths, such that, the first subset maximum rangewise indirectness is greater than zero.

Embodiment K—Explicitly Uniaxial and Implicitly Multiaxial Framework Apparatuses, Three Structural Members Minimum, Triplets Embodiment K is an apparatus comprising: two or more cavities, first, second, and third structural members, spaced apart from one another, first and second webs, each layer comprising one or more structural members, the first and second webs each comprising one or more web members, each web member in the first web connecting one or more structural members in the first layer to one or more structural members in the second layer, each web member in the second web connecting one or more structural members in the second layer to one or more structural members in the third layer. Each web member in the first and second webs is configured to give a dimensional constraint selected from the group comprising: a greater than 0 value of maximum rangewise indirectness, a greater than 0 value of minimum rangewise indirectness, a greater than 0 value of maximum spanwise indirectness, and a greater than 0 value of minimum spanwise indirectness, for the flow of energy along the associated metric paths between any point at the interface of the first structural member with the first or more web members, and any point on the third structural member.

Embodiments L, M N O and P—Uniaxial—Three Structural Members Minimum in 1D Framework Embodiment L is an apparatus comprising: first, second, and third structural members, spaced apart from one another, a first web member connecting the first structural member to the second structural member, a second web member connecting the second structural member to the third structural member, the first and second web members being configured to give a maximum rangewise indirectness greater than zero for the shortest metric path along which energy can flow between any point on the first structural member and any point on the third structural member.

Embodiment M is an apparatus comprising: first, second, and third structural members, spaced apart from one another, a first web member or more web members connecting the first structural member to the second structural member, a second web member or more web members connecting the second structural member to the third structural member, the first web member or more web members and the second web member or more web members being configured to give a maximum rangewise indirectness greater than zero for the shortest metric path along which energy can flow between any point on the first structural member and any point on the third structural member.

Embodiment N is an apparatus comprising first, second, and third structural members, spaced apart from one another, a first web member or more web members connecting the first structural member to the second structural member, a second web member or more web members connecting the second structural member to the third structural member, the first web member or more web members and the second web member or more web members being configured to give a minimum rangewise indirectness greater than zero for the shortest metric path along which energy can flow between the first structural member and the third structural member.

Embodiment O is an apparatus comprising: first, second, and third structural members, spaced apart from one another, a first or more web members connecting the first structural member to the second structural member, a second or more web members connecting the second structural member to the third structural member, the first or more web members and the second or more web members being configured to give a maximum rangewise indirectness greater than zero for the shortest metric path along which energy can flow between any point at the interface of the first structural member with the first or more web members, and any point on the third structural member.

Embodiment P is an apparatus comprising three or more structural members, two or more webs, and two or more web members, each of the two or more webs comprising at least one of the two or more web members and connecting an adjacent pair of the three or more structural members, that is, a first structural member and an adjacent structural member, exactly one of the two or more webs connecting the first structural member to the adjacent structural member of each pair of structural members.

Embodiments Q, R S and T—Explicitly Uniaxial and Implicitly Multiaxial Two Structural Members Minimum, Doublets Embodiment Q1 is an apparatus comprising: first and second structural members, spaced apart from one another, a first web member connecting the first structural member to the second structural member, the first web member being configured to give a maximum rangewise indirectness greater than zero for the shortest metric path along which energy can flow between any point at the interface of the first web member with the first structural member, and any point on the second structural member.

Embodiment Q2 is an apparatus comprising: first and second structural members, spaced apart from one another, a first web member connecting the first structural member to the second structural member, the first web member being configured to give a minimum rangewise indirectness greater than zero for the shortest metric path along which energy can flow between any point at the interface of the first web member with the first structural member, and any point on the second structural member.

Embodiment R is an apparatus comprising first and second structural members, spaced apart from one another, a first web member connecting the first structural member to the second structural member, the first and second web members being configured to give a minimum rangewise indirectness greater than zero for the shortest metric path along which energy can flow between any point on the first structural member and any point on the second structural member. In embodiments, the "minimum spanwise indirectness" is greater than or equal to 150%±50%, 250%±50%, 350%±50%, 450%±50%, 550%±50%, or 650%±50%.

Embodiment S is an apparatus comprising: first and second structural members, spaced apart from one another, a first web member connecting the first structural member to the second structural member, the first and second web members being configured to give a normalized spread of spanwise indirectness that is less than or equal to 50% for the flow of energy between any point on the first structural member and any point on the second structural member.

Embodiment T is an apparatus comprising: first and second structural members, spaced apart from one another, a first web member connecting the first structural member to the second structural member, the first and second web members being configured to give a uniformity of spanwise indirectness less than or equal to 50% for the flow of energy between any point on the first structural member and any point on the second structural member.

Embodiment U—Triaxial Apparatus—Sandwich Framework

Embodiment U is an apparatus comprising the first apparatus Embodiment L, and further comprising one special additional layer, one or more additional layers, two or more special additional structural members, one or more additional structural members, one or more additional webs, and one or more additional web members wherein the special additional layer comprises three or more special additional structural members, each of the one or more additional layers comprises one or more additional structural members, each of the one or more additional webs comprises one or more of the one or more additional web members, the special additional layer has an index of zero, each of the one or more additional layers has an index greater than zero, each index is an integer between zero and the number of the one or more additional layers, each index greater than one forms a pair of adjacent indices comprising a first index and second index that equals the first index minus one, and each pair of adjacent indices forms a pair of adjacent layers between a first layer, the one of the one or more additional layers with an index equal to the first index in the pair of adjacent indices, and a second layer, the one of the one or more additional layers with an index equal to the second index in the pair of adjacent indices. As a result, each of the two or more webs in the first set of the first apparatus connects to two of the one or more special additional structural members, each one of the one or more additional webs connects each of the one or more additional layers to the third apparatus, and each of the one or more additional web members connects two of the additional structural members in the first layer in a pair of adjacent layers to the second layer in the pair of adjacent layers.

Embodiment V1—Single Solid Body Apparatus

Embodiment V1 is an apparatus in which the material of the apparatus fills each and every seam at the interface between the apparatus members wherein the apparatus members are the structural members and web members to form a solid body with structural-member-like parts and a web-member-like parts.

Embodiment V2 is an apparatus in which the material of the apparatus fills one or more seams, up to a maximum of one fewer than all seams, at the interface between the apparatus members wherein the apparatus members are the structural members and web members.

Embodiment W—Single Solid Body

Embodiment W is a window frame formed by adding a through-going cavity to the framework described in Embodiment L in the spanwise direction. In embodiments, one or more of the apparatus members has a different length than the others wherein the apparatus members are the structural members and web members.

Embodiment X is a framework as described above that is incorporated into a window opening, door opening, penetration, circular opening, portal, insulation cavity, room, chamber, indentation, open cavity, closed cavity, closed cell, capsule, microscopic cavity, nanoscopic cavity, and insignificant cavity.

Embodiment Y is similar to Embodiment L and further includes one special additional layer, one or more additional layers, two or more special additional structural members, one or more additional structural members, one or more additional webs, and one or more additional web members, wherein the special additional layer comprises three or more special additional structural members, each of the one or more additional layers comprises one or more additional structural members, each of the one or more additional webs comprises one or more of the one or more additional web members. In embodiments, the special additional layer has an index of zero, each of the one or more additional layers has an index greater than zero, each index is an integer between zero and the number of the one or more additional layers, each index greater than one forms a pair of adjacent indices comprising a first index and second index that equals the first index minus one, and each pair of adjacent indices forms a pair of adjacent layers between a first layer, the one of the one or more additional layers with an index equal to the first index in the pair of adjacent indices, and a second layer, the one of the one or more additional layers with an index equal to the second index in the pair of adjacent indices As a result, each of the two or more webs in the first set of the first apparatus connects to two of the one or more special additional structural members, each one of the one or more additional webs connects each of the one or more additional layers to the third apparatus, and each of the one or more additional web members connects two of the additional structural members in the first layer in a pair of adjacent layers to the second layer in the pair of adjacent layers. In this embodiment, the first feature is the most distal structural member along a first axis, the second feature is the most proximal structural member along the first axis, the third feature is the most distal structural member along a second axis, the fourth feature is the most proximal structural member along the second axis, and the second axis runs at an angle with respect to the first axis Embodiment Z Embodiment Z is a temporary formwork that contains permanently installed autoclaved aerated concrete blocks arranged in a pattern of cavities for forming a concrete framework by pouring concrete into said formwork such that the concrete framework has a minimum spanwise indirectness of 0.25 (25%) for at least one minimized path between faces of the concrete framework that oppose one another in the depthwise direction.

Embodiment AB is a window framework as described above that includes a valve for depressurizing the space between at least two window panes when the valve is open and for resealing the space so as to preserve the low pressure within when the valve is closed. A household vacuum cleaner, handheld pump, or other suction device can depressurize the space with an appropriate fitting to mate with that of the window valve port. In some cases, this embodiment comprises a framework including three layers of offset encapsulated cells. In some cases, the framework pieces are formed from three struts connected by two webs.

Embodiment AC is an apparatus as described in the last paragraph of the Summary and in claims 16 and 17, further comprising any number of additional structural-members for a total of N_sm structural-members labeled by a structural-member-array, any number of additional webs for a total of N_w webs labeled by a web-array,
 the first web further comprising any number of additional web-members for a total of N_wm web-members in the first web,
 the second web further comprising any number of additional web-members for a total of N_wm web-members in the second web,
 the structural-member-array indexed by an index, I_sm, that ranges between 1 and N_sm,
 the first structural-member indexed by I_sm equal to 1,
 the second structural-member indexed by I_sm equal to 2,
 the third structural-member indexed by I_sm equal to 3,
 the $I\_sm^{th}$ structural-member positioned between the $(I\_sm-1)^{th}$ and $(I\_sm+1)^{th}$ for I_sm running from 2 to N_sm−1,
 the web-array indexed by an index, I_w, that ranges between 1 and N_sm−1,
 the first web indexed by I_w equal to 1,
 the second web indexed by I_w equal to 2,
 the $I\_w^{th}$ web comprising a number of web-members, $I\_w^{th}$-web N_wm, ranging between 1 and any positive integer greater than zero,
 the $I\_w^{th}$ web indexed by an index, $I\_w^{th}$-web I_wm, that ranges between 1 and $I\_w^{th}$-web N_wm,
 the first web comprising the first web-member,
 the second web comprising the second web-member,
 the first web-member indexed by a first-web N_wm value of 1,
 the second web-member indexed by a second-web N_wm value of 1,
 each web-member in the $I\_w^{th}$ web connecting the $I\_w^{th}$ structural-member to the $(I\_w+1)^{th}$ structural-member in a spaced apart relationship for I_w running from 1 to the $I\_w^{th}$ N_wm,
 the structural parts further comprising the additional structural-members and additional webs and constituting a uniaxial framework, Embodiment AD is the combination of embodiment AB with at least one additional framework for a total of N_f frameworks, and N_f−1 internetworking-web-arrays,
 the frameworks labeled by a framework-array,
 the framework-array indexed by an index, I_f,
 the index, I_f, ranging between 1 and N_f,
 the internetworking-web-arrays labeled by a internetworking-web-array-matrix,
 the internetworking-web-array-matrix comprising a number, N_iwa, of internetworking-web-arrays,
 the number, N_iwa, being at least one,
 the internetworking-web-array-matrix indexed with an index, I_iwa, that specifies the $I\_iwa^{th}$ internetworking-web-array,
 I_iwa, running between 1 and N_f−1,
 the $I\_iwa^{th}$ internetworking-web-array comprising a number, an $I\_iwa^{th}$ N_iw, of internetworking webs,
 the $I\_iwa^{th}$ N_iw, being at least one,
 the $I\_iwa^{th}$ internetworking-web-array indexed by an index, the $I\_iwa^{th}$ I_iw, that specifies the $I\_iwa^{th}$ $I\_iw^{th}$ internetworking-web-array,
 the $I\_iwa^{th}$ I_iw running between 1 and $1\_iwa^{th}$ N_iw,
 the $I\_iwa^{th}$ $I\_iw^{th}$ internetworking-web comprising a number, the $I\_iwa^{th}$ $I\_iw^{th}$ N_iwm, of internetworking-web-members,
 the $I\_iwa^{th}$ $I\_iw^{th}$ N_iwm being at least one,
 the $I\_iwa^{th}$ $I\_iw^{th}$ internetworking-web indexed by an index, the $I\_iwa^{th}$ $I\_iw^{th}$ I_iwm, that specifies the $I\_iwa^{th}$ $I\_iw^{th}$ $I\_iwm^{th}$ internetworking-web-member,
 the $I\_iwa^{th}$ $I\_iw^{th}$ I_iwm running between 1 and $I\_iwa^{th}$ $I\_iw^{th}$ N_iwm,
 the $I\_iwa^{th}$ $I\_iw^{th}$ internetworking-web connecting the $I\_iwa^{th}$ framework to the $(I\_iwa+1)^{th}$ framework for I_iwa running from 1 to N_f−1,
 the $I\_iwa^{th}$ $I\_iw^{th}$ internetworking-web comprising at least one internetworking-web-member that connects at least one structural-member in the $I\_iwa^{th}$ framework to at least one structural-member in the $(I\_iwa+1)^{th}$ framework,
 the structural parts further comprising the internetworking-web-arrays and additional frameworks,
 the structural parts constituting a multiaxial framework, Embodiment AE is Embodiment AC wherein the structural parts are dimensioned and positioned so as to comprise at least one of (A) a most direct second path through the uniaxial frameworks starting from the first structural-member at least 1.5 times longer than the span of the most direct second path through the uniaxial frameworks starting from the first structural-member or (B) a most direct second path through the uniaxial frameworks starting from the first structural-member at least 2 times longer than the span of the most direct second path through the uniaxial frameworks starting from the first structural-member or (C) a most direct second path through the uniaxial frameworks starting from the first structural-member at least 2.5 times longer than the span of the most direct second path through the uniaxial frameworks starting from the first structural-member or (D) a most direct second path through the uniaxial frameworks starting from the first structural-member at least 3 times longer than the span of the most direct second path through the uniaxial frameworks starting from the first structural-member. In some cases each internetworking web-member is a piece of rigid insulation.

Embodiment AF is an apparatus comprising at least one of an array of structural formations, each structural formation comprising an array of structural members, each structural member comprising an array of structural sub-members and an array of webs, each web comprising an array of web members, each web comprising at least one of: (a) an interformation web, wherein the interformation web members are configured to give a span-wise indirectness greater than 100% for the shortest metric path between first and last formations within an array of structural formations.

Embodiment AF: (Preferred Embodiment) for installation in a barrier with a cooperative interior surface and exterior surface, an apparatus comprising a framework with more than one structural member and a global web comprising more than zero global web members wherein the global web members are configured to give (1) a first metric path between the interior surface and exterior surface with a first length $L_1$ a first span $S_1$ a first span-wise indirectness $I_1=\{L_1/S_1\}-1$ greater than 100% (insulative aspect) equivalent to a first structural insulation factor $F_1=L_1/S_1$ greater than 2 wherein the first metric path is shorter than any other metric path between the interior and exterior surfaces, (2) a first direct path between the interior and exterior surfaces with a second span and a first cumulative distance between structural parts (a) greater than {(9%±1%) times the second span} (insulatable aspect) and (b) less than {80% times the second span} (not so insulatable that the structure becomes weak) wherein the first cumulative distance between structural parts is less than any other cumulative distance between structural parts for any other direct path between the interior and exterior surfaces, (3) a first path length that is less than 85 times first cumulative distance between structural parts (balance between the insulatable and insulative aspects). wherein the structural parts include each structural member and the global web.

Embodiment AG: Embodiment AF wherein the same rules apply in any direction perpendicular to the structural members.

A number of alternatives, modifications, variations, or improvements therein may be subsequently made by those skilled in the art, which are also intended to be encompassed by the following claims.

I claim:

1. A framework comprising:
    a first structural member, a second structural member, and a third structural member spaced apart from one another,
    a first web comprising a first plurality of web members each connecting the first structural member to the second structural member,
    a second web comprising a second plurality of web members each connecting the second structural member to the third structural member,
        a set of metric paths, each metric path in the set being defined by a shortest path along which energy can flow through the framework between a first point on the first structural member and a second point on the third structural member, the energy flowing between the first structural member and the second structural member through at least one web member,
        each metric path in the first set of metric paths being characterized by
        a range, R
        a path length, L
        and a rangewise indirectness $I_R$ wherein $(L/R)-1=I_R$, wherein an average rangewise indirectness for the set of metric paths is greater than 0.05.

2. The framework of claim 1 configured such that the average rangewise indirectness is greater than 0.10 for the set of metric paths.

3. The framework of claim 1, wherein each of the first, second, and third structural members is straight, and is in an aligned, coplanar relationship with another of the first, second, and third structural members.

4. The framework of claim 1, wherein any number of the structural members and web members protrude in any direction parallel to another of the structural members and web members.

5. The framework of claim 1, wherein any number of the structural members and web members protrude in any direction perpendicular to another of the structural members and web members.

6. The framework of claim 1, wherein any number of the structural members and web members protrude in any direction diagonal to another of the structural members and web members.

7. The framework of claim 1, wherein the framework is included as a portion in at least one member selected from a group consisting of a window frame, a wall stud, a cripple stud, a jack stud, a queen stud, a king stud, a sill plate, a sole plate, a header, a roof truss, a floor joist, a door frame, and a drywall frame.

8. The framework of claim 1, wherein each web member has a substantially similar thickness to at least one of the structural members connected to the web member.

9. The framework of claim 1, wherein the framework is configured as at least one of a: plate, a picture window frame window sash housing, a window frame, an operable window, a wall stud, a cripple stud, a jack stud, a queen stud, a king stud, a sill plate, a sole plate, a header, a roof truss, a floor joist, a roof truss, a floor joist, a door frame, a drywall frame, a post, a hollow shell, a truss, a header, a rectangular frame, or a polygonal frame.

10. The framework of claim 1 wherein at least one web member connects the three structural members.

11. The framework of claim 1 wherein adhesive secures the elongated structural members to the web members.

12. A building apparatus comprising:
    a framework that includes at least one set of three elongated structural members and at least two web members that maintain the three elongated structural members in a spaced apart, substantially parallel relationship, each of the at least two web members forming a connection between at least two of the three elongated structural members, each set of three elongated structural members and the web members forming a structural-member trio with the second structural member positioned between the first structural member and third structural member,
    the structural-member trio having an average cumulative distance between adjacent elongated structural members, and an average normal depth,
    wherein, for at least one structural-member trio:
        the average cumulative distance between adjacent elongated structural members is less than 80% times the average normal depth, and
        the average cumulative distance between adjacent elongated structural members is more than 10% times the average normal depth.

13. The building apparatus of claim 12, further including insulation.

14. The building apparatus of claim 12 wherein the building apparatus has a thermal resistivity greater than or equal to 0.08° F.·ft$^2$ per BTUh per inch.

15. The building apparatus of claim 12 wherein there are cavities between the elongated structural members, at least a portion of which are filled with an insulating material.

16. The building apparatus of claim 12 wherein at least one web member connects the three elongated structural members.

17. The building apparatus of claim 12 wherein adhesive secures the elongated structural members to the web members.

18. The building apparatus of claim 12, wherein the insulating material is rigid.

19. The building apparatus of claim 12, wherein the insulating material is a foam.

20. The building apparatus of claim 12, wherein the insulating material is a rigid foam.

\* \* \* \* \*